US012671891B2

(12) United States Patent
Alonso et al.

(10) Patent No.: US 12,671,891 B2
(45) Date of Patent: Jun. 30, 2026

(54) USER INTERFACES INTEGRATING HARDWARE BUTTONS

(71) Applicant: Apple Inc., Cupertino, CA (US)

(72) Inventors: Marcos Alonso, Oakland, CA (US); Johnnie B. Manzari, San Francisco, CA (US); Camille Moussette, San Francisco, CA (US); Andre Souza Dos Santos, San Jose, CA (US); Guillaume R. Ardaud, San Francisco, CA (US); Sean Z. Amadio, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/781,667

(22) Filed: Jul. 23, 2024

(65) Prior Publication Data

US 2025/0110574 A1      Apr. 3, 2025

Related U.S. Application Data

(60) Provisional application No. 63/541,755, filed on Sep. 29, 2023.

(51) Int. Cl.
H04N 23/62          (2023.01)
G06F 3/02          (2006.01)
(Continued)

(52) U.S. Cl.
CPC .............. H04N 23/62 (2023.01); G06F 3/02 (2013.01); G06F 3/0482 (2013.01); (Continued)

(58) Field of Classification Search
CPC .... H04N 23/62; H04N 23/632; H04N 23/631; H04N 23/667; G06F 3/02; G06F 3/0482; G06F 3/04847; G06F 3/0488
See application file for complete search history.

(56) References Cited

U.S. PATENT DOCUMENTS 4,518,237 A      5/1985   Mizokami
4,933,702 A      6/1990   Komatsuzaki et al.
(Continued)

FOREIGN PATENT DOCUMENTS

CA          2729392 A1      8/2011
CA          2965700 A1      5/2016
(Continued)

OTHER PUBLICATIONS

Applicant-Initiated Interview Summary received for U.S. Appl. No. 18/423,234, mailed on Jan. 2, 2025, 2 pages.
(Continued)

*Primary Examiner* — Benyam Ketema
(74) *Attorney, Agent, or Firm* — YHE Law LLP

(57)          ABSTRACT

User interfaces integrating one or more hardware buttons are described, including camera user interfaces that perform different media capture operations (e.g., different types of captures, synthetic depth-of-field operations, and/or changes to the camera user interface) in response to presses of different buttons and/or in response to different types of button presses, user interfaces that provide different responses to button presses inside and outside of a camera application, and user interfaces that provide different settings functions in response to different types of button presses.

42 Claims, 56 Drawing Sheets

(51) Int. Cl.

| | |
|---|---|
| *G06F 3/0482* | (2013.01) |
| *G06F 3/04847* | (2022.01) |
| *G06F 3/0488* | (2022.01) |
| *H04N 23/63* | (2023.01) |

(52) U.S. Cl.
CPC ........ *G06F 3/04847* (2013.01); *G06F 3/0488* (2013.01); *H04N 23/632* (2023.01)

(56) References Cited

U.S. PATENT DOCUMENTS

| | | | |
|---|---|---|---|
| 5,463,443 A | 10/1995 | Tanaka et al. | |
| 5,557,358 A | 9/1996 | Mukai et al. | |
| 5,615,384 A | 3/1997 | Allard et al. | |
| 5,825,353 A * | 10/1998 | Will | H04M 1/275 |
| | | | 345/184 |
| 6,262,769 B1 | 7/2001 | Anderson et al. | |
| 6,268,864 B1 | 7/2001 | Chen et al. | |
| 6,278,466 B1 | 8/2001 | Chen | |
| 6,359,837 B1 | 3/2002 | Tsukamoto | |
| 6,429,896 B1 | 8/2002 | Aruga et al. | |
| 6,522,347 B1 | 2/2003 | Sakai et al. | |
| 6,677,981 B1 | 1/2004 | Mancuso et al. | |
| 6,809,724 B1 | 10/2004 | Shiraishi et al. | |
| 6,809,759 B1 | 10/2004 | Chiang | |
| 6,819,867 B2 | 11/2004 | Mayer et al. | |
| 6,900,840 B1 | 5/2005 | Schinner et al. | |
| 7,417,680 B2 | 8/2008 | Aoki et al. | |
| 7,463,304 B2 | 12/2008 | Murray | |
| 7,515,178 B1 | 4/2009 | Fleischman et al. | |
| 7,583,892 B2 | 9/2009 | Okumura | |
| 8,073,207 B2 | 12/2011 | Ayaki et al. | |
| 8,185,839 B2 | 5/2012 | Jalon et al. | |
| 8,189,087 B2 | 5/2012 | Misawa et al. | |
| 8,493,408 B2 | 7/2013 | Williamson et al. | |
| 8,576,304 B2 | 11/2013 | Ishibashi | |
| 8,624,836 B1 | 1/2014 | Miller et al. | |
| 8,638,371 B2 | 1/2014 | Laberge et al. | |
| 8,659,555 B2 * | 2/2014 | Pihlaja | G06F 3/016 |
| | | | 715/702 |
| 8,675,084 B2 | 3/2014 | Bolton et al. | |
| 8,723,988 B2 | 5/2014 | Thorn | |
| 8,736,704 B2 | 5/2014 | Jasinski et al. | |
| 8,736,716 B2 | 5/2014 | Prentice | |
| 8,742,890 B2 | 6/2014 | Gocho et al. | |
| 8,762,895 B2 | 6/2014 | Mehta et al. | |
| 8,848,097 B2 | 9/2014 | Makii | |
| 8,885,978 B2 | 11/2014 | Cote et al. | |
| 8,941,749 B2 | 1/2015 | Yahata | |
| 9,001,226 B1 | 4/2015 | Ng et al. | |
| 9,024,938 B2 | 5/2015 | Joshi | |
| 9,077,896 B2 | 7/2015 | Park et al. | |
| 9,122,376 B1 | 9/2015 | Brotherston et al. | |
| 9,143,692 B2 | 9/2015 | Hayashi | |
| 9,158,974 B1 | 10/2015 | Laska et al. | |
| 9,172,866 B2 | 10/2015 | Ito et al. | |
| 9,223,486 B2 | 12/2015 | Shin et al. | |
| 9,230,306 B2 | 1/2016 | Sun et al. | |
| 9,250,797 B2 | 2/2016 | Roberts et al. | |
| 9,264,660 B1 | 2/2016 | Petterson et al. | |
| 9,288,476 B2 | 3/2016 | Sandrew et al. | |
| 9,313,397 B2 | 4/2016 | Harris et al. | |
| 9,313,401 B2 | 4/2016 | Frey et al. | |
| 9,342,230 B2 | 5/2016 | Bastien et al. | |
| 9,360,671 B1 | 6/2016 | Zhou | |
| 9,423,868 B2 | 8/2016 | Iwasaki | |
| 9,451,144 B2 | 9/2016 | Dye | |
| 9,467,812 B2 | 10/2016 | Jung et al. | |
| 9,507,420 B2 | 11/2016 | Tartz et al. | |
| 9,538,069 B2 * | 1/2017 | Nagao | H04N 23/635 |
| 9,544,563 B1 | 1/2017 | Cheng et al. | |
| 9,600,178 B2 | 3/2017 | Yun et al. | |
| 9,609,221 B2 | 3/2017 | Kim et al. | |
| 9,667,881 B2 | 5/2017 | Harris et al. | |
| 9,716,825 B1 | 7/2017 | Manzari et al. | |

| | | | |
|---|---|---|---|
| 9,767,613 B1 | 9/2017 | Bedikian et al. | |
| 9,824,499 B2 | 11/2017 | Wright et al. | |
| 9,874,933 B1 | 1/2018 | Carryer | |
| 9,942,463 B2 | 4/2018 | Kuo et al. | |
| 9,973,674 B2 | 5/2018 | Dye et al. | |
| 10,015,298 B2 | 7/2018 | Yang et al. | |
| 10,021,294 B2 | 7/2018 | Kwon et al. | |
| 10,025,380 B2 | 7/2018 | Hodge et al. | |
| 10,055,887 B1 | 8/2018 | Gil et al. | |
| 10,127,639 B2 | 11/2018 | Miura et al. | |
| 10,152,222 B2 | 12/2018 | Ozawa et al. | |
| 10,176,622 B1 | 1/2019 | Waggoner et al. | |
| 10,187,587 B2 | 1/2019 | Hasinoff et al. | |
| 10,225,463 B2 | 3/2019 | Yun et al. | |
| 10,230,901 B2 | 3/2019 | Harris et al. | |
| 10,264,647 B1 | 4/2019 | Penberthy et al. | |
| 10,270,983 B1 | 4/2019 | Van Os et al. | |
| 10,277,829 B1 | 4/2019 | Garrido et al. | |
| 10,297,034 B2 | 5/2019 | Nash et al. | |
| 10,304,231 B2 | 5/2019 | Saito | |
| 10,313,652 B1 | 6/2019 | Falstrup et al. | |
| 10,325,417 B1 | 6/2019 | Scapel et al. | |
| 10,326,942 B2 | 6/2019 | Shabtay et al. | |
| 10,345,592 B2 | 7/2019 | Samec et al. | |
| 10,397,469 B1 | 8/2019 | Yan et al. | |
| 10,397,500 B1 | 8/2019 | Xu et al. | |
| 10,447,908 B2 | 10/2019 | Lee et al. | |
| 10,452,116 B1 | 10/2019 | Devries et al. | |
| 10,467,729 B1 | 11/2019 | Perera et al. | |
| 10,467,775 B1 | 11/2019 | Waggoner et al. | |
| 10,474,194 B1 * | 11/2019 | Ell | G06F 1/1633 |
| 10,523,879 B2 | 12/2019 | Dye et al. | |
| 10,574,895 B2 | 2/2020 | Lee et al. | |
| 10,585,551 B2 | 3/2020 | Lee et al. | |
| 10,614,139 B2 | 4/2020 | Fujioka et al. | |
| 10,645,294 B1 | 5/2020 | Manzari et al. | |
| 10,652,470 B1 | 5/2020 | Manzari et al. | |
| 10,674,072 B1 | 6/2020 | Manzari et al. | |
| 10,681,282 B1 | 6/2020 | Manzari et al. | |
| 10,681,341 B2 | 6/2020 | Lutter et al. | |
| 10,735,642 B1 | 8/2020 | Manzari et al. | |
| 10,735,643 B1 | 8/2020 | Manzari et al. | |
| 10,791,273 B1 | 9/2020 | Manzari et al. | |
| 10,914,834 B2 | 2/2021 | Amihood et al. | |
| 10,955,956 B2 | 3/2021 | Gleeson et al. | |
| 10,958,850 B2 | 3/2021 | Kwak et al. | |
| 10,962,935 B1 * | 3/2021 | Ely | G04G 21/00 |
| 11,032,535 B2 | 6/2021 | Lutter et al. | |
| 11,032,536 B2 | 6/2021 | Lutter et al. | |
| 11,039,074 B1 | 6/2021 | Manzari et al. | |
| 11,054,973 B1 | 7/2021 | Manzari et al. | |
| 11,070,717 B2 | 7/2021 | Cragg et al. | |
| 11,099,650 B1 * | 8/2021 | Haynold | G06F 3/016 |
| 11,140,313 B1 | 10/2021 | Knott | |
| 11,209,957 B2 | 12/2021 | Dryer et al. | |
| 11,212,449 B1 | 12/2021 | Manzari et al. | |
| 11,321,857 B2 | 5/2022 | Stauber et al. | |
| 11,350,026 B1 | 5/2022 | Manzari et al. | |
| 11,397,239 B2 | 7/2022 | Jungmaier et al. | |
| 11,399,155 B2 | 7/2022 | Van Os et al. | |
| 11,431,891 B2 | 8/2022 | O'leary et al. | |
| 11,468,625 B2 | 10/2022 | Manzari et al. | |
| 11,490,017 B2 | 11/2022 | Bernstein et al. | |
| 11,550,420 B2 | 1/2023 | Bovet et al. | |
| 11,570,359 B2 | 1/2023 | Lee et al. | |
| 11,606,496 B2 | 3/2023 | Watanabe et al. | |
| 11,747,969 B1 | 9/2023 | Karunamuni | |
| 11,811,961 B2 | 11/2023 | Zhang et al. | |
| 11,877,064 B1 | 1/2024 | Douglas et al. | |
| 11,982,563 B1 | 5/2024 | Staats et al. | |
| 2002/0140803 A1 | 10/2002 | Gutta et al. | |
| 2002/0167604 A1 | 11/2002 | Ban et al. | |
| 2002/0171737 A1 | 11/2002 | Tullis et al. | |
| 2003/0025802 A1 | 2/2003 | Mayer, Jr. et al. | |
| 2003/0107664 A1 | 6/2003 | Suzuki | |
| 2003/0122930 A1 | 7/2003 | Schofield et al. | |
| 2003/0160756 A1 | 8/2003 | Numano | |
| 2003/0174216 A1 | 9/2003 | Iguchi et al. | |
| 2003/0184587 A1 | 10/2003 | Ording et al. | |

(56) References Cited

U.S. PATENT DOCUMENTS

| | | |
|---|---|---|
| 2004/0041924 A1 | 3/2004 | White et al. |
| 2004/0061796 A1 | 4/2004 | Honda et al. |
| 2004/0090469 A1 | 5/2004 | Moon et al. |
| 2004/0090546 A1 | 5/2004 | Doron |
| 2004/0111164 A1 | 6/2004 | Stohrer et al. |
| 2004/0189861 A1 | 9/2004 | Tom et al. |
| 2004/0201699 A1* | 10/2004 | Parulski .............. H04N 1/6011 |
| | | 348/207.99 |
| 2005/0027515 A1 | 2/2005 | Huang et al. |
| 2005/0134695 A1 | 6/2005 | Deshpande et al. |
| 2005/0189419 A1 | 9/2005 | Igarashi et al. |
| 2005/0206981 A1 | 9/2005 | Hung |
| 2005/0210403 A1 | 9/2005 | Satanek |
| 2005/0237383 A1 | 10/2005 | Soga et al. |
| 2005/0248660 A1 | 11/2005 | Stavely et al. |
| 2005/0270397 A1 | 12/2005 | Battles |
| 2006/0033831 A1 | 2/2006 | Ejima et al. |
| 2006/0132482 A1 | 6/2006 | Oh et al. |
| 2006/0158730 A1 | 7/2006 | Kira |
| 2006/0187322 A1 | 8/2006 | Janson et al. |
| 2006/0209067 A1 | 9/2006 | Pellacini et al. |
| 2007/0025711 A1 | 2/2007 | Marcus et al. |
| 2007/0025723 A1 | 2/2007 | Baudisch et al. |
| 2007/0031062 A1 | 2/2007 | Pal et al. |
| 2007/0040810 A1* | 2/2007 | Dowe ................. G06F 3/04142 |
| | | 345/173 |
| 2007/0097088 A1 | 5/2007 | Battles |
| 2007/0109417 A1 | 5/2007 | Hyttfors et al. |
| 2007/0140675 A1 | 6/2007 | Yanagi et al. |
| 2007/0153112 A1 | 7/2007 | Ueda et al. |
| 2007/0165103 A1 | 7/2007 | Arima et al. |
| 2007/0228259 A1 | 10/2007 | Hohenberger |
| 2007/0254640 A1 | 11/2007 | Bliss |
| 2007/0273769 A1 | 11/2007 | Takahashi |
| 2007/0291152 A1 | 12/2007 | Suekane et al. |
| 2008/0030592 A1 | 2/2008 | Border et al. |
| 2008/0084484 A1 | 4/2008 | Ochi et al. |
| 2008/0106601 A1 | 5/2008 | Matsuda |
| 2008/0129759 A1 | 6/2008 | Jeon et al. |
| 2008/0129825 A1 | 6/2008 | Deangelis et al. |
| 2008/0131019 A1 | 6/2008 | Ng |
| 2008/0143840 A1 | 6/2008 | Corkum et al. |
| 2008/0192020 A1 | 8/2008 | Kang et al. |
| 2008/0218611 A1 | 9/2008 | Parulski et al. |
| 2008/0222558 A1 | 9/2008 | Cho et al. |
| 2008/0259154 A1 | 10/2008 | Garrison et al. |
| 2008/0284855 A1 | 11/2008 | Umeyama et al. |
| 2008/0309811 A1 | 12/2008 | Fujinawa et al. |
| 2009/0009612 A1 | 1/2009 | Tico et al. |
| 2009/0021576 A1 | 1/2009 | Linder et al. |
| 2009/0021600 A1 | 1/2009 | Watanabe |
| 2009/0022422 A1 | 1/2009 | Sorek et al. |
| 2009/0027515 A1 | 1/2009 | Maruyama et al. |
| 2009/0027539 A1 | 1/2009 | Kunou |
| 2009/0040332 A1 | 2/2009 | Yoshino et al. |
| 2009/0046097 A1 | 2/2009 | Franklin |
| 2009/0051783 A1 | 2/2009 | Kim et al. |
| 2009/0102918 A1 | 4/2009 | Sakamoto et al. |
| 2009/0102933 A1 | 4/2009 | Harris et al. |
| 2009/0109316 A1 | 4/2009 | Matsui |
| 2009/0160778 A1 | 6/2009 | Nurmi et al. |
| 2009/0167671 A1 | 7/2009 | Kerofsky |
| 2009/0167672 A1 | 7/2009 | Kerofsky |
| 2009/0175511 A1 | 7/2009 | Lee et al. |
| 2009/0227295 A1 | 9/2009 | Kim |
| 2009/0244318 A1 | 10/2009 | Makii |
| 2009/0262088 A1* | 10/2009 | Moll-Carrillo .......... A61B 5/11 |
| | | 345/173 |
| 2009/0263044 A1 | 10/2009 | Imagawa et al. |
| 2009/0276700 A1 | 11/2009 | Anderson et al. |
| 2009/0315671 A1 | 12/2009 | Gocho et al. |
| 2009/0322901 A1 | 12/2009 | Subbotin et al. |
| 2010/0020221 A1 | 1/2010 | Tupman et al. |
| 2010/0020222 A1 | 1/2010 | Jones et al. |
| 2010/0026637 A1 | 2/2010 | Lai |
| 2010/0033615 A1 | 2/2010 | Mori |
| 2010/0039394 A1 | 2/2010 | Moussavi |
| 2010/0039522 A1 | 2/2010 | Huang |
| 2010/0066853 A1 | 3/2010 | Aoki et al. |
| 2010/0066889 A1 | 3/2010 | Ueda et al. |
| 2010/0066890 A1 | 3/2010 | Ueda et al. |
| 2010/0066895 A1 | 3/2010 | Ueda et al. |
| 2010/0123737 A1 | 5/2010 | Williamson et al. |
| 2010/0162160 A1 | 6/2010 | Stallings et al. |
| 2010/0164893 A1 | 7/2010 | Shin et al. |
| 2010/0194931 A1 | 8/2010 | Kawaguchi et al. |
| 2010/0208122 A1 | 8/2010 | Yumiki |
| 2010/0210248 A1 | 8/2010 | Morrissey et al. |
| 2010/0231735 A1 | 9/2010 | Burian et al. |
| 2010/0231777 A1 | 9/2010 | Shintani et al. |
| 2010/0232703 A1 | 9/2010 | Aiso |
| 2010/0238327 A1 | 9/2010 | Griffith et al. |
| 2010/0245287 A1 | 9/2010 | Thorn |
| 2010/0259645 A1 | 10/2010 | Kaplan et al. |
| 2010/0265183 A1 | 10/2010 | Mail et al. |
| 2010/0271315 A1 | 10/2010 | Bathiche |
| 2010/0283743 A1 | 11/2010 | Coddington |
| 2010/0289825 A1 | 11/2010 | Shin et al. |
| 2010/0289910 A1 | 11/2010 | Kamshilin et al. |
| 2010/0302280 A1 | 12/2010 | Szeliski et al. |
| 2011/0008033 A1 | 1/2011 | Ichimiya et al. |
| 2011/0013049 A1 | 1/2011 | Thörn |
| 2011/0018970 A1 | 1/2011 | Wakabayashi |
| 2011/0019058 A1 | 1/2011 | Sakai et al. |
| 2011/0019069 A1* | 1/2011 | Kojima .................. H04N 23/68 |
| | | 348/E5.037 |
| 2011/0043662 A1 | 2/2011 | Kim |
| 2011/0050864 A1 | 3/2011 | Bond |
| 2011/0058052 A1 | 3/2011 | Bolton et al. |
| 2011/0074710 A1 | 3/2011 | Weeldreyer et al. |
| 2011/0074830 A1 | 3/2011 | Rapp et al. |
| 2011/0109581 A1 | 5/2011 | Ozawa et al. |
| 2011/0115932 A1 | 5/2011 | Shin et al. |
| 2011/0138332 A1 | 6/2011 | Miyagawa |
| 2011/0157379 A1 | 6/2011 | Kimura |
| 2011/0176039 A1 | 7/2011 | Lo |
| 2011/0187879 A1 | 8/2011 | Ochial |
| 2011/0199495 A1 | 8/2011 | Laberge et al. |
| 2011/0242369 A1 | 10/2011 | Misawa et al. |
| 2011/0249078 A1 | 10/2011 | Abuan et al. |
| 2011/0296163 A1 | 12/2011 | Abernethy et al. |
| 2012/0002098 A1 | 1/2012 | Ueda |
| 2012/0002898 A1 | 1/2012 | Côt̂eet al. |
| 2012/0011456 A1 | 1/2012 | Noda et al. |
| 2012/0026378 A1 | 2/2012 | Pang et al. |
| 2012/0056997 A1 | 3/2012 | Jang |
| 2012/0057064 A1 | 3/2012 | Gardiner et al. |
| 2012/0069206 A1 | 3/2012 | Hsieh |
| 2012/0084662 A1 | 4/2012 | Navarro et al. |
| 2012/0120277 A1 | 5/2012 | Tsai et al. |
| 2012/0127189 A1 | 5/2012 | Park et al. |
| 2012/0127346 A1 | 5/2012 | Sato et al. |
| 2012/0133797 A1 | 5/2012 | Sato et al. |
| 2012/0162242 A1 | 6/2012 | Amano et al. |
| 2012/0162455 A1 | 6/2012 | Kim et al. |
| 2012/0169776 A1 | 7/2012 | Rissa et al. |
| 2012/0188394 A1 | 7/2012 | Park et al. |
| 2012/0194559 A1 | 8/2012 | Lim |
| 2012/0206621 A1 | 8/2012 | Chen et al. |
| 2012/0235990 A1 | 9/2012 | Yamaji |
| 2012/0243802 A1 | 9/2012 | Fintel et al. |
| 2012/0274508 A1 | 11/2012 | Brown et al. |
| 2012/0274830 A1 | 11/2012 | Kameyama et al. |
| 2012/0293558 A1 | 11/2012 | Dilts |
| 2012/0293611 A1 | 11/2012 | Lee |
| 2012/0308209 A1 | 12/2012 | Zaletel |
| 2012/0320141 A1 | 12/2012 | Bowen et al. |
| 2013/0009858 A1 | 1/2013 | Lacey |
| 2013/0010170 A1 | 1/2013 | Matsuzawa et al. |
| 2013/0038546 A1 | 2/2013 | Mineo |
| 2013/0038771 A1 | 2/2013 | Brunner et al. |
| 2013/0050129 A1 | 2/2013 | Liu |
| 2013/0055119 A1 | 2/2013 | Luong |
| 2013/0057472 A1 | 3/2013 | Dizac et al. |

(56)  References Cited

U.S. PATENT DOCUMENTS

| | | | |
|---|---|---|---|
| 2013/0076908 A1 | 3/2013 | Bratton et al. |
| 2013/0083222 A1 | 4/2013 | Matsuzawa et al. |
| 2013/0088413 A1 | 4/2013 | Raffle et al. |
| 2013/0091298 A1 | 4/2013 | Ozzie et al. |
| 2013/0093904 A1 | 4/2013 | Wagner et al. |
| 2013/0109425 A1 | 5/2013 | Kerger et al. |
| 2013/0120386 A1 | 5/2013 | Wilensky et al. |
| 2013/0135315 A1 | 5/2013 | Bares et al. |
| 2013/0141362 A1 | 6/2013 | Asanuma et al. |
| 2013/0155308 A1 | 6/2013 | Wu et al. |
| 2013/0165186 A1 | 6/2013 | Choi |
| 2013/0179831 A1 | 7/2013 | Izaki |
| 2013/0194378 A1 | 8/2013 | Brown |
| 2013/0201307 A1 | 8/2013 | Schloter et al. |
| 2013/0208093 A1 | 8/2013 | Sun et al. |
| 2013/0210563 A1 | 8/2013 | Hollinger |
| 2013/0222671 A1 | 8/2013 | Tseng et al. |
| 2013/0235222 A1 | 9/2013 | Karn et al. |
| 2013/0235226 A1 | 9/2013 | Karn et al. |
| 2013/0235234 A1 | 9/2013 | Cucci et al. |
| 2013/0239057 A1 | 9/2013 | Ubillos et al. |
| 2013/0246948 A1 | 9/2013 | Chen et al. |
| 2013/0265467 A1 | 10/2013 | Matsuzawa et al. |
| 2013/0278576 A1 | 10/2013 | Lee et al. |
| 2013/0286251 A1 | 10/2013 | Wood et al. |
| 2013/0311186 A1 | 11/2013 | Lee et al. |
| 2013/0329074 A1 | 12/2013 | Zhang et al. |
| 2013/0346916 A1 | 12/2013 | Williamson et al. |
| 2014/0007021 A1 | 1/2014 | Akiyama et al. |
| 2014/0009639 A1 | 1/2014 | Lee |
| 2014/0022399 A1 | 1/2014 | Rashid et al. |
| 2014/0028872 A1 | 1/2014 | Lee et al. |
| 2014/0028885 A1 | 1/2014 | Ma et al. |
| 2014/0033043 A1 | 1/2014 | Kashima |
| 2014/0033059 A1 | 1/2014 | Schubert et al. |
| 2014/0033100 A1 | 1/2014 | Noda et al. |
| 2014/0037178 A1 | 2/2014 | Park |
| 2014/0043368 A1 | 2/2014 | Yu |
| 2014/0043517 A1 | 2/2014 | Mm et al. |
| 2014/0047389 A1 | 2/2014 | Aarabi |
| 2014/0049536 A1 | 2/2014 | Neuman et al. |
| 2014/0063175 A1 | 3/2014 | Jafry et al. |
| 2014/0063313 A1 | 3/2014 | Choi et al. |
| 2014/0071325 A1 | 3/2014 | Kawahara et al. |
| 2014/0078371 A1 | 3/2014 | Kinoshita |
| 2014/0092272 A1 | 4/2014 | Choi |
| 2014/0099994 A1 | 4/2014 | Bishop et al. |
| 2014/0101608 A1 | 4/2014 | Ryskamp et al. |
| 2014/0104449 A1 | 4/2014 | Masarik et al. |
| 2014/0108928 A1 | 4/2014 | Mumick |
| 2014/0118563 A1 | 5/2014 | Mehta et al. |
| 2014/0132735 A1 | 5/2014 | Lee et al. |
| 2014/0143678 A1 | 5/2014 | Mistry et al. |
| 2014/0152886 A1 | 6/2014 | Morgan-Mar et al. |
| 2014/0160304 A1 | 6/2014 | Galor et al. |
| 2014/0160316 A1 | 6/2014 | Hwang |
| 2014/0176469 A1 | 6/2014 | Lim |
| 2014/0184524 A1 | 7/2014 | Schiefer et al. |
| 2014/0192232 A1 | 7/2014 | Park et al. |
| 2014/0192233 A1 | 7/2014 | Kakkori et al. |
| 2014/0204229 A1 | 7/2014 | Leung et al. |
| 2014/0218383 A1 | 8/2014 | Srivastava |
| 2014/0218599 A1 | 8/2014 | Nakamura et al. |
| 2014/0226052 A1 | 8/2014 | Kang et al. |
| 2014/0232838 A1 | 8/2014 | Jorgensen et al. |
| 2014/0232921 A1 | 8/2014 | Kim et al. |
| 2014/0240471 A1 | 8/2014 | Srinivasa et al. |
| 2014/0240531 A1 | 8/2014 | Nakai et al. |
| 2014/0240551 A1 | 8/2014 | Kim et al. |
| 2014/0240577 A1 | 8/2014 | Masugi |
| 2014/0253470 A1* | 9/2014 | Havilio ................ G06F 3/0488 |
| | | 345/173 |
| 2014/0267867 A1 | 9/2014 | Lee et al. |
| 2014/0281966 A1 | 9/2014 | Kajiyama et al. |
| 2014/0281983 A1 | 9/2014 | Xian et al. |
| 2014/0282223 A1 | 9/2014 | Bastien et al. |
| 2014/0285698 A1 | 9/2014 | Geiss |
| 2014/0300635 A1 | 10/2014 | Suzuki |
| 2014/0300779 A1 | 10/2014 | Yeo et al. |
| 2014/0307147 A1 | 10/2014 | Hanzawa et al. |
| 2014/0310598 A1 | 10/2014 | Sprague et al. |
| 2014/0327639 A1 | 11/2014 | Papakipos et al. |
| 2014/0333671 A1 | 11/2014 | Phang et al. |
| 2014/0333790 A1 | 11/2014 | Wakazono |
| 2014/0333824 A1 | 11/2014 | Xiu |
| 2014/0351753 A1 | 11/2014 | Shin et al. |
| 2014/0354845 A1 | 12/2014 | Mølgaard et al. |
| 2014/0359438 A1 | 12/2014 | Matsuki |
| 2014/0362257 A1* | 12/2014 | Viljamaa ............... G06F 1/1684 |
| | | 348/231.99 |
| 2014/0362274 A1 | 12/2014 | Christie et al. |
| 2014/0368601 A1 | 12/2014 | Decharms |
| 2014/0368719 A1 | 12/2014 | Kaneko et al. |
| 2014/0372856 A1 | 12/2014 | Radakovitz et al. |
| 2014/0375862 A1 | 12/2014 | Kim et al. |
| 2015/0022649 A1 | 1/2015 | Koppal |
| 2015/0022674 A1 | 1/2015 | Koss et al. |
| 2015/0033129 A1 | 1/2015 | Cho et al. |
| 2015/0042852 A1 | 2/2015 | Lee et al. |
| 2015/0049233 A1 | 2/2015 | Choi |
| 2015/0067513 A1 | 3/2015 | Zambetti et al. |
| 2015/0070362 A1 | 3/2015 | Hirai |
| 2015/0085174 A1 | 3/2015 | Shabtay et al. |
| 2015/0092077 A1 | 4/2015 | Feder et al. |
| 2015/0116353 A1 | 4/2015 | Miura et al. |
| 2015/0116448 A1 | 4/2015 | Gottlieb |
| 2015/0116542 A1 | 4/2015 | Lee |
| 2015/0135109 A1 | 5/2015 | Zambetti et al. |
| 2015/0135234 A1 | 5/2015 | Hall |
| 2015/0138079 A1 | 5/2015 | Lannsjö |
| 2015/0145950 A1 | 5/2015 | Murphy et al. |
| 2015/0146079 A1 | 5/2015 | Kim |
| 2015/0149967 A1 | 5/2015 | Bernstein et al. |
| 2015/0150141 A1 | 5/2015 | Szymanski et al. |
| 2015/0154448 A1 | 6/2015 | Murayama et al. |
| 2015/0163442 A1 | 6/2015 | Han et al. |
| 2015/0172534 A1 | 6/2015 | Miyakawa et al. |
| 2015/0181135 A1 | 6/2015 | Shimosato |
| 2015/0189162 A1 | 7/2015 | Kuo et al. |
| 2015/0194186 A1 | 7/2015 | Lee et al. |
| 2015/0201130 A1 | 7/2015 | Cho et al. |
| 2015/0207924 A1 | 7/2015 | Kim et al. |
| 2015/0212723 A1 | 7/2015 | Lim et al. |
| 2015/0220249 A1 | 8/2015 | Snibbe et al. |
| 2015/0248198 A1 | 9/2015 | Somlai-Fisher et al. |
| 2015/0248213 A1* | 9/2015 | Postal ................... G06F 3/0488 |
| | | 715/835 |
| 2015/0249775 A1 | 9/2015 | Jacumet |
| 2015/0249785 A1 | 9/2015 | Mehta et al. |
| 2015/0254855 A1 | 9/2015 | Patankar et al. |
| 2015/0254868 A1 | 9/2015 | Srikanth et al. |
| 2015/0256749 A1 | 9/2015 | Frey et al. |
| 2015/0264202 A1 | 9/2015 | Pawlowski |
| 2015/0271389 A1 | 9/2015 | Huang et al. |
| 2015/0281585 A1 | 10/2015 | Guldogan |
| 2015/0289104 A1 | 10/2015 | Jung et al. |
| 2015/0297185 A1 | 10/2015 | Mccormack et al. |
| 2015/0301731 A1 | 10/2015 | Okamoto et al. |
| 2015/0310583 A1 | 10/2015 | Hume et al. |
| 2015/0312185 A1 | 10/2015 | Langholz et al. |
| 2015/0334291 A1 | 11/2015 | Cho et al. |
| 2015/0334292 A1 | 11/2015 | Tartz et al. |
| 2015/0334293 A1 | 11/2015 | Jeung |
| 2015/0341536 A1 | 11/2015 | Huang et al. |
| 2015/0350141 A1 | 12/2015 | Yang et al. |
| 2015/0350523 A1 | 12/2015 | Kinoshita |
| 2015/0350533 A1 | 12/2015 | Harris et al. |
| 2015/0350535 A1 | 12/2015 | Voss |
| 2015/0362998 A1 | 12/2015 | Park et al. |
| 2015/0370425 A1 | 12/2015 | Chen et al. |
| 2015/0370458 A1 | 12/2015 | Chen |
| 2016/0012567 A1 | 1/2016 | Siddiqui et al. |
| 2016/0026371 A1 | 1/2016 | Lu et al. |
| 2016/0029004 A1 | 1/2016 | Campbell et al. |

(56)　　　　　References Cited

U.S. PATENT DOCUMENTS

| | | |
|---|---|---|
| 2016/0044236 A1 | 2/2016 | Matsuzawa et al. |
| 2016/0048598 A1 | 2/2016 | Fujioka et al. |
| 2016/0048599 A1 | 2/2016 | Fujioka et al. |
| 2016/0048725 A1 | 2/2016 | Holz et al. |
| 2016/0048903 A1 | 2/2016 | Fujioka et al. |
| 2016/0050351 A1 | 2/2016 | Lee et al. |
| 2016/0050446 A1 | 2/2016 | Fujioka et al. |
| 2016/0065832 A1 | 3/2016 | Kim et al. |
| 2016/0077725 A1 | 3/2016 | Maeda |
| 2016/0080639 A1 | 3/2016 | Choi et al. |
| 2016/0088280 A1 | 3/2016 | Sadi et al. |
| 2016/0105388 A1 | 4/2016 | Bin Mahfooz et al. |
| 2016/0117829 A1 | 4/2016 | Yoon et al. |
| 2016/0119552 A1 | 4/2016 | Oh et al. |
| 2016/0127636 A1 | 5/2016 | Ito et al. |
| 2016/0127638 A1 | 5/2016 | Guo et al. |
| 2016/0132201 A1 | 5/2016 | Shaw et al. |
| 2016/0148384 A1 | 5/2016 | Bud et al. |
| 2016/0162039 A1 | 6/2016 | Eilat et al. |
| 2016/0173869 A1 | 6/2016 | Srikanth et al. |
| 2016/0188181 A1 | 6/2016 | Smith |
| 2016/0212319 A1 | 7/2016 | Harris et al. |
| 2016/0219212 A1 | 7/2016 | Shoji |
| 2016/0219217 A1 | 7/2016 | Williams et al. |
| 2016/0225175 A1 | 8/2016 | Kim et al. |
| 2016/0227016 A1 | 8/2016 | Kim et al. |
| 2016/0241777 A1 | 8/2016 | Rav-Acha et al. |
| 2016/0247288 A1 | 8/2016 | Omori et al. |
| 2016/0255268 A1 | 9/2016 | Kang et al. |
| 2016/0259413 A1 | 9/2016 | Anzures et al. |
| 2016/0283586 A1 | 9/2016 | Thapliyal et al. |
| 2016/0316147 A1 | 10/2016 | Bernstein et al. |
| 2016/0328023 A1 | 11/2016 | Mistry et al. |
| 2016/0337570 A1 | 11/2016 | Tan et al. |
| 2016/0337582 A1 | 11/2016 | Shimauchi et al. |
| 2016/0357353 A1 | 12/2016 | Miura et al. |
| 2016/0357354 A1* | 12/2016 | Chen ...................... G06F 3/167 |
| 2016/0360097 A1 | 12/2016 | Penha et al. |
| 2016/0360116 A1 | 12/2016 | Penha et al. |
| 2016/0366344 A1 | 12/2016 | Pan et al. |
| 2016/0373631 A1 | 12/2016 | Titi et al. |
| 2016/0373650 A1 | 12/2016 | Kim et al. |
| 2017/0006210 A1 | 1/2017 | Dye et al. |
| 2017/0011773 A1 | 1/2017 | Lee |
| 2017/0013179 A1 | 1/2017 | Kang et al. |
| 2017/0019604 A1 | 1/2017 | Kim et al. |
| 2017/0024872 A1 | 1/2017 | Olsson et al. |
| 2017/0026565 A1 | 1/2017 | Hong et al. |
| 2017/0032269 A1 | 2/2017 | Portilla et al. |
| 2017/0034449 A1 | 2/2017 | Eum et al. |
| 2017/0038852 A1 | 2/2017 | Hildreth et al. |
| 2017/0039686 A1 | 2/2017 | Miura et al. |
| 2017/0041549 A1 | 2/2017 | Kim et al. |
| 2017/0041677 A1 | 2/2017 | Anderson et al. |
| 2017/0046025 A1 | 2/2017 | Dascola et al. |
| 2017/0048450 A1 | 2/2017 | Lee et al. |
| 2017/0048461 A1 | 2/2017 | Lee et al. |
| 2017/0048494 A1 | 2/2017 | Boyle et al. |
| 2017/0054960 A1 | 2/2017 | Chien et al. |
| 2017/0064184 A1 | 3/2017 | Tsai |
| 2017/0064205 A1 | 3/2017 | Choi et al. |
| 2017/0064213 A1 | 3/2017 | Windmark et al. |
| 2017/0092329 A1 | 3/2017 | Kim et al. |
| 2017/0094019 A1 | 3/2017 | Ahmed et al. |
| 2017/0109912 A1 | 4/2017 | Lee et al. |
| 2017/0111567 A1 | 4/2017 | Pila |
| 2017/0124664 A1 | 5/2017 | Savenok et al. |
| 2017/0134605 A1 | 5/2017 | Ju et al. |
| 2017/0139572 A1 | 5/2017 | Sunkavalli et al. |
| 2017/0186162 A1 | 6/2017 | Mihic et al. |
| 2017/0230576 A1 | 8/2017 | Sparks et al. |
| 2017/0230585 A1 | 8/2017 | Nash et al. |
| 2017/0237888 A1 | 8/2017 | Harris et al. |
| 2017/0243389 A1 | 8/2017 | Wild et al. |
| 2017/0244482 A1 | 8/2017 | Dimare et al. |
| 2017/0244896 A1 | 8/2017 | Chien et al. |
| 2017/0244897 A1 | 8/2017 | Jung et al. |
| 2017/0257559 A1 | 9/2017 | Stricker |
| 2017/0257596 A1 | 9/2017 | Murata et al. |
| 2017/0264817 A1 | 9/2017 | Yan et al. |
| 2017/0285764 A1 | 10/2017 | Kim et al. |
| 2017/0287220 A1 | 10/2017 | Khalid et al. |
| 2017/0289462 A1 | 10/2017 | Eum et al. |
| 2017/0302840 A1 | 10/2017 | Hasinoff et al. |
| 2017/0315772 A1 | 11/2017 | Lee et al. |
| 2017/0324784 A1 | 11/2017 | Taine et al. |
| 2017/0336961 A1 | 11/2017 | Heo et al. |
| 2017/0354888 A1 | 12/2017 | Benedetto et al. |
| 2017/0357411 A1 | 12/2017 | Williams et al. |
| 2017/0358071 A1 | 12/2017 | Yamaoka et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2017/0366729 A1 | 12/2017 | Itoh |
| 2017/0371538 A1* | 12/2017 | Zhang ................. G06F 3/04897 |
| 2017/0371844 A1 | 12/2017 | Yao |
| 2018/0007315 A1 | 1/2018 | Kim et al. |
| 2018/0021684 A1 | 1/2018 | Benedetto |
| 2018/0032536 A1 | 2/2018 | Stachowski |
| 2018/0047200 A1 | 2/2018 | O'Hara et al. |
| 2018/0048820 A1 | 2/2018 | Hinkel et al. |
| 2018/0052571 A1 | 2/2018 | Seol et al. |
| 2018/0067622 A1 | 3/2018 | Chaudhri et al. |
| 2018/0077332 A1 | 3/2018 | Shimura et al. |
| 2018/0081502 A1 | 3/2018 | Sangco et al. |
| 2018/0088787 A1 | 3/2018 | Bereza et al. |
| 2018/0091728 A1 | 3/2018 | Brown et al. |
| 2018/0096487 A1 | 4/2018 | Nash et al. |
| 2018/0107367 A1 | 4/2018 | Rinneberg et al. |
| 2018/0108224 A1 | 4/2018 | Longo |
| 2018/0109722 A1 | 4/2018 | Laroia et al. |
| 2018/0113577 A1 | 4/2018 | Burns et al. |
| 2018/0114543 A1 | 4/2018 | Novikoff |
| 2018/0120661 A1 | 5/2018 | Kilgore et al. |
| 2018/0124299 A1 | 5/2018 | Brook |
| 2018/0129224 A1 | 5/2018 | Hur |
| 2018/0146132 A1 | 5/2018 | Manzari et al. |
| 2018/0152611 A1 | 5/2018 | Li et al. |
| 2018/0184008 A1 | 6/2018 | Kondo |
| 2018/0184061 A1 | 6/2018 | Kitsunai et al. |
| 2018/0198985 A1 | 7/2018 | Ishitsuka |
| 2018/0199025 A1 | 7/2018 | Holzer et al. |
| 2018/0213144 A1 | 7/2018 | Kim et al. |
| 2018/0213161 A1 | 7/2018 | Kanda et al. |
| 2018/0227479 A1 | 8/2018 | Parameswaran et al. |
| 2018/0227482 A1 | 8/2018 | Holzer et al. |
| 2018/0227505 A1 | 8/2018 | Baltz et al. |
| 2018/0234608 A1 | 8/2018 | Sudo et al. |
| 2018/0239930 A1 | 8/2018 | Lai et al. |
| 2018/0262677 A1 | 9/2018 | Dye et al. |
| 2018/0267703 A1 | 9/2018 | Kamimaru et al. |
| 2018/0270420 A1 | 9/2018 | Lee et al. |
| 2018/0278823 A1 | 9/2018 | Horesh |
| 2018/0284979 A1 | 10/2018 | Choi et al. |
| 2018/0288310 A1 | 10/2018 | Goldenberg |
| 2018/0302551 A1 | 10/2018 | Yamajo et al. |
| 2018/0302568 A1 | 10/2018 | Kim et al. |
| 2018/0308282 A1 | 10/2018 | Yokoi |
| 2018/0335901 A1 | 11/2018 | Manzari et al. |
| 2018/0349008 A1 | 12/2018 | Manzari et al. |
| 2018/0349659 A1 | 12/2018 | Manzari et al. |
| 2018/0352165 A1 | 12/2018 | Zhen et al. |
| 2018/0364815 A1* | 12/2018 | Moussette ............. G06F 3/0362 |
| 2018/0376122 A1 | 12/2018 | Park et al. |
| 2019/0007589 A1 | 1/2019 | Kadambala et al. |
| 2019/0028650 A1 | 1/2019 | Bernstein et al. |
| 2019/0029513 A1 | 1/2019 | Gunnerson et al. |
| 2019/0043613 A1 | 2/2019 | Gallagher et al. |
| 2019/0050115 A1 | 2/2019 | Krishna et al. |
| 2019/0051032 A1 | 2/2019 | Chu et al. |
| 2019/0080189 A1* | 3/2019 | Van Os ................. H04N 23/62 |
| 2019/0082044 A1 | 3/2019 | Melendez et al. |
| 2019/0082097 A1 | 3/2019 | Manzari et al. |
| 2019/0089873 A1 | 3/2019 | Misawa et al. |

(56) References Cited

U.S. PATENT DOCUMENTS

| | | |
|---|---|---|
| 2019/0108684 A1 | 4/2019 | Callaghan |
| 2019/0114740 A1 | 4/2019 | Ogino et al. |
| 2019/0121216 A1 | 4/2019 | Shabtay et al. |
| 2019/0138259 A1 | 5/2019 | Bagaria et al. |
| 2019/0141030 A1 | 5/2019 | Cockerill et al. |
| 2019/0149706 A1 | 5/2019 | Rivard et al. |
| 2019/0163288 A1 | 5/2019 | You et al. |
| 2019/0174054 A1 | 6/2019 | Srivastava et al. |
| 2019/0199926 A1 | 6/2019 | An et al. |
| 2019/0205861 A1 | 7/2019 | Bace |
| 2019/0206031 A1 | 7/2019 | Kim et al. |
| 2019/0220089 A1 | 7/2019 | Kakizawa et al. |
| 2019/0222769 A1 | 7/2019 | Srivastava et al. |
| 2019/0235743 A1 | 8/2019 | Ono |
| 2019/0250812 A1 | 8/2019 | Davydov et al. |
| 2019/0253619 A1 | 8/2019 | Davydov et al. |
| 2019/0289201 A1 | 9/2019 | Nishimura et al. |
| 2019/0318538 A1 | 10/2019 | Li et al. |
| 2019/0339804 A1 | 11/2019 | Gleeson et al. |
| 2019/0346885 A1 | 11/2019 | Sepulveda et al. |
| 2019/0379821 A1 | 12/2019 | Kobayashi et al. |
| 2019/0379837 A1 | 12/2019 | Kim et al. |
| 2020/0045245 A1 | 2/2020 | Van Os et al. |
| 2020/0053288 A1 | 2/2020 | Kim et al. |
| 2020/0059605 A1 | 2/2020 | Liu et al. |
| 2020/0068121 A1 | 2/2020 | Wang |
| 2020/0077250 A1 | 3/2020 | Gideon |
| 2020/0082599 A1* | 3/2020 | Manzari .............. G06F 3/04883 |
| 2020/0104021 A1* | 4/2020 | Bylenok .................. G06F 3/02 |
| 2020/0105003 A1 | 4/2020 | Stauber et al. |
| 2020/0106952 A1 | 4/2020 | Missig et al. |
| 2020/0106965 A1 | 4/2020 | Malia et al. |
| 2020/0122802 A1 | 4/2020 | Bradlow et al. |
| 2020/0128191 A1 | 4/2020 | Sun et al. |
| 2020/0150836 A1 | 5/2020 | Penha et al. |
| 2020/0204725 A1 | 6/2020 | Li |
| 2020/0221020 A1 | 7/2020 | Manzari et al. |
| 2020/0236278 A1 | 7/2020 | Yeung et al. |
| 2020/0242788 A1 | 7/2020 | Jacobs et al. |
| 2020/0244879 A1 | 7/2020 | Hohjoh |
| 2020/0285806 A1 | 9/2020 | Radakovitz et al. |
| 2020/0336660 A1 | 10/2020 | Dong et al. |
| 2020/0342613 A1 | 10/2020 | Altuev et al. |
| 2020/0358963 A1 | 11/2020 | Manzari et al. |
| 2020/0382723 A1 | 12/2020 | Pena et al. |
| 2020/0410763 A1 | 12/2020 | Hare et al. |
| 2021/0012761 A1 | 1/2021 | Song |
| 2021/0051275 A1 | 2/2021 | Brown et al. |
| 2021/0073007 A1 | 3/2021 | Guzman et al. |
| 2021/0081093 A1 | 3/2021 | Yun et al. |
| 2021/0081450 A1 | 3/2021 | Lopez |
| 2021/0146838 A1 | 5/2021 | Goseberg et al. |
| 2021/0149736 A1 | 5/2021 | Kondapuram et al. |
| 2021/0160431 A1 | 5/2021 | Chen et al. |
| 2021/0168300 A1 | 6/2021 | Wang et al. |
| 2021/0195093 A1 | 6/2021 | Manzari et al. |
| 2021/0201953 A1 | 7/2021 | Takahashi et al. |
| 2021/0248371 A1 | 8/2021 | Carter et al. |
| 2021/0266447 A1 | 8/2021 | Ding et al. |
| 2021/0281746 A1 | 9/2021 | Fleizach et al. |
| 2021/0286510 A1 | 9/2021 | Tyler et al. |
| 2021/0304629 A1 | 9/2021 | Barron et al. |
| 2021/0311553 A1 | 10/2021 | Keller et al. |
| 2021/0314496 A1 | 10/2021 | Sadhu |
| 2021/0318758 A1 | 10/2021 | Lazaridis et al. |
| 2021/0344845 A1 | 11/2021 | Li et al. |
| 2021/0373750 A1 | 12/2021 | Manzari et al. |
| 2021/0389850 A1 | 12/2021 | Charlton et al. |
| 2021/0390765 A1 | 12/2021 | Laaksonen et al. |
| 2021/0397338 A1 | 12/2021 | Davydov et al. |
| 2022/0006946 A1 | 1/2022 | Missig et al. |
| 2022/0050867 A1 | 2/2022 | Waller |
| 2022/0053126 A1 | 2/2022 | Zhao et al. |
| 2022/0053142 A1 | 2/2022 | Manzari et al. |
| 2022/0057984 A1 | 2/2022 | Yang et al. |
| 2022/0070385 A1 | 3/2022 | Van Os et al. |
| 2022/0086336 A1 | 3/2022 | Zhang |
| 2022/0103758 A1 | 3/2022 | Manzari et al. |
| 2022/0124241 A1 | 4/2022 | Manzari et al. |
| 2022/0134226 A1 | 5/2022 | Takura et al. |
| 2022/0155909 A1 | 5/2022 | Kawashima et al. |
| 2022/0171471 A1 | 6/2022 | Fu |
| 2022/0207838 A1 | 6/2022 | Anvaripour et al. |
| 2022/0210328 A1 | 6/2022 | Anvaripour et al. |
| 2022/0210337 A1 | 6/2022 | Anvaripour et al. |
| 2022/0217253 A1 | 7/2022 | Tian et al. |
| 2022/0217275 A1 | 7/2022 | Fan |
| 2022/0224828 A1 | 7/2022 | Lim et al. |
| 2022/0256068 A1 | 8/2022 | Geiss et al. |
| 2022/0262022 A1 | 8/2022 | Stauber et al. |
| 2022/0264028 A1 | 8/2022 | Manzari et al. |
| 2022/0276041 A1 | 9/2022 | Dryer et al. |
| 2022/0279116 A1 | 9/2022 | Zhou |
| 2022/0294992 A1 | 9/2022 | Manzari et al. |
| 2022/0319100 A1 | 10/2022 | Manzari et al. |
| 2022/0321797 A1 | 10/2022 | Bian et al. |
| 2022/0353425 A1 | 11/2022 | Manzari et al. |
| 2022/0382440 A1* | 12/2022 | Manzari .............. G06F 3/04883 |
| 2022/0382443 A1 | 12/2022 | Clarke et al. |
| 2022/0394190 A1 | 12/2022 | Cui et al. |
| 2022/0408020 A1 | 12/2022 | Zhang |
| 2022/0417416 A1 | 12/2022 | Li et al. |
| 2023/0007186 A1 | 1/2023 | Li et al. |
| 2023/0016178 A1 | 1/2023 | Ma et al. |
| 2023/0018557 A1 | 1/2023 | Jiang |
| 2023/0020616 A1 | 1/2023 | Manzari et al. |
| 2023/0081664 A1 | 3/2023 | Li |
| 2023/0087879 A1 | 3/2023 | An et al. |
| 2023/0098395 A1 | 3/2023 | O'leary et al. |
| 2023/0115929 A1 | 4/2023 | Bian et al. |
| 2023/0116044 A1 | 4/2023 | Han |
| 2023/0118567 A1 | 4/2023 | Manzari et al. |
| 2023/0125403 A1 | 4/2023 | Simmons et al. |
| 2023/0156144 A1 | 5/2023 | Cui |
| 2023/0156316 A1 | 5/2023 | Kang et al. |
| 2023/0164427 A1 | 5/2023 | Lu et al. |
| 2023/0179856 A1 | 6/2023 | Shin |
| 2023/0188831 A1 | 6/2023 | Hyun et al. |
| 2023/0188861 A1 | 6/2023 | Bian |
| 2023/0209179 A1 | 6/2023 | Manzari et al. |
| 2023/0217097 A1 | 7/2023 | Wu et al. |
| 2023/0217098 A1 | 7/2023 | Wang et al. |
| 2023/0224575 A1 | 7/2023 | Ding et al. |
| 2023/0252659 A1 | 8/2023 | Stauber et al. |
| 2023/0254573 A1 | 8/2023 | Manzari et al. |
| 2023/0262317 A1 | 8/2023 | O'leary et al. |
| 2023/0308742 A1 | 9/2023 | Lin et al. |
| 2023/0308743 A1 | 9/2023 | Ku et al. |
| 2023/0308778 A1 | 9/2023 | Yang |
| 2023/0319394 A1 | 10/2023 | Manzari et al. |
| 2023/0325989 A1 | 10/2023 | Zhao |
| 2023/0328429 A1 | 10/2023 | Bian |
| 2023/0333704 A1 | 10/2023 | Chen |
| 2023/0336865 A1 | 10/2023 | Da Veiga et al. |
| 2023/0341925 A1 | 10/2023 | Carrigan et al. |
| 2023/0342019 A1 | 10/2023 | Carrigan et al. |
| 2023/0343200 A1 | 10/2023 | Carrigan et al. |
| 2023/0345110 A1 | 10/2023 | Yi et al. |
| 2023/0345113 A1 | 10/2023 | Liu |
| 2023/0353862 A1 | 11/2023 | et al. |
| 2023/0359314 A1 | 11/2023 | Karunamuni |
| 2023/0359315 A1 | 11/2023 | Karunamuni et al. |
| 2023/0359316 A1 | 11/2023 | Karunamuni |
| 2023/0367472 A1 | 11/2023 | Clarke et al. |
| 2023/0370507 A1 | 11/2023 | Chang et al. |
| 2023/0393705 A1 | 12/2023 | Krenn |
| 2023/0418426 A1 | 12/2023 | Karunamuni |
| 2024/0062640 A1 | 2/2024 | Carrigan et al. |
| 2024/0080543 A1 | 3/2024 | Manzari et al. |
| 2024/0168626 A1 | 5/2024 | Davydov et al. |
| 2024/0259669 A1 | 8/2024 | Missig et al. |
| 2024/0259670 A1 | 8/2024 | Manzari et al. |
| 2024/0284037 A1 | 8/2024 | Manzari et al. |
| 2024/0361898 A1 | 10/2024 | Ardaud et al. |

(56) References Cited

U.S. PATENT DOCUMENTS

| 2024/0422425 A1 | 12/2024 | Che et al. |
| 2024/0430564 A1 | 12/2024 | Manzari et al. |
| 2025/0022211 A1 | 1/2025 | Manzari et al. |
| 2025/0024133 A1 | 1/2025 | Manzari et al. |
| 2025/0054379 A1 | 2/2025 | Carrigan et al. |
| 2025/0088734 A1 | 3/2025 | Manzari et al. |
| 2025/0110574 A1* | 4/2025 | Alonso ............... H04N 23/667 |
| 2025/0113094 A1 | 4/2025 | Alonso et al. |
| 2025/0113095 A1 | 4/2025 | Alonso et al. |
| 2025/0238127 A1 | 7/2025 | Alonso et al. |
| 2025/0238128 A1 | 7/2025 | Manzari et al. |
| 2025/0238129 A1 | 7/2025 | Moussette et al. |
| 2025/0240516 A1 | 7/2025 | Zumbrunnen et al. |
| 2025/0370597 A1 | 12/2025 | Carrigan et al. |

FOREIGN PATENT DOCUMENTS

| CA | 2729392 C | 5/2017 |
| CA | 2965925 A1 | 3/2018 |
| CN | 1437365 A | 8/2003 |
| CN | 1499878 A | 5/2004 |
| CN | 1705346 A | 12/2005 |
| CN | 1901717 A | 1/2007 |
| CN | 101243383 A | 8/2008 |
| CN | 101282422 A | 10/2008 |
| CN | 101300830 A | 11/2008 |
| CN | 101310519 A | 11/2008 |
| CN | 101355655 A | 1/2009 |
| CN | 101364031 A | 2/2009 |
| CN | 101427574 A | 5/2009 |
| CN | 101533330 A | 9/2009 |
| CN | 101576996 A | 11/2009 |
| CN | 101681462 A | 3/2010 |
| CN | 101778220 A | 7/2010 |
| CN | 101883213 A | 11/2010 |
| CN | 101931691 A | 12/2010 |
| CN | 102084327 A | 6/2011 |
| CN | 102088554 A | 6/2011 |
| CN | 102272700 A | 12/2011 |
| CN | 102369723 A | 3/2012 |
| CN | 102428655 A | 4/2012 |
| CN | 102457661 A | 5/2012 |
| CN | 102474560 A | 5/2012 |
| CN | 202309894 U | 7/2012 |
| CN | 202330968 U | 7/2012 |
| CN | 102855079 A | 1/2013 |
| CN | 103051837 A | 4/2013 |
| CN | 103051841 A | 4/2013 |
| CN | 103052961 A | 4/2013 |
| CN | 103297719 A | 9/2013 |
| CN | 103309602 A | 9/2013 |
| CN | 103324329 A | 9/2013 |
| CN | 103685925 A | 3/2014 |
| CN | 103702039 A | 4/2014 |
| CN | 103777742 A | 5/2014 |
| CN | 103970472 A | 8/2014 |
| CN | 104035648 A | 9/2014 |
| CN | 104346080 A | 2/2015 |
| CN | 104346099 A | 2/2015 |
| CN | 104423946 A | 3/2015 |
| CN | 104461288 A | 3/2015 |
| CN | 104781773 A | 7/2015 |
| CN | 104813322 A | 7/2015 |
| CN | 104836947 A | 8/2015 |
| CN | 105049726 A | 11/2015 |
| CN | 105138259 A | 12/2015 |
| CN | 105183442 A | 12/2015 |
| CN | 105190511 A | 12/2015 |
| CN | 105229571 A | 1/2016 |
| CN | 105338256 A | 2/2016 |
| CN | 105474163 A | 4/2016 |
| CN | 105589637 A | 5/2016 |
| CN | 105620393 A | 6/2016 |
| CN | 105630290 A | 6/2016 |
| CN | 105637855 A | 6/2016 |
| CN | 105765967 A | 7/2016 |
| CN | 105981372 A | 9/2016 |
| CN | 105991915 A | 10/2016 |
| CN | 106067947 A | 11/2016 |
| CN | 106104448 A | 11/2016 |
| CN | 106161956 A | 11/2016 |
| CN | 106210184 A | 12/2016 |
| CN | 106210550 A | 12/2016 |
| CN | 106257909 A | 12/2016 |
| CN | 106303280 A | 1/2017 |
| CN | 106341611 A | 1/2017 |
| CN | 106375662 A | 2/2017 |
| CN | 106412214 A | 2/2017 |
| CN | 106412412 A | 2/2017 |
| CN | 106412445 A | 2/2017 |
| CN | 106445219 A | 2/2017 |
| CN | 106791357 A | 5/2017 |
| CN | 106791377 A | 5/2017 |
| CN | 106791420 A | 5/2017 |
| CN | 106921829 A | 7/2017 |
| CN | 106936992 A | 7/2017 |
| CN | 107077274 A | 8/2017 |
| CN | 107079141 A | 8/2017 |
| CN | 107566721 A | 1/2018 |
| CN | 107580693 A | 1/2018 |
| CN | 107710135 A | 2/2018 |
| CN | 107770448 A | 3/2018 |
| CN | 107800945 A | 3/2018 |
| CN | 107820011 A | 3/2018 |
| CN | 107924113 A | 4/2018 |
| CN | 108174096 A | 6/2018 |
| CN | 108196761 A | 6/2018 |
| CN | 108319629 A | 7/2018 |
| CN | 108353126 A | 7/2018 |
| CN | 108391053 A | 8/2018 |
| CN | 108419019 A | 8/2018 |
| CN | 108513070 A | 9/2018 |
| CN | 108549522 A | 9/2018 |
| CN | 108600610 A | 9/2018 |
| CN | 108668083 A | 10/2018 |
| CN | 108848308 A | 11/2018 |
| CN | 108886569 A | 11/2018 |
| CN | 109005366 A | 12/2018 |
| CN | 109061985 A | 12/2018 |
| CN | 109313530 A | 2/2019 |
| CN | 109314735 A | 2/2019 |
| CN | 109496425 A | 3/2019 |
| CN | 105338244 B | 4/2019 |
| CN | 109639970 A | 4/2019 |
| CN | 109644217 A | 4/2019 |
| CN | 109644229 A | 4/2019 |
| CN | 109769396 A | 5/2019 |
| CN | 110678832 A | 1/2020 |
| CN | 111034164 A | 4/2020 |
| CN | 111142724 A | 5/2020 |
| CN | 113163052 A | 7/2021 |
| CN | 113228074 A | 8/2021 |
| CN | 115696026 A | 2/2023 |
| DE | 202017002874 U1 | 9/2017 |
| DK | 201670753 A1 | 1/2018 |
| DK | 201670755 A1 | 1/2018 |
| DK | 201670627 A1 | 2/2018 |
| EP | 0257972 A2 | 3/1988 |
| EP | 0651543 A2 | 5/1995 |
| EP | 0651543 A3 | 12/1997 |
| EP | 1278099 A1 | 1/2003 |
| EP | 1953663 A1 | 8/2008 |
| EP | 0651543 B1 | 9/2008 |
| EP | 2194508 A1 | 6/2010 |
| EP | 2430766 A2 | 3/2012 |
| EP | 2454872 A1 | 5/2012 |
| EP | 2482179 A2 | 8/2012 |
| EP | 2487613 A1 | 8/2012 |
| EP | 2487913 A2 | 8/2012 |
| EP | 2430766 A4 | 12/2012 |
| EP | 2579572 A1 | 4/2013 |
| EP | 2640060 A1 | 9/2013 |
| EP | 2682855 A2 | 1/2014 |
| EP | 2830297 A1 | 1/2015 |

(56) References Cited

FOREIGN PATENT DOCUMENTS

| | | | |
|---|---|---|---|
| EP | 2843530 | A1 | 3/2015 |
| EP | 2950198 | A1 | 12/2015 |
| EP | 2966855 | A2 | 1/2016 |
| EP | 2972677 | A1 | 1/2016 |
| EP | 2430766 | B1 | 3/2016 |
| EP | 3008575 | A1 | 4/2016 |
| EP | 3012732 | A1 | 4/2016 |
| EP | 3033837 | | 6/2016 |
| EP | 3033837 | A4 | 3/2017 |
| EP | 3217341 | A1 | 9/2017 |
| EP | 2194508 | B1 | 12/2017 |
| EP | 3333544 | A1 | 6/2018 |
| EP | 3033837 | B1 | 10/2018 |
| EP | 3393119 | A1 | 10/2018 |
| EP | 3135028 | B1 | 1/2019 |
| EP | 2482179 | B1 | 3/2019 |
| EP | 3457680 | A1 | 3/2019 |
| EP | 3012732 | B1 | 5/2019 |
| EP | 3008575 | B1 | 7/2019 |
| EP | 3633975 | A1 | 4/2020 |
| EP | 3736676 | A1 | 11/2020 |
| EP | 2682855 | B1 | 2/2021 |
| EP | 3833002 | A1 | 6/2021 |
| EP | 3633975 | B1 | 5/2023 |
| EP | 4195658 | A1 | 6/2023 |
| GB | 2307383 | A | 5/1997 |
| GB | 2515797 | A | 1/2015 |
| GB | 2523670 | A | 9/2015 |
| JP | 2-179078 | A | 7/1990 |
| JP | 3-129573 | A | 6/1991 |
| JP | 6-215092 | A | 8/1994 |
| JP | 9-116792 | A | 5/1997 |
| JP | 9-179998 | A | 7/1997 |
| JP | 11-355617 | A | 12/1999 |
| JP | 2000-207549 | A | 7/2000 |
| JP | 2000-244905 | A | 9/2000 |
| JP | 2000-286958 | A | 10/2000 |
| JP | 2001-101259 | A | 4/2001 |
| JP | 2001-245204 | A | 9/2001 |
| JP | 2001-298649 | A | 10/2001 |
| JP | 2003-8964 | A | 1/2003 |
| JP | 2003-18438 | A | 1/2003 |
| JP | 2003-32597 | A | 1/2003 |
| JP | 2003-241293 | A | 8/2003 |
| JP | 2003-248549 | A | 9/2003 |
| JP | 2004-15595 | A | 1/2004 |
| JP | 2004-135074 | A | 4/2004 |
| JP | 2005-31466 | A | 2/2005 |
| JP | 2005-191641 | A | 7/2005 |
| JP | 2005-191985 | A | 7/2005 |
| JP | 2005-311699 | A | 11/2005 |
| JP | 2006-332809 | A | 12/2006 |
| JP | 3872041 | B2 | 1/2007 |
| JP | 2007-28211 | A | 2/2007 |
| JP | 2007-124279 | A | 5/2007 |
| JP | 2007-124398 | A | 5/2007 |
| JP | 2007-258869 | A | 10/2007 |
| JP | 2007-274017 | A | 10/2007 |
| JP | 2008-66978 | A | 3/2008 |
| JP | 2008-103903 | A | 5/2008 |
| JP | 2008-236534 | A | 10/2008 |
| JP | 2009-105919 | A | 5/2009 |
| JP | 2009-212899 | A | 9/2009 |
| JP | 2009-217816 | A | 9/2009 |
| JP | 2009-246468 | A | 10/2009 |
| JP | 2009-273023 | A | 11/2009 |
| JP | 2009-290782 | A | 12/2009 |
| JP | 2009-545256 | A | 12/2009 |
| JP | 2010-117444 | A | 5/2010 |
| JP | 2010-119147 | A | 5/2010 |
| JP | 2010-182023 | A | 8/2010 |
| JP | 2010-211166 | A | 9/2010 |
| JP | 2010-268052 | A | 11/2010 |
| JP | 2011-87167 | A | 4/2011 |
| JP | 2011-91570 | A | 5/2011 |
| JP | 2011-124864 | A | 6/2011 |
| JP | 2011-211552 | A | 10/2011 |
| JP | 2012-15978 | A | 1/2012 |
| JP | 2012-27646 | A | 2/2012 |
| JP | 2012-44564 | A | 3/2012 |
| JP | 2012-79302 | A | 4/2012 |
| JP | 2012-89973 | A | 5/2012 |
| JP | 2012-147379 | A | 8/2012 |
| JP | 2012-239638 | A | 12/2012 |
| JP | 2012-253748 | A | 12/2012 |
| JP | 2013-9274 | A | 1/2013 |
| JP | 2013-58861 | A | 3/2013 |
| JP | 2013-70303 | A | 4/2013 |
| JP | 2013-106289 | A | 5/2013 |
| JP | 2013-149245 | A | 8/2013 |
| JP | 2013-225844 | A | 10/2013 |
| JP | 2013-546238 | A | 12/2013 |
| JP | 2014-23083 | A | 2/2014 |
| JP | 2014-60501 | A | 4/2014 |
| JP | 2014-107836 | A | 6/2014 |
| JP | 2014-123069 | A | 7/2014 |
| JP | 2014-212415 | A | 11/2014 |
| JP | 2015-1716 | A | 1/2015 |
| JP | 2015-5255 | A | 1/2015 |
| JP | 2015-22716 | A | 2/2015 |
| JP | 2015-25897 | A | 2/2015 |
| JP | 2015-49728 | A | 3/2015 |
| JP | 2015-50713 | A | 3/2015 |
| JP | 2015-76717 | A | 4/2015 |
| JP | 2015-91098 | A | 5/2015 |
| JP | 2015-104031 | A | 6/2015 |
| JP | 2015-111822 | A | 6/2015 |
| JP | 2015-115042 | A | 6/2015 |
| JP | 2015-520456 | A | 7/2015 |
| JP | 2015-149095 | A | 8/2015 |
| JP | 2015-534742 | A | 12/2015 |
| JP | 2016-39613 | A | 3/2016 |
| JP | 2016-66978 | A | 4/2016 |
| JP | 2016-72965 | A | 5/2016 |
| JP | 2016-129315 | A | 7/2016 |
| JP | 2016-175175 | A | 10/2016 |
| JP | 2017-34474 | A | 2/2017 |
| JP | 2017-521737 | A | 8/2017 |
| JP | 2017-194783 | A | 10/2017 |
| JP | 2017-204834 | A | 11/2017 |
| JP | 2018-10488 | A | 1/2018 |
| JP | 2018-107711 | A | 7/2018 |
| JP | 2018-117186 | A | 7/2018 |
| JP | 2018-121235 | A | 8/2018 |
| JP | 2019-507928 | A | 3/2019 |
| JP | 2019-62556 | A | 4/2019 |
| JP | 2019-203399 | A | 11/2019 |
| JP | 2020-42602 | A | 3/2020 |
| JP | 6982047 | B2 | 11/2021 |
| KR | 10-2009-0096833 | A | 9/2009 |
| KR | 10-2012-0004928 | A | 1/2012 |
| KR | 10-2012-0025872 | A | 3/2012 |
| KR | 10-2012-0048397 | A | 5/2012 |
| KR | 10-2012-0054406 | A | 5/2012 |
| KR | 10-2012-0057696 | A | 6/2012 |
| KR | 10-2012-0093322 | A | 8/2012 |
| KR | 10-2013-0033445 | A | 4/2013 |
| KR | 10-1341095 | B1 | 12/2013 |
| KR | 10-1343591 | B1 | 12/2013 |
| KR | 10-2014-0019631 | A | 2/2014 |
| KR | 10-2014-0049850 | A | 4/2014 |
| KR | 10-2014-0062801 | A | 5/2014 |
| KR | 10-2015-0014290 | A | 2/2015 |
| KR | 10-2016-0019145 | A | 2/2016 |
| KR | 10-2016-0020396 | A | 2/2016 |
| KR | 10-2016-0020791 | A | 2/2016 |
| KR | 10-2016-0075583 | A | 6/2016 |
| KR | 10-1674959 | B1 | 11/2016 |
| KR | 10-2017-0123125 | A | 11/2017 |
| KR | 10-1799223 | B1 | 11/2017 |
| KR | 10-2017-0135975 | A | 12/2017 |
| KR | 10-2018-0024761 | A | 3/2018 |
| KR | 10-2018-0037076 | A | 4/2018 |
| KR | 10-2018-0095331 | A | 8/2018 |

(56) References Cited

FOREIGN PATENT DOCUMENTS

| | | |
|---|---|---|
| KR | 10-2018-0108847 A | 10/2018 |
| KR | 10-2018-0116574 A | 10/2018 |
| KR | 10-2018-0137610 A | 12/2018 |
| KR | 10-1939253 B1 | 1/2019 |
| KR | 10-2019-0034248 A | 4/2019 |
| KR | 10-2020-0001601 A | 1/2020 |
| KR | 10-2020-0130139 A | 11/2020 |
| KR | 10-2020-0140378 A | 12/2020 |
| WO | 99/39307 A1 | 8/1999 |
| WO | 2005/043892 A1 | 5/2005 |
| WO | 2007/126707 A1 | 11/2007 |
| WO | 2008/014301 A2 | 1/2008 |
| WO | 2008/020655 A1 | 2/2008 |
| WO | 2009/078091 A1 | 6/2009 |
| WO | 2010/059426 A2 | 5/2010 |
| WO | 2010/077048 A2 | 7/2010 |
| WO | 2010/102678 A1 | 9/2010 |
| WO | 2010/077048 A3 | 10/2010 |
| WO | 2010/131869 A2 | 11/2010 |
| WO | 2010/134275 A1 | 11/2010 |
| WO | 2011/007264 A1 | 1/2011 |
| WO | 2010/131869 A3 | 2/2011 |
| WO | 2010/059426 A3 | 5/2011 |
| WO | 2011/094854 A1 | 8/2011 |
| WO | 2012/001947 A1 | 1/2012 |
| WO | 2012/006251 A1 | 1/2012 |
| WO | 2012/019163 A2 | 2/2012 |
| WO | 2012/051720 A2 | 4/2012 |
| WO | 2013/136394 A1 | 9/2013 |
| WO | 2013/169849 A2 | 11/2013 |
| WO | 2013/173838 A2 | 11/2013 |
| WO | 2014/066115 A1 | 5/2014 |
| WO | 2014/109125 A1 | 7/2014 |
| WO | 2014/159779 A1 | 10/2014 |
| WO | 2014/160819 A1 | 10/2014 |
| WO | 2014/165141 A1 | 10/2014 |
| WO | 2014/200734 A1 | 12/2014 |
| WO | 2014/200798 A1 | 12/2014 |
| WO | 2015/023044 A1 | 2/2015 |
| WO | 2015/026864 A1 | 2/2015 |
| WO | 2015/034969 A2 | 3/2015 |
| WO | 2015/080744 A1 | 6/2015 |
| WO | 2015/085042 A1 | 6/2015 |
| WO | 2015/112868 A1 | 7/2015 |
| WO | 2014/200798 A8 | 8/2015 |
| WO | 2015/183438 A1 | 12/2015 |
| WO | 2015/187494 A1 | 12/2015 |
| WO | 2015/190666 A1 | 12/2015 |
| WO | 2016/024440 A1 | 2/2016 |
| WO | 2016/028806 A1 | 2/2016 |
| WO | 2016/028807 A1 | 2/2016 |
| WO | 2016/028808 A1 | 2/2016 |
| WO | 2016/028809 A1 | 2/2016 |
| WO | 2016/072538 A1 | 5/2016 |
| WO | 2016/073804 A2 | 5/2016 |
| WO | 2016/073804 A3 | 7/2016 |
| WO | 2016/144563 A1 | 9/2016 |
| WO | 2016/172619 A1 | 10/2016 |
| WO | 2016/204936 A1 | 12/2016 |
| WO | 2016/208539 A1 | 12/2016 |
| WO | 2017/051605 A1 | 3/2017 |
| WO | 2017/058834 A1 | 4/2017 |
| WO | 2017/187573 A1 | 11/2017 |
| WO | 2017/213924 A1 | 12/2017 |
| WO | 2017/218193 A1 | 12/2017 |
| WO | 2018/012395 A1 | 1/2018 |
| WO | 2018/048838 A1 | 3/2018 |
| WO | 2018/057267 A1 | 3/2018 |
| WO | 2018/057268 A1 | 3/2018 |
| WO | 2018/099037 A1 | 6/2018 |
| WO | 2018/144339 A2 | 8/2018 |
| WO | 2018/159864 A1 | 9/2018 |
| WO | 2018/222244 A1 | 12/2018 |
| WO | 2018/226264 A1 | 12/2018 |
| WO | 2019/050562 A1 | 3/2019 |
| WO | 2019/118933 A1 | 6/2019 |
| WO | 2019/217148 A1 | 11/2019 |
| WO | 2020/123180 A1 | 6/2020 |
| WO | 2021/031816 A1 | 2/2021 |
| WO | 2021/093793 A1 | 5/2021 |
| WO | 2024/001513 A1 | 1/2024 |
| WO | 2024/186519 A1 | 9/2024 |

OTHER PUBLICATIONS

Applicant-Initiated Interview Summary received for U.S. Appl. No. 18/137,369, mailed on Mar. 7, 2025, 2 pages.

Corrected Notice of Allowance received for U.S. Appl. No. 18/196,997, mailed on Nov. 15, 2024, 2 pages.

Decision to Grant received for Japanese Patent Application No. 2024-001951, mailed on Jan. 7, 2025, 4 pages (2 pages of English Translation and 2 pages of Official Copy).

Decision to Grant received for Japanese Patent Application No. 2024-060293, mailed on Oct. 15, 2024, 3 pages (1 page of English Translation and 2 pages of Official Copy).

Egg Flakes, "Use Slow Shutter to capture night scenes and light trails", Online available at: https://www.jianshu.com/p/6c742da00d3c, Mar. 8, 2018, 5 pages (1 page of English Translation and 4 pages of Official Copy).

Extended European Search Report received for European Application No. 24182717.9, mailed on Jan. 31, 2025, 6 pages.

Final Office Action received for U.S. Appl. No. 18/423,234, mailed on Dec. 19, 2024, 8 pages.

Intention to Grant received for European Patent Application No. 19769316.1, mailed on Dec. 17, 2024, 9 pages.

Intention to Grant received for European Patent Application No. 20206196.6, mailed on Mar. 10, 2025, 10 pages.

International Preliminary Report on Patentability received for PCT Patent Application No. PCT/US2023/019476, mailed on Nov. 7, 2024, 18 pages.

International Search Report and Written Opinion received for PCT Patent Application No. PCT/US2024/044796, mailed on Nov. 28, 2024, 17 pages.

Manogajapathi et al., "Detecting Camera Based Traitor and Fraudulent Apps on Smartphone", World Conference on Futuristic Trends in Research and Innovation for Social Welfare (Startup Conclave), IEEE, Feb. 29, 2016, 5 pages.

Non-Final Office Action received for U.S. Appl. No. 17/992,789, mailed on Mar. 20, 2025, 17 pages.

Non-Final Office Action received for U.S. Appl. No. 18/137,369, mailed on Dec. 4, 2024, 13 pages.

Notice of Acceptance received for Australian Patent Application No. 2024213126, mailed on Oct. 30, 2024, 3 pages.

Notice of Allowance received for Chinese Patent Application No. 202210849316.2, mailed on Nov. 9, 2024, 4 pages (1 page of English Translation and 3 pages of Official Copy).

Notice of Allowance received for Chinese Patent Application No. 2022-152018, mailed on Nov. 5, 2024, 4 pages (1 page of English Translation and 3 pages of Official Copy).

Notice of Allowance received for Korean Patent Application No. 10-2022-0120786, mailed on Mar. 7, 2025, 7 pages (2 pages of English Translation and 5 pages of Official Copy).

Notice of Allowance received for Korean Patent Application No. 10-2023-7002360, mailed on Feb. 5, 2025, 8 pages (2 pages of English Translation and 6 pages of Official Copy).

Notice of Allowance received for Korean Patent Application No. 10-2023-7041271, mailed on Nov. 24, 2024, 7 pages (2 pages of English Translation and 5 pages of Official Copy).

Notice of Allowance received for U.S. Appl. No. 17/846,962, mailed on Oct. 25, 2024, 2 pages.

Notice of Allowance received for U.S. Appl. No. 17/846,962, mailed on Sep. 30, 2024, 8 pages.

Notice of Allowance received for U.S. Appl. No. 18/196,997, mailed on Nov. 4, 2024, 11 pages.

Notice of Hearing received for Indian Patent Application No. 202118021941, mailed on Feb. 21, 2025, 2 pages.

Notice of Hearing received for Indian Patent Application No. 202215010325, mailed on Feb. 18, 2025, 3 pages.

(56)    References Cited

OTHER PUBLICATIONS

Notice of Hearing received for Indian Patent Application No. 202215010325, mailed on Mar. 10, 2025, 3 pages.

Office Action received for Australian Patent Application No. 2023226764, mailed on Nov. 13, 2024, 3 pages.

Office Action received for Australian Patent Application No. 2023282230, mailed on Dec. 9, 2024, 2 pages.

Office Action received for Australian Patent Application No. 2023285892, mailed on Dec. 16, 2024, 5 pages.

Office Action received for Australian Patent Application No. 2024213126, mailed on Sep. 26, 2024, 3 pages.

Office Action received for Chinese Patent Application No. 201980012481.9, mailed on Dec. 24, 2024, 17 pages (9 pages of English Translation and 8 pages of Official Copy).

Office Action received for Chinese Patent Application No. 201980012481.9, mailed on Feb. 26, 2025, 27 pages (14 page of English Translation and 13 pages of Official Copy).

Office Action received for Chinese Patent Application No. 202010235395.9, mailed on Oct. 19, 2024, 12 pages (7 pages of English Translation and 5 pages of Official Copy).

Office Action received for Chinese Patent Application No. 202110356908.6, mailed on Jan. 25, 2025, 10 pages (5 pages of English Translation and 5 pages of Official Copy).

Office Action received for European Patent Application No. 21157252.4, mailed on Feb. 24, 2025, 6 pages.

Office Action received for European Patent Application No. 23173036.7, mailed on Nov. 8, 2024, 5 pages.

Office Action received for Indian Patent Application No. 202218054598, mailed on Oct. 3, 2024, 5 pages.

Office Action received for Japanese Patent Application No. 2023-158354, mailed on Dec. 2, 2024, 6 pages (3 pages of English Translation and 3 pages of Official Copy).

Office Action received for Japanese Patent Application No. 2024-033171, mailed on Feb. 25, 2025, 12 pages (6 pages of English Translation and 6 pages of Official Copy).

Office Action received for Japanese Patent Application No. 2024-532566, mailed on Mar. 7, 2025, 14 pages (7 pages of English Translation and 7 pages of Official Copy).

Office Action received for Korean Patent Application No. 10-2022-0120786, mailed on Oct. 8, 2024, 10 pages (4 pages of English Translation and 6 pages of Official Copy).

Office Action received for Korean Patent Application No. 10-2023-0125143, mailed on Sep. 24, 2024, 9 pages (4 pages of English Translation and 5 pages of Official Copy).

Shinobu, Unakami, "Camera—Intention of Continuous Shooting Will be Video Photographing by Application!?—iPhone which cannot now be heard—why—", available online at: https://news.mynavi.jp/article/20201119 - iphone_why/, Nov. 19, 2020, 3 pages (Official Copy only) {See Communication Under Rule 37 CFR § 1.98(a) (3)}.

Shinobu, Unakami, "The reason why the "outside of the frame" of the camera application is turned off? Reason for the iphone which is not to be heard again", available online at: https://news.mynavi.jp/article/20210216 ]iphone_why/>, Feb. 16, 2021, 3 pages (Official Copy only) {See Communication Under Rule 37 CFR § 1.98(a) (3)}.

Slice42, iPhone 11 Quicktake, available online at: https://www.voutube.com/watch?v=hMwTfD44nUg, Sep. 30, 2019, 2 pages (Official Copy only) {See Communication Under Rule 37 CFR § 1.98(a) (3)}.

Wanjale et al., "AAPS: Android Based System for Camera Based Attacks", International Journal of Emerging Technologies and Engineering (IJETE) vol. 1 Issue 10, Nov. 2014, pp. 246-247.

Wu et al., "Analyzing Mobile Phone Vulnerabilities Caused by Camera", IEEE Global Communications Conference, Dec. 8, 2014, 5 pages.

Ygigazine, "Basic camera operation method of iphone 11 Pro", available online at: https://www.youtube.com/shorts/Jr7a6F7hUiA, Sep. 21, 2019, 2 pages (Official Copy only) {See Communication Under Rule 37 CFR § 1.98(a) (3)}.

Applicant-Initiated Interview Summary received for U.S. Appl. No. 18/628,021, mailed on Aug. 5, 2024, 4 pages.

Corrected Notice of Allowance received for U.S. Appl. No. 17/951,016, mailed on Aug. 15, 2024, 3 pages.

Corrected Notice of Allowance received for U.S. Appl. No. 18/196,997, mailed on Aug. 19, 2024, 2 pages.

Corrected Notice of Allowance received for U.S. Appl. No. 18/383,281, mailed on Aug. 29, 2024, 2 pages.

Corrected Notice of Allowance received for U.S. Appl. No. 18/628,021, mailed on Sep. 12, 2024, 2 pages.

Non-Final Office Action received for U.S. Appl. No. 18/423,234, mailed on Sep. 16, 2024, 9 pages.

Notice of Allowance received for Korean Patent Application No. 10-2023-7016569, mailed on Sep. 10, 2024, 7 pages (2 pages of English Translation and 5 pages of Official Copy).

Notice of Allowance received for U.S. Appl. No. 17/546,968, mailed on Sep. 13, 2024, 25 pages.

Notice of Allowance received for U.S. Appl. No. 18/628,021, mailed on Aug. 28, 2024, 9 pages.

Office Action received for Chinese Patent Application No. 202210849316.2, mailed on Aug. 30, 2024, 7 pages (4 pages of English Translation and 3 pages of Official Copy).

Office Action received for Indian Patent Application No. 202218016788, mailed on Sep. 4, 2024, 5 pages.

Office Action received for Japanese Patent Application No. 2024-060293, mailed on Jul. 29, 2024, 6 pages (3 pages of English Translation and 3 pages of Official Copy).

Supplemental Notice of Allowance received for U.S. Appl. No. 17/546,968, mailed on Sep. 25, 2024, 2 pages.

Corrected Notice of Allowance received for U.S. Appl. No. 18/892,251, mailed on Nov. 4, 2025, 2 pages.

Decision to Grant received for European Patent Application No. 20206196.6, mailed on Nov. 6, 2025, 4 pages.

Intention to Grant received for European Patent Application No. 23173036.7, mailed on Nov. 5, 2025, 9 pages.

Notice of Acceptance received for Australian Patent Application No. 2023285892, mailed on Oct. 27, 2025, 3 pages.

Office Action received for Chinese Patent Application No. 202010235395.9, mailed on Oct. 29, 2025, 2 pages (1 page of English Translation and 1 page of Official Copy).

Office Action received for Japanese Patent Application No. 2024-201009, mailed on Oct. 24, 2025, 8 pages (4 pages of English Translation and 4 pages of Official Copy).

Corrected Notice of Allowance received for U.S. Appl. No. 17/992,789, mailed on Oct. 7, 2025, 2 pages.

Office Action received for Japanese Patent Application No. 2024-199034, mailed on Oct. 2, 2025, 7 pages (4 pages of English Translation and 3 pages of Official Copy).

Office Action received for Japanese Patent Application No. 2025-145953, mailed on Oct. 2, 2025, 3 pages (1 page of English Translation and 2 pages of Official Copy).

Supplemental Notice of Allowance received for U.S. Appl. No. 18/928,895, mailed on Oct. 7, 2025, 5 pages.

Corrected Notice of Allowance received for U.S. Appl. No. 17/992,789, mailed on Oct. 28, 2025, 4 pages.

Decision to Grant received for European Patent Application No. 24182717.9, mailed on Oct. 16, 2025, 4 pages.

Notice of Acceptance received for Australian Patent Application No. 2023282230, mailed on Oct. 17, 2025, 3 pages.

Notice of Allowance received for U.S. Appl. No. 18/892,251, mailed on Oct. 22, 2025, 8 pages.

Office Action received for European Patent Application No. 22197490.0, mailed on Oct. 17, 2025, 7 pages.

Office Action received for Korean Patent Application No. 10-2024-7018082, mailed on Oct. 16, 2025, 20 pages (9 pages of English Translation and 11 pages of Official Copy).

Supplemental Notice of Allowance received for U.S. Appl. No. 18/928,895. mailed on Oct. 22, 2025, 2 pages,.

"[Iphone] How To Turn On/Off (Enable/Disable) "Show Outside the Frame" On the Camera", Func !! , Available Online at: https://func.jp/iphone-camera-frame-exterior/, Nov. 5, 2024, 8 pages.

Applicant-Initiated Interview Summary received for U.S. Appl. No. 18/423,234, mailed on May 9, 2025, 2 pages.

(56)    References Cited

OTHER PUBLICATIONS

Applicant-Initiated Interview Summary received for U.S. Appl. No. 18/892,251, mailed on Sep. 17, 2025, 4 pages.

Corrected Notice of Allowance received for U.S. Appl. No. 18/137,369, mailed on May 12, 2025, 2 pages.

Decision to Grant received for European Patent Application No. 19769316.1, mailed on Apr. 25, 2025, 4 pages.

Decision to Grant received for Japanese Patent Application No. 2023-158354, mailed on Sep. 8, 2025, 3 pages (1 page of English Translation and 2 pages of Official Copy).

Decision to Grant received for Japanese Patent Application No. 2024-173257, mailed on Aug. 5, 2025, 3 pages (1 page of English Translation and 2 pages of Official Copy).

European Search Report received for European Patent Application No. 25172958.8, mailed on Jul. 23, 2025, 11 pages.

"Focos—Bokeh Camera for Dual Lens", Available Online at: http://web.archive.org/web/20180908220222/http://focos.me/, Sep. 8, 2018, 7 pages.

Intention to Grant received for European Patent Application No. 20206196.6, mailed on Jul. 14, 2025, 10 pages.

Intention to Grant received for European Patent Application No. 23173036.7, mailed on Jun. 30, 2025, 9 pages.

Intention to Grant received for European Patent Application No. 24182717.9, mailed on Jun. 6, 2025, 8 pages.

International Search Report and Written Opinion received for PCT Patent Application No. PCT/US2025/010440, mailed on Jul. 4, 2025, 20 pages.

Invitation to Pay Additional Fees and Partial International Search Report received for PCT Patent Application No. PCT/US2025/010440, mailed on May 13, 2025, 15 pages.

Non-Final Office Action received for U.S. Appl. No. 18/428,549, mailed on Sep. 24, 2025, 13 pages.

Non-Final Office Action received for U.S. Appl. No. 18/892,251, mailed on Jul. 11, 2025, 28 pages.

Notice of Acceptance received for Australian Patent Application No. 2023226764, mailed on Apr. 11, 2025, 3 pages.

Notice of Allowance received for Chinese Patent Application No. 202110356908.6, mailed on Jul. 1, 2025, 2 pages (1 page of English Translation and 1 page of Official Copy).

Notice of Allowance received for Japanese Patent Application No. 2024-033171, mailed on Jul. 18, 2025, 4 pages (1 page of English Translation and 3 pages of Official Copy).

Notice of Allowance received for Japanese Patent Application No. 2024-532566, mailed on Jun. 13, 2025, 5 pages (1 page of English Translation and 4 pages of Official Copy).

Notice of Allowance received for U.S. Appl. No. 17/992,789, mailed on Sep. 18, 2025, 12 pages.

Notice of Allowance received for U.S. Appl. No. 18/137,369, mailed on Apr. 15, 2025, 11 pages.

Notice of Allowance received for U.S. Appl. No. 18/423,234, mailed on Aug. 11, 2025, 6 pages.

Notice of Allowance received for U.S. Appl. No. 18/928,895, mailed on Jul. 2, 2025, 9 pages.

Office Action received for Australian Patent Application No. 2023285892, mailed on Apr. 11, 2025, 4 pages.

Office Action received for Australian Patent Application No. 2023285892, mailed on Jul. 21, 2025, 5 pages.

Office Action received for Chinese Patent Application No. 202010235395.9, mailed on Mar. 1, 2025, 16 pages (9 pages of English Translation and 7 pages of Official Copy).

Office Action received for Chinese Patent Application No. 202010235395.9, mailed on May 31, 2025, 15 pages (7 pages of English Translation and 8 pages of Official Copy).

Office Action received for Chinese Patent Application No. 202110766668.7, mailed on Aug. 27, 2025, 17 pages (10 pages of English Translation and 7 pages of Official Copy).

Office Action received for Chinese Patent Application No. 202411853119.3, mailed on Jun. 16, 2025, 19 pages (10 pages of English Translation and 9 pages of Official Copy).

Office Action received for European Patent Application No. 20728854.9, mailed on Jun. 20, 2025, 6 pages.

Office Action received for European Patent Application No. 21773186.8, mailed on Mar. 20, 2025, 7 pages.

Office Action received for European Patent Application No. 24155758.6, mailed on May 28, 2025, 8 pages.

Office Action received for Indian Patent Application No. 202118009190, mailed on Mar. 24, 2025, 7 pages.

Office Action received for Indian Patent Application No. 202318031344, mailed on Apr. 1, 2025, 7 pages.

Office Action received for Japanese Patent Application No. 2023-158354, mailed on Jun. 3, 2025, 6 pages (3 pages of English Translation and 3 pages of Official Copy).

Office Action received for Korean Patent Application No. 10-2023-0125143, mailed on May 19, 2025, 9 pages (4 pages of English Translation and 5 pages of Official Copy).

Shinobu Umi, "What Happens if You Turn Off "Show Outside Frame" In The Camera App? - Why Can't I Ask About the Iphone Anymore?", Available Online at: https://news.mynavi.jp/article/20210216 ]iphone_why/>, Feb. 16, 2021, 5 pages (1 page of English Translation and 4 pages of Official Copy).

Corrected Notice of Allowance received for U.S. Appl. No. 17/992,789, mailed on Dec. 2, 2025, 2 pages.

Examiner-Initiated Interview Summary received for U.S. Appl. No. 18/428,549, mailed on Nov. 20, 2025, 2 pages.

International Search Report and Written Opinion received for PCT Patent Application No. PCT/US2025/030506, mailed on Oct. 17, 2025, 20 pages.

Invitation to Pay Additional Fees and Partial International Search Report received for PCT Patent Application No. PCT/US2025/030506, mailed on Aug. 26, 2025, 14 pages.

Non-Final Office Action received for U.S. Appl. No. 18/892,230, mailed on Nov. 19, 2025, 25 pages.

Notice of Allowance received for Chinese Patent Application No. 202010235395.9, mailed on Nov. 10, 2025, 2 pages (1 page of English Translation and 1 page of Official Copy).

Office Action received for Indian Patent Application No. 202218054596, mailed on Nov. 14, 2025, 6 pages.

Office Action received for Indian Patent Application No. 202218054599, mailed on Nov. 14, 2025, 8 pages.

Office Action received for Indian Patent Application No. 202318031342, mailed on Nov. 12, 2025, 6 pages.

Advisory Action received for U.S. Appl. No. 16/144,629, mailed on Dec. 13, 2019, 9 pages.

Advisory Action received for U.S. Appl. No. 16/144,629, mailed on Jan. 6, 2021, 10 pages.

Advisory Action received for U.S. Appl. No. 17/951,016, mailed on Jul. 14, 2023, 7 pages.

Advisory Action received for U.S. Appl. No. 17/951,016, mailed on Mar. 11, 2024, 5 pages.

Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.

Apple Support, "Multitask with Picture in Picture on iPad", Online available at: <https://web.archive.org/web/20210207010119/https://support.apple.com/en-gb/guide/ipad/ipad7858c392/ipados>, Retrieved from the Internet: URL: https://support.apple.com/en-gb/guide/ipad/ipad7858c392/ipados, Feb. 7, 2021, 2 pages.

Applicant Initiated Interview Summary received for U.S. Appl. No. 17/190,879, mailed on Oct. 26, 2021, 3 pages.

Applicant Initiated Interview Summary received for U.S. Appl. No. 16/271,583, mailed on Mar. 2, 2020, 3 pages.

Applicant Initiated Interview Summary received for U.S. Appl. No. 16/271,583, mailed on Jul. 14, 2020, 4 pages.

Applicant Initiated Interview Summary received for U.S. Appl. No. 15/995,040, mailed on Aug. 2, 2022, 5 pages.

Applicant Initiated Interview Summary received for U.S. Appl. No. 15/995,040, mailed on Dec. 23, 2019, 5 pages.

Applicant Initiated Interview Summary received for U.S. Appl. No. 15/995,040, mailed on Jul. 27, 2020, 4 pages.

Applicant Initiated Interview Summary received for U.S. Appl. No. 15/995,040, mailed on Nov. 18, 2022, 5 pages.

(56) References Cited

OTHER PUBLICATIONS

Applicant Initiated Interview Summary received for U.S. Appl. No. 15/995,040, mailed on Nov. 24, 2020, 4 pages.
Applicant Initiated Interview Summary received for U.S. Appl. No. 16/144,629, mailed on Jul. 2, 2020, 5 pages.
Applicant Initiated Interview Summary received for U.S. Appl. No. 16/144,629, mailed on Nov. 23, 2020, 3 pages.
Applicant Initiated Interview Summary received for U.S. Appl. No. 16/528,257, mailed on Nov. 18, 2021, 2 pages.
Applicant Initiated Interview Summary received for U.S. Appl. No. 16/528,941, mailed on Jun. 19, 2020, 3 pages.
Applicant Initiated Interview Summary received for U.S. Appl. No. 16/528,941, mailed on Nov. 10, 2020, 2 pages.
Applicant Initiated Interview Summary received for U.S. Appl. No. 16/584,100, mailed on Feb. 19, 2020, 3 pages.
Applicant Initiated Interview Summary received for U.S. Appl. No. 16/586,344, mailed on Feb. 27, 2020, 3 pages.
Applicant Initiated Interview Summary received for U.S. Appl. No. 17/027,317, mailed on Dec. 21, 2020, 4 pages.
Applicant Initiated Interview Summary received for U.S. Appl. No. 17/041,412, mailed on Jan. 31, 2023, 7 pages.
Applicant Initiated Interview Summary received for U.S. Appl. No. 17/220,596, mailed on Aug. 18, 2021, 3 pages.
Applicant Initiated Interview Summary received for U.S. Appl. No. 17/466,824, mailed on Apr. 20, 2023, 2 pages.
Applicant Initiated Interview Summary received for U.S. Appl. No. 17/466,824, mailed on Oct. 5, 2022, 2 pages.
Applicant Initiated Interview Summary received for U.S. Appl. No. 17/466,824, mailed on Sep. 28, 2023, 2 pages.
Applicant Initiated Interview Summary received for U.S. Appl. No. 17/479,897, mailed on Jun. 12, 2023, 2 pages.
Applicant Initiated Interview Summary received for U.S. Appl. No. 17/479,897, mailed on Oct. 31, 2022, 3 pages.
Applicant Initiated Interview Summary received for U.S. Appl. No. 17/546,968, mailed on Apr. 26, 2024, 2 pages.
Applicant Initiated Interview Summary received for U.S. Appl. No. 17/546,968, mailed on Jan. 16, 2024, 3 pages.
Applicant Initiated Interview Summary received for U.S. Appl. No. 17/951,016, mailed on Feb. 1, 2024, 4 pages.
Applicant Initiated Interview Summary received for U.S. Appl. No. 17/951,016, mailed on Nov. 24, 2023, 5 pages.
AstroVideo, "AstroVideo enables you to use a low-cost,low-light video camera to capture astronomical images.", Available online at: https://www.coaa.co.uk/astrovideo.htm, Retrieved on: Nov. 18, 2019, 5 pages.
Board Decision received for Chinese Patent Application No. 201811446867.4, mailed on Apr. 26, 2023, 21 pages (5 pages of English Translation and 16 pages of Official Copy).
Board Decision received for Chinese Patent Application No. 201811446867.4, mailed on Feb. 14, 2023, 11 pages (5 pages of English Translation and 7 pages of Official Copy).
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Brief Communication Regarding Oral Proceedings received for European Patent Application No. 21163791.3 mailed on Nov. 7, 2023, 4 pages.
Certificate of Examination received for Australian Patent Application No. 2017100683, mailed on Jan. 16, 2018, 2 pages.
Certificate of Examination received for Australian Patent Application No. 2020100720, mailed on Nov. 11, 2020, 2 pages.
Certificate of Examination received for Australian Patent Application No. 2020104220, mailed on Apr. 1, 2021, 2 pages.
Certificate of Examination received for Australian Patent Application No. 2021103004, mailed on Sep. 13, 2021, 2 pages.
Certificate of Examination received for Australian Patent Application No. 2021107587, mailed on Apr. 29, 2022, 2 pages.

Chfondue, "Siemens Gigaset SL785 and SL78h demo", Online Available at: https://www.youtube.com/watch?v=9HRL-8hkJ4s, Feb. 20, 2009, 2 pages.
Clover Juli, "Moment Pro Camera App for iOS Gains Zebra Striping for Displaying Over and Underexposed Areas", Online Available at: https://web.archive.org/web/20190502081353/https://www.macrumors.com/2019/05/01/momentcamera-app-zebra-striping-and-more/, May 1, 2019, 8 pages.
Communication for Board of Appeal received for European Patent Application No. 17184710.6, mailed on Feb. 29, 2024, 13 pages.
Computerhilfen, "Whatsapp: Voice Message without Holding the Button", Retrieved from Internet: <https://www.youtube.com/watch?v=ofFCKvs5URw>, Jan. 14, 2018, 9 pages.
Corrected Notice of Allowance received for U.S. Appl. No. 14/641,251, mailed on Jun. 17, 2016, 2 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 15/273,453, mailed on Dec. 21, 2017, 3 pages.
Corrected Notice of Allowance received for U.S. Appl. No. 15/273,453, mailed on Feb. 8, 2018, 2 pages.
Corrected Notice of Allowance received for U.S. Appl. No. 15/273,453, mailed on Nov. 27, 2017, 2 pages.
Corrected Notice of Allowance received for U.S. Appl. No. 15/273,503, mailed on Nov. 2, 2017, 2 pages.
Corrected Notice of Allowance received for U.S. Appl. No. 15/273,503, mailed on Nov. 24, 2017, 2 pages.
Corrected Notice of Allowance received for U.S. Appl. No. 15/858,175, mailed on Sep. 21, 2018, 2 pages.
Corrected Notice of Allowance received for U.S. Appl. No. 16/144,629, mailed on Apr. 21, 2022, 5 pages.
Corrected Notice of Allowance received for U.S. Appl. No. 16/144,629, mailed on Aug. 24, 2022, 6 pages.
Corrected Notice of Allowance received for U.S. Appl. No. 16/144,629, mailed on Jun. 23, 2022, 5 pages.
Corrected Notice of Allowance received for U.S. Appl. No. 16/191,117, mailed on Dec. 9, 2019, 2 pages.
Corrected Notice of Allowance received for U.S. Appl. No. 16/191,117, mailed on Feb. 28, 2020, 2 pages.
Corrected Notice of Allowance received for U.S. Appl. No. 16/191,117, mailed on Nov. 20, 2019, 2 pages.
Corrected Notice of Allowance received for U.S. Appl. No. 16/528,257, mailed on Feb. 3, 2022, 2 pages.
Corrected Notice of Allowance received for U.S. Appl. No. 16/582,595, mailed on Apr. 7, 2020, 5 pages.
Corrected Notice of Allowance received for U.S. Appl. No. 16/582,595, mailed on Apr. 22, 2020, 5 pages.
Corrected Notice of Allowance received for U.S. Appl. No. 16/583,020, mailed on Mar. 24, 2020, 2 pages.
Corrected Notice of Allowance received for U.S. Appl. No. 16/584,044, mailed on Apr. 16, 2020, 3 pages.
Corrected Notice of Allowance received for U.S. Appl. No. 16/584,044, mailed on Jan. 29, 2020, 3 pages.
Corrected Notice of Allowance received for U.S. Appl. No. 16/584,044, mailed on Mar. 4, 2020, 2 pages.
Corrected Notice of Allowance received for U.S. Appl. No. 16/584,100, mailed on Feb. 21, 2020, 9 pages.
Corrected Notice of Allowance received for U.S. Appl. No. 16/584,693, mailed on Feb. 21, 2020, 15 pages.
Corrected Notice of Allowance received for U.S. Appl. No. 16/584,693, mailed on Mar. 4, 2020, 2 pages.
Corrected Notice of Allowance received for U.S. Appl. No. 16/584,693, mailed on Mar. 20, 2020, 2 pages.
Corrected Notice of Allowance received for U.S. Appl. No. 16/586,314, mailed on Apr. 8, 2020, 5 pages.
Corrected Notice of Allowance received for U.S. Appl. No. 16/586,314, mailed on Mar. 4, 2020, 3 pages.
Corrected Notice of Allowance received for U.S. Appl. No. 16/586,344, mailed on Apr. 7, 2020, 4 pages.
Corrected Notice of Allowance received for U.S. Appl. No. 16/586,344, mailed on Jan. 23, 2020, 4 pages.

(56) References Cited

OTHER PUBLICATIONS

Corrected Notice of Allowance received for U.S. Appl. No. 16/586,344, mailed on Mar. 17, 2020, 4 pages.
Corrected Notice of Allowance received for U.S. Appl. No. 16/825,879, mailed on Aug. 13, 2021, 2 pages.
Corrected Notice of Allowance received for U.S. Appl. No. 16/825,879, mailed on Jul. 23, 2021, 2 pages.
Corrected Notice of Allowance received for U.S. Appl. No. 16/825,879, mailed on Sep. 15, 2021, 2 pages.
Corrected Notice of Allowance received for U.S. Appl. No. 16/835,651, mailed on Aug. 10, 2021, 4 pages.
Corrected Notice of Allowance received for U.S. Appl. No. 16/835,651, mailed on Aug. 13, 2021, 2 pages.
Corrected Notice of Allowance received for U.S. Appl. No. 16/835,651, mailed on Jul. 28, 2021, 4 pages.
Corrected Notice of Allowance received for U.S. Appl. No. 16/835,651, mailed on Jun. 14, 2021, 2 pages.
Corrected Notice of Allowance received for U.S. Appl. No. 17/027,484, mailed on May 14, 2021, 5 pages.
Corrected Notice of Allowance received for U.S. Appl. No. 17/027,484, mailed on May 28, 2021, 5 pages.
Corrected Notice of Allowance received for U.S. Appl. No. 17/041,412, mailed on Apr. 12, 2023, 2 pages.
Corrected Notice of Allowance received for U.S. Appl. No. 17/041,412, mailed on Mar. 23, 2023, 7 pages.
Corrected Notice of Allowance received for U.S. Appl. No. 17/041,412, mailed on Mar. 31, 2023, 6 pages.
Corrected Notice of Allowance received for U.S. Appl. No. 17/041,412, mailed on May 17, 2023, 2 pages.
Corrected Notice of Allowance received for U.S. Appl. No. 17/190,879, mailed on Nov. 19, 2021, 2 pages.
Corrected Notice of Allowance received for U.S. Appl. No. 17/220,596, mailed on Nov. 4, 2021, 3 pages.
Corrected Notice of Allowance received for U.S. Appl. No. 17/220,596, mailed on Nov. 18, 2021, 27 pages.
Corrected Notice of Allowance received for U.S. Appl. No. 17/354,376, mailed on Apr. 11, 2022, 5 pages.
Corrected Notice of Allowance received for U.S. Appl. No. 17/354,376, mailed on Feb. 16, 2022, 5 pages.
Corrected Notice of Allowance received for U.S. Appl. No. 17/354,376, mailed on Mar. 23, 2022, 6 pages.
Corrected Notice of Allowance received for U.S. Appl. No. 17/466,824, mailed on Feb. 6, 2024, 2 pages.
Corrected Notice of Allowance received for U.S. Appl. No. 17/479,897, mailed on Aug. 17, 2023, 2 pages.
Corrected Notice of Allowance received for U.S. Appl. No. 17/510,168, mailed on Mar. 16, 2023, 2 pages.
Corrected Notice of Allowance received for U.S. Appl. No. 17/510,168, mailed on Mar. 29, 2023, 2 pages.
Corrected Notice of Allowance received for U.S. Appl. No. 17/566,094, mailed on Feb. 8, 2023, 2 pages.
Corrected Notice of Allowance received for U.S. Appl. No. 17/566,094, mailed on Jan. 5, 2023, 2 pages.
Corrected Notice of Allowance received for U.S. Appl. No. 17/566,094, mailed on Jan. 23, 2023, 2 pages.
Corrected Notice of Allowance received for U.S. Appl. No. 17/566,094, mailed on Mar. 7, 2023, 2 pages.
Corrected Notice of Allowance received for U.S. Appl. No. 17/740,032, mailed on Feb. 15, 2023, 6 pages.
Corrected Notice of Allowance received for U.S. Appl. No. 17/740,032, mailed on Nov. 3, 2022, 6 pages.
Corrected Notice of Allowance received for U.S. Appl. No. 17/951,034, mailed on Jul. 14, 2023, 6 pages.
Corrected Notice of Allowance received for U.S. Appl. No. 18/121,458, mailed on Jan. 18, 2024, 2 pages.
Corrected Notice of Allowance received for U.S. Appl. No. 18/196,997, mailed on Apr. 18, 2024, 2 pages.
Corrected Notice of Allowance received for U.S. Appl. No. 18/196,997, mailed on Apr. 25, 2024, 2 pages.
Corrected Notice of Allowance received for U.S. Appl. No. 18/196,997, mailed on Jun. 3, 2024, 2 pages.
Corrected Notice of Allowance received for U.S. Appl. No. 18/196,997, mailed on Jun. 13, 2024, 2 pages.
Corrected Notice of Allowance received for U.S. Appl. No. 18/196,997, mailed on May 23, 2024, 2 pages.
Corrected Notice of Allowance received for U.S. Appl. No. 18/628,021, mailed on Jun. 24, 2024, 2 pages.
Decision of Refusal received for Japanese Patent Application No. 2018-243463, mailed on Feb. 25, 2019, 8 pages (5 pages of English Translation and 3 pages of Official Copy).
Decision of Refusal received for Japanese Patent Application No. 2018-545502, mailed on Feb. 25, 2019, 11 pages (7 pages of English Translation and 4 pages of Official Copy).
Decision on Appeal received for Japanese Patent Application No. 2018-225131, mailed on Mar. 11, 2021, 5 pages (4 pages of English Translation and 1 page of Official Copy).
Decision on Appeal received for Japanese Patent Application No. 2018-545502, mailed on Mar. 25, 2021, 3 pages (1 page of English Translation and 2 pages of Official Copy).
Decision on Appeal received for U.S. Appl. No. 15/995,040, mailed on Dec. 29, 2021, 14 pages.
Decision on Appeal received for U.S. Appl. No. 16/144,629, mailed on Jan. 18, 2022, 8 pages.
Decision to grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for Danish Patent Application No. PA201670627, mailed on Nov. 29, 2018, 2 pages.
Decision to Grant received for Danish Patent Application No. PA201670753, mailed on Mar. 6, 2019, 2 pages.
Decision to Grant received for Danish Patent Application No. PA201670755, mailed on Mar. 6, 2019, 2 pages.
Decision to Grant received for Danish Patent Application No. PA201970593, mailed on Sep. 7, 2021, 2 pages.
Decision to Grant received for Danish Patent Application No. PA201970601, mailed on Feb. 3, 2021, 2 pages.
Decision to Grant received for Danish Patent Application No. PA201970603, mailed on May 21, 2021, 2 pages.
Decision to Grant received for European Patent Application No. 15712218.5, mailed on Jun. 7, 2018, 2 pages.
Decision to Grant received for European Patent Application No. 17809168.2, mailed on Oct. 21, 2021, 3 pages.
Decision to Grant received for European Patent Application No. 18176890.4, mailed on Jul. 9, 2020, 3 pages.
Decision to Grant received for European Patent Application No. 18183054.8, mailed on Jan. 21, 2021, 3 pages.
Decision to Grant received for European Patent Application No. 18209460.7, mailed on Apr. 9, 2021, 2 pages.
Decision to Grant received for European Patent Application No. 18214698.5, mailed on Sep. 10, 2020, 3 pages.
Decision to Grant received for European Patent Application No. 20168009.7, mailed on Jun. 22, 2023, 4 pages.
Decision to Grant received for European Patent Application No. 20206197.4, mailed on Oct. 6, 2023, 4 pages.
Decision to Grant received for European Patent Application No. 20210373.5, mailed on May 19, 2023, 4 pages.
Decision to Grant received for European Patent Application No. 21733324.4, mailed on Jun. 2, 2023, 3 pages.
Decision to Grant received for Japanese Patent Application No. 2018-243463, mailed on Aug. 17, 2020, 2 pages (1 page of English Translation and 1 page of Official Copy).
Decision to Grant received for Japanese Patent Application No. 2019-203399, mailed on Oct. 20, 2021, 3 pages (1 page of English Translation and 2 pages of Official Copy).
Decision to Grant received for Japanese Patent Application No. 2020-070418, mailed on Feb. 8, 2021, 3 pages (1 page of English Translation and 2 pages of Official Copy).
Decision to Grant received for Japanese Patent Application No. 2020-184470, mailed on Jul. 1, 2021, 3 pages (1 page of English Translation and 2 pages of Official Copy).

(56)                  References Cited

OTHER PUBLICATIONS

Decision to Grant received for Japanese Patent Application No. 2020-184471, mailed on Jul. 1, 2021, 3 pages (1 page of English Translation and 2 pages of Official Copy).
Decision to Grant received for Japanese Patent Application No. 2021-051385, mailed on Jul. 8, 2021, 3 pages (1 page of English Translation and 2 pages of Official Copy).
Decision to Grant received for Japanese Patent Application No. 2021-187533, mailed on Sep. 28, 2023, 3 pages (1 page of English Translation and 2 pages of Official Copy).
Decision to Grant received for Japanese Patent Application No. 2022-130725, mailed on Dec. 11, 2023, 2 pages (1 page of English Translation and 1 page of Official Copy).
Decision to Grant received for Japanese Patent Application No. 2022-145387, mailed on Mar. 4, 2024, 3 pages (1 page of English Translation and 2 pages of Official Copy).
Decision to Refuse received for European Patent Application No. 17184710.6, mailed on Jun. 16, 2020, 9 pages.
Decision to Refuse received for European Patent Application No. 21163791.3, mailed on Dec. 4, 2023, 16 pages.
Decision to Refuse received for Japanese Patent Application No. 2018-225131, mailed on Jul. 8, 2019, 6 pages (4 pages of English Translation and 2 pages of Official Copy).
Decision to Refuse received for Japanese Patent Application No. 2018-243463, mailed on Jul. 8, 2019, 5 pages (3 pages of English Translation and 2 pages of Official Copy).
Decision to Refuse received for Japanese Patent Application No. 2018-545502, mailed on Jul. 8, 2019, 5 pages (3 pages of English Translation and 2 pages of Official Copy).
Demetriou Soteris, "Analyzing & Designing the Security of Shared Resource On Smartphone Operating Systems", Dissertation, University of Illinois at Urbana-Champaign Online available at: https://www.ideals.illinois.edu/bitstream/handle/2142/100907/DEMETRIOU-DISSERTATION-2018.pdf?sequence=1&isAllowed=n, 2018, 211 pages.
Drunk Beauty Flower Digital Technology, "iPhone Xs Max Camera Tips, Tricks, Features and Complete Tutorial", Available online at: https://www.ixigua.com/6606874981844386308?wid_try=1, Oct. 2, 2018, 2 pages (Official Copy Only) {See Communication under Rule 37 CFR § 1.98(a) (3)}.
Dutta Tushar S., "Warning! iOS Apps With Camera Access Permission Can Spy On You", Online available at: https://web.archive.org/web/20180219092123/https://techviral.net/ios-apps-camera-can-spy/, Feb. 19, 2018, 3 pages.
European Search Report received for European Patent Application No. 18209460.7, mailed on Mar. 15, 2019, 4 pages.
European Search Report received for European Patent Application No. 18214698.5, mailed on Mar. 21, 2019, 5 pages.
European Search Report received for European Patent Application No. 20206196.6, mailed on Dec. 8, 2020, 4 pages.
European Search Report received for European Patent Application No. 20206197.4, mailed on Nov. 30, 2020, 4 pages.
European Search Report received for European Patent Application No. 20210373.5, mailed on Apr. 13, 2021, 4 pages.
European Search Report received for European Patent Application No. 21157252.4, mailed on Apr. 16, 2021, 4 pages.
European Search Report received for European Patent Application No. 21163791.3, mailed on May 6, 2021, 5 pages.
European Search Report received for European Patent Application No. 22197490.0, mailed on Aug. 18, 2023, 10 pages.
Examiner Initiated-Interview Summary received for U.S. Appl. No. 16/528,941, mailed on Dec. 1, 2020, 2 pages.
Examiner Initiated-Interview Summary received for U.S. Appl. No. 17/220,596, mailed on Oct. 7, 2021, 2 pages.
Examiner's Answer to Appeal Brief received for U.S. Appl. No. 15/995,040, mailed on Jun. 23, 2021, 31 pages.
Examiner's Answer to Appeal Brief received for U.S. Appl. No. 16/144,629, mailed on Jul. 21, 2021, 21 pages.
Extended European Search Report received for European Patent Application No. 20168009.7, mailed on Sep. 11, 2020, 12 pages.

Extended European Search Report received for European Patent Application No. 22197513.9, mailed on Aug. 25, 2023, 10 pages.
Extended European Search Report received for European Patent Application No. 23173036.7, mailed on Jul. 24, 2023, 13 pages.
Extended European Search Report received for European Patent Application No. 24155758.6, mailed on Mar. 20, 2024, 11 pages.
Extended Search Report received for European Patent Application No. 17809168.2, mailed on Jun. 28, 2018, 9 pages.
Feng et al., "3D Direct Human-Computer Interface Paradigm Based on Free Hand Tracking", Chinese Journal of Computers, vol. 37, No. 6, Jun. 30, 2014, 15 pages (Official copy only) {See Communication under Rule 37 CFR § 1.98(a) (3)}.
Final Office Action received for U.S. Appl. No. 15/268,115, mailed on Oct. 11, 2017, 48 pages.
Final Office Action received for U.S. Appl. No. 15/995,040, mailed on Oct. 6, 2022, 27 pages.
Final Office Action received for U.S. Appl. No. 15/995,040, mailed on Oct. 17, 2019, 20 pages.
Final Office Action received for U.S. Appl. No. 15/995,040, mailed on Sep. 2, 2020, 21 pages.
Final Office Action received for U.S. Appl. No. 16/144,629, mailed on Sep. 11, 2020, 22 pages.
Final Office Action received for U.S. Appl. No. 16/144,629, mailed on Sep. 18, 2019, 22 pages.
Final Office Action received for U.S. Appl. No. 16/271,583, mailed on Aug. 26, 2020, 18 pages.
Final Office Action received for U.S. Appl. No. 16/528,941, mailed on Jul. 13, 2020, 15 pages.
Final Office Action received for U.S. Appl. No. 17/466,824, mailed on Nov. 25, 2022, 35 pages.
Final Office Action received for U.S. Appl. No. 17/479,897, mailed on Jan. 10, 2023, 15 pages.
Final Office Action received for U.S. Appl. No. 17/546,968, mailed on Mar. 19, 2024, 43 pages.
Final Office Action received for U.S. Appl. No. 17/951,016, mailed on Jan. 2, 2024, 48 pages.
Final Office Action received for U.S. Appl. No. 17/951,016, mailed on May 4, 2023, 37 pages.
Franks Tech Help,"DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
Gibson Andrews, "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review: Camera", Available Online at <https://web.archive.org/web/20180823142417/https://www.gsmarena.com/honor_10-review-1771p5.php>, Aug. 23, 2018, 11 pages.
Hall Brent, "Samsung Galaxy Phones Pro Mode (S7/S8/S9/Note 8/Note 9): When, why, & How To Use It", See Especially 3:18-5:57, Available Online at <https://www.youtube.com/watch?v=KwPxGUDRkTg>, Jun. 18, 2018, 3 pages.
Hearing Notice received for Indian Patent Application No. 201817024430, mailed on Apr. 6, 2023, 2 pages.
Hernández Carlos, "Lens Blur in the New Google Camera App", Available online at: https://research.googleblog.com/2014/04/lens-blur-in-new-google-camera-app.html, https://ai.googleblog.com/2014/04/1ens-blur-in-new-google-camera-app.html, Apr. 16, 2014, 6 pages
Huawei Mobile PH, "Huawei P10 Tips & Tricks: Compose Portraits With Wide Aperture (Bokeh)", Available Online at <https://www.youtube.com/watch?v=WM4yo5-hrrE>, Mar. 30, 2017, 2 pages.

(56)  References Cited

OTHER PUBLICATIONS

Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.

Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.

ImagespaceTV, "Olympus OM-D E-M1 Mark II—Highlights & Shadows with Gavin Hoey", Online available at: https://www.youtube.com/watch?v=goEhh1n--hQ, Aug. 3, 2018, 3 pages.

Intention to Grant received for Danish Patent Application No. PA201570788, mailed on Mar. 27, 2017, 2 pages.

Intention to Grant received for Danish Patent Application No. PA201570791, mailed on Mar. 7, 2017, 2 pages.

Intention to Grant received for Danish Patent Application No. PA201670627, mailed on Jun. 11, 2018, 2 pages.

Intention to Grant received for Danish Patent Application No. PA201670753, mailed on Oct. 29, 2018, 2 pages.

Intention to Grant received for Danish Patent Application No. PA201670755, mailed on Nov. 13, 2018, 2 pages.

Intention to Grant received for Danish Patent Application No. PA201970593, mailed on Apr. 13, 2021, 2 pages.

Intention to Grant received for Danish Patent Application No. PA201970601, mailed on Sep. 21, 2020, 2 pages.

Intention to Grant received for Danish Patent Application No. PA201970603, mailed on Jan. 13, 2021, 2 pages.

Intention to Grant received for Danish Patent Application No. PA202070611, mailed on May 5, 2021, 2 pages.

Intention to Grant received for European Patent Application No. 15712218.5, mailed on Jan. 24, 2018, 7 pages.

Intention to Grant received for European Patent Application No. 17809168.2, mailed on Jun. 25, 2021, 8 pages.

Intention to Grant received for European Patent Application No. 18176890.4, mailed on Feb. 28, 2020, 8 pages.

Intention to Grant received for European Patent Application No. 18183054.8, mailed on Nov. 5, 2020, 6 pages.

Intention to Grant received for European Patent Application No. 18209460.7, mailed on Jan. 15, 2021, 8 pages.

Intention to Grant received for European Patent Application No. 18214698.5, mailed on Apr. 21, 2020, 8 pages.

Intention to Grant received for European Patent Application No. 20168009.7, mailed on Feb. 28, 2023, 10 pages.

Intention to Grant received for European Patent Application No. 20168009.7, mailed on May 17, 2022, 9 pages.

Intention to Grant received for European Patent Application No. 20168009.7, mailed on Oct. 31, 2022, 9 pages.

Intention to Grant received for European Patent Application No. 20206196.6, mailed on Nov. 10, 2023, 10 pages.

Intention to Grant received for European Patent Application No. 20206197.4, mailed on Dec. 15, 2022, 10 pages.

Intention to Grant received for European Patent Application No. 20206197.4, mailed on May 25, 2023, 9 pages.

Intention to Grant received for European Patent Application No. 20210373.5, mailed on Jan. 10, 2023, 12 pages.

Intention to Grant received for European Patent Application No. 21733324.4, mailed on Jan. 9, 2023, 9 pages.

Intention to Grant received for European Patent Application No. 21733324.4, mailed on Sep. 13, 2022, 7 pages.

International Preliminary Report on Patentability received for PCT Patent Application No. PCT/US2015/019298, mailed on Mar. 16, 2017, 12 pages.

International Preliminary Report on Patentability received for PCT Patent Application No. PCT/US2017/035321, mailed on Dec. 27, 2018, 11 pages.

International Preliminary Report on Patentability received for PCT Patent Application No. PCT/US2019/017363, mailed on Aug. 20, 2020, 9 pages.

International Preliminary Report on Patentability received for PCT Patent Application No. PCT/US2019/049101, mailed on Mar. 25, 2021, 17 pages.

International Preliminary Report on Patentability received for PCT Patent Application No. PCT/US2020/031643, mailed on Nov. 18, 2021, 27 pages.

International Preliminary Report on Patentability received for PCT Patent Application No. PCT/US2021/034304, mailed on Dec. 15, 2022, 19 pages.

International Preliminary Report on Patentability received for PCT Patent Application No. PCT/US2021/046877, mailed on Apr. 6, 2023, 12 pages.

International Preliminary Report on Patentability received for PCT Patent Application No. PCT/US2022/050916, mailed on Jun. 13, 2024, 18 pages.

International Search Report and Written Opinion received for PCT Patent Application No. PCT/US2015/019298, mailed on Jul. 13, 2015, 7 pages.

International Search Report and Written Opinion received for PCT Patent Application No. PCT/US2017/035321, mailed on Oct. 6, 2017, 15 pages.

International Search Report and Written Opinion received for PCT Patent Application No. PCT/US2019/017363, mailed on Aug. 12, 2019, 12 pages.

International Search Report and Written Opinion received for PCT Patent Application No. PCT/US2019/049101, mailed on Dec. 16, 2019, 26 pages.

International Search Report and Written Opinion received for PCT Patent Application No. PCT/US2020/031643, mailed on Dec. 2, 2020, 33 pages.

International Search Report and Written Opinion received for PCT Patent Application No. PCT/US2020/031643, mailed on Nov. 2, 2020, 34 pages.

International Search Report and Written Opinion received for PCT Patent Application No. PCT/US2021/034304, mailed on Oct. 11, 2021, 24 pages.

International Search Report and Written Opinion received for PCT Patent Application No. PCT/US2021/046877, mailed on Mar. 1, 2022, 17 pages.

International Search Report and Written Opinion received for PCT Patent Application No. PCT/US2022/050916, mailed on May 15, 2023, 23 pages.

International Search Report and Written Opinion received for PCT Patent Application No. PCT/US2023/019476, mailed on Oct. 10, 2023, 25 pages.

Invitation to Pay Addition Fees received for PCT Patent Application No. PCT/US2017/035321, mailed on Aug. 17, 2017, 3 pages.

Invitation to Pay Additional Fee received for PCT Patent Application No. PCT/US2022/050916, mailed on Mar. 23, 2023, 16 pages.

Invitation to Pay Additional Fees and Partial International Search Report received for PCT Patent Application No. PCT/US2019/049101, mailed on Oct. 24, 2019, 17 pages.

Invitation to Pay Additional Fees and Partial International Search Report received for PCT Patent Application No. PCT/US2023/019476, mailed on Aug. 17, 2023, 16 pages.

Invitation to Pay Additional Fees received for PCT Patent Application No. PCT/US2019/017363, mailed on Jun. 17, 2019, 8 pages.

Invitation to Pay Additional Fees received for PCT Patent Application No. PCT/US2020/031643, mailed on Sep. 9, 2020, 30 pages.

Invitation to Pay Additional Fees received for PCT Patent Application No. PCT/US2021/034304, mailed on Aug. 20, 2021, 16 pages.

Invitation to Pay Additional Fees received for PCT Patent Application No. PCT/US2021/046877, mailed on Jan. 5, 2022, 10 pages.

Invitation to Pay Search Fees received for European Patent Application No. 20728854.9, mailed on Feb. 23, 2024, 3 pages.

"IPhone User Guide For iOS 4.2 and 4.3 Software", Available at https://manuals.info.apple.com/MANUALS/1000/MA1539/en_US/iPhone_iOS4_User_Guide.pdf, 2011, 274 pages.

Junxiang Zhang, "Playing My New iPad", The Publishing House of Ordinance Industry, Sep. 30, 2012, pp. 217-219 (Official Copy only) {See Communication under Rule 37 CFR § 1.98(a) (3)}.

(56) References Cited

OTHER PUBLICATIONS

King Juliea, "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.

KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.

Minutes of the Oral Proceedings received for European Patent Application No. 17184710.6, mailed on May 22, 2024, 4 pages.

Minutes of the Oral Proceedings received for European Patent Application No. 21163791.3, mailed on Dec. 1, 2023, 6 pages.

Nikon Digital Camera D7200 User's Manual, Online available at: https://download.nikonimglib.com/archive3/dbHI400jWws903mGr6q98a4k8F90/D7200UM_SG(En)05.pdf, 2005, 416 pages.

Non-Final Office Action received for U.S. Appl. No. 16/528,257, mailed on Jul. 30, 2021, 12 pages.

Non-Final Office Action received for U.S. Appl. No. 14/869,807, mailed on Dec. 2, 2016, 23 pages.

Non-Final Office Action received for U.S. Appl. No. 15/268,115, mailed on Apr. 13, 2017, 44 pages.

Non-Final Office Action received for U.S. Appl. No. 15/273,522, mailed on Nov. 30, 2016, 15 pages.

Non-Final Office Action received for U.S. Appl. No. 15/273,544, mailed on May 25, 2017, 18 pages.

Non-Final Office Action received for U.S. Appl. No. 15/995,040, mailed on Apr. 8, 2022, 21 pages.

Non-Final Office Action received for U.S. Appl. No. 15/995,040, mailed on Apr. 15, 2020, 19 pages.

Non-Final Office Action received for U.S. Appl. No. 15/995,040, mailed on Jun. 7, 2023, 26 pages.

Non-Final Office Action received for U.S. Appl. No. 15/995,040, mailed on May 16, 2019, 24 pages.

Non-Final Office Action received for U.S. Appl. No. 16/144,629, mailed on Mar. 13, 2020, 24 pages.

Non-Final Office Action received for U.S. Appl. No. 16/144,629, mailed on Mar. 29, 2019, 18 pages.

Non-Final Office Action received for U.S. Appl. No. 16/271,583, mailed on May 6, 2020, 24 pages.

Non-Final Office Action received for U.S. Appl. No. 16/271,583, mailed on Nov. 29, 2019, 18 pages.

Non-Final Office Action received for U.S. Appl. No. 16/528,941, mailed on Dec. 7, 2020, 15 pages.

Non-Final Office Action received for U.S. Appl. No. 16/528,941, mailed on Jan. 30, 2020, 14 pages.

Non-Final Office Action received for U.S. Appl. No. 16/528,595, mailed on Nov. 26, 2019, 17 pages.

Non-Final Office Action received for U.S. Appl. No. 16/583,020, mailed on Nov. 14, 2019, 9 pages.

Non-Final Office Action received for U.S. Appl. No. 16/825,879, mailed on May 5, 2021, 12 pages.

Non-Final Office Action received for U.S. Appl. No. 17/027,317, mailed on Nov. 17, 2020, 17 pages.

Non-Final Office Action received for U.S. Appl. No. 17/041,412, mailed on Dec. 5, 2022, 13 pages.

Non-Final Office Action received for U.S. Appl. No. 17/190,879, mailed on Oct. 13, 2021, 10 pages.

Non-Final Office Action received for U.S. Appl. No. 17/220,596, mailed on Jun. 10, 2021, 31 pages.

Non-Final Office Action received for U.S. Appl. No. 17/466,824, mailed on May 11, 2022, 30 pages.

Non-Final Office Action received for U.S. Appl. No. 17/466,824, mailed on May 25, 2023, 33 pages.

Non-Final Office Action received for U.S. Appl. No. 17/479,897, mailed on Apr. 25, 2023, 14 pages.

Non-Final Office Action received for U.S. Appl. No. 17/479,897, mailed on Aug. 30, 2022, 10 pages.

Non-Final Office Action received for U.S. Appl. No. 17/510,168, mailed on Dec. 6, 2022, 11 pages.

Non-Final Office Action received for U.S. Appl. No. 17/546,968, mailed on Nov. 24, 2023, 34 pages.

Non-Final Office Action received for U.S. Appl. No. 17/846,962, mailed on May 9, 2024, 19 pages.

Non-Final Office Action received for U.S. Appl. No. 17/951,016, mailed on Feb. 14, 2023, 29 pages.

Non-Final Office Action received for U.S. Appl. No. 17/951,016, mailed on May 9, 2024, 51 pages.

Non-Final Office Action received for U.S. Appl. No. 17/951,016, mailed on Oct. 10, 2023, 51 pages.

Non-Final Office Action received for U.S. Appl. No. 18/114,880, mailed on Aug. 29, 2023, 10 pages.

Non-Final Office Action received for U.S. Appl. No. 18/196,997, mailed on Nov. 20, 2023, 12 pages.

Notice of Acceptance received for Australian Patent Application No. 2017286130, mailed on Apr. 26, 2019, 3 pages.

Notice of Acceptance received for Australian Patent Application No. 2019213341, mailed on Aug. 25, 2020, 3 pages.

Notice of Acceptance received for Australian Patent Application No. 2019218241, mailed on Mar. 9, 2022, 3 pages.

Notice of Acceptance received for Australian Patent Application No. 2019338180, mailed on Jun. 27, 2022, 3 pages.

Notice of Acceptance received for Australian Patent Application No. 2020239717, mailed on Jun. 1, 2022, 3 pages.

Notice of Acceptance received for Australian Patent Application No. 2020260413, mailed on Oct. 14, 2021, 3 pages.

Notice of Acceptance received for Australian Patent Application No. 2020267151, mailed on Dec. 9, 2020, 3 pages.

Notice of Acceptance received for Australian Patent Application No. 2020277216, mailed on Mar. 15, 2021, 3 pages.

Notice of Acceptance received for Australian Patent Application No. 2021201167, mailed on Mar. 15, 2021, 3 pages.

Notice of Acceptance received for Australian Patent Application No. 2021203210, mailed on Jul. 9, 2021, 3 pages.

Notice of Acceptance received for Australian Patent Application No. 2021254567, mailed on Nov. 17, 2021, 3 pages.

Notice of Acceptance received for Australian Patent Application No. 2021290292, mailed on Jan. 23, 2023, 3 pages.

Notice of Acceptance received for Australian Patent Application No. 2022200966, mailed on Feb. 25, 2022, 3 pages.

Notice of Acceptance received for Australian Patent Application No. 2022202377, mailed on May 11, 2022, 3 pages.

Notice of Acceptance received for Australian Patent Application No. 2022204465, mailed on May 26, 2023, 3 pages.

Notice of Acceptance received for Australian Patent Application No. 2022221466, mailed on Aug. 31, 2023, 3 pages.

Notice of Acceptance received for Australian Patent Application No. 2022228121, mailed on Dec. 13, 2023, 3 pages.

Notice of Acceptance received for Australian Patent Application No. 2022228191, mailed on Oct. 10, 2023, 3 pages.

Notice of Acceptance received for Australian Patent Application No. 2023200607, mailed on May 9, 2024, 3 pages.

Notice of Allowance received for Brazilian Patent Application No. 112018074765-3, mailed on Oct. 8, 2019, 2 pages (1 page of English Translation and 1 page of Official Copy).

Notice of Allowance received for Brazilian Patent Application No. BR122018076550-0, mailed on Jan. 3, 2022, 3 pages (1 page of English Translation and 2 pages of Official Copy).

Notice of Allowance received for Chinese Patent Application No. 201580046237.6, mailed on Aug. 29, 2018, 4 pages (1 page of English Translation and 3 pages of Official copy).

Notice of Allowance received for Chinese Patent Application No. 201710657424.9, mailed on May 8, 2020, 2 pages (1 page of English Translation and 1 page of Official Copy).

Notice of Allowance received for Chinese Patent Application No. 201780002533.5. mailed on Apr. 14, 2020, 2 pages (1 page of English Translation and 1 page of Official Copy).

Notice of Allowance received for Chinese Patent Application No. 201810566134.8, mailed on Apr. 7, 2020, 3 pages (1 page of English Translation and 2 pages of Official Copy).

Notice of Allowance received for Chinese Patent Application No. 201810664927.3, mailed on Jul. 19, 2019, 2 pages (1 page of English Translation and 1 page of Official Copy).

(56)  References Cited

OTHER PUBLICATIONS

Notice of Allowance received for Chinese Patent Application No. 201811512767.7. mailed on Jul. 27, 2020, 4 pages (1 page of English Translation and 3 pages of Official Copy).

Notice of Allowance received for Chinese Patent Application No. 202010287950.2, mailed on Mar. 22, 2022, 7 pages (3 pages of English Translation and 4 pages of Official Copy).

Notice of Allowance received for Chinese Patent Application No. 202010287953.6, mailed on Mar. 18, 2021, 7 pages (3 pages of English Translation and 4 pages of Official Copy).

Notice of Allowance received for Chinese Patent Application No. 202010287958.9, mailed on Aug. 27, 2021, 6 pages (3 pages of English Translation and 3 pages of Official Copy).

Notice of Allowance received for Chinese Patent Application No. 202010287961.0, mailed on Mar. 9, 2021, 8 pages (4 pages of English Translation and 4 pages of Official Copy).

Notice of Allowance received for Chinese Patent Application No. 202010287975.2, mailed on Mar. 1, 2021, 7 pages (3 pages of English Translation and 4 pages of Official Copy).

Notice of Allowance received for Chinese Patent Application No. 202010600151.6, mailed on Aug. 13, 2021, 2 pages (1 page of English Translation and 1 page of Official Copy).

Notice of Allowance received for Chinese Patent Application No. 202010600197.8, mailed on Feb. 9, 2022, 5 pages (1 page of English Translation and 4 pages of Official Copy).

Notice of Allowance received for Chinese Patent Application No. 202010601484.0, mailed on Nov. 23, 2021, 2 pages (1 page of English Translation and 1 page of Official Copy).

Notice of Allowance received for Chinese Patent Application No. 202011480411.7, mailed on Feb. 18, 2022, 6 pages (3 pages of English Translation and 3 pages of Official Copy).

Notice of Allowance received for Chinese Patent Application No. 202180002106.3, mailed on May 5, 2022, 6 pages (3 pages of English Translation and 3 pages of Official Copy).

Notice of Allowance received for Japanese Patent Application No. 2018-171188, mailed on Jul. 16, 2019, 3 pages (1 page of English Translation and 2 pages of Official Copy).

Notice of Allowance received for Japanese Patent Application No. 2020-159338, mailed on Jul. 19, 2022, 3 pages (1 page of English Translation and 2 pages of Official Copy).

Notice of Allowance received for Japanese Patent Application No. 2020-542592, mailed on Nov. 14, 2022, 2 pages (1 page of English Translation and 1 page of Official Copy).

Notice of Allowance received for Japanese Patent Application No. 2021-510849, mailed on May 16, 2022, 4 pages (1 page of English Translation and 3 pages of Official Copy).

Notice of Allowance received for Japanese Patent Application No. 2021-565919, mailed on Oct. 3, 2022, 3 pages (1 page of English Translation and 2 pages of Official Copy).

Notice of Allowance received for Japanese Patent Application No. 2022-095182, mailed on Feb. 5, 2024, 4 pages (1 page of English Translation and 3 pages of Official Copy).

Notice of Allowance received for Japanese Patent Application No. 2022-152017, mailed on Jun. 3, 2024, 4 pages (1 page of English Translation and 3 pages of Official Copy).

Notice of Allowance received for Korean Patent Application No. 10-2018-7026743, mailed on Mar. 20, 2019, 7 pages (1 page of English Translation and 6 pages of Official Copy).

Notice of Allowance received for Korean Patent Application No. 10-2018-7028849, mailed on Feb. 1, 2019, 4 pages (1 page of English Translation and 3 pages of Official Copy).

Notice of Allowance received for Korean Patent Application No. 10-2018-7034780, mailed on Jun. 19, 2019, 4 pages (1 page of English Translation and 3 pages of Official Copy).

Notice of Allowance received for Korean Patent Application No. 10-2018-7036893, mailed on Jun. 12, 2019, 4 pages (1 page of English Translation and 3 pages of Official Copy).

Notice of Allowance received for Korean Patent Application No. 10-2019-7027042, mailed on Nov. 26, 2020, 4 pages (1 page of English Translation and 3 pages of Official Copy).

Notice of Allowance received for Korean Patent Application No. 10-2020-0052618, mailed on Mar. 23, 2021, 5 pages (2 page of English Translation and 3 pages of Official Copy).

Notice of Allowance received for Korean Patent Application No. 10-2020-0124139, mailed on Jun. 19, 2023, 7 pages (2 pages of English Translation and 5 pages of Official Copy).

Notice of Allowance received for Korean Patent Application No. 10-2020-0143726, mailed on Nov. 10, 2020, 5 pages (2 pages of English Translation and 3 pages of Official Copy).

Notice of Allowance received for Korean Patent Application No. 10-2020-0155924, mailed on Nov. 23, 2020, 7 pages (2 pages of English Translation and 5 pages of Official Copy).

Notice of Allowance received for Korean Patent Application No. 10-2020-7022663, mailed on Jun. 23, 2022, 6 pages (2 pages of English Translation and 4 pages of Official Copy).

Notice of Allowance received for Korean Patent Application No. 10-2021-0022053, mailed on Nov. 23, 2021, 5 pages (2 pages of English Translation and 3 pages of Official Copy).

Notice of Allowance received for Korean Patent Application No. 10-2021-7000954, mailed on Aug. 18, 2021, 5 pages (2 pages of English Translation and 3 pages of Official Copy).

Notice of Allowance received for Korean Patent Application No. 10-2021-7006145, mailed on Mar. 6, 2023, 5 pages (2 pages of English Translation and 3 pages of Official Copy).

Notice of Allowance received for Korean Patent Application No. 10-2021-7035687, mailed on Dec. 30, 2021, 5 pages (1 page of English Translation and 4 pages of Official Copy).

Notice of Allowance received for Korean Patent Application No. 10-2021-7036337, mailed on Apr. 5, 2022, 4 pages (1 page of English Translation and 3 pages of Official Copy).

Notice of Allowance received for Korean Patent Application No. 10-2022-7010505, mailed on Dec. 26, 2022, 7 pages (2 pages of English Translation and 5 pages of Official Copy).

Notice of Allowance received for Korean Patent Application No. 10-2022-7023077, mailed on Nov. 1, 2022, 8 pages (2 pages of English Translation and 6 pages of Official Copy).

Notice of Allowance received for Korean Patent Application No. 10-2022-7033119, mailed on Jul. 26, 2023, 7 pages (2 pages of English Translation and 5 pages of Official Copy).

Notice of Allowance received for Korean Patent Application No. 10-2023-7009943, mailed on Aug. 31, 2023, 7 pages (2 pages of English Translation and 5 pages of Official Copy).

Notice of Allowance received for Korean Patent Application No. 10-2023-7036985, mailed on Apr. 11, 2024, 7 pages (2 pages of English Translation and 5 pages of Official Copy). .

Notice of Allowance received for Taiwanese Patent Application No. 104107328, mailed on Jun. 12, 2017, 3 pages (Official Copy Only). {See Communication under Rule 37 CFR § 1.98(a) (3)}.

Notice of Allowance received for U.S. Appl. No. 16/528,941, mailed on Aug. 10, 2021, 5 pages.

Notice of Allowance received for U.S. Appl. No. 16/528,941, mailed on May 19, 2021, 5 pages.

Notice of Allowance received for U.S. Appl. No. 14/641,251, mailed on May 18, 2016, 13 pages.

Notice of Allowance received for U.S. Appl. No. 14/869,807, mailed on Jun. 21, 2017, 9 pages.

Notice of Allowance received for U.S. Appl. No. 14/869,807, mailed on Oct. 10, 2017, 9 pages.

Notice of Allowance received for U.S. Appl. No. 15/268,115, mailed on Mar. 7, 2018, 15 pages.

Notice of Allowance received for U.S. Appl. No. 15/273,453, mailed on Oct. 12, 2017, 11 pages.

Notice of Allowance received for U.S. Appl. No. 15/273,503, mailed on Aug. 14, 2017, 9 pages.

Notice of Allowance received for U.S. Appl. No. 15/273,522, mailed on Mar. 28, 2017, 9 pages.

Notice of Allowance received for U.S. Appl. No. 15/273,522, mailed on May 19, 2017, 2 pages.

Notice of Allowance received for U.S. Appl. No. 15/273,522, mailed on May 23, 2017, 2 pages.

Notice of Allowance received for U.S. Appl. No. 15/273,544, mailed on Mar. 13, 2018, 8 pages.

(56) References Cited

OTHER PUBLICATIONS

Notice of Allowance received for U.S. Appl. No. 15/273,544, mailed on Oct. 27, 2017, 8 pages.

Notice of Allowance received for U.S. Appl. No. 15/858,175, mailed on Jun. 1, 2018, 8 pages.

Notice of Allowance received for U.S. Appl. No. 15/858,175, mailed on Sep. 12, 2018, 8 pages.

Notice of Allowance received for U.S. Appl. No. 15/975,581, mailed on Oct. 3, 2018, 25 pages.

Notice of Allowance received for U.S. Appl. No. 16/144,629, mailed on Apr. 7, 2022, 8 pages.

Notice of Allowance received for U.S. Appl. No. 16/144,629, mailed on Jul. 25, 2022, 10 pages.

Notice of Allowance received for U.S. Appl. No. 16/191,117, mailed on Oct. 29, 2019, 9 pages.

Notice of Allowance received for U.S. Appl. No. 16/271,583, mailed on Apr. 14, 2021, 6 pages.

Notice of Allowance received for U.S. Appl. No. 16/271,583, mailed on Dec. 9, 2020, 6 pages.

Notice of Allowance received for U.S. Appl. No. 16/271,583, mailed on Jul. 23, 2021, 6 pages.

Notice of Allowance received for U.S. Appl. No. 16/271,583, mailed on May 10, 2021, 3 pages.

Notice of Allowance received for U.S. Appl. No. 16/528,257, mailed on Jan. 14, 2022, 10 pages.

Notice of Allowance received for U.S. Appl. No. 16/582,595, mailed on Mar. 20, 2020, 9 pages.

Notice of Allowance received for U.S. Appl. No. 16/583,020, mailed on Apr. 1, 2020, 5 pages.

Notice of Allowance received for U.S. Appl. No. 16/583,020, mailed on Feb. 28, 2020, 5 pages.

Notice of Allowance received for U.S. Appl. No. 16/584,044, mailed on Dec. 11, 2019, 15 pages.

Notice of Allowance received for U.S. Appl. No. 16/584,044, mailed on Mar. 30, 2020, 16 pages.

Notice of Allowance received for U.S. Appl. No. 16/584,044, mailed on Nov. 14, 2019, 13 pages.

Notice of Allowance received for U.S. Appl. No. 16/584,100, mailed on Apr. 8, 2020, 12 pages.

Notice of Allowance received for U.S. Appl. No. 16/584,100, mailed on Jan. 14, 2020, 13 pages.

Notice of Allowance received for U.S. Appl. No. 16/584,693, mailed on Jan. 15, 2020, 15 pages.

Notice of Allowance received for U.S. Appl. No. 16/584,693, mailed on May 4, 2020, 12 pages.

Notice of Allowance received for U.S. Appl. No. 16/586,314, mailed on Apr. 1, 2020, 8 pages.

Notice of Allowance received for U.S. Appl. No. 16/586,314, mailed on Jan. 9, 2020, 10 pages.

Notice of Allowance received for U.S. Appl. No. 16/586,344, mailed on Dec. 16, 2019, 12 pages.

Notice of Allowance received for U.S. Appl. No. 16/586,344, mailed on Mar. 27, 2020, 12 pages.

Notice of Allowance received for U.S. Appl. No. 16/825,879, mailed on Jul. 13, 2021, 9 pages.

Notice of Allowance received for U.S. Appl. No. 16/825,879, mailed on Sep. 28, 2021, 8 pages.

Notice of Allowance received for U.S. Appl. No. 16/835,651, mailed on Jul. 23, 2021, 8 pages.

Notice of Allowance received for U.S. Appl. No. 16/835,651, mailed on Jun. 1, 2021, 10 pages.

Notice of Allowance received for U.S. Appl. No. 16/835,651, mailed on Nov. 10, 2021, 9 pages.

Notice of Allowance received for U.S. Appl. No. 17/027,317, mailed on Apr. 12, 2021, 7 pages.

Notice of Allowance received for U.S. Appl. No. 17/027,317, mailed on Jan. 13, 2021, 10 pages.

Notice of Allowance received for U.S. Appl. No. 17/027,484, mailed on May 3, 2021, 11 pages.

Notice of Allowance received for U.S. Appl. No. 17/041,412, mailed on Apr. 26, 2023, 11 pages.

Notice of Allowance received for U.S. Appl. No. 17/041,412, mailed on Mar. 15, 2023, 13 pages.

Notice of Allowance received for U.S. Appl. No. 17/190,879, mailed on Nov. 10, 2021, 8 pages.

Notice of Allowance received for U.S. Appl. No. 17/220,596, mailed on Oct. 21, 2021, 43 pages.

Notice of Allowance received for U.S. Appl. No. 17/354,376, mailed on Jan. 27, 2022, 10 pages.

Notice of Allowance received for U.S. Appl. No. 17/354,376, mailed on Mar. 4, 2022, 5 pages.

Notice of Allowance received for U.S. Appl. No. 17/354,376, mailed on Mar. 30, 2022, 5 pages.

Notice of Allowance received for U.S. Appl. No. 17/466,824, mailed on Mar. 13, 2024, 5 pages.

Notice of Allowance received for U.S. Appl. No. 17/466,824, mailed on Nov. 8, 2023, 5 pages.

Notice of Allowance received for U.S. Appl. No. 17/479,897, mailed on Jul. 26, 2023, 7 pages.

Notice of Allowance received for U.S. Appl. No. 17/479,897, mailed on Oct. 3, 2023, 5 pages.

Notice of Allowance received for U.S. Appl. No. 17/510,168, mailed on Feb. 13, 2023, 10 pages.

Notice of Allowance received for U.S. Appl. No. 17/510,168, mailed on May 3, 2023, 10 pages.

Notice of Allowance received for U.S. Appl. No. 17/546,968, mailed on May 31, 2024, 24 pages.

Notice of Allowance received for U.S. Appl. No. 17/566,094, mailed on Feb. 23, 2023, 8 pages.

Notice of Allowance received for U.S. Appl. No. 17/566,094, mailed on Nov. 22, 2022, 10 pages.

Notice of Allowance received for U.S. Appl. No. 17/732,191, mailed on Feb. 27, 2023, 12 pages.

Notice of Allowance received for U.S. Appl. No. 17/732,191, mailed on Nov. 9, 2022, 12 pages.

Notice of Allowance received for U.S. Appl. No. 17/740,032, mailed on Feb. 1, 2023, 9 pages.

Notice of Allowance received for U.S. Appl. No. 17/740,032, mailed on Oct. 13, 2022, 11 pages.

Notice of Allowance received for U.S. Appl. No. 17/846,962, mailed on Aug. 1, 2024, 7 pages.

Notice of Allowance received for U.S. Appl. No. 17/951,016, mailed on Jul. 31, 2024, 7 pages.

Notice of Allowance received for U.S. Appl. No. 17/951,034, mailed on Jun. 26, 2023, 9 pages.

Notice of Allowance received for U.S. Appl. No. 17/951,035, mailed on Jul. 12, 2023, 7 pages.

Notice of Allowance received for U.S. Appl. No. 17/951,035, mailed on Mar. 22, 2023, 9 pages.

Notice of Allowance received for U.S. Appl. No. 18/114,880, mailed on Feb. 15, 2024, 17 pages.

Notice of Allowance received for U.S. Appl. No. 18/114,880, mailed on Nov. 15, 2023, 11 pages.

Notice of Allowance received for U.S. Appl. No. 18/121,458, mailed on Dec. 6, 2023, 9 pages.

Notice of Allowance received for U.S. Appl. No. 18/121,458, mailed on Mar. 12, 2024, 9 pages.

Notice of Allowance received for U.S. Appl. No. 18/196,997, mailed on Jul. 15, 2024, 11 pages.

Notice of Allowance received for U.S. Appl. No. 18/196,997, mailed on Mar. 28, 2024, 11 pages.

Notice of Allowance received for U.S. Appl. No. 18/383,281, mailed on Jun. 17, 2024, 9 pages.

Notice of Allowance received for U.S. Appl. No. 18/628,021, mailed on Jun. 5, 2024, 9 pages.

Notice of Hearing received for Indian Patent Application No. 201818045872, mailed on Nov. 16, 2023, 2 pages.

Notice of Hearing received for Indian Patent Application No. 201818046896, mailed on Jul. 11, 2023, 2 pages.

Notice of Hearing received for Indian Patent Application No. 202118028159, mailed on Nov. 22, 2023, 2 pages.

(56)　　　References Cited

OTHER PUBLICATIONS

Office Action received for Australian Patent Application No. 2017100683, mailed on Sep. 20, 2017, 3 pages.

Office Action received for Australian Patent Application No. 2017100684, mailed on Jan. 24, 2018, 4 pages.

Office Action received for Australian Patent Application No. 2017100684, mailed on Oct. 5, 2017, 4 pages.

Office Action received for Australian Patent Application No. 2017286130, mailed on Jan. 21, 2019, 4 pages.

Office Action received for Australian Patent Application No. 2019213341, mailed on Jun. 30, 2020, 6 pages.

Office Action received for Australian Patent Application No. 2019218241, mailed on Apr. 1, 2021, 3 pages.

Office Action received for Australian Patent Application No. 2019338180, mailed on Feb. 18, 2022, 3 pages.

Office Action received for Australian Patent Application No. 2020100720, mailed on Jul. 9, 2020, 7 pages.

Office Action received for Australian Patent Application No. 2020100720, mailed on Sep. 1, 2020, 5 pages.

Office Action received for Australian Patent Application No. 2020239717, mailed on Dec. 15, 2021, 6 pages.

Office Action received for Australian Patent Application No. 2020239717, mailed on Jun. 23, 2021, 7 pages.

Office Action received for Australian Patent Application No. 2020239717, mailed on Mar. 16, 2022, 4 pages.

Office Action received for Australian Patent Application No. 2020239717, mailed on Sep. 28, 2021, 6 pages.

Office Action received for Australian Patent Application No. 2020260413, mailed on Jun. 24, 2021, 2 pages.

Office Action received for Australian Patent Application No. 2020277216, mailed on Dec. 17, 2020, 5 pages.

Office Action received for Australian Patent Application No. 2021103004, mailed on Aug. 12, 2021, 5 pages.

Office Action received for Australian Patent Application No. 2021107587, mailed on Feb. 1, 2022, 6 pages.

Office Action received for Australian Patent Application No. 2021290292, mailed on Nov. 24, 2022, 2 pages.

Office Action received for Australian Patent Application No. 2022204465, mailed on Mar. 10, 2023, 4 pages.

Office Action received for Australian Patent Application No. 2022221466, mailed on Jun. 16, 2023, 2 pages.

Office Action received for Australian Patent Application No. 2022228121, mailed on Jul. 7, 2023, 3 pages.

Office Action received for Australian Patent Application No. 2022228121, mailed on Sep. 20, 2023, 3 pages.

Office Action received for Australian Patent Application No. 2022228191, mailed on Aug. 16, 2023, 4 pages.

Office Action received for Australian Patent Application No. 2023200607, mailed on Dec. 20, 2023, 3 pages.

Office Action received for Australian Patent Application No. 2023200607, mailed on Feb. 22, 2024, 2 pages.

Office Action received for Brazilian Patent Application No. BR122018076550-0, mailed on Sep. 28, 2022, 7 pages (1 page of English Translation and 6 pages of Official Copy).

Office Action received for Chinese Patent Application No. 201580046237.6, mailed on Feb. 6, 2018, 10 pages (5 pages of English Translation and 5 pages of Official Copy).

Office Action received for Chinese Patent Application No. 201710657424.9, mailed on Sep. 17, 2019, 23 pages (11 pages of English Translation and 12 pages of Official Copy).

Office Action received for Chinese Patent Application No. 201780002533.5, mailed on Apr. 25, 2019, 17 pages (7 pages of English Translation and 10 pages of Official Copy).

Office Action received for Chinese Patent Application No. 201780002533.5, mailed on Feb. 3, 2020, 6 pages (3 pages of English Translation and 3 pages of Official Copy).

Office Action received for Chinese Patent Application No. 201780002533.5, mailed on Sep. 26, 2019, 21 pages (9 pages of English Translation and 12 pages of Official Copy).

Office Action received for Chinese Patent Application No. 201810566134.8, mailed on Aug. 13, 2019, 14 pages (8 pages of English Translation and 6 pages of Official Copy).

Office Action received for Chinese Patent Application No. 201810664927.3, mailed on Mar. 28, 2019, 11 pages (5 pages of English Translation and 6 pages of Official Copy).

Office Action received for Chinese Patent Application No. 201811446867.4, mailed on Dec. 31, 2019, 12 pages (5 pages of English Translation and 7 pages of Official Copy).

Office Action received for Chinese Patent Application No. 201811446867.4, mailed on May 6, 2020, 10 pages (5 pages of English Translation and 5 pages of Official Copy).

Office Action received for Chinese Patent Application No. 201811446867.4, mailed on Sep. 8, 2020, 9 pages (4 pages of English Translation and 5 pages of Official Copy).

Office Action received for Chinese Patent Application No. 201811512767.7, mailed on Dec. 20, 2019, 14 pages (7 pages of English Translation and 7 pages of Official Copy).

Office Action received for Chinese Patent Application No. 201811512767.7, mailed on Jun. 4, 2020, 6 pages (3 pages of English Translation and 3 pages of Official Copy).

Office Action received for Chinese Patent Application No. 201980012481.9, mailed on Jan. 12, 2023, 18 pages (9 pages of English Translation and 9 pages of Official Copy).

Office Action received for Chinese Patent Application No. 201980012481.9, mailed on Jun. 8, 2023, 16 pages (9 pages of English Translation and 7 pages of Official Copy).

Office Action received for Chinese Patent Application No. 201980012481.9, mailed on Nov. 21, 2023, 18 pages (10 pages of English Translation and 8 pages of Official Copy).

Office Action received for Chinese Patent Application No. 202010235395.9, mailed on Mar. 16, 2024, 18 pages (9 pages of English Translation and 9 pages of Official Copy).

Office Action received for Chinese Patent Application No. 202010287950.2, mailed on Aug. 10, 2021, 12 pages (6 pages of English Translation and 6 pages of Official Copy).

Office Action received for Chinese Patent Application No. 202010287950.2, mailed on Feb. 20, 2021, 22 pages (10 pages of English Translation and 12 pages of Official Copy).

Office Action received for Chinese Patent Application No. 202010287950.2, mailed on Nov. 19, 2021, 8 pages (5 pages of English Translation and 3 pages of Official Copy).

Office Action received for Chinese Patent Application No. 202010287953.6, mailed on Jan. 14, 2021, 14 pages (7 pages of English Translation and 7 pages of Official Copy).

Office Action received for Chinese Patent Application No. 202010287958.9, mailed on Jan. 5, 2021, 16 pages (8 pages of English Translation and 8 pages of Official Copy).

Office Action received for Chinese Patent Application No. 202010287961.0, mailed on Dec. 30, 2020, 16 pages (8 pages of English Translation and 8 pages of Official Copy).

Office Action received for Chinese Patent Application No. 202010287975.2, mailed on Dec. 30, 2020, 17 pages (9 pages of English Translation and 8 pages of Official Copy).

Office Action received for Chinese Patent Application No. 202010600151.6, mailed on Apr. 29, 2021, 11 pages (5 pages of English Translation and 6 pages of Official Copy).

Office Action received for Chinese Patent Application No. 202010600197.8, mailed on Jul. 2, 2021, 14 pages (6 pages of English Translation and 8 pages of Official Copy).

Office Action received for Chinese Patent Application No. 202010601484.0, mailed on Jun. 3, 2021, 13 pages (6 pages of English Translation and 7 pages of Official Copy).

Office Action received for Chinese Patent Application No. 202011480411.7, mailed on Aug. 2, 2021, 12 pages (6 pages of English Translation and 6 pages of Official Copy).

Office Action received for Chinese Patent Application No. 202011480411.7, mailed on Jan. 12, 2022, 7 pages (4 pages of English Translation and 3 pages of Official Copy).

Office Action received for Chinese Patent Application No. 202110766668.7, mailed on Feb. 16, 2022, 12 pages (6 pages of English Translation and 6 pages of Official Copy).

(56)　　　References Cited

OTHER PUBLICATIONS

Office Action received for Chinese Patent Application No. 202110766668.7, mailed on Jan. 20, 2023, 11 pages (6 pages of English Translation and 5 pages of Official Copy).

Office Action received for Chinese Patent Application No. 202110766668.7, mailed on Jun. 7, 2023, 13 pages (9 pages of English Translation and 4 pages of Official Copy).

Office Action received for Chinese Patent Application No. 202110766668.7, mailed on Sep. 15, 2022, 18 pages (9 pages of English Translation and 9 pages of Official Copy).

Office Action received for Chinese Patent Application No. 202180002106.3, mailed on Feb. 16, 2022, 12 pages (6 pages of English Translation and 6 pages of Official Copy).

Office Action received for Chinese Patent Application No. 202210849242.2, mailed on Jan. 20, 2023, 12 pages (6 pages of English Translation and 6 pages of Official Copy).

Office Action received for Chinese Patent Application No. 202210849316.2, mailed on Jan. 18, 2024, 12 pages (6 pages of English Translation and 6 pages of Official Copy).

Office Action received for Danish Patent Application No. PA201570788, mailed on Apr. 8, 2016, 11 pages.

Office Action received for Danish Patent Application No. PA201570788, mailed on Sep. 13, 2016, 3 pages.

Office action received for Danish Patent Application No. PA201570791, mailed on Apr. 6, 2016, 12 pages.

Office action received for Danish Patent Application No. PA201570791, mailed on Sep. 6, 2016, 4 pages.

Office Action received for Danish Patent Application No. PA201670627, mailed on Apr. 5, 2017, 3 pages.

Office Action received for Danish Patent Application No. PA201670627, mailed on Nov. 6, 2017, 2 pages.

Office Action received for Danish Patent Application No. PA201670627, mailed on Oct. 11, 2016, 8 pages.

Office Action received for Danish Patent Application No. PA201670753, mailed on Dec. 20, 2016, 7 pages.

Office Action received for Danish Patent Application No. PA201670753, mailed on Jul. 5, 2017, 4 pages.

Office Action received for Danish Patent Application No. PA201670753, mailed on Mar. 23, 2018, 5 pages.

Office Action received for Danish Patent Application No. PA201670755, mailed on Apr. 6, 2017, 5 pages.

Office Action received for Danish Patent Application No. PA201670755, mailed on Apr. 20, 2018, 2 pages.

Office Action received for Danish Patent Application No. PA201670755, mailed on Dec. 22, 2016, 6 pages.

Office Action received for Danish Patent Application No. PA201670755, mailed on Oct. 20, 2017, 4 pages.

Office Action received for Danish Patent Application No. PA201870623, mailed on Jan. 30, 2020, 2 pages.

Office Action received for Danish Patent Application No. PA201870623, mailed on Jul. 12, 2019, 4 pages.

Office Action received for Danish Patent Application No. PA201970592, mailed on Mar. 2, 2020, 5 pages.

Office Action received for Danish Patent Application No. PA201970592, mailed on Oct. 26, 2020, 5 pages.

Office Action received for Danish Patent Application No. PA201970593, mailed on Apr. 16, 2020, 2 pages.

Office Action received for Danish Patent Application No. PA201970593, mailed on Feb. 2, 2021, 2 pages.

Office Action received for Danish Patent Application No. PA201970593, mailed on Mar. 10, 2020, 4 pages.

Office Action received for Danish Patent Application No. PA201970595, mailed on Mar. 10, 2020, 4 pages.

Office Action received for Danish Patent Application No. PA201970600, mailed on Mar. 9, 2020, 5 pages.

Office Action received for Danish Patent Application No. PA201970601, mailed on Aug. 13, 2020, 3 pages.

Office Action received for Danish Patent Application No. PA201970601, mailed on Jan. 31, 2020, 3 pages.

Office Action received for Danish Patent Application No. PA201970601, mailed on Nov. 11, 2019, 8 pages.

Office Action received for Danish Patent Application No. PA201970603, mailed on Nov. 4, 2020, 3 pages.

Office Action received for Danish Patent Application No. PA201970605, mailed on Mar. 10, 2020, 5 pages.

Office Action received for Danish Patent Application No. PA202070611, mailed on Dec. 22, 2020, 7 pages.

Office Action received for European Patent Application No. 17809168.2, mailed on Jan. 7, 2020, 5 pages.

Office Action received for European Patent Application No. 17809168.2, mailed on Oct. 8, 2020, 4 pages.

Office Action received for European Patent Application No. 15712218.5, mailed on Aug. 3, 2017, 4 pages.

Office Action received for European Patent Application No. 17184710.6, mailed on Dec. 21, 2018, 7 pages.

Office Action received for European Patent Application No. 18176890.4, mailed on Oct. 16, 2018, 8 pages.

Office Action received for European Patent Application No. 18183054.8, mailed on Feb. 24, 2020, 6 pages.

Office Action received for European Patent Application No. 18183054.8, mailed on Nov. 16, 2018, 8 pages.

Office Action received for European Patent Application No. 18209460.7, mailed on Apr. 10, 2019, 7 pages.

Office Action received for European Patent Application No. 18209460.7, mailed on Apr. 21, 2020, 5 pages.

Office Action received for European Patent Application No. 18214698.5, mailed on Apr. 2, 2019, 8 pages.

Office Action received for European Patent Application No. 19707557.5, mailed on Jun. 3, 2022, 5 pages.

Office Action received for European Patent Application No. 19769316.1, mailed on Jan. 12, 2023, 10 pages.

Office Action received for European Patent Application No. 20168009.7, mailed on Apr. 20, 2021, 6 pages.

Office Action received for European Patent Application No. 20168009.7, mailed on Sep. 13, 2021, 8 pages.

Office Action received for European Patent Application No. 20206196.6, mailed on Aug. 10, 2022, 13 pages.

Office Action received for European Patent Application No. 20206196.6, mailed on Jan. 13, 2021, 10 pages.

Office Action received for European Patent Application No. 20206197.4, mailed on Aug. 27, 2021, 6 pages.

Office Action received for European Patent Application No. 20206197.4, mailed on Jan. 12, 2021, 9 pages.

Office Action received for European Patent Application No. 20206197.4, mailed on Mar. 18, 2022, 7 pages.

Office Action received for European Patent Application No. 20210373.5, mailed on Dec. 9, 2021, 7 pages.

Office Action received for European Patent Application No. 20210373.5, mailed on May 10, 2021, 9 pages.

Office Action received for European Patent Application No. 20210373.5, mailed on May 31, 2022, 5 pages.

Office Action received for European Patent Application No. 20728854.9, mailed on Apr. 8, 2024, 7 pages.

Office Action received for European Patent Application No. 20728854.9, mailed on May 7, 2024, 10 pages.

Office Action received for European Patent Application No. 21157252.4, mailed on Apr. 23, 2021, 8 pages.

Office Action received for European Patent Application No. 21157252.4, mailed on Jul. 24, 2023, 5 pages.

Office Action received for European Patent Application No. 21163791.3, mailed on Jun. 2, 2021, 8 pages.

Office Action received for European Patent Application No. 21163791.3, mailed on Sep. 20, 2022, 6 pages.

Office Action received for Indian Patent Application No. 201817024430, mailed on Sep. 27, 2021, 8 pages.

Office Action received for Indian Patent Application No. 201818025015, mailed on Feb. 4, 2022, 7 pages.

Office Action received for Indian Patent Application No. 201818045872, mailed on Oct. 13, 2021, 7 pages.

Office Action received for Indian Patent Application No. 201818046896, mailed on Feb. 2, 2022, 7 pages.

(56) References Cited

OTHER PUBLICATIONS

Office Action received for Indian Patent Application No. 202014041530, mailed on Dec. 8, 2021, 7 pages.

Office Action received for Indian Patent Application No. 202117009020, mailed on Feb. 6, 2023, 7 pages.

Office Action received for Indian Patent Application No. 202117017871, mailed on Apr. 4, 2024, 8 pages.

Office Action received for Indian Patent Application No. 202118021941, mailed on Mar. 23, 2022, 5 pages.

Office Action received for Indian Patent Application No. 202118028158, mailed on Apr. 22, 2024, 7 pages.

Office Action received for Indian Patent Application No. 202118028159, mailed on Jun. 27, 2022, 6 pages.

Office Action received for Indian Patent Application No. 202215010325, mailed on Oct. 10, 2022, 7 pages.

Office Action received for Japanese Patent Application No. 2018-225131, mailed on Aug. 17, 2020, 21 pages (6 pages of English Translation and 15 pages of Official Copy).

Office Action received for Japanese Patent Application No. 2018-225131, mailed on Mar. 4, 2019, 10 pages (6 pages of English Translation and 4 pages of Official Copy).

Office Action received for Japanese Patent Application No. 2018-545502, mailed on Aug. 17, 2020, 14 pages (6 pages of English Translation and 8 pages of Official Copy).

Office Action received for Japanese Patent Application No. 2019-203399, mailed on Aug. 10, 2021, 4 pages (2 pages of English Translation and 2 pages of Official Copy).

Office Action received for Japanese Patent Application No. 2020-070418, mailed on Aug. 3, 2020, 22 pages (14 pages of English Translation and 8 pages of Official Copy).

Office Action received for Japanese Patent Application No. 2020-159338, mailed on Dec. 8, 2021, 9 pages (5 pages of English Translation and 4 pages of Official Copy).

Office Action received for Japanese Patent Application No. 2020-184470, mailed on May 10, 2021, 3 pages (1 page of English Translation and 2 pages of Official Copy).

Office Action received for Japanese Patent Application No. 2020-184471, mailed on May 10, 2021, 3 pages (1 page of English Translation and 2 pages of Official Copy).

Office Action received for Japanese Patent Application No. 2020-542592, mailed on Aug. 1, 2022, 5 pages (2 pages of English Translation and 3 pages of Official Copy).

Office Action received for Japanese Patent Application No. 2020-542592, mailed on Sep. 21, 2021, 5 pages (3 pages of English Translation and 2 pages of Official Copy).

Office Action received for Japanese Patent Application No. 2021-187533, mailed on Feb. 6, 2023, 7 pages (4 pages of English Translation and 3 pages of Official Copy).

Office Action received for Japanese Patent Application No. 2021-187533, mailed on Jun. 26, 2023, 6 pages (3 pages of English Translation and 3 pages of Official Copy).

Office Action received for Japanese Patent Application No. 2021-565919, mailed on Jun. 13, 2022, 4 pages (2 pages of English Translation and 2 pages of Official Copy).

Office Action received for Japanese Patent Application No. 2022-095182, mailed on Sep. 25, 2023, 10 pages (5 pages of English Translation and 5 pages of Official Copy).

Office Action received for Japanese Patent Application No. 2022-130725, mailed on Sep. 4, 2023, 2 pages (1 page of English Translation and 1 page of Official Copy).

Office Action received for Japanese Patent Application No. 2022-145387, mailed on Oct. 2, 2023, 7 pages (3 pages of English Translation and 4 pages of Official Copy).

Office Action received for Japanese Patent Application No. 2022-152017, mailed on Dec. 18, 2023, 8 pages (4 pages of English Translation and 4 pages of Official Copy).

Office Action received for Japanese Patent Application No. 2022-152018, mailed on Dec. 22, 2023, 7 pages (4 pages of English Translation and 3 pages of Official Copy).

Office Action received for Japanese Patent Application No. 2022-152018, mailed on Jun. 3, 2024, 8 pages (4 pages of English Translation and 4 pages of Official Copy).

Office Action received for Japanese Patent Application No. 2022-199433, mailed on Jan. 29, 2024, 6 pages (3 pages of English Translation and 3 pages of Official Copy).

Office Action received for Japanese Patent Application No. 2022-199433, mailed on Jul. 2, 2024, 6 pages (3 pages of English Translation and 3 pages of Official Copy).

Office Action received for Korean Patent Application No. 10-2018-7026743, mailed on Jan. 17, 2019, 5 pages (2 pages of English Translation and 3 pages of Official Copy).

Office Action received for Korean Patent Application No. 10-2018-7034780, mailed on Apr. 4, 2019, 11 pages (5 pages of English Translation and 6 pages of Official Copy).

Office Action received for Korean Patent Application No. 10-2018-7036893, mailed on Apr. 9, 2019, 6 pages (2 pages of English Translation and 4 pages of Official Copy).

Office Action received for Korean Patent Application No. 10-2019-7027042, mailed on May 13, 2020, 6 pages (2 pages of English Translation and 4 pages of Official Copy).

Office Action received for Korean Patent Application No. 10-2020-0052618, mailed on Aug. 18, 2020, 11 pages (5 pages of English Translation and 6 pages of Official Copy).

Office Action received for Korean Patent Application No. 10-2020-0124139, mailed on Jan. 17, 2023, 10 pages (5 pages of English Translation and 5 pages of Official Copy).

Office Action received for Korean Patent Application No. 10-2020-7022663, mailed on Aug. 17, 2021, 11 pages (5 pages of English Translation and 6 pages of Official Copy).

Office Action received for Korean Patent Application No. 10-2021-0022053, mailed on Mar. 1, 2021, 11 pages (5 pages of English Translation and 6 pages of Official Copy).

Office Action received for Korean Patent Application No. 10-2021-7000954, mailed on Jan. 28, 2021, 5 pages (2 pages of English Translation and 3 pages of Official Copy).

Office Action received for Korean Patent Application No. 10-2021-7006145, mailed on Oct. 12, 2022, 14 pages (6 pages of English Translation and 8 pages of Official Copy).

Office Action received for Korean Patent Application No. 10-2021-7036337, mailed on Dec. 8, 2021, 6 pages (2 pages of English Translation and 4 pages of Official Copy).

Office Action received for Korean Patent Application No. 10-2022-7010505, mailed on Jun. 14, 2022, 5 pages (2 pages of English Translation and 3 pages of Official Copy).

Office Action received for Korean Patent Application No. 10-2022-7023077, mailed on Jul. 25, 2022, 6 pages (2 pages of English Translation and 4 pages of Official Copy).

Office Action received for Korean Patent Application No. 10-2022-7033119, mailed on Mar. 29, 2023, 5 pages (2 pages of English Translation and 3 pages of Official Copy).

Office Action received for Korean Patent Application No. 10-2023-7002360, mailed on Jun. 5, 2024, 6 pages (2 pages of English Translation and 4 pages of Official Copy).

Office Action received for Korean Patent Application No. 10-2023-7016569, mailed on Jan. 22, 2024, 10 pages (4 pages of English Translation and 6 pages of Official Copy).

Office Action received for Taiwanese Patent Application No. 104107328, mailed on Dec. 28, 2016, 4 pages (1 page of Search Report and 3 pages of Official Copy).

OSXDaily, "How to Zoom the Camera on iPhone", Available Online at: https://osxdaily.com/2012/04/18/zoom-camera-iphone/, Apr. 18, 2012, 6 pages.

PlayMemories Camera Apps, "PlayMemories Camera Apps Help Guide", available at <https://www.playmemoriescameraapps.com/portal/manual/IS9104-NPIA09014_00-F00002/en/index.html>, 2012, 3 pages.

PreAppeal Review Report received for Japanese Patent Application No. 2018-225131, mailed on Jan. 24, 2020, 8 pages (4 pages of English Translation and 4 pages of Official Copy).

PreAppeal Review Report received for Japanese Patent Application No. 2018-545502, mailed on Jan. 24, 2020, 8 pages (3 pages of English Translation and 5 pages of Official Copy).

(56) References Cited

OTHER PUBLICATIONS

"Procamera Capture the Moment", Online Available at: http://www.procamera-app.com/procamera_manual/ProCamera_Manual_EN.pdf, Apr. 21, 2016, 63 pages.

Record of Oral Hearing received for U.S. Appl. No. 16/144,629, mailed on Jan. 28, 2022, 13 pages.

"Remote Shot for SmartWatch 2", Available online at: https://play.google.com/store/apps/details?id=net.watea.sw2.rshot&hl=en, Nov. 21, 2017, 3 pages.

Result of Consultation received for European Patent Application No. 17184710.6, mailed on Feb. 21, 2020, 6 pages.

Result of Consultation received for European Patent Application No. 17184710.6, mailed on Feb. 28, 2020, 3 pages.

Result of Consultation received for European Patent Application No. 20206196.6, mailed on Mar. 27, 2024, 4 pages.

Schiffhauer Alexander, "See the Light with Night Sight", Available online at: https://www.blog.google/products/pixel/see-light-night-sight, Nov. 14, 2018, 6 pages.

Search Report and Opinion received for Danish Patent Application No. PA201870623, mailed on Dec. 20, 2018, 8 pages.

Search Report and Opinion received for Danish Patent Application No. PA201970592, mailed on Nov. 7, 2019, 8 pages.

Search Report and Opinion received for Danish Patent Application No. PA201970593, mailed on Oct. 29, 2019, 10 pages.

Search Report and Opinion received for Danish Patent Application No. PA201970595, mailed on Nov. 8, 2019, 16 pages.

Search Report and Opinion received for Danish Patent Application No. PA201970600, mailed on Nov. 5, 2019, 11 pages.

Search Report and Opinion received for Danish Patent Application No. PA201970603, mailed on Nov. 15, 2019, 9 pages.

Search Report and Opinion received for Danish Patent Application No. PA201970605, mailed on Nov. 12, 2019, 10 pages.

ShareIt, "WhatsApp Easy Way to Record Long Voice Messages—New Update", Retrieved from Internet: <https://www.youtube.com/watch?v=3MVnYGt8v1l>, Apr. 7, 2018, 39 pages.

Shaw et al., ""Skills for Closeups Photgraph"", Watson-Guptill Publication, Nov. 1999, 5 pages (Official Copy Only).

shiftdelete.net, "Oppo Reno 10x Zoom Ön Inceleme—Huawei P30 Pro'ya rakip mi geliyor?", Available online at <https://www.youtube.com/watch?v=ev2wlUztdrg>, See especially 5:34-6:05., Apr. 24, 2019, 2 pages.

Siemens, "Gigaset SL78H", Online Available at: https://www.manualslib.com/manual/1636505/Siemens-Gigaset-Sl78h.html?page=3#manual, Sep. 16, 2005, 57 pages.

Sigdel Prakash, "How to record WhatsApp voice message without continue holding down button", Available Online at: https://www.youtube.com/watch?v=m3Hz6TXt0PA, Dec. 6, 2017, 9 pages.

Smart Reviews,"Honor10 AI Camera's In Depth Review", See Especially 2:37-2:48; 6:39-6:49, Available Online at <https://www.youtube.com/watch?v=oKFqRvxeDBQ>, May 31, 2018, 2 pages.

"Sony Xperia XZ3 Camera Review—The Colors, Duke, The Colors!", Android Headlines—Android News & Tech News, Available online at <https://www.youtube.com/watch?v=mwpYXzWVOgw>, See especially 1:02-1:27, 2:28-2:30, Nov. 3, 2018, 3 pages.

Sony, "User Guide, Xperia XZ3, H8416/H9436/H9493", Sony Mobile Communications Inc., Retrieved from <https://www.support-downloads.sonymobile.com/h8416/userguide_EN_H8416-H9436-H9493_2_Android9.0.pdf>, See pp. 86-102., 2018, 121 pages.

Summons to Attend Oral Proceedings received for European Patent Application No. 17184710.6, mailed on Sep. 17, 2019, 7 pages.

Summons to Attend Oral Proceedings received for European Patent Application No. 19707557.5, mailed on Jan. 26, 2024, 6 pages.

Summons to Attend Oral Proceedings received for European Patent Application No. 21163791.3, mailed on May 3, 2023, 6 pages.

Summons to Oral Proceedings received for European Patent Application No. 17184710.6, mailed on May 10, 2023, 3 pages.

Supplemental Notice of Allowance received for U.S. Appl. No. 17/546,968, mailed on Jun. 14, 2024, 2 pages.

Supplemental Notice of Allowance received for U.S. Appl. No. 17/951,034, mailed on Sep. 25, 2023, 3 pages.

Supplemental Notice of Allowance received for U.S. Appl. No. 18/383,281, mailed on Jul. 1, 2024, 2 pages.

Supplementary European Search Report received for European Patent Application No. 18176890.4, mailed on Sep. 20, 2018, 4 pages.

Supplementary European Search Report received for European Patent Application No. 18183054.8, mailed on Oct. 11, 2018, 4 pages.

Symmoto, "Android Key Programmer/Remapping for Zebra Devices", Retrieved from: https://www.youtube.com/watch?v=7nyS4UP9u4o, Jan. 26, 2021, 2 pages.

Tech Stuff, "Telegram 4.0: Video Messages + Telescope, Payments and more . . . ", Available Online at: https://www.youtube.com/watch?v=y0alJRPH7nQ, May 20, 2017, 6 pages.

Techsmith, "Snagit® 11 Snagit 11.4 Help", Online available at <http://assets.techsmith.com/Downloads/ua-tutorials-snagit-11/Snagit_11.pdf>, Jan. 2014, 146 pages.

Telleen et al., "Synthetic Shutter Speed Imaging", University of California, Santa Cruz, vol. 26, No. 3, 2007, 8 pages.

The Nitpicker, "Sony Xperia XZ3 | In-depth Preview". Avalaible online at <https://www.youtube.com/watch?v=TGCKxBuiO5c>, See especially 12:40-17:25, Oct. 7, 2018, 3 pages.

Tico et al., "Robust method of digital image stabilization", Nokia Research Center, ISCCSP, Malta, Mar. 12-14, 2008, pp. 316-321.

Travel Tech Sports Channel, "New Whatsapp update—voice message recording made easy—Want to record long voice messages", Available Online at: https://www.youtube.com/watch?v=SEviqgsAdUk, Nov. 30, 2017, 13 pages.

Vivo India, "Bokeh Mode | Vivo V9", Available Online at <https://www.youtube.com/watch?v=B5AIHhH5Rxs>, Mar. 25, 2018, 3 pages.

Whitacre Michele, "Photograpy 101 | Exposure Meter", Online available at: https://web.archive.org/web/20160223055834/http://www.michelewhitacrephotographyblog.com, Feb. 23, 2016, 4 pages.

Wikipedia, "IPad (9th generation): Difference between revisions", Online Available at: <https://en.wikipedia.org/w/index.php?title=IPad_(9th_generation)&diff=prev&oldid=1080211852> Retrieved from the Internet: URL: https://en.wikipedia.org/wiki/IPad_(9th_generation), Mar. 30, 2022, pp. 1-4.

Wong Richard, "Huawei Smartphone (P20/P10/P9, Mate 10/9) Wide Aperture Mode Demo", Available Online at <https://www.youtube.com/watch?v=eLY3LsZGDPA>, May 7, 2017, 2 pages.

Wu et al., "Security Threats to Mobile Multimedia Applications: Camera-Based Attacks on Mobile Phones", IEEE Communications Magazine, Available online at: http://www.ieeeprojectmadurai.in/BASE/ANDROID/Security%20Threats%20to%20Mobile.pdf, Mar. 2014, pp. 80-87.

Xeetechcare, "Samsung Galaxy S10—Super Night Mode & Ultra-Fast Charging!", Online Available at: https://www.youtube.com/watch?v=3bguV4FX6aA, Mar. 28, 2019, 4 pages.

Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.

Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.

Yuan Ye, "Iphone 4s Original Secrets", China Railway Press, 2012, 15 pages (Official Copy Only) {See Communication under Rule 37 CFR § 1.98(a) (3)}.

Zebra, "Key Mapping Manager", Available Online at: https://web.archive.org/web/20211206014611/https://techdocs.zebra.com/mx/keymappingmgr/, Dec. 6, 2021, 51 pages.

Corrected Notice of Allowance received for U.S. Appl. No. 18/423,234, mailed on Dec. 18, 2025, 3 pages.

Notice of Allowance received for Japanese Patent Application No. 2025-018293, mailed on Dec. 22, 2025, 3 pages (1 page of English Translation and 2 pages of Official Copy).

Notice of Allowance received for U.S. Appl. No. 18/928,895, mailed on Dec. 23, 2025, 8 pages.

(56) References Cited

OTHER PUBLICATIONS

Notice of Hearing received for Indian Patent Application No. 202318031344, mailed on Dec. 12, 2025, 4 pages.

Office Action received for Chinese Patent Application No. 202411853119.3, mailed on Nov. 20, 2025, 15 pages (9 pages of English Translation and 6 pages of Official Copy).

Office Action received for Indian Patent Application No. 202417043055, mailed on Dec. 17, 2025, 8 pages.

Applicant-Initiated Interview Summary received for U.S. Appl. No. 18/892,230, mailed on Feb. 4, 2026, 3 pages.

Non-Final Office Action received for U.S. Appl. No. 18/896,881, mailed on Dec. 31, 2025, 15 pages.

Notice of Allowance received for U.S. Appl. No. 18/892,251, mailed on Mar. 10, 2026, 8 pages.

International Preliminary Report on Patentability received for PCT Patent Application No. PCT/US2024/044796, mailed on Apr. 9, 2026, 11 pages.

Applicant-Initiated Interview Summary received for U.S. Appl. No. 18/896,881, mailed on Mar. 19, 2026, 3 pages.

Corrected Notice of Allowance received for U.S. Appl. No. 18/892,251, mailed on Mar. 20, 2026, 2 pages.

* cited by examiner

Portable Multifunction Device 100

Speaker 111

Optical Sensor 164

Proximity Sensor 166

200

210 is SIM card slot
212 is headphone jack

202

Touch Screen 112

Contact Intensity Sensor(s) 165

Tactile Output Generator(s) 167

203

Microphone 113

Home 204

Accelerometer(s) 168

External Port 124

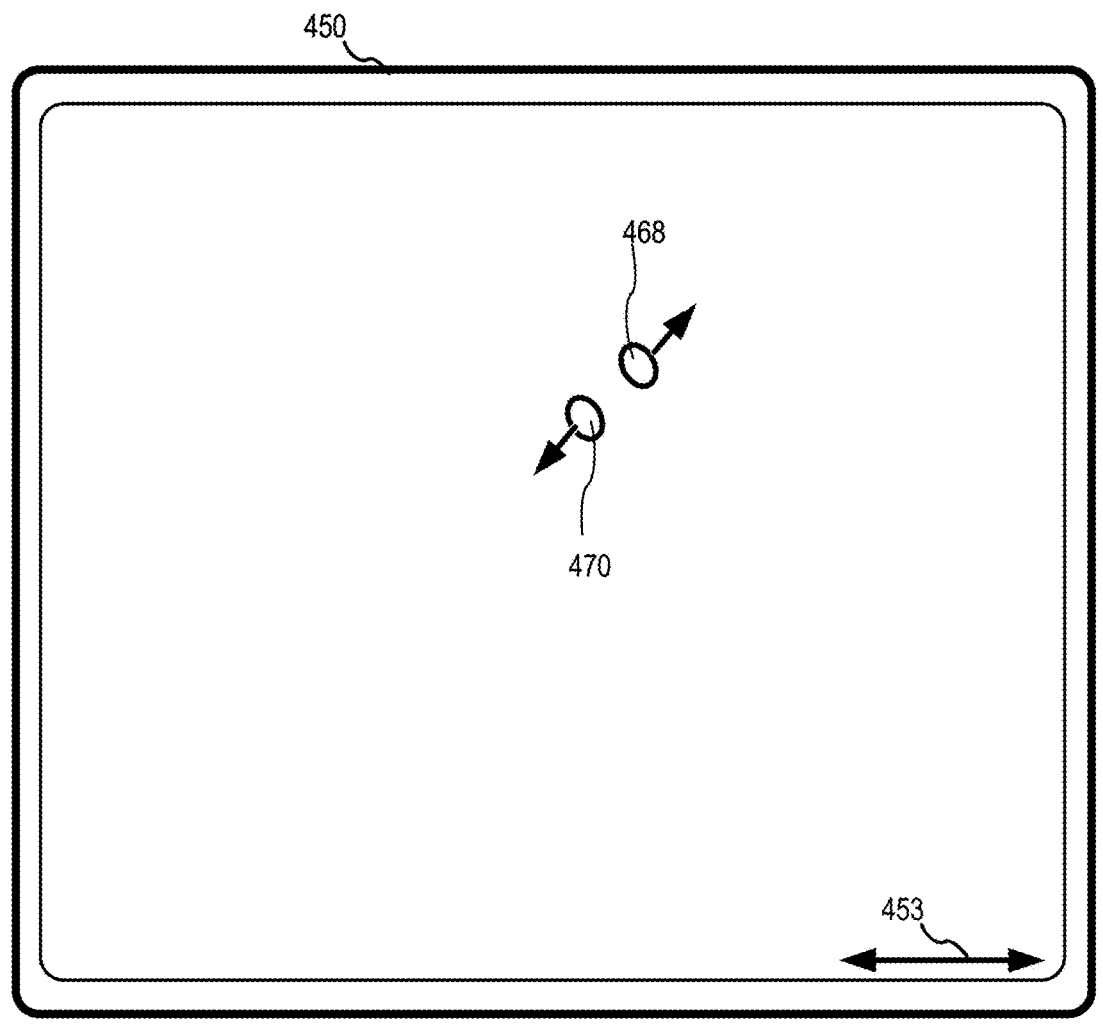
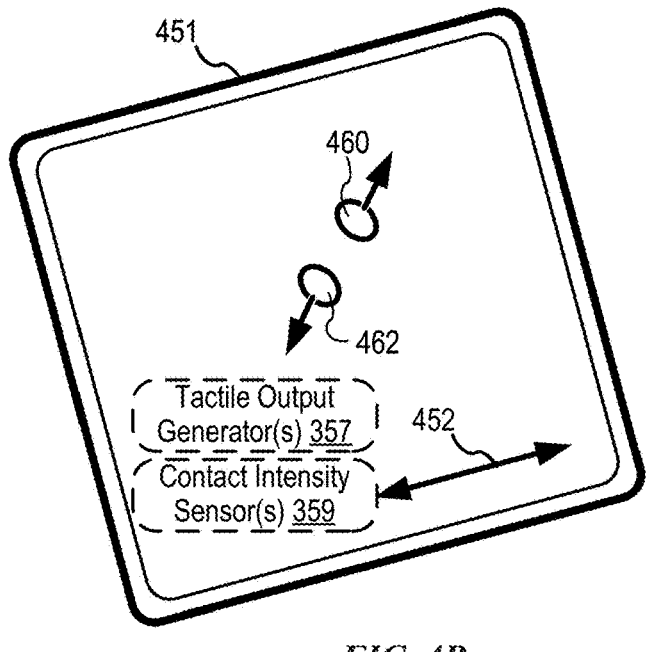
*FIG. 4B*

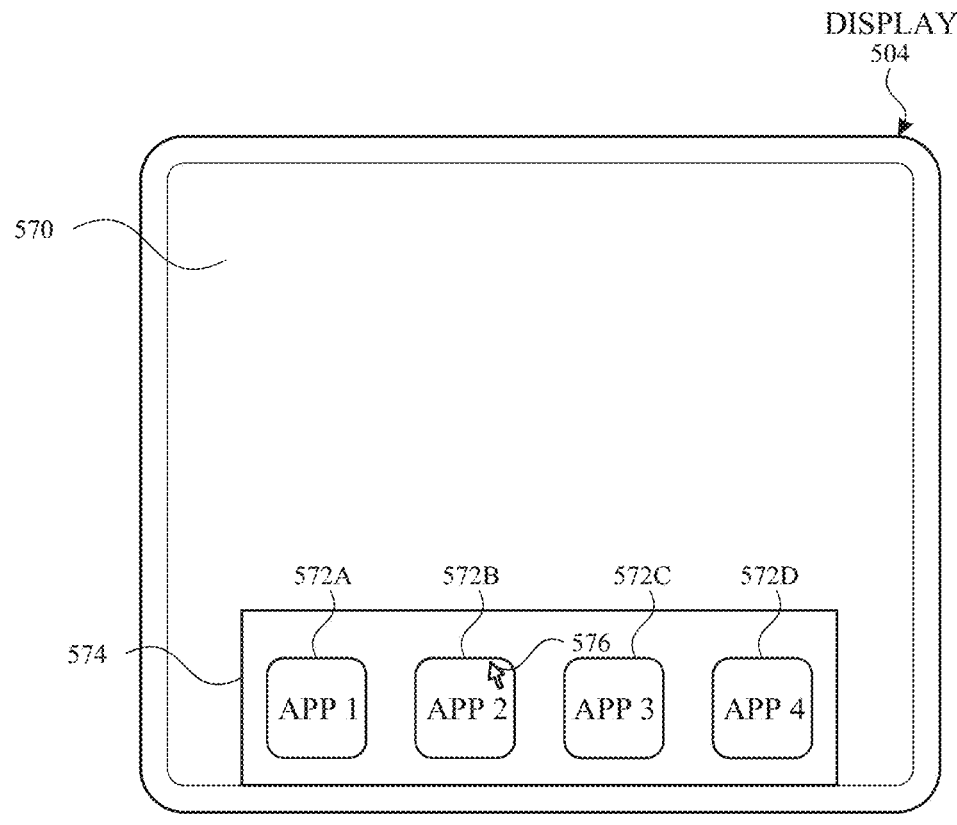
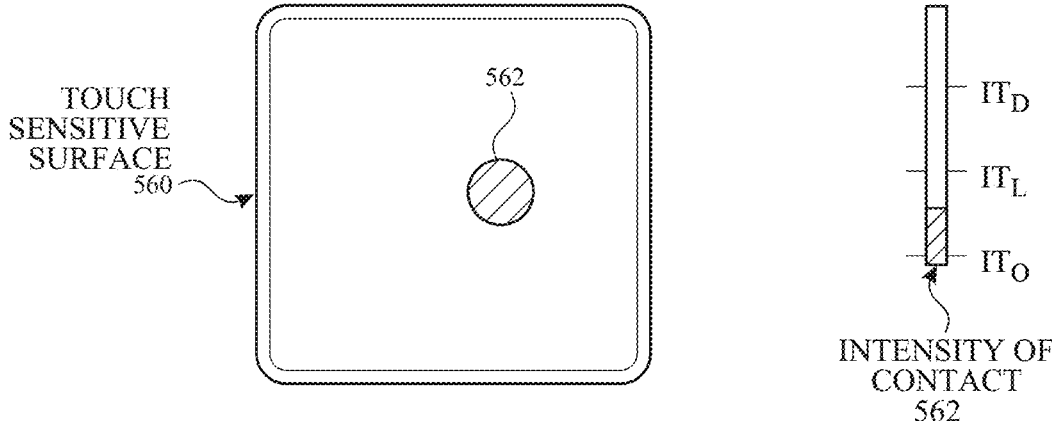
*FIG. 5E*

700

<u>702</u>
While displaying, via the display generation component, a camera user interface, detect a first button press <u>704</u>
In response to detecting the first button press:

<u>706</u>
In accordance with a determination that the first button press satisfies a first set of criteria, capture first media with the one or more cameras, wherein the first set of criteria includes a first criterion that is satisfied when the first button press is detected at the first hardware button and the first media is designated to be displayed with a synthetic depth-of-field effect <u>708</u>
In accordance with a determination that the first button press satisfies a second set of criteria different from the first set of criteria, capture second media with the one or more cameras, wherein the second set of criteria includes a second criterion that is satisfied when the first button press is detected at the second hardware button and the second media is not designated to be displayed with the synthetic depth-of-field effect

---

802

While displaying, via the display generation component, a camera user interface with a first set of one or more user interface objects that are selectable via the touch-sensitive surface to control a first set of functions, detect a first press of the hardware button

---

804

In response to detecting the first press of the hardware button:

---

806

In accordance with a determination that the first press satisfies a first set of criteria, display the camera user interface with a second set of one or more user interface objects, different from the first set of one or more user interface objects, that are selectable via the touch-sensitive surface to control a second set of functions different from the first set of functions, wherein the first set of criteria includes a first criterion that is satisfied when the first press does not exceed a first press threshold

---

808

In accordance with a determination that the first press satisfies a second set of criteria, perform a media capture operation with the one or more cameras, wherein the second set of criteria includes a second criterion that is satisfied when the first press exceeds the first press threshold

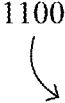

| 1102 |
| :---: |
| Detect a first press of the hardware button |

| 1104 |
| :---: |
| In accordance with a determination that the first press of the hardware button satisfies a first set of criteria, wherein the first set of criteria includes a first subset of criteria that is satisfied when the first press is a press of a first type, display a menu of one or more settings that can be associated with the hardware button |

| 1106 |
| :---: |
| In accordance with a determination that the first press of the hardware button satisfies a second set of criteria different from the first set of criteria, wherein the second set of criteria includes a second subset of criteria that is satisfied when the first press is a press of a second type different from the first type, change a value of a first setting of the one or more settings to a first value |

1302
While displaying a camera application, detect a press input at a location corresponding to a first hardware button

1304
In response to detecting the press input:

1306
In accordance with a determination that press input at the location corresponding to the first hardware button is a press input of a first type, perform a synthetic depth-of-field operation in the camera application

1308
In accordance with a determination that the press input at the location corresponding to the first hardware button is a press input of a second type different from the first type, perform a first media capture operation, wherein the press input at the location corresponding to the first hardware button of the second type applies more pressure to the location corresponding to the first hardware button than an amount of pressure that is applied to the location corresponding to the first hardware button by the press input of the first type

*FIG. 13*

USER INTERFACES INTEGRATING HARDWARE BUTTONS

CROSS-REFERENCE TO RELATED APPLICATIONS

This application claims priority to U.S. Provisional Patent Application Ser. No. 63/541,755, entitled "USER INTERFACES INTEGRATING HARDWARE BUTTONS," filed on Sep. 29, 2023. The contents of this application are hereby incorporated by reference in their entirety.

FIELD

The present disclosure relates generally to computer user interfaces, and more specifically to techniques for providing user interfaces that integrate one or more hardware buttons.

BACKGROUND

Electronic devices, such as smart phones, tablets, and wearable devices, provide user interfaces for controlling an ever-increasing scope, variety, and sophistication of functionality. Example user interfaces can be interacted with (e.g., controlled) using displayed software controls, such as user interface elements that can be interacted with via a touch-sensitive surface of a display, and hardware controls, such as buttons and switches.

BRIEF SUMMARY

Some systems and techniques for providing user interfaces that integrate one or more hardware buttons using electronic devices, however, are generally limited, cumbersome, and inefficient. For example, integrating numerous hardware buttons can increase the size, weight, and cost of electronic devices, but systems with user interfaces that over-rely on displayed software controls (e.g., touch controls) or require frequent switching between displayed software controls and hardware buttons are complex, error-prone, distracting, uncomfortable, and require more time than necessary, wasting user time and device energy. This latter consideration is particularly important in battery-operated devices.

In some embodiments, the present technique provides electronic devices with faster, more efficient systems and methods for providing interfaces that integrate one or more hardware buttons. Such methods and interfaces optionally complement or replace other methods that integrate one or more hardware buttons. Such systems and methods reduce the cognitive burden on a user and produce a more efficient human-machine interface. Such systems and methods reduce the processing power used by electronic devices to provide user interfaces, receive inputs through the user interfaces, and respond to the user inputs. For battery-operated computing devices, such methods and interfaces conserve power and increase the time between battery charges.

In accordance with some embodiments, a method is described. The method is performed at a computer system that is in communication with a display generation component, one or more cameras, and a set of hardware buttons including at least a first hardware button, and a second hardware button different from the first hardware button, and comprises: while displaying, via the display generation component, a camera user interface, detecting a first button press; and in response to detecting the first button press: in accordance with a determination that the first button press satisfies a first set of criteria, capturing first media with the one or more cameras, wherein: the first set of criteria includes a first criterion that is satisfied when the first button press is detected at the first hardware button; and the first media is designated to be displayed with a synthetic depth-of-field effect; and in accordance with a determination that the first button press satisfies a second set of criteria different from the first set of criteria, capturing second media with the one or more cameras, wherein: the second set of criteria includes a second criterion that is satisfied when the first button press is detected at the second hardware button; and the second media is not designated to be displayed with the synthetic depth-of-field effect.

In accordance with some embodiments, a non-transitory computer-readable storage medium is described. The non-transitory computer-readable storage medium stores one or more programs configured to be executed by one or more processors of a computer system that is in communication with a display generation component, one or more cameras, and a set of hardware buttons including at least a first hardware button, and a second hardware button different from the first hardware button, the one or more programs including instructions for: while displaying, via the display generation component, a camera user interface, detecting a first button press; and in response to detecting the first button press: in accordance with a determination that the first button press satisfies a first set of criteria, capturing first media with the one or more cameras, wherein: the first set of criteria includes a first criterion that is satisfied when the first button press is detected at the first hardware button; and the first media is designated to be displayed with a synthetic depth-of-field effect; and in accordance with a determination that the first button press satisfies a second set of criteria different from the first set of criteria, capturing second media with the one or more cameras, wherein: the second set of criteria includes a second criterion that is satisfied when the first button press is detected at the second hardware button; and the second media is not designated to be displayed with the synthetic depth-of-field effect.

In accordance with some embodiments, a transitory computer-readable storage medium is described. The transitory computer-readable storage medium stores one or more programs configured to be executed by one or more processors of a computer system that is in communication with a display generation component, one or more cameras, and a set of hardware buttons including at least a first hardware button, and a second hardware button different from the first hardware button, the one or more programs including instructions for: while displaying, via the display generation component, a camera user interface, detecting a first button press; and in response to detecting the first button press: in accordance with a determination that the first button press satisfies a first set of criteria, capturing first media with the one or more cameras, wherein: the first set of criteria includes a first criterion that is satisfied when the first button press is detected at the first hardware button; and the first media is designated to be displayed with a synthetic depth-of-field effect; and in accordance with a determination that the first button press satisfies a second set of criteria different from the first set of criteria, capturing second media with the one or more cameras, wherein: the second set of criteria includes a second criterion that is satisfied when the first button press is detected at the second hardware button; and the second media is not designated to be displayed with the synthetic depth-of-field effect.

In accordance with some embodiments, a computer system is described. The computer system is configured to communicate with a display generation component, one or more cameras, and a set of hardware buttons including at least a first hardware button, and a second hardware button different from the first hardware button, the computer system comprising one or more processors and memory storing one or more programs configured to be executed by the one or more processors, the one or more programs including instructions for: while displaying, via the display generation component, a camera user interface, detecting a first button press; and in response to detecting the first button press: in accordance with a determination that the first button press satisfies a first set of criteria, capturing first media with the one or more cameras, wherein: the first set of criteria includes a first criterion that is satisfied when the first button press is detected at the first hardware button; and the first media is designated to be displayed with a synthetic depth-of-field effect; and in accordance with a determination that the first button press satisfies a second set of criteria different from the first set of criteria, capturing second media with the one or more cameras, wherein: the second set of criteria includes a second criterion that is satisfied when the first button press is detected at the second hardware button; and the second media is not designated to be displayed with the synthetic depth-of-field effect.

In accordance with some embodiments, a computer system is described. The computer system is configured to communicate with a display generation component, one or more cameras, and a set of hardware buttons including at least a first hardware button, and a second hardware button different from the first hardware button, the computer system comprising: means for, while displaying, via the display generation component, a camera user interface, detecting a first button press; and means for, in response to detecting the first button press: in accordance with a determination that the first button press satisfies a first set of criteria, capturing first media with the one or more cameras, wherein: the first set of criteria includes a first criterion that is satisfied when the first button press is detected at the first hardware button; and the first media is designated to be displayed with a synthetic depth-of-field effect; and in accordance with a determination that the first button press satisfies a second set of criteria different from the first set of criteria, capturing second media with the one or more cameras, wherein: the second set of criteria includes a second criterion that is satisfied when the first button press is detected at the second hardware button; and the second media is not designated to be displayed with the synthetic depth-of-field effect.

In accordance with some embodiments, a computer program product is described. The computer program product comprises one or more programs configured to be executed by one or more processors of a computer system that is in communication with a display generation component, one or more cameras, and a set of hardware buttons including at least a first hardware button, and a second hardware button different from the first hardware button, the one or more programs including instructions for: while displaying, via the display generation component, a camera user interface, detecting a first button press; and in response to detecting the first button press: in accordance with a determination that the first button press satisfies a first set of criteria, capturing first media with the one or more cameras, wherein: the first set of criteria includes a first criterion that is satisfied when the first button press is detected at the first hardware button; and the first media is designated to be displayed with a synthetic depth-of-field effect; and in accordance with a determination that the first button press satisfies a second set of criteria different from the first set of criteria, capturing second media with the one or more cameras, wherein: the second set of criteria includes a second criterion that is satisfied when the first button press is detected at the second hardware button; and the second media is not designated to be displayed with the synthetic depth-of-field effect.

In accordance with some embodiments, a method is described. The method is performed at a computer system that is in communication with a display generation component, one or more cameras, a touch-sensitive surface, and a hardware button, and comprises: while displaying, via the display generation component, a camera user interface with a first set of one or more user interface objects that are selectable via the touch-sensitive surface to control a first set of functions, detecting a first press of the hardware button; and in response to detecting the first press of the hardware button: in accordance with a determination that the first press satisfies a first set of criteria, displaying the camera user interface with a second set of one or more user interface objects, different from the first set of one or more user interface objects, that are selectable via the touch-sensitive surface to control a second set of functions different from the first set of functions, wherein: the first set of criteria includes a first criterion that is satisfied when the first press does not exceed a first press threshold; and in accordance with a determination that the first press satisfies a second set of criteria, performing a media capture operation with the one or more cameras, wherein the second set of criteria includes a second criterion that is satisfied when the first press exceeds the first press threshold.

In accordance with some embodiments, a non-transitory computer-readable storage medium is described. The non-transitory computer-readable storage medium stores one or more programs configured to be executed by one or more processors of a computer system that is in communication with a display generation component, one or more cameras, a touch-sensitive surface, and a hardware button, the one or more programs including instructions for: while displaying, via the display generation component, a camera user interface with a first set of one or more user interface objects that are selectable via the touch-sensitive surface to control a first set of functions, detecting a first press of the hardware button; and in response to detecting the first press of the hardware button: in accordance with a determination that the first press satisfies a first set of criteria, displaying the camera user interface with a second set of one or more user interface objects, different from the first set of one or more user interface objects, that are selectable via the touch-sensitive surface to control a second set of functions different from the first set of functions, wherein: the first set of criteria includes a first criterion that is satisfied when the first press does not exceed a first press threshold; and in accordance with a determination that the first press satisfies a second set of criteria, performing a media capture operation with the one or more cameras, wherein the second set of criteria includes a second criterion that is satisfied when the first press exceeds the first press threshold.

In accordance with some embodiments, a transitory computer-readable storage medium is described. The transitory computer-readable storage medium stores one or more programs configured to be executed by one or more processors of a computer system that is in communication with a display generation component, one or more cameras, a touch-sensitive surface, and a hardware button, the one or more programs including instructions for: while displaying, via the display generation component, a camera user interface with a first set of one or more user interface objects that are selectable via the touch-sensitive surface to control a first set of functions, detecting a first press of the hardware button; and in response to detecting the first press of the hardware button: in accordance with a determination that the first press satisfies a first set of criteria, displaying the camera user interface with a second set of one or more user interface objects, different from the first set of one or more user interface objects, that are selectable via the touch-sensitive surface to control a second set of functions different from the first set of functions, wherein: the first set of criteria includes a first criterion that is satisfied when the first press does not exceed a first press threshold; and in accordance with a determination that the first press satisfies a second set of criteria, performing a media capture operation with the one or more cameras, wherein the second set of criteria includes a second criterion that is satisfied when the first press exceeds the first press threshold.

In accordance with some embodiments, a computer system is described. The computer system is configured to communicate with a display generation component, one or more cameras, a touch-sensitive surface, and a hardware button, the computer system comprising one or more processors and memory storing one or more programs configured to be executed by the one or more processors, the one or more programs including instructions for: while displaying, via the display generation component, a camera user interface with a first set of one or more user interface objects that are selectable via the touch-sensitive surface to control a first set of functions, detecting a first press of the hardware button; and in response to detecting the first press of the hardware button: in accordance with a determination that the first press satisfies a first set of criteria, displaying the camera user interface with a second set of one or more user interface objects, different from the first set of one or more user interface objects, that are selectable via the touch-sensitive surface to control a second set of functions different from the first set of functions, wherein: the first set of criteria includes a first criterion that is satisfied when the first press does not exceed a first press threshold; and in accordance with a determination that the first press satisfies a second set of criteria, performing a media capture operation with the one or more cameras, wherein the second set of criteria includes a second criterion that is satisfied when the first press exceeds the first press threshold.

In accordance with some embodiments, a computer system is described. The computer system is configured to communicate with a display generation component, one or more cameras, a touch-sensitive surface, and a hardware button, the computer system comprising: means for, while displaying, via the display generation component, a camera user interface with a first set of one or more user interface objects that are selectable via the touch-sensitive surface to control a first set of functions, detecting a first press of the hardware button; and means for, in response to detecting the first press of the hardware button: in accordance with a determination that the first press satisfies a first set of criteria, displaying the camera user interface with a second set of one or more user interface objects, different from the first set of one or more user interface objects, that are selectable via the touch-sensitive surface to control a second set of functions different from the first set of functions, wherein: the first set of criteria includes a first criterion that is satisfied when the first press does not exceed a first press threshold; and in accordance with a determination that the first press satisfies a second set of criteria, performing a media capture operation with the one or more cameras, wherein the second set of criteria includes a second criterion that is satisfied when the first press exceeds the first press threshold.

In accordance with some embodiments, a computer program product is described. The computer program product comprises one or more programs configured to be executed by one or more processors of a computer system that is in communication with a display generation component, one or more cameras, a touch-sensitive surface, and a hardware button, the one or more programs including instructions for: while displaying, via the display generation component, a camera user interface with a first set of one or more user interface objects that are selectable via the touch-sensitive surface to control a first set of functions, detecting a first press of the hardware button; and in response to detecting the first press of the hardware button: in accordance with a determination that the first press satisfies a first set of criteria, displaying the camera user interface with a second set of one or more user interface objects, different from the first set of one or more user interface objects, that are selectable via the touch-sensitive surface to control a second set of functions different from the first set of functions, wherein: the first set of criteria includes a first criterion that is satisfied when the first press does not exceed a first press threshold; and in accordance with a determination that the first press satisfies a second set of criteria, performing a media capture operation with the one or more cameras, wherein the second set of criteria includes a second criterion that is satisfied when the first press exceeds the first press threshold.

In accordance with some embodiments, a method is described. The method is performed at a computer system that is in communication with a display generation component, one or more cameras, and a hardware button, and comprises: detecting a first press of the hardware button; and in response to detecting the first press of the hardware button: in accordance with a determination that the hardware button is associated with launching a camera user interface and the first press is detected while displaying, via the display generation component, the camera user interface, performing a camera operation within the camera user interface; and in accordance with a determination that the hardware button is associated with launching the camera user interface and the first press is detected while displaying, via the display generation component, a user interface other than the camera user interface, displaying, via the display generation component, the camera user interface.

In accordance with some embodiments, a non-transitory computer-readable storage medium is described. The non-transitory computer-readable storage medium stores one or more programs configured to be executed by one or more processors of a computer system that is in communication with a display generation component, one or more cameras, and a hardware button, the one or more programs including instructions for: detecting a first press of the hardware button; and in response to detecting the first press of the hardware button: in accordance with a determination that the hardware button is associated with launching a camera user interface and the first press is detected while displaying, via the display generation component, the camera user interface, performing a camera operation within the camera user interface; and in accordance with a determination that the hardware button is associated with launching the camera user interface and the first press is detected while displaying, via the display generation component, a user interface other than the camera user interface, displaying, via the display generation component, the camera user interface.

In accordance with some embodiments, a transitory computer-readable storage medium is described. The transitory computer-readable storage medium stores one or more programs configured to be executed by one or more processors of a computer system that is in communication with a display generation component, one or more cameras, and a hardware button, the one or more programs including instructions for: detecting a first press of the hardware button; and in response to detecting the first press of the hardware button: in accordance with a determination that the hardware button is associated with launching a camera user interface and the first press is detected while displaying, via the display generation component, the camera user interface, performing a camera operation within the camera user interface; and in accordance with a determination that the hardware button is associated with launching the camera user interface and the first press is detected while displaying, via the display generation component, a user interface other than the camera user interface, displaying, via the display generation component, the camera user interface.

In accordance with some embodiments, a computer system is described. The computer system is configured to communicate with a display generation component, one or more cameras, and a hardware button, the computer system comprising one or more processors and memory storing one or more programs configured to be executed by the one or more processors, the one or more programs including instructions for: detecting a first press of the hardware button; and in response to detecting the first press of the hardware button: in accordance with a determination that the hardware button is associated with launching a camera user interface and the first press is detected while displaying, via the display generation component, the camera user interface, performing a camera operation within the camera user interface; and in accordance with a determination that the hardware button is associated with launching the camera user interface and the first press is detected while displaying, via the display generation component, a user interface other than the camera user interface, displaying, via the display generation component, the camera user interface.

In accordance with some embodiments, a computer system is described. The computer system is configured to communicate with a display generation component, one or more cameras, and a hardware button, the computer system comprising: means for detecting a first press of the hardware button; and means for, in response to detecting the first press of the hardware button: in accordance with a determination that the hardware button is associated with launching a camera user interface and the first press is detected while displaying, via the display generation component, the camera user interface, performing a camera operation within the camera user interface; and in accordance with a determination that the hardware button is associated with launching the camera user interface and the first press is detected while displaying, via the display generation component, a user interface other than the camera user interface, displaying, via the display generation component, the camera user interface.

In accordance with some embodiments, a computer program product is described. The computer program product comprises one or more programs configured to be executed by one or more processors of a computer system that is in communication with a display generation component, one or more cameras, and a hardware button, the one or more programs including instructions for: detecting a first press of the hardware button; and in response to detecting the first press of the hardware button: in accordance with a determination that the hardware button is associated with launching a camera user interface and the first press is detected while displaying, via the display generation component, the camera user interface, performing a camera operation within the camera user interface; and in accordance with a determination that the hardware button is associated with launching the camera user interface and the first press is detected while displaying, via the display generation component, a user interface other than the camera user interface, displaying, via the display generation component, the camera user interface.

In accordance with some embodiments, a method is described. The method is performed at a computer system that is in communication with a display generation component, one or more cameras, and a hardware button, and comprises: detecting a first press of the hardware button; in accordance with a determination that the first press of the hardware button satisfies a first set of criteria, wherein the first set of criteria includes a first subset of criteria that is satisfied when the first press is a press of a first type, displaying, via the display generation component, a menu of one or more settings that can be associated with the hardware button; and in accordance with a determination that the first press of the hardware button satisfies a second set of criteria different from the first set of criteria, wherein the second set of criteria includes a second subset of criteria that is satisfied when the first press is a press of a second type different from the first type, changing a value of a first setting of the one or more settings to a first value.

In accordance with some embodiments, a non-transitory computer-readable storage medium is described. The non-transitory computer-readable storage medium stores one or more programs configured to be executed by one or more processors of a computer system that is in communication with a display generation component, one or more cameras, and a hardware button, the one or more programs including instructions for: detecting a first press of the hardware button; in accordance with a determination that the first press of the hardware button satisfies a first set of criteria, wherein the first set of criteria includes a first subset of criteria that is satisfied when the first press is a press of a first type, displaying, via the display generation component, a menu of one or more settings that can be associated with the hardware button; and in accordance with a determination that the first press of the hardware button satisfies a second set of criteria different from the first set of criteria, wherein the second set of criteria includes a second subset of criteria that is satisfied when the first press is a press of a second type different from the first type, changing a value of a first setting of the one or more settings to a first value.

In accordance with some embodiments, a transitory computer-readable storage medium is described. The transitory computer-readable storage medium stores one or more programs configured to be executed by one or more processors of a computer system that is in communication with a display generation component, one or more cameras, and a hardware button, the one or more programs including instructions for: detecting a first press of the hardware button; in accordance with a determination that the first press of the hardware button satisfies a first set of criteria, wherein the first set of criteria includes a first subset of criteria that is satisfied when the first press is a press of a first type, displaying, via the display generation component, a menu of one or more settings that can be associated with the hardware button; and in accordance with a determination that the first press of the hardware button satisfies a second set of criteria different from the first set of criteria, wherein the second set of criteria includes a second subset of criteria that is satisfied when the first press is a press of a second type different from the first type, changing a value of a first setting of the one or more settings to a first value.

In accordance with some embodiments, a computer system is described. The computer system is configured to communicate with a display generation component, one or more cameras, and a hardware button, the computer system comprising one or more processors and memory storing one or more programs configured to be executed by the one or more processors, the one or more programs including instructions for: detecting a first press of the hardware button; in accordance with a determination that the first press of the hardware button satisfies a first set of criteria, wherein the first set of criteria includes a first subset of criteria that is satisfied when the first press is a press of a first type, displaying, via the display generation component, a menu of one or more settings that can be associated with the hardware button; and in accordance with a determination that the first press of the hardware button satisfies a second set of criteria different from the first set of criteria, wherein the second set of criteria includes a second subset of criteria that is satisfied when the first press is a press of a second type different from the first type, changing a value of a first setting of the one or more settings to a first value.

In accordance with some embodiments, a computer system is described. The computer system is configured to communicate with a display generation component, one or more cameras, and a hardware button, the computer system comprising: means for detecting a first press of the hardware button; means for, in accordance with a determination that the first press of the hardware button satisfies a first set of criteria, wherein the first set of criteria includes a first subset of criteria that is satisfied when the first press is a press of a first type, displaying, via the display generation component, a menu of one or more settings that can be associated with the hardware button; and means for, in accordance with a determination that the first press of the hardware button satisfies a second set of criteria different from the first set of criteria, wherein the second set of criteria includes a second subset of criteria that is satisfied when the first press is a press of a second type different from the first type, changing a value of a first setting of the one or more settings to a first value.

In accordance with some embodiments, a computer program product is described. The computer program product comprises one or more programs configured to be executed by one or more processors of a computer system that is in communication with a display generation component, one or more cameras, and a hardware button, the one or more programs including instructions for: detecting a first press of the hardware button; in accordance with a determination that the first press of the hardware button satisfies a first set of criteria, wherein the first set of criteria includes a first subset of criteria that is satisfied when the first press is a press of a first type, displaying, via the display generation component, a menu of one or more settings that can be associated with the hardware button; and in accordance with a determination that the first press of the hardware button satisfies a second set of criteria different from the first set of criteria, wherein the second set of criteria includes a second subset of criteria that is satisfied when the first press is a press of a second type different from the first type, changing a value of a first setting of the one or more settings to a first value.

In accordance with some embodiments, a method is described. The method is performed at a computer system that is in communication with a display generation component, one or more cameras, and a set of hardware buttons including at least a first hardware button, and comprises: while displaying, via the display generation component, a camera application, detecting a press input at a location corresponding to the first hardware button; and in response to detecting the press input: in accordance with a determination that the press input at the location corresponding to the first hardware button is a press input of a first type, performing a synthetic depth-of-field operation in the camera application; and in accordance with a determination that the press input at the location corresponding to the first hardware button is a press input of a second type different from the first type, performing a first media capture operation in the camera application, wherein the press input at the location corresponding to the first hardware button of the second type applies more pressure to the location corresponding to the first hardware button than an amount of pressure that is applied to the location corresponding to the first hardware button by the press input of the first type.

In accordance with some embodiments, a non-transitory computer-readable storage medium is described. The non-transitory computer-readable storage medium stores one or more programs configured to be executed by one or more processors of a computer system that is in communication with a display generation component, one or more cameras, and a set of hardware buttons including at least a first hardware button, the one or more programs including instructions for: while displaying, via the display generation component, a camera application, detecting a press input at a location corresponding to the first hardware button; and in response to detecting the press input: in accordance with a determination that the press input at the location corresponding to the first hardware button is a press input of a first type, performing a synthetic depth-of-field operation in the camera application; and in accordance with a determination that the press input at the location corresponding to the first hardware button is a press input of a second type different from the first type, performing a first media capture operation in the camera application, wherein the press input at the location corresponding to the first hardware button of the second type applies more pressure to the location corresponding to the first hardware button than an amount of pressure that is applied to the location corresponding to the first hardware button by the press input of the first type.

In accordance with some embodiments, a transitory computer-readable storage medium is described. The transitory computer-readable storage medium stores one or more programs configured to be executed by one or more processors of a computer system that is in communication with a display generation component, one or more cameras, and a set of hardware buttons including at least a first hardware button, the one or more programs including instructions for: while displaying, via the display generation component, a camera application, detecting a press input at a location corresponding to the first hardware button; and in response to detecting the press input: in accordance with a determination that the press input at the location corresponding to the first hardware button is a press input of a first type, performing a synthetic depth-of-field operation in the camera application; and in accordance with a determination that the press input at the location corresponding to the first hardware button is a press input of a second type different from the first type, performing a first media capture operation in the camera application, wherein the press input at the location corresponding to the first hardware button of the second type applies more pressure to the location corresponding to the first hardware button than an amount of pressure that is applied to the location corresponding to the first hardware button by the press input of the first type.

In accordance with some embodiments, a computer system is described. The computer system is configured to communicate with a display generation component, one or more cameras, and a set of hardware buttons including at least a first hardware button, the computer system comprising one or more processors and memory storing one or more programs configured to be executed by the one or more processors, the one or more programs including instructions for: while displaying, via the display generation component, a camera application, detecting a press input at a location corresponding to the first hardware button; and in response to detecting the press input: in accordance with a determination that the press input at the location corresponding to the first hardware button is a press input of a first type, performing a synthetic depth-of-field operation in the camera application; and in accordance with a determination that the press input at the location corresponding to the first hardware button is a press input of a second type different from the first type, performing a first media capture operation in the camera application, wherein the press input at the location corresponding to the first hardware button of the second type applies more pressure to the location corresponding to the first hardware button than an amount of pressure that is applied to the location corresponding to the first hardware button by the press input of the first type.

In accordance with some embodiments, a computer system is described. The computer system is configured to communicate with a display generation component, one or more cameras, and a set of hardware buttons including at least a first hardware button, the computer system comprising: means for, while displaying, via the display generation component, a camera application, detecting a press input at a location corresponding to the first hardware button; and means for, in response to detecting the press input: in accordance with a determination that the press input at the location corresponding to the first hardware button is a press input of a first type, performing a synthetic depth-of-field operation in the camera application; and in accordance with a determination that the press input at the location corresponding to the first hardware button is a press input of a second type different from the first type, performing a first media capture operation in the camera application, wherein the press input at the location corresponding to the first hardware button of the second type applies more pressure to the location corresponding to the first hardware button than an amount of pressure that is applied to the location corresponding to the first hardware button by the press input of the first type.

In accordance with some embodiments, a computer program product is described. The computer program product comprises one or more programs configured to be executed by one or more processors of a computer system that is in communication with a display generation component, one or more cameras, and a set of hardware buttons including at least a first hardware button, the one or more programs including instructions for: while displaying, via the display generation component, a camera application, detecting a press input at a location corresponding to the first hardware button; and in response to detecting the press input: in accordance with a determination that the press input at the location corresponding to the first hardware button is a press input of a first type, performing a synthetic depth-of-field operation in the camera application; and in accordance with a determination that the press input at the location corresponding to the first hardware button is a press input of a second type different from the first type, performing a first media capture operation in the camera application, wherein the press input at the location corresponding to the first hardware button of the second type applies more pressure to the location corresponding to the first hardware button than an amount of pressure that is applied to the location corresponding to the first hardware button by the press input of the first type.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces that integrate one or more hardware buttons, thereby increasing the effectiveness, efficiency, and user satisfaction with such devices. Such methods and interfaces may complement or replace other methods that integrate one or more hardware buttons.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5E-5H illustrate exemplary components and user interfaces of a personal electronic device in accordance with some embodiments.

FIG. 7 is a flow diagram of methods for using different hardware buttons to control a camera application in accordance with some embodiments.

FIG. 8 is a flow diagram of methods for using different hardware button presses to control a camera application in accordance with some embodiments.

FIG. 11 is a flow diagram of methods for providing customizable settings controls using a hardware button in accordance with some embodiments.

FIG. 13 is a flow diagram of methods for using different hardware button presses to control different functions of a camera application in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces that integrate one or more hardware buttons. For example, hardware button inputs can be used to control a variety of different functionality depending on the type of hardware button input detected (e.g., long or short presses, light or hard presses, and/or presses with other characteristics), the device context in which the hardware button input is detected (e.g., the user interface being displayed and/or the settings associated with the hardware button), and/or the hardware button being pressed (e.g., automatically switching between different media capture modes for a camera application using different buttons). Such techniques can improve the flexibility, ergonomics, and ease of use of user interfaces and reduce the cognitive burden on a user interacting with the user interface, thereby enhancing productivity. Further, such techniques can reduce processor and battery power otherwise wasted on redundant user inputs.

Figures 9A, 9B:
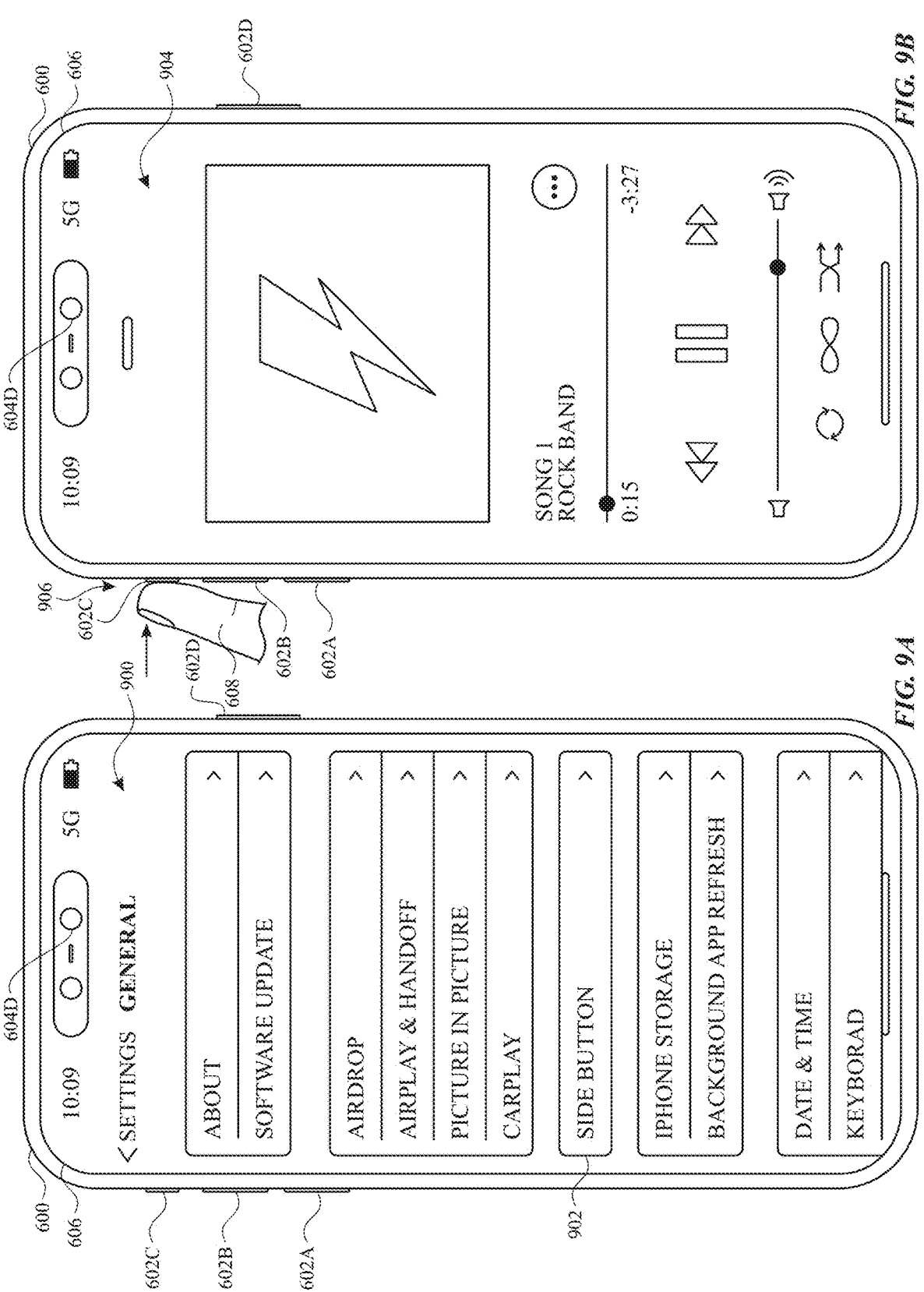
FIGS. 9A-9Z illustrate example techniques and systems for providing customizable controls using a hardware button in accordance with some embodiments.
Figure 9C:
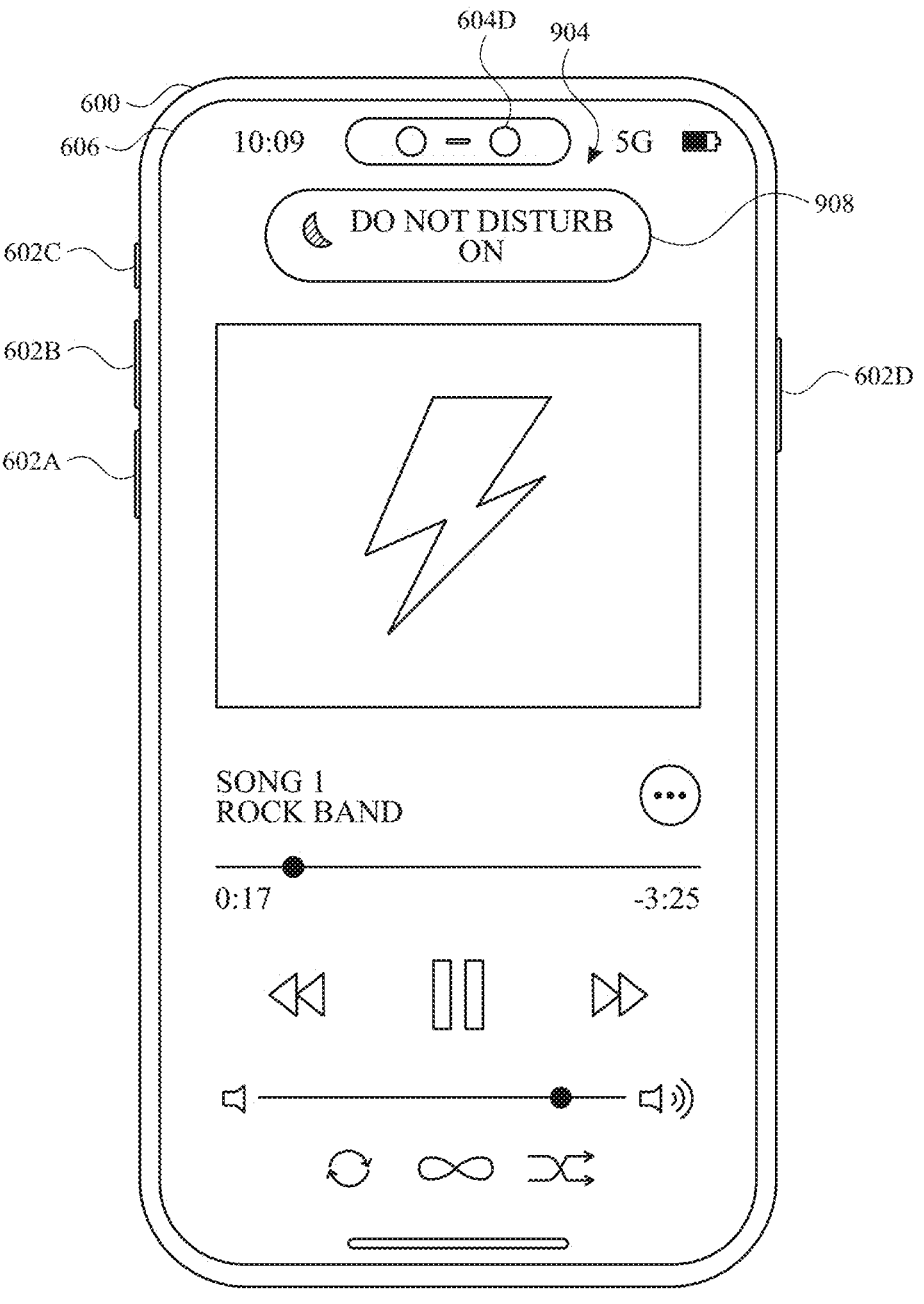
Figures 9Y, 9Z:
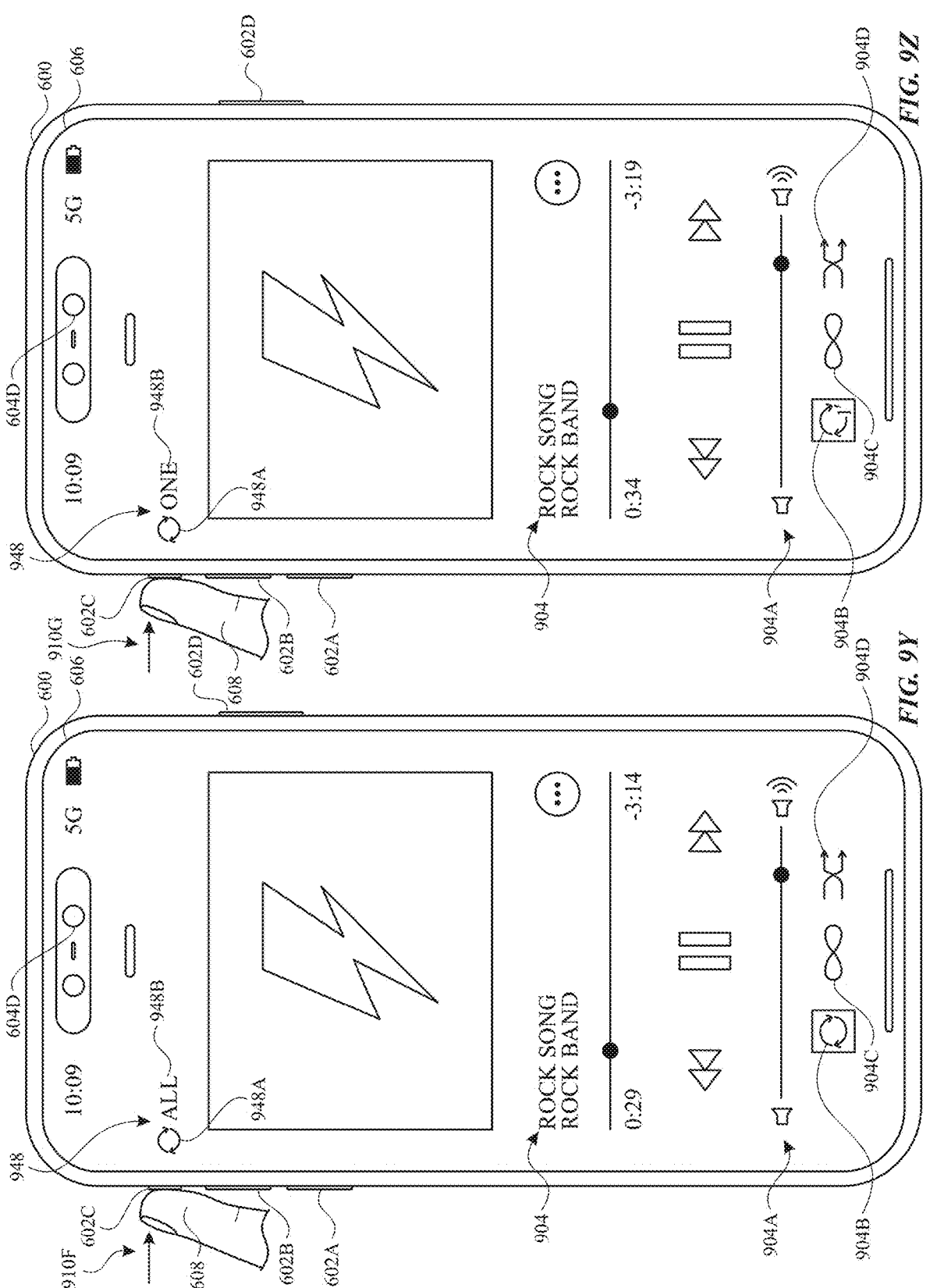
Figure 10:
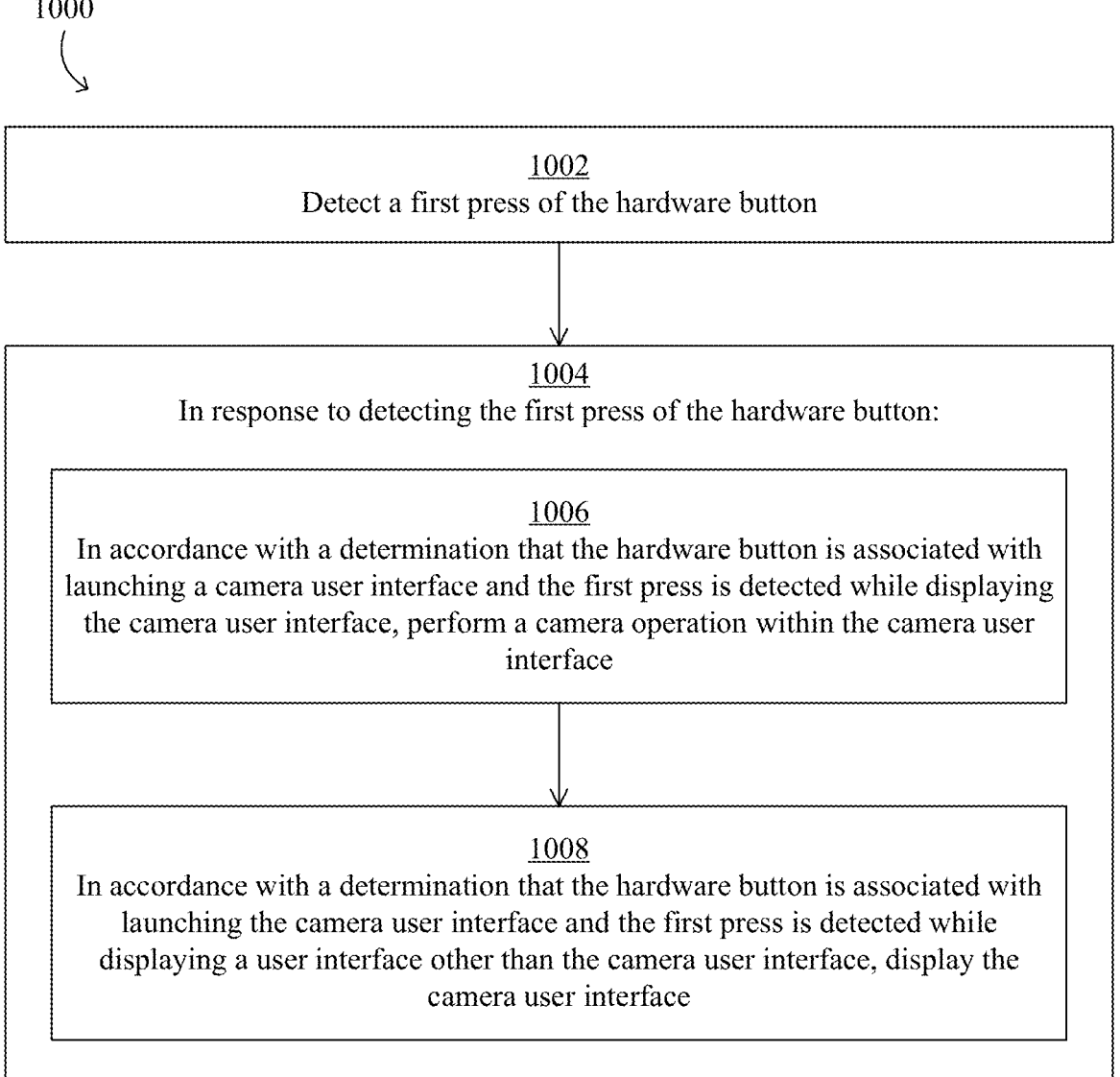
FIG. 10 is a flow diagram of methods for providing customizable camera application controls using a hardware button in accordance with some embodiments.

Below, FIGS. 1A-1B, 2, 3, 4A-4B, and 5A-5H provide a description of exemplary devices for performing the techniques for managing event notifications. FIGS. 6A-6X illustrate exemplary user interfaces for using different hardware buttons and/or different hardware button presses to control a camera application. FIG. 7 is a flow diagram illustrating methods for using different hardware buttons to control a camera application in accordance with some embodiments. FIG. 8 is a flow diagram illustrating methods for using different hardware button presses to control a camera application in accordance with some embodiments. The user interfaces in FIGS. 6A-6X are used to illustrate the processes described below, including the processes in FIGS. 7 and 8. FIGS. 9A-9Z illustrate exemplary user interfaces for providing customizable controls using a hardware button. FIG. 10 is a flow diagram illustrating methods for providing customizable camera application controls using a hardware button in accordance with some embodiments. FIG. 11 is a flow diagram illustrating methods for providing customizable settings controls using a hardware button. The user interfaces in FIGS. 9A-9Z are used to illustrate the processes described below, including the processes in FIGS. 10 and 11.

FIGS. 12A-12K illustrate exemplary user interfaces for using different hardware button presses to control different functions of a camera application. FIG. 13 is a flow diagram illustrating methods for using different hardware button presses to control different functions of a camera application in accordance with some embodiments. The user interfaces in FIGS. 12A-12K are used to illustrate the processes described below, including the process in FIG. 13.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
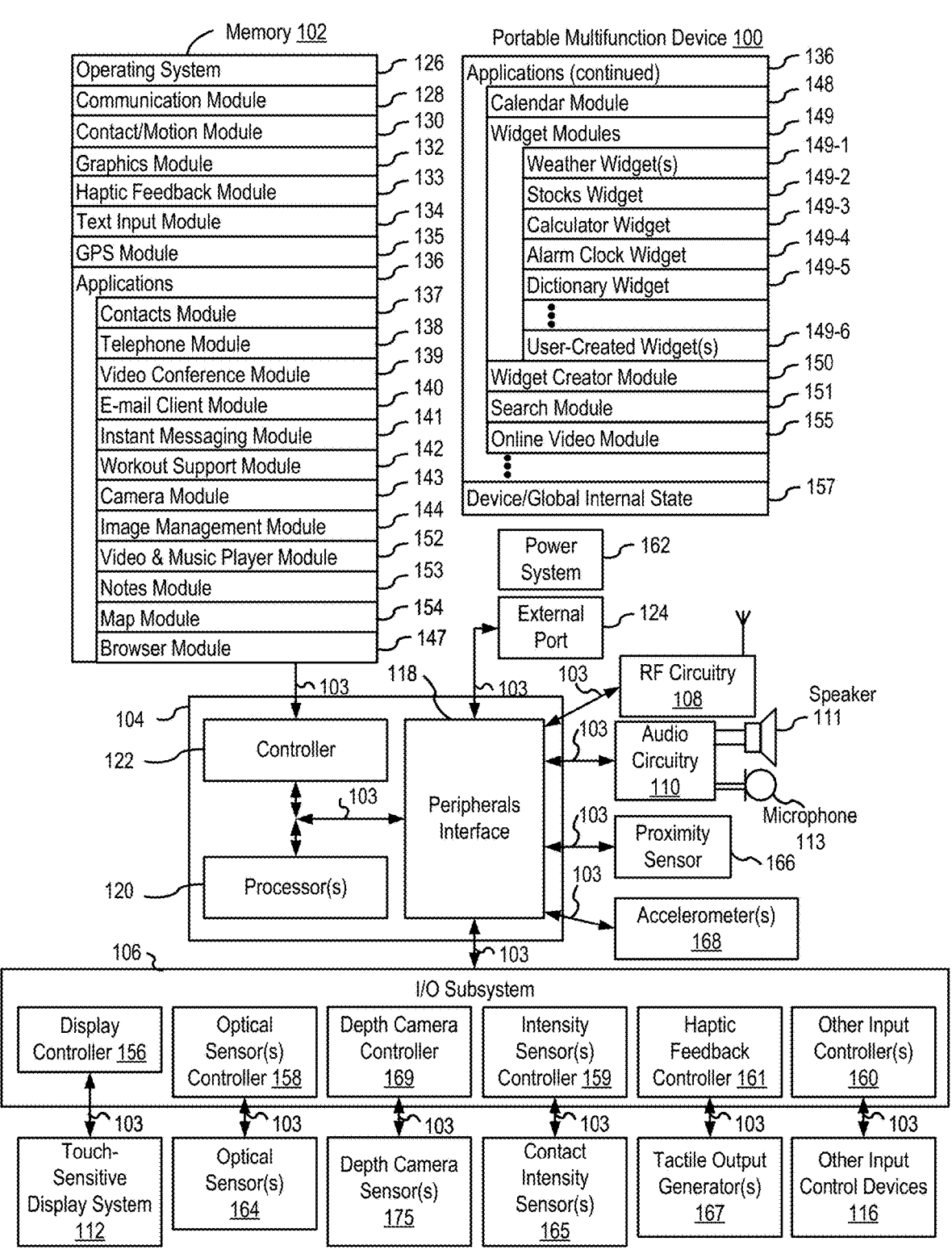
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user.

Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3A:
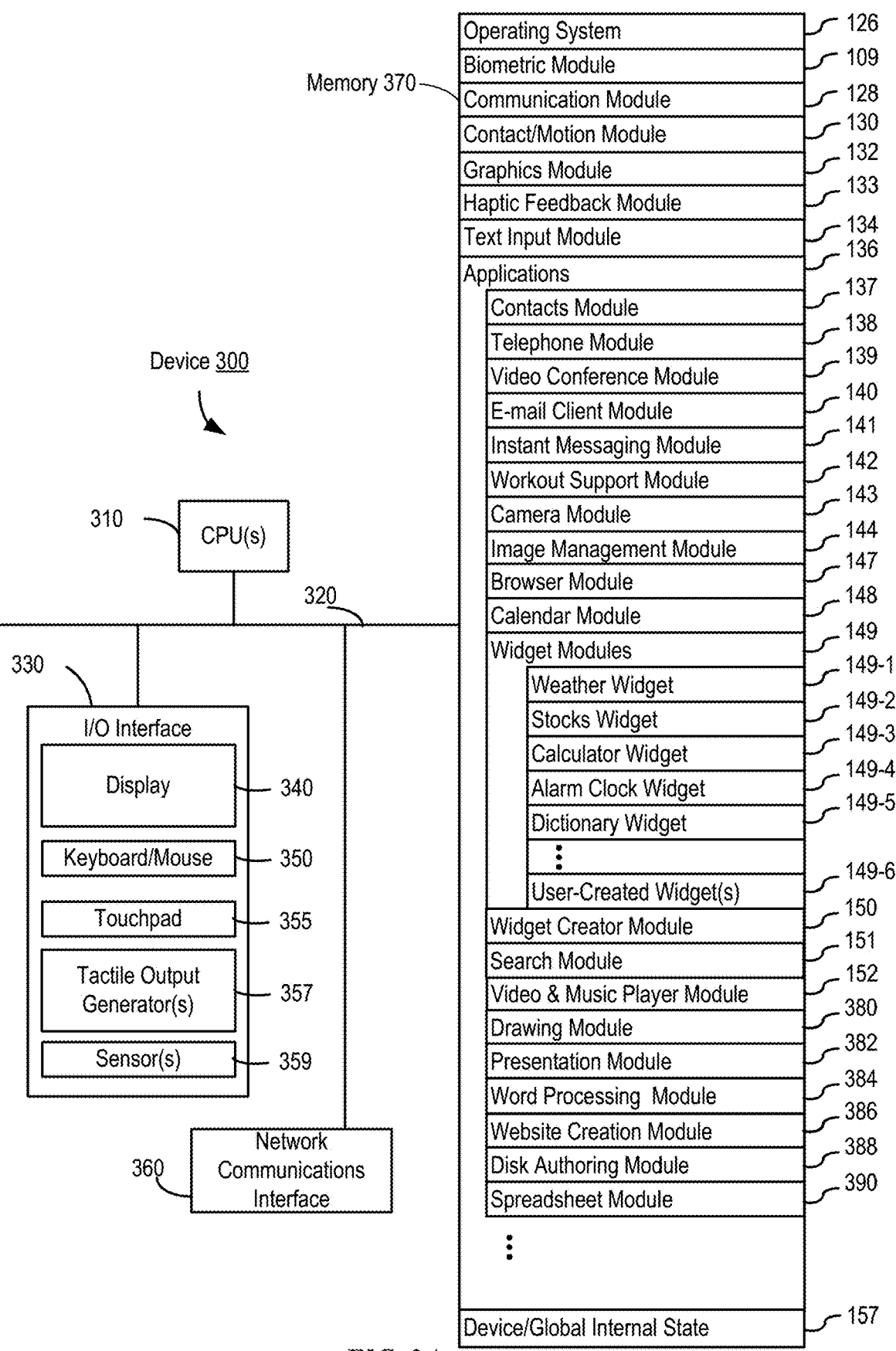
FIG. 3A is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3A) stores device/global internal state 157, as shown in FIGS. 1A and 3A. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;

Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
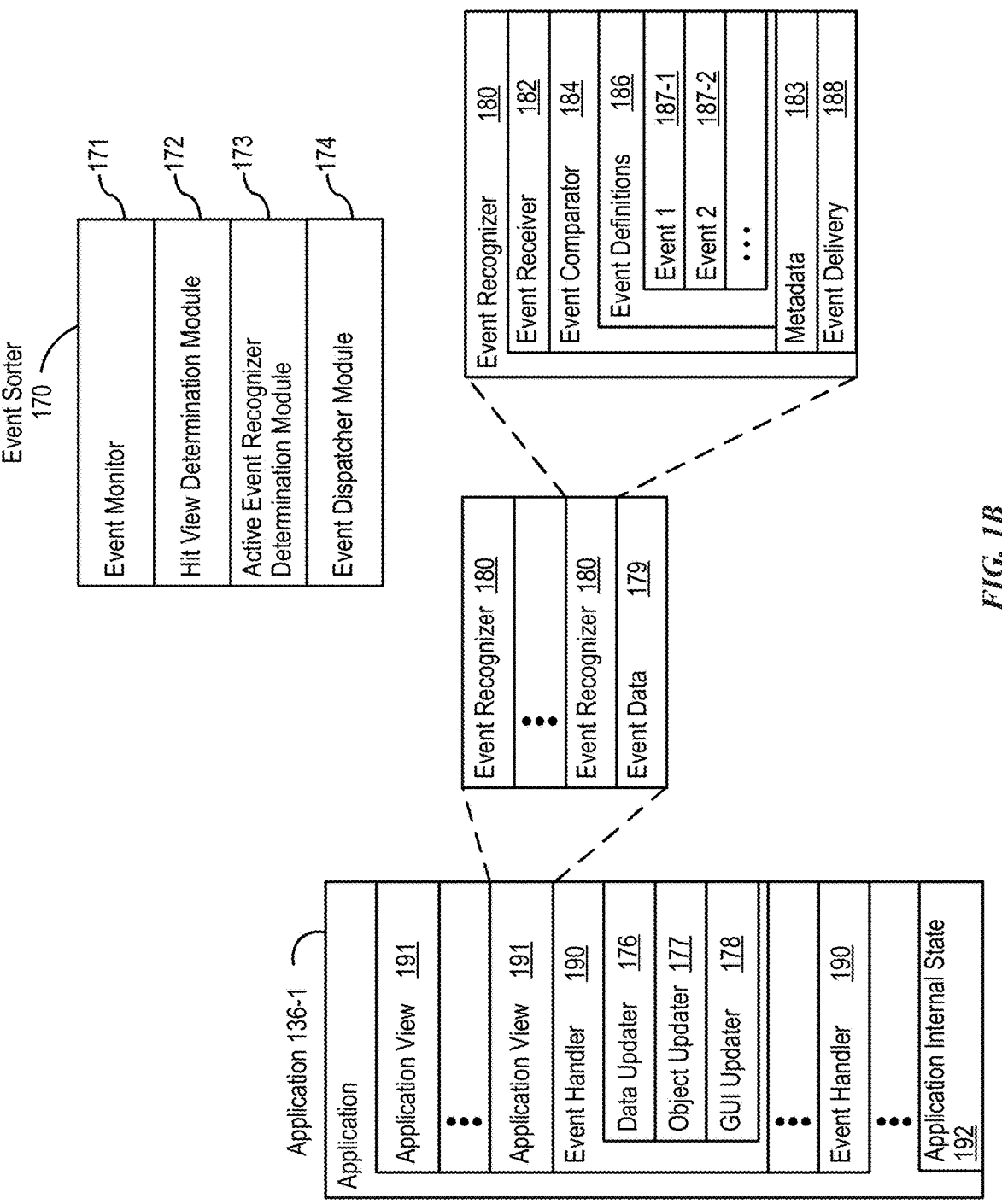
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
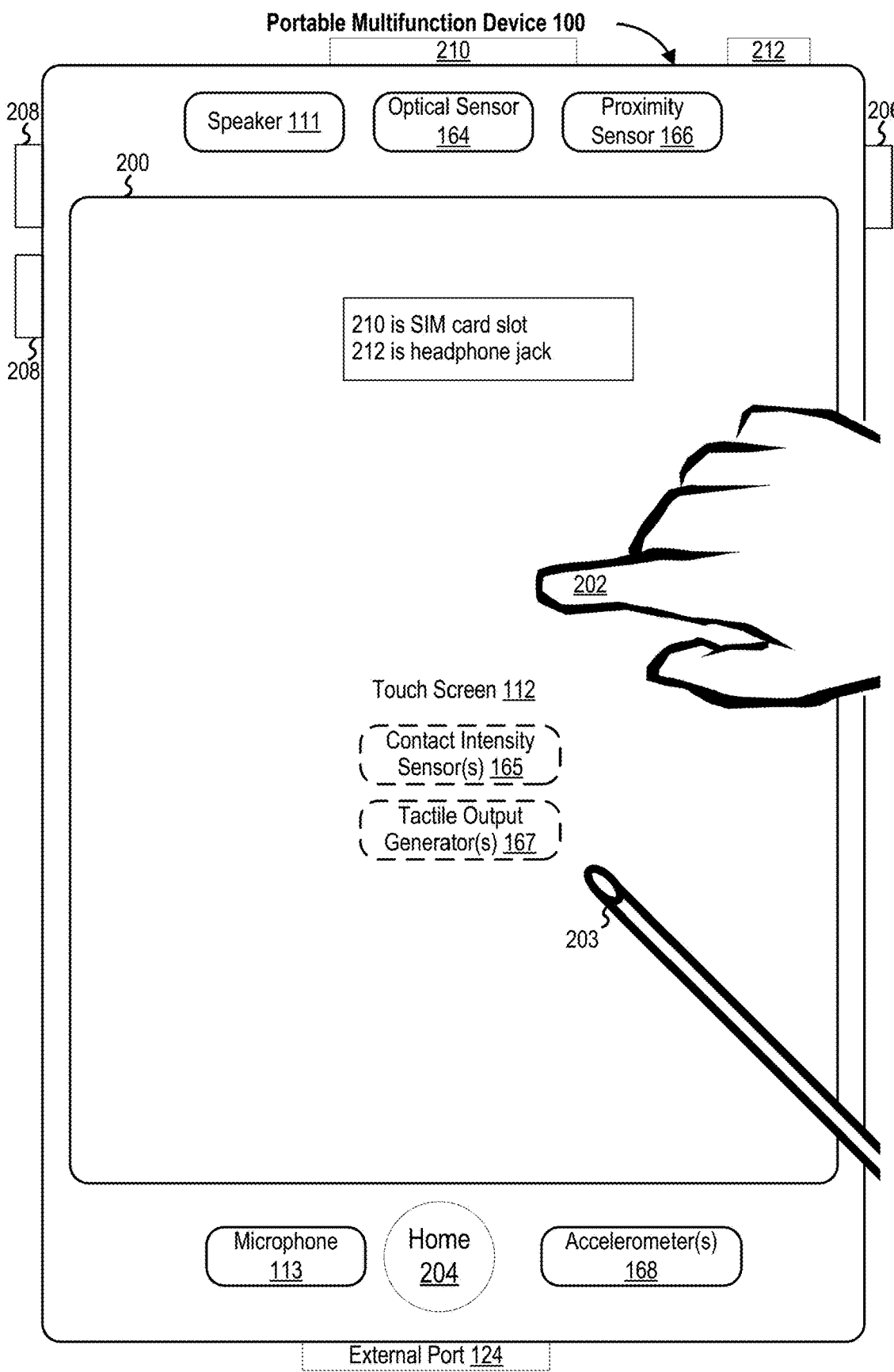
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
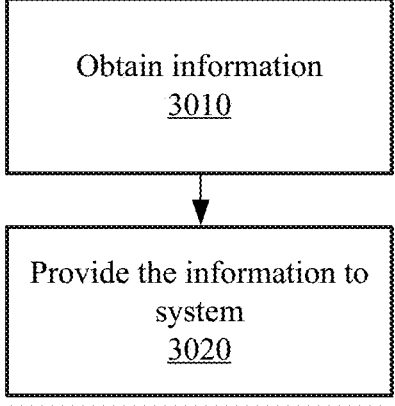
FIGS. 3B-3G illustrate the use of Application Programming Interfaces (APIs) to perform operations.
Figure 3C:
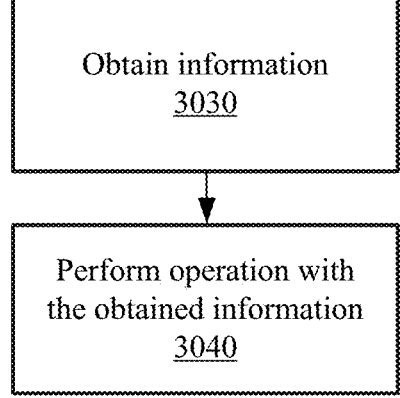

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
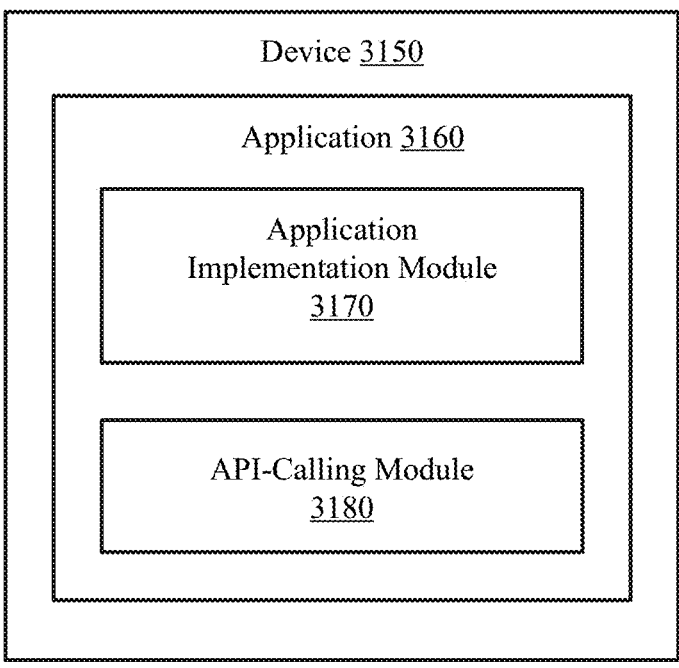
Figure 3E:
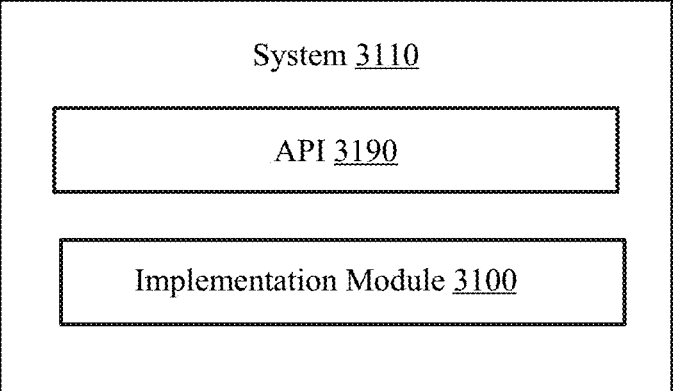
Figure 3F:
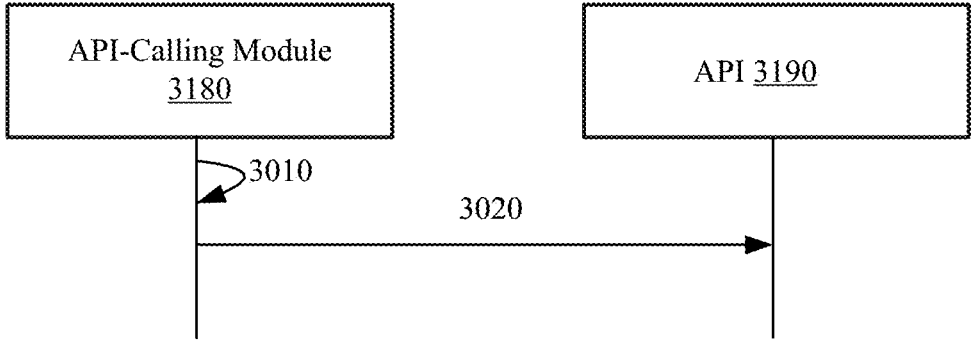

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
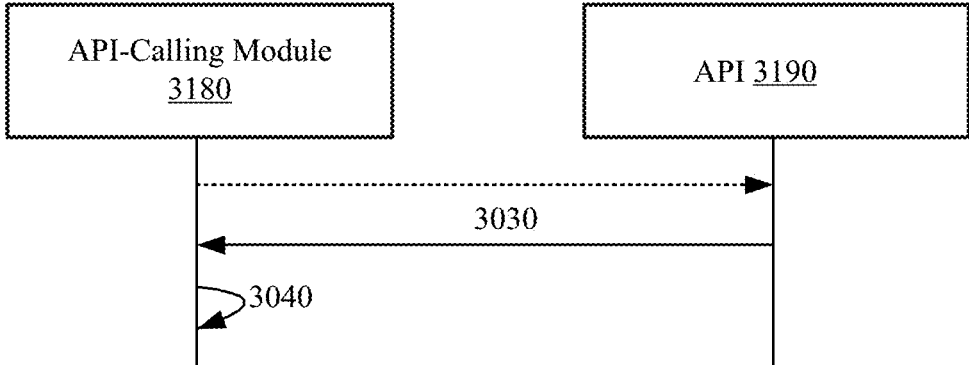

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform method 700 (FIG. 7) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that are, optionally, implemented on, for example, portable multifunction device 100.

Figure 4A:
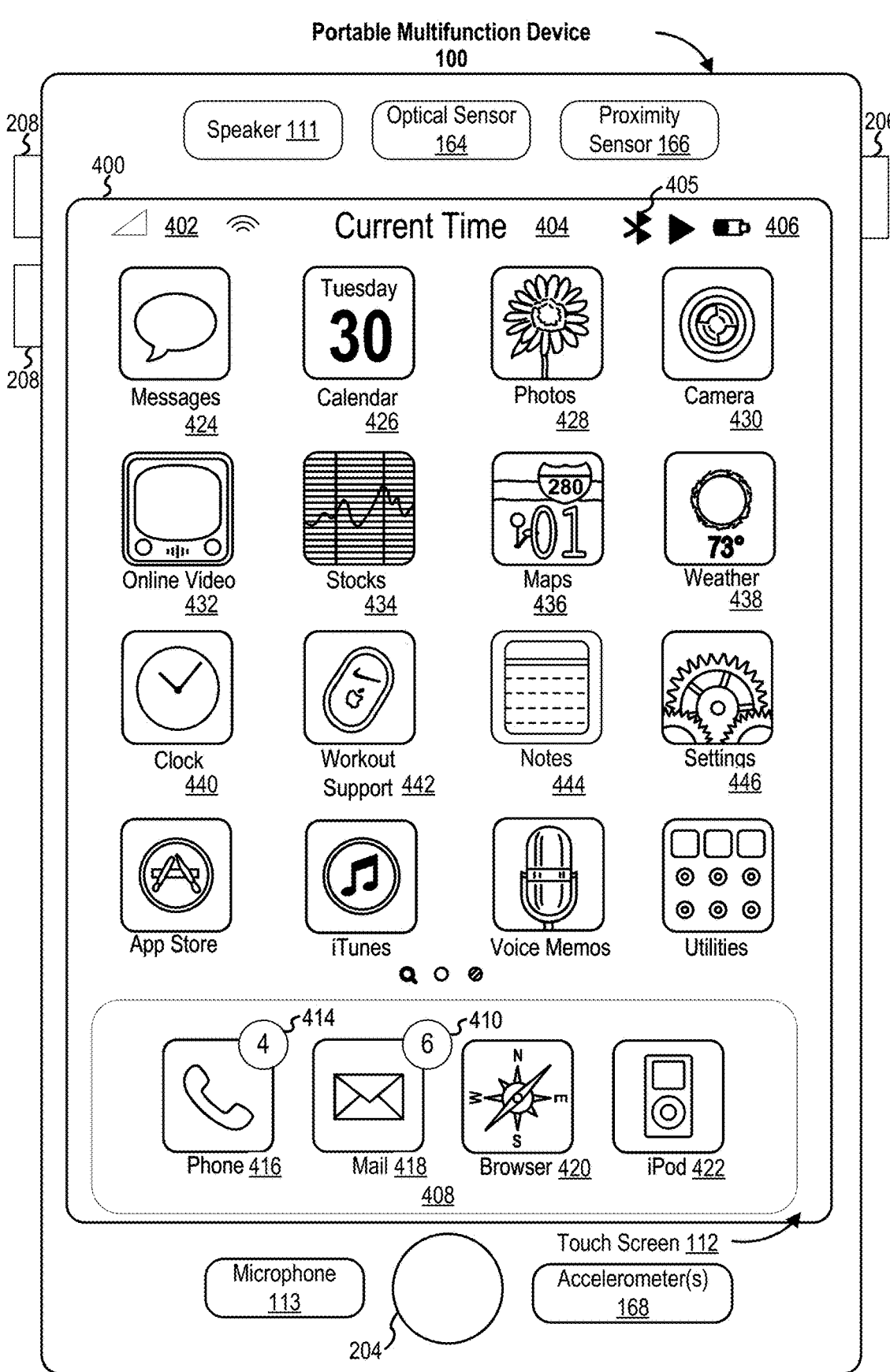
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
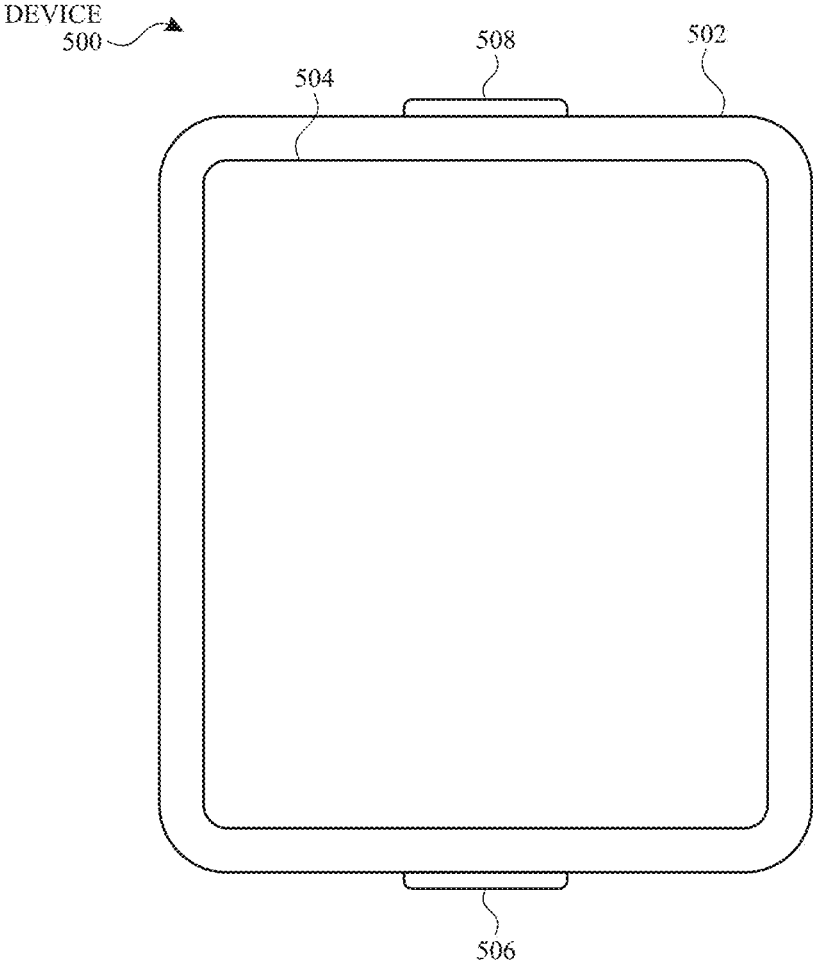
FIG. 5A illustrates a personal electronic device in accordance with some embodiments.
Figures 6A, 6B:
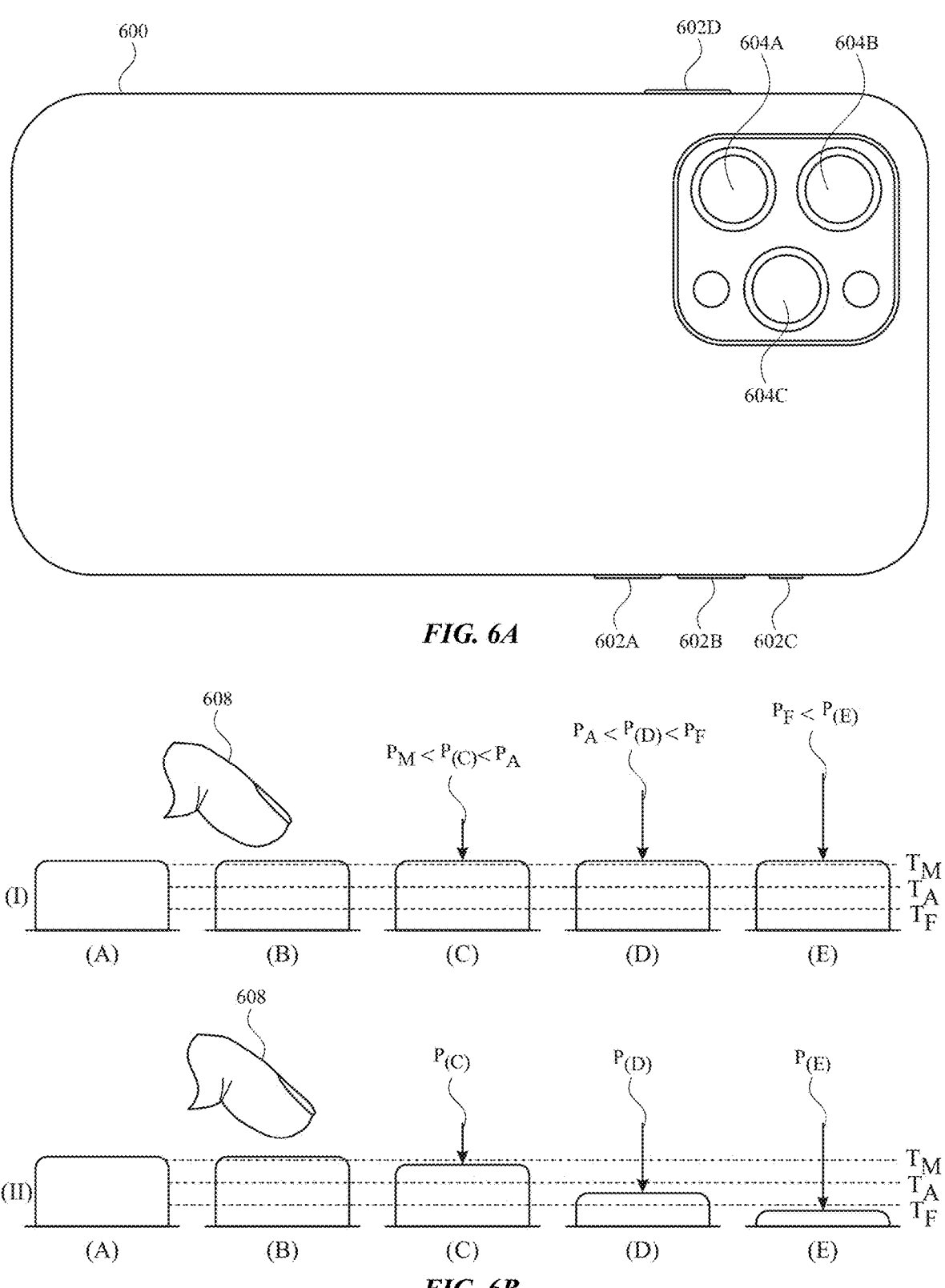
FIGS. 6A-6X illustrate example techniques and systems for using different hardware buttons and/or different hardware button presses to control a camera application in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
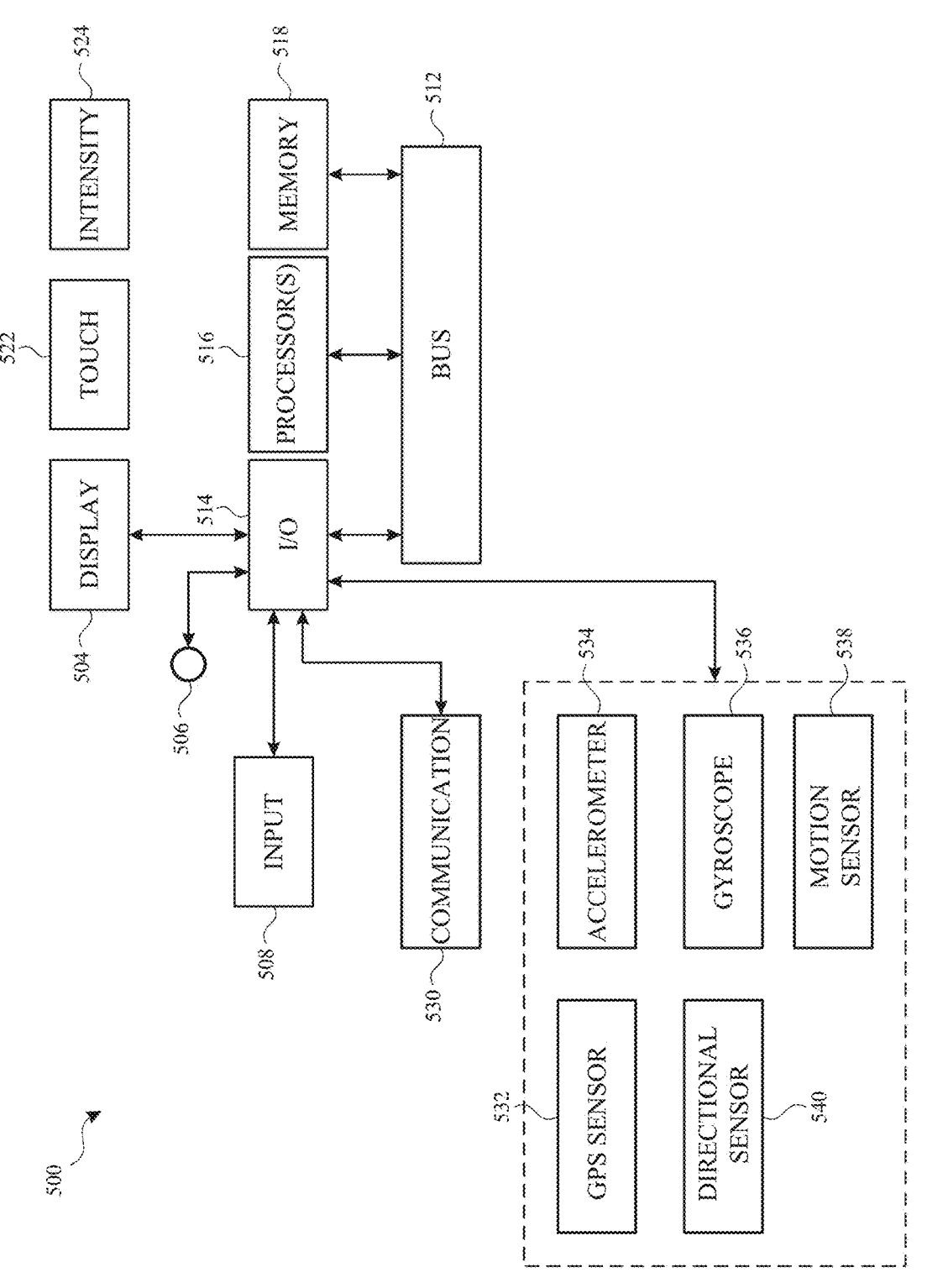
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including methods 700, 800, 1000, 1100, and 1300 (FIGS. 7-8, 10-11, and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3A, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
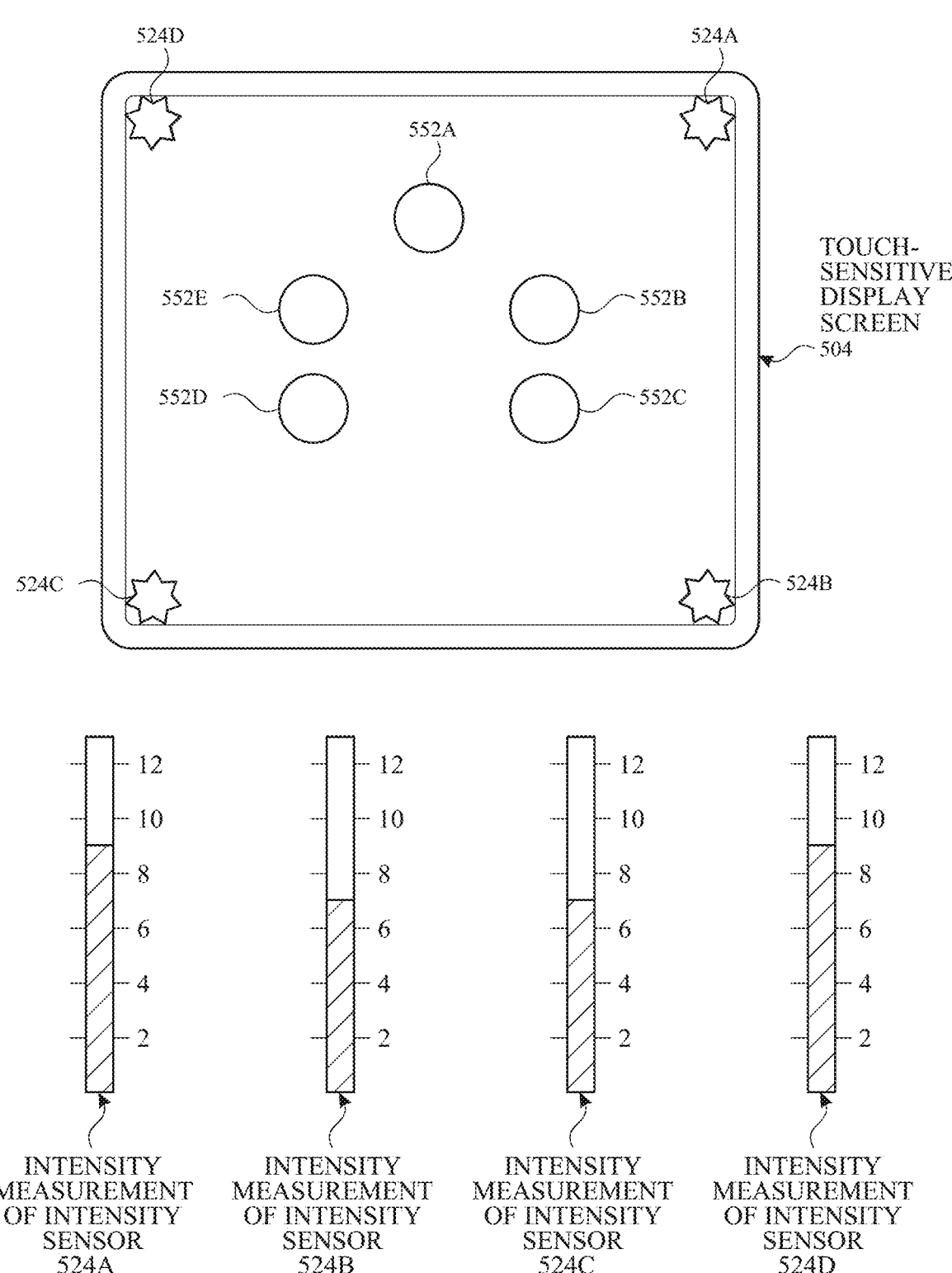
FIGS. 5C-5D illustrate exemplary components of a personal electronic device having a touch-sensitive display and intensity sensors in accordance with some embodiments.
Figure 5D:
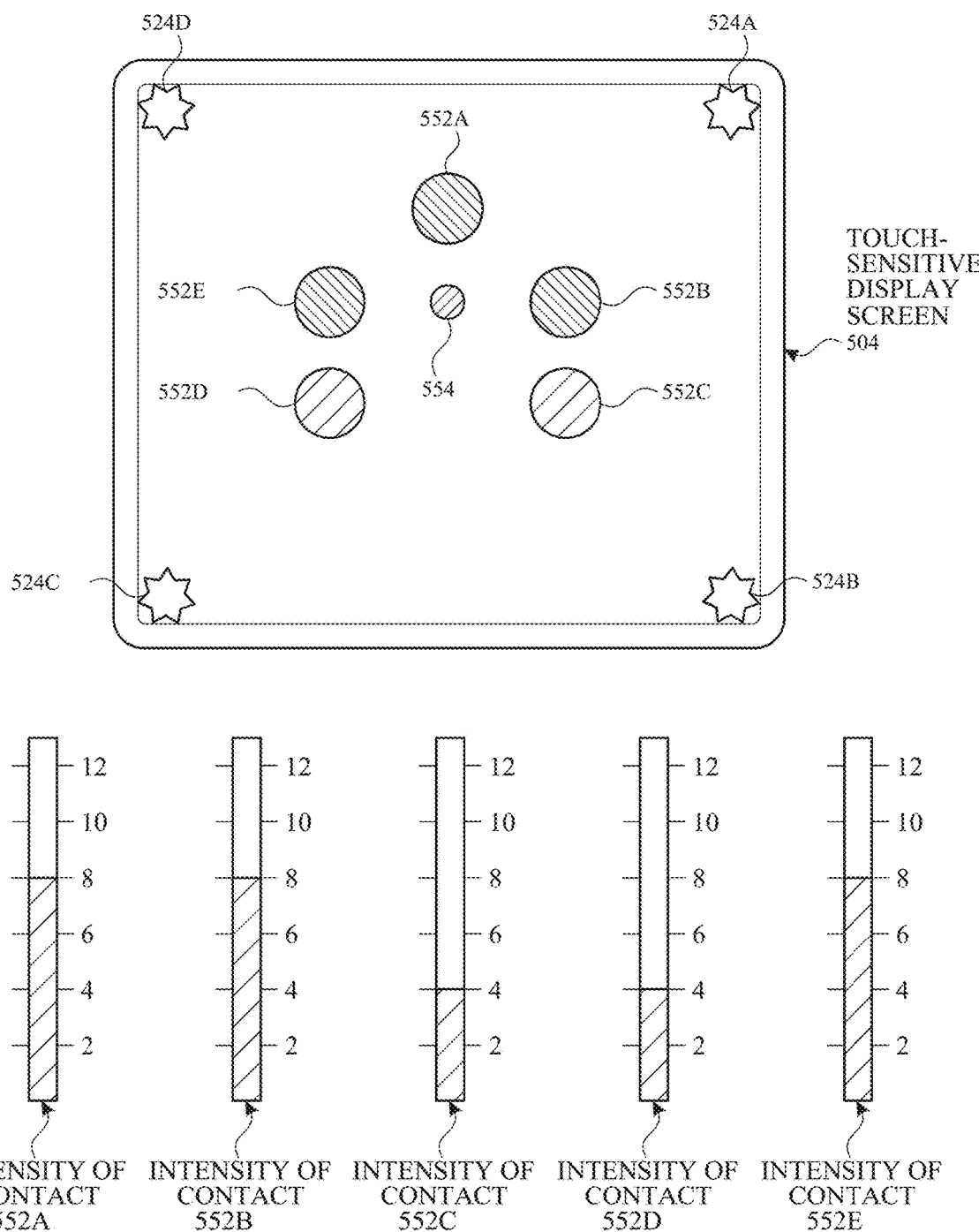

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
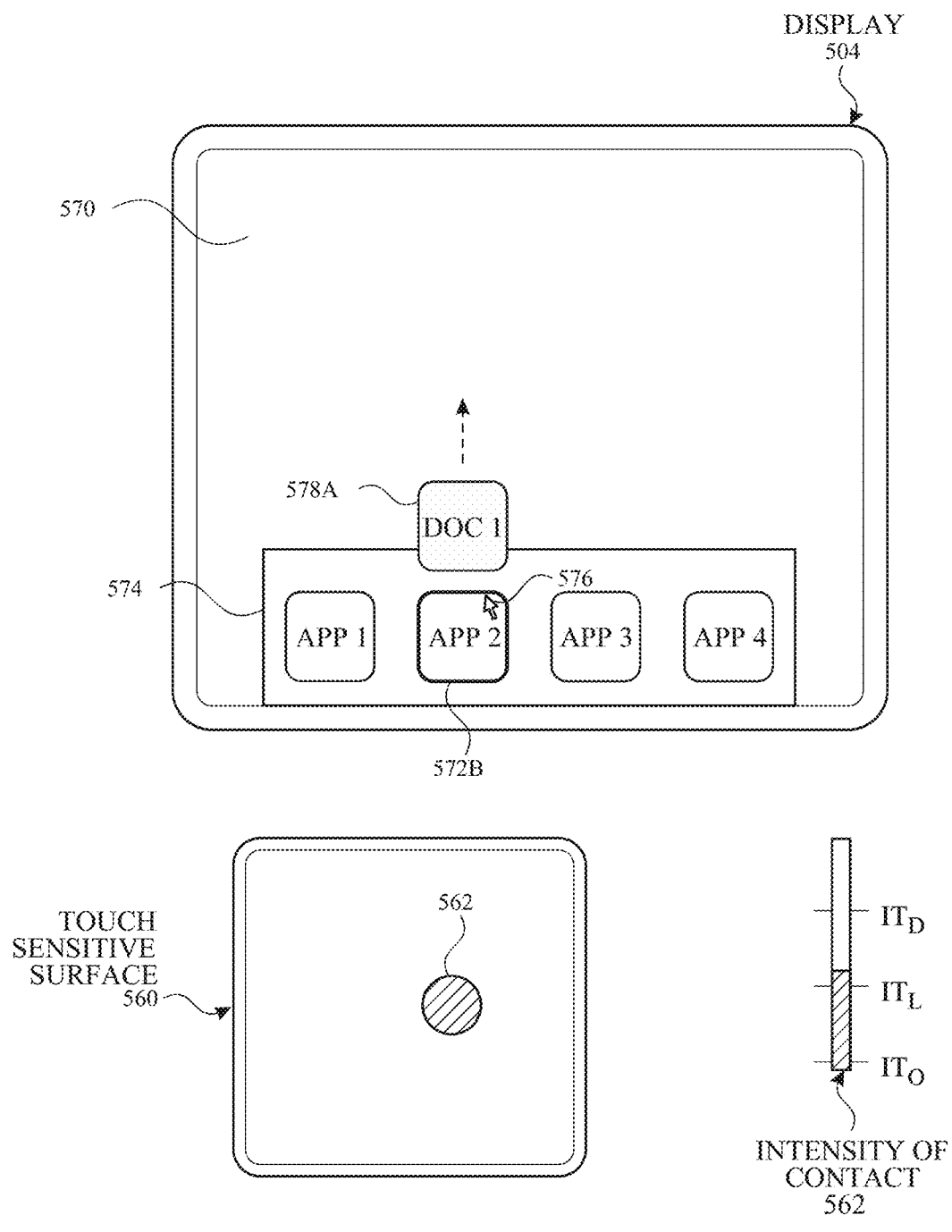
Figure 5G:
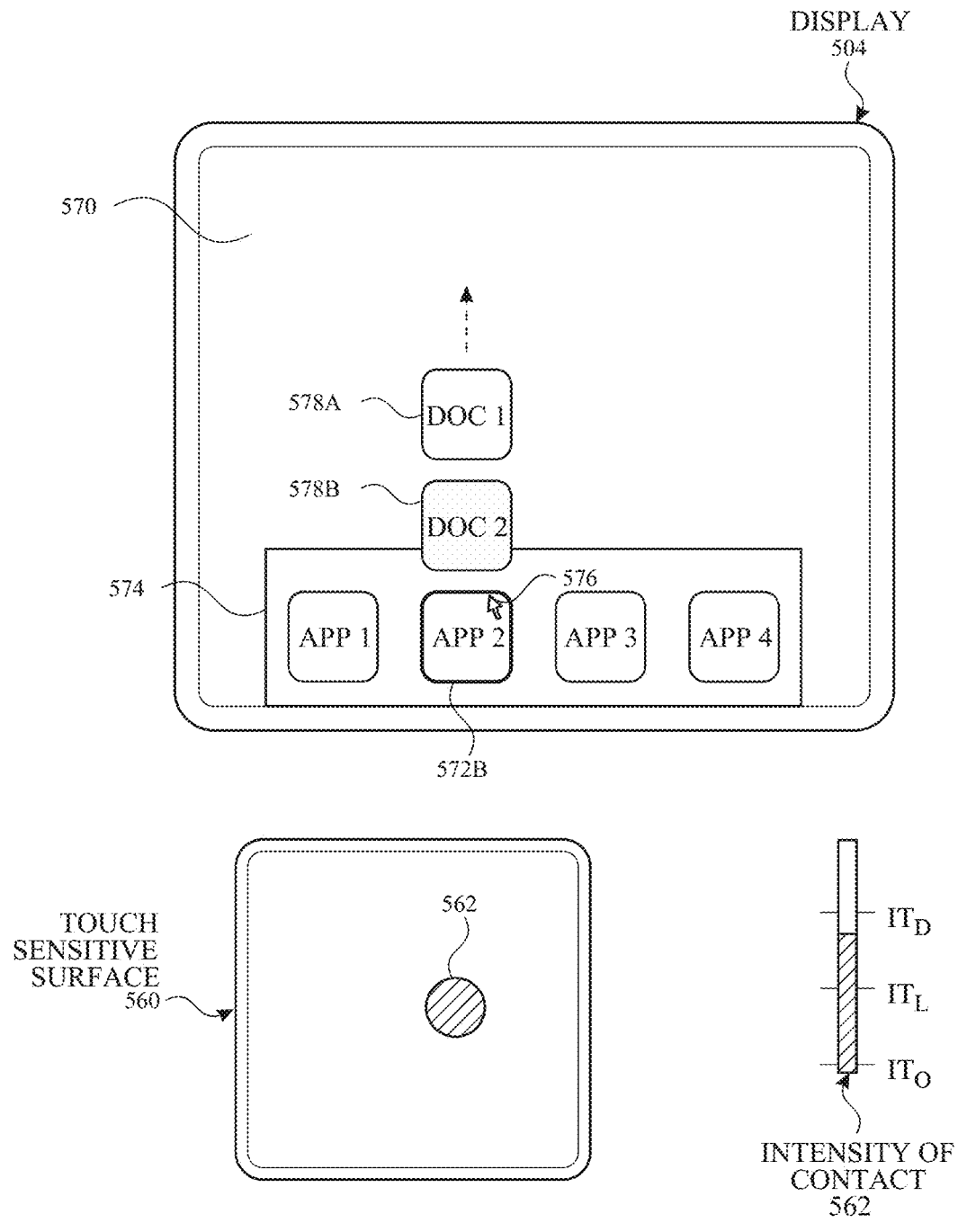
Figure 5H:
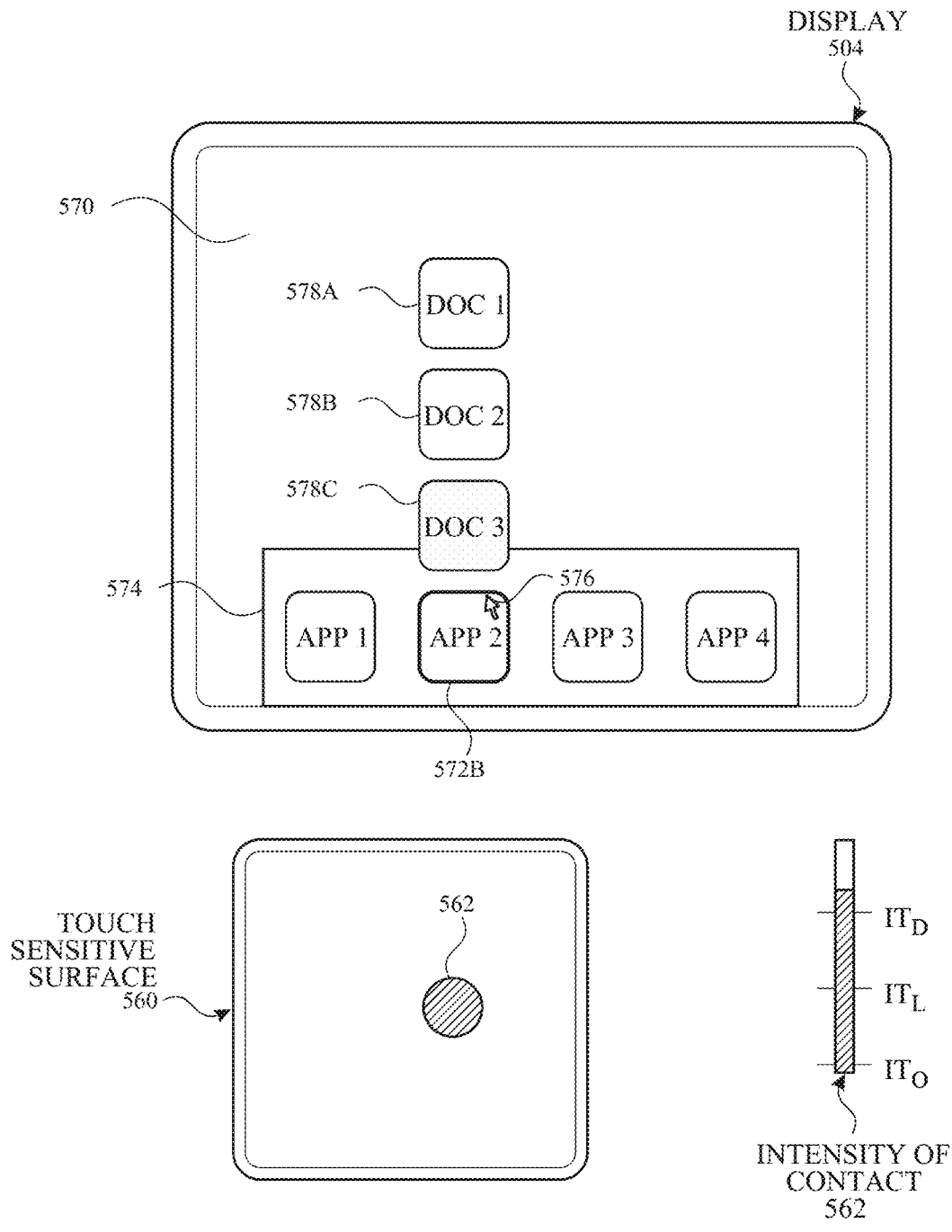

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on an electronic device, such as portable multifunction device 100, device 300, or device 500.

FIGS. 6A-6X illustrate exemplary techniques and systems for using different hardware buttons and/or different hardware button presses to control a camera application, in accordance with some embodiments. The user interfaces in these figures are used to illustrate the processes described below, including the processes in FIGS. 7-8.

Figure 6C:
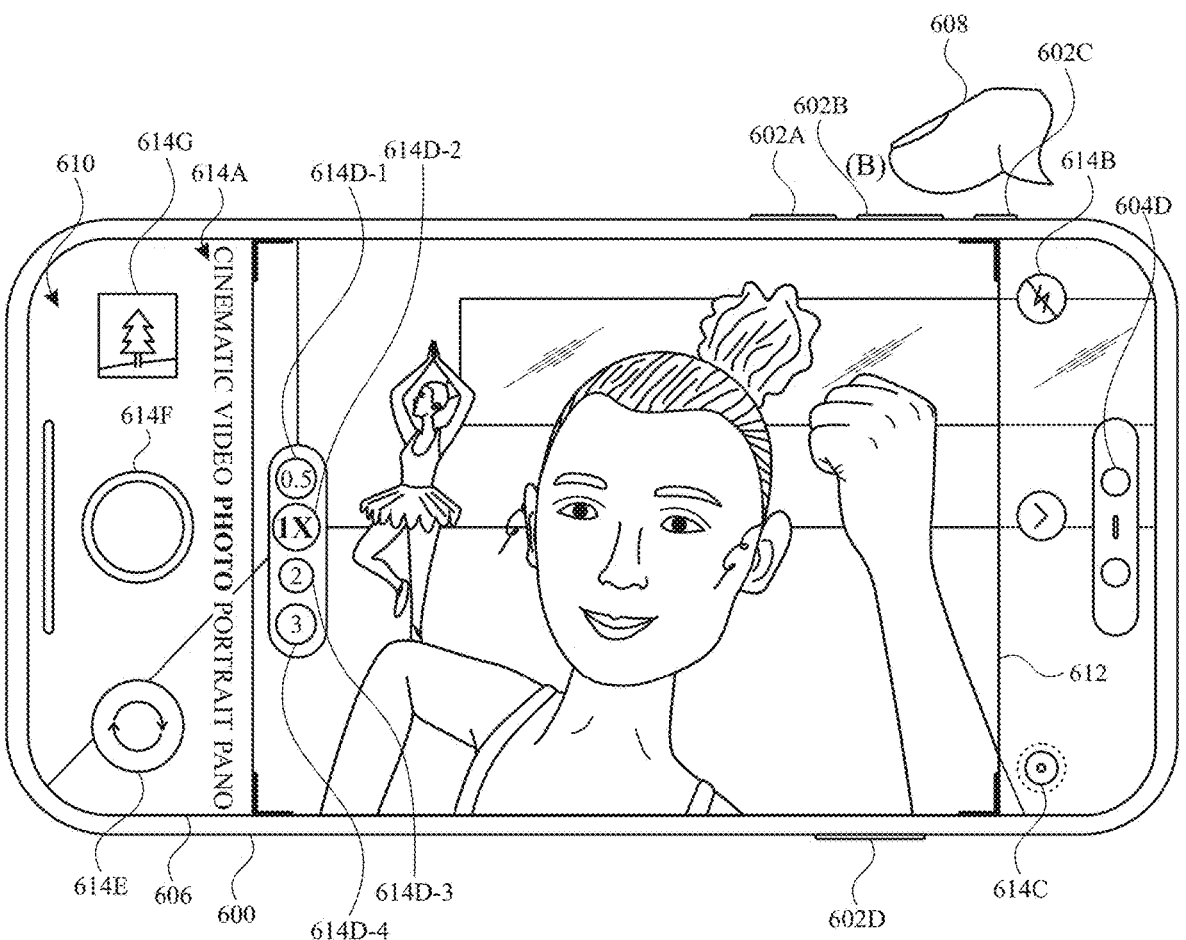

FIGS. 6A and 6C illustrate computer system 600 (e.g., a mobile phone device), viewed from the back (e.g., FIG. 6A) and from the front (e.g., FIG. 6C). Computer system 600 includes a set of hardware buttons including first button 602A, second button 602B, third button 602C, and fourth button 602D; a set of cameras including first camera 604A, second camera 604B, third camera 604C, and fourth camera 604D; and a display 606 including a touch-sensitive surface. As illustrated in FIG. 6C, first button 602A, second button 602B, and third button 602C are arranged outside of display 606 on one edge of computer system 600 and fourth button 602D is arranged outside of display 606 on a different edge of computer system 600. In some embodiments, the set of hardware buttons may include different numbers of buttons, different arrangements of buttons, different types of buttons (e.g., mechanical and/or solid-state buttons, described in further detail with respect to FIG. 6B), and/or compound buttons (e.g., one or more independently-operable buttons combined into a compound form or housing). As illustrated in FIGS. 6A and 6C, first camera 604A, second camera 604B, and third camera 604C are visible on the backside of the device and fourth camera 604D is visible on the front side of the device. In some embodiments, the set of cameras may include different numbers of cameras, different arrangements of cameras, and/or different types of cameras (e.g., including one or more wide-angle lenses, one or more telephoto lenses, one or more macro lenses, and/or one or more other lenses of varying geometries (e.g., 22 mm, 24 mm, and/or 28 mm)). In some embodiments, computer system 600 includes one or more sensors, such as light sensors, depth sensors, motion sensors, and/or audio sensors. In some embodiments, the methods described herein using computer system 600 are implemented using (e.g., in conjunction with computer system 600) one or more user devices (e.g., mobile phones, tablet computers, laptop computers, and/or wearable electronic devices (e.g., smart watches)), remote devices (e.g., servers and/or network-connected devices), and/or peripheral devices (e.g., external storage drives, microphones, speakers, and/or hardware input devices). In some embodiments, computer system 600 includes one or more features of devices 100, 300, or 500 (e.g., the set of cameras can include optical sensor 164).

FIG. 6B illustrates exemplary hardware button states (A)-(E) that can be detected by computer system 600 via the set of hardware buttons (e.g., first button 602A, second button 602B, third button 602C, and/or fourth button 602D). The top panel (I) illustrates an embodiment including a pressure-sensitive button that does not physically depress when pressure is applied by a user (e.g., a solid-state button), and the bottom panel (II) illustrates an embodiment including a mechanical button, which physically depresses when pressure is applied by a user (e.g., by the user's finger 608). In some embodiments, a pressure-sensitive button that does not physically depress (e.g., a solid-state button) includes one or more haptic output generators that create the sensation of physically depressing the button by different amounts (e.g., as illustrated in bottom panel (II)) without the button actually moving (e.g., as illustrated in top panel (I)). In some embodiments, the solid-state button and/or the mechanical button include one or more pressure sensors, one or more capacitive (e.g., touch) sensors, and/or one or more intensity sensors (e.g., as described with respect to FIGS. 5C-5D). In some embodiments, computer system 600 may detect hardware button states (A)-(E) based on touch proximity, the directly-measured applied pressure, and/or the amount of physical (e.g., mechanical) depression of a button. In some embodiments, the pressure thresholds and depression thresholds described below may correspond to the same states of the hardware button, for example, such that applying the threshold pressure values $P_M$, $P_A$, and/or $P_F$ physically depresses a hardware button to the respective depression levels $T_M$, $T_A$, and/or $T_F$.

As illustrated in FIG. 6B, computer system 600 detects hardware button state (A) when a user is not using or pressing the hardware button. Accordingly, as illustrated in bottom panel (II), in hardware button state (A), the mechanical button is not (e.g., 0%) physically depressed (e.g., the mechanical button is in a "rest" position). Computer system 600 detects hardware button state (B) when finger 608 is detected (e.g., using the one or more capacitive sensors) near (e.g., hovering over) or resting on (e.g., touching, but not pressing) the button. As illustrated in bottom panel (II), in hardware button state (B), the mechanical button remains in the rest position. In some embodiments, computer system 600 may detect hardware button state (B) when less than a maintenance pressure threshold $P_M$ (e.g., 5 g/cm$^2$, 10 g/cm$^2$, 16 g/cm$^2$, or 20 g/cm$^2$) is detected (e.g., using the one or more pressure sensors) and/or when a mechanical button is physically depressed less than a maintenance depression threshold $T_M$ (e.g., the least-depressed state illustrated in bottom panel (II); e.g., 2% depressed, 5% depressed, 10% depressed, or 18% depressed).

Computer system 600 detects hardware button state (C) when the user begins to press the hardware button. In some embodiments, computer system 600 detects hardware button state (C) when a user applies pressure $P_{(C)}$ to the button, where $P_{(C)}$ is less than an activation pressure threshold $P_A$ (e.g., 25 g/cm², 50 g/cm², 75 g/cm², 82 g/cm², or 100 g/cm²) and, in some embodiments, greater or equal to than the maintenance pressure threshold $P_M$. In some embodiments, computer system 600 detects hardware button state (C) when a mechanical button is physically depressed less than an activation depression threshold $T_A$ (e.g., the partially-depressed state illustrated in bottom panel (II); e.g., 15% depressed, 30% depressed, 40% depressed, 43% depressed, or 50% depressed) and, in some embodiments, physically depressed to at least the maintenance depression threshold $T_M$.

Computer system 600 registers a "light" or "partial" press (e.g., a first type of button press) of the hardware button when computer system 600 detects hardware button state (D). In some embodiments, computer system 600 detects hardware button state (D) when a user applies pressure $P_{(D)}$ to the button, where $P_{(D)}$ is less than a hard-press pressure threshold $P_H$ (e.g., 75 g/cm², 100 g/cm², 123 g/cm², or 150 g/cm²) and greater than or equal to the activation pressure threshold $P_A$. In some embodiments, computer system 600 detects hardware button state (D) when a mechanical button is physically depressed less than a hard-press depression threshold $T_H$ (e.g., the mostly-depressed state illustrated in bottom panel (II); e.g., 65% depressed, 72% depressed, 80% depressed, or 90% depressed) and physically depressed to at least the activation depression threshold $T_A$. In some embodiments, once computer system 600 detects hardware button state (D) (e.g., "activating" the light/partial button press), computer system 600 will register hardware button state (C) (e.g., "maintaining" the light/partial button press) as a continued or maintained light/partial press (e.g., the first type of button press), for instance, until computer system 600 detects one of hardware button state (A), hardware button state (B) (e.g., releasing the light/partial button press), or hardware button state (E) (e.g., transitioning to a hard/full press, as described below). For example, once the user has activated a light/partial press by pressing a button with more than the activation pressure threshold $P_A$ and/or beyond the activation depression threshold $T_A$, the user can maintain the light/partial press with a lighter touch, as long as the button is still pressed with more than the maintenance pressure threshold $P_M$ and/or beyond the maintenance depression threshold $T_M$. In some embodiments, presses meeting a light press intensity threshold (e.g., as described above with respect to FIGS. 5C-5D) may be registered as light/partial-type button presses (for example, a light press intensity may correspond to hardware button state (C) and/or hardware button state (D)). As used herein, a light/partial press corresponds to a light press and/or a partial press, and a hard/full press corresponds to a hard and/or full press.

Computer system 600 registers as a "hard" or "full" press (e.g., a second type of button press) when computer system 600 detects hardware button state (E). In some embodiments, computer system 600 detects hardware button state (E) when a user applies pressure $P_{(E)}$ to the button, where $P_{(E)}$ is greater than or equal to the hard-press pressure threshold $P_H$, and/or when a mechanical button is physically depressed to at least the hard-press depression threshold $T_H$. In some embodiments, if computer system 600 detects hardware button state (E) less than a threshold duration of time (e.g., 0.1, 0.25 s, 0.5 s, 1 s, or 2 s) after detecting hardware button state (D), computer system 600 registers hardware button state (E) as a "quick" hard/full press and, in some embodiments, does not register or respond to the detection of hardware button state (D) as a light/partial press. For example, a user can provide a hard/full press without necessarily activating a light/partial press by quickly increasing pressure from activation pressure threshold $P_A$ to hard-press pressure threshold $P_H$ and/or quickly depressing the button from activation depression threshold $T_A$ to hard-press depression threshold $T_H$. In some embodiments, presses meeting a deep press intensity threshold (e.g., as described above with respect to FIGS. 5C-5D) may be registered as hard/full-type button presses (for example, a deep press intensity may correspond to hardware button state (E)).

At FIG. 6C, computer system 600 displays, via display 606, camera user interface 610 (e.g., a user interface for a camera application). In some embodiments, the appearance of camera user interface 610 illustrated in FIG. 6C is a "default" or "standard" appearance or configuration for a standard photo capture mode. As illustrated in FIG. 6C, camera user interface 610 includes camera preview 612, a representation of a portion of the environment captured by (e.g., included in the field-of-view of) first camera 604A, second camera 604B, third camera 604C, and/or fourth camera 604D that would currently be included in a media capture taken using camera user interface 610. In some embodiments, while displaying camera preview 612, in addition to capturing image data using the one or more cameras, computer system 600 detects (e.g., samples) additional sensor data, such as audio data (e.g., using one or more microphones) and/or depth information (e.g., using one or more depth sensors, such as structural light sensors and/or time-of-flight sensors (e.g., LIDAR and/or ultrasonic sensors), and/or using two or more of the cameras as stereoscopic camera sensors). In some embodiments, computer system 600 may detect depth information in response to particular user inputs (e.g., light/partial press 618 of second button 602B and/or an input selecting a portrait photo capture mode or cinematic video capture mode via capture mode affordance 614A, as described in further detail below) and/or particular conditions (e.g., when a particular subject is detected in camera preview 612), or may detect depth information by default (e.g., an "always on" sensor) while displaying camera preview 612.

As illustrated in FIG. 6C, camera user interface 610 includes touch controls 614A-614G for navigating, using, assisting with, and/or changing settings of the camera user interface via the touch-sensitive surface of display 606. Capture mode affordance 614A is a menu (e.g., a sliding toolbar) for selecting between capture modes including a standard photo capture mode (e.g., a mode for capturing photo media that are not designated for display with synthetic depth-of-field effects), a portrait capture mode (e.g., a mode for capturing photo media that are designated for display with synthetic depth-of-field effects, lighting effects, and/or other post-processing effects), a panoramic photo capture mode (e.g., a mode for capturing photos from different positions and/or angles that are stitched together to create a single, larger form-factor image), a standard video capture mode (e.g., a mode for capturing video media that are not designated for display with synthetic depth-of-field effects), and/or a cinematic video capture mode (e.g., a mode for capturing video media that are designated for display with synthetic depth-of-field effects, lighting effects, and/or other post-processing effects). Camera flash affordance 614B is a software button for selecting a camera flash mode (e.g., on, off, or automatic). Multi-frame photo affordance 614C is a software button for toggling between capturing single-frame/still photo capture and capturing photo media with a limited duration (e.g., 1, 3, and/or 5 seconds), for example, including content from before and/or after a capture input is detected that can be displayed in sequence for a "live" effect. Zoom affordance 614D is a menu (e.g., a platter of multiple software buttons) for changing the capture magnification and/or switching between cameras/lenses with different magnification, including menu item 614D-1 corresponding to 0.5× zoom, menu item 614D-2 corresponding to 1× zoom, menu item 614D-3 corresponding to 2× zoom, and menu item 614D-4 corresponding to 3× zoom. Camera selection affordance 614E is a software button for switching between capture using a front-facing (e.g., environment-facing) camera (e.g., first camera 604A, second camera 604B, and/or third camera 604C) and using a back-facing (e.g., user-facing) camera (e.g., fourth camera 604D). Shutter affordance 614F is a software button that can be selected to initiate the capture of media. Captured media icon 614G is a selectable thumbnail icon that previews captured media and can be selected to view captured media (e.g., in a media viewing or media library user interface). As indicated by capture mode affordance 614A, where the "PHOTO" menu item is centered and visually emphasized (e.g., bolded), at FIG. 6C, camera user interface 610 is in a standard photo capture mode, for example, a mode for capturing still or multi-frame photo media that are not designated for display with synthetic depth-of-field effects, lighting effects, and/or other post-processing effects.

At FIG. 6C, the user's finger 608 is hovering over but not pressing second button 602B, placing second button 602B into hardware button state (B) (e.g., as described with respect to FIG. 6B), which computer system 600 does not register as a button press (e.g., neither a light/partial or hard/full button press). Accordingly, at FIG. 6D, computer system 600 continues to display camera user interface 610 with touch controls 614A-614G. Likewise, computer system 600 does not register any button press (e.g., either light/partial or hard/full) at FIG. 6D, as second button 602B is in hardware button state (C). For example, at FIG. 6D, the user's finger 608 has not applied more than activation pressure threshold $P_A$ to second button 602B and/or depressed second button 602B beyond activation depression threshold $T_A$. Accordingly at FIG. 6E, computer system 600 continues to display camera user interface 610 with the same displayed touch controls 614 described with respect to FIG. 6C.

Figures 6D, 6E:
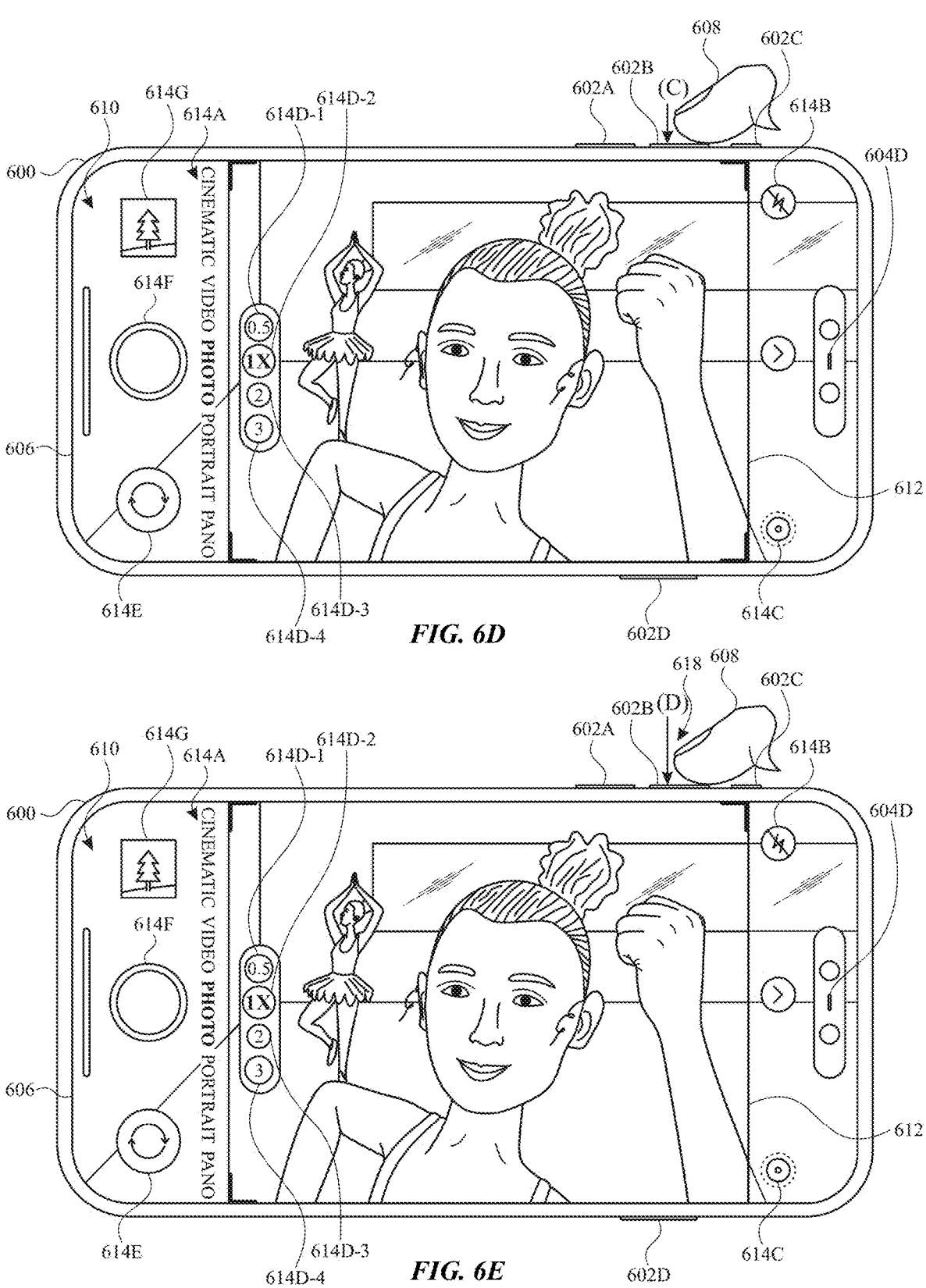
Figures 6F, 6G:
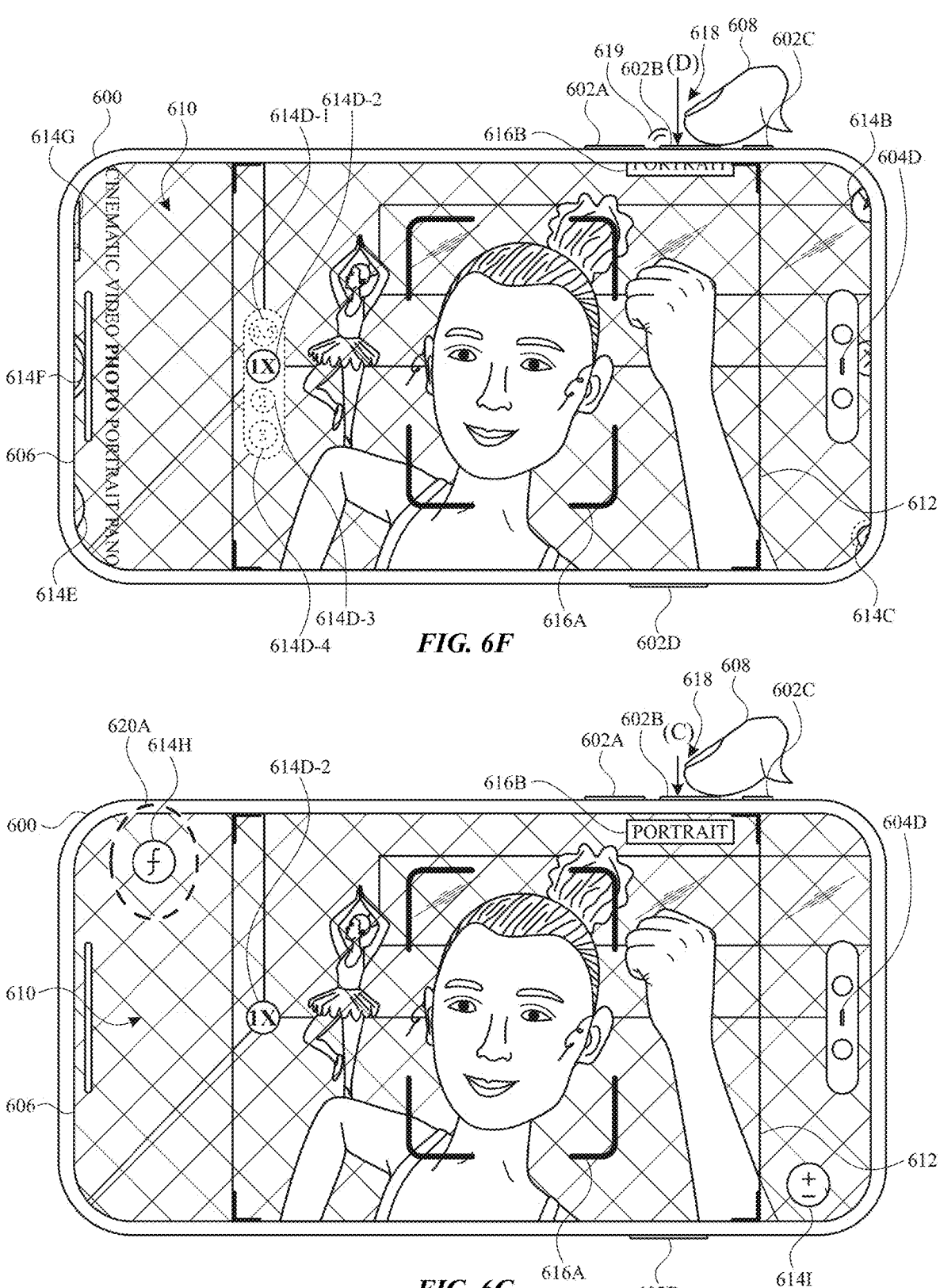

At FIG. 6E, computer system 600 detects that second button 602B is in hardware button state (D). For example, at FIG. 6E, the user's finger 608 is applying at least the activation pressure threshold $P_A$ to second button 602B and/or depressing second button 602B to at least the activation depression threshold $T_A$. In some embodiments, computer system 600 detects that second button 602B remains in hardware button state (D) (or, in some embodiments, hardware button state (C) (e.g., maintaining an activated light/partial press)) for at least the threshold period of time without transitioning to hardware button state (E). Accordingly, computer system 600 registers light/partial press 618 of second button 602B, and, at FIG. 6F, provides tactile output 619 (e.g., a haptic response, such as a vibration or other sensation) indicating the detection of light/partial press 618 to the user. For example, tactile output 619 may create the sensation of lightly depressing second button 602B, even if second button 602B is a solid-state button that does not physically move. Although haptic output 619 is illustrated as being localized to second button 602B, in some embodiments, computer system 600 may localize haptic outputs elsewhere and/or provide a non-localized haptic output (e.g., an all-over vibration). As illustrated in FIGS. 6F-6J, after detecting that second button 602B is in hardware button state (D) (e.g., after the user "activates" light/partial press 618 by applying at least the activation pressure threshold $P_A$ and/or depresses second button 602B to at least the activation depression threshold $T_A$), computer system 600 continues to register light/partial press 618 of second button 602B as long as computer system 600 detects that hardware button 602B is in either hardware button state (D) (e.g., the "activation" state) or hardware button state (C) (e.g., the "maintenance" state). Accordingly, the user can maintain or hold light/partial press 618 with a slightly lighter touch after the initial activation is detected at FIG. 6E.

In response to light/partial press 618 of second button 602B, at FIG. 6F, computer system 600 applies a synthetic (e.g., simulated) depth-of-field effect to camera preview 612. For example, the synthetic depth-of-field effect simulates the depth-of-field of a camera or lens with a particular aperture setting (e.g., an f-stop value, which defines a ratio between the focal length of a photographic lens and the aperture size, such as f/1.4, f/2.8, or f/8), such that portions of the environment within the simulated depth-of-field's range (e.g., the current focal plane or focal range) appear in focus (e.g., sharp) in camera preview 612, while portions of the environment outside of the simulated depth-of-field's range appear out of focus (e.g., blurry), represented in FIG. 6F by crosshatching over the out-of-focus portions. As illustrated in FIG. 6F, the synthetic depth-of-field effect is applied such that the person in camera preview 612 (e.g., a detected subject indicated by subject indicator 616A, as described in further detail below) remains in focus. In some embodiments, the synthetic depth-of-field effect is simulated using depth information captured by computer system 600. In some embodiments, the synthetic depth-of-field effect displayed in response to light/partial press 618 would also be applied when camera user interface 610 is in a portrait photo capture mode or cinematic video capture mode (e.g., in response to the user selecting "Portrait" or "Cinematic" from capture mode affordance 614A). Accordingly, the synthetic depth-of-field effect can be previewed using a light/partial press of second button 602B even while camera user interface 610 is in a standard photo or video capture mode (e.g., without switching the mode of camera user interface 610 using a touch input of capture mode affordance 614A).

In response to light/partial press 618 of second button 602B, at FIG. 6F, computer system 600 additionally updates the display of camera user interface 610, for example, transitioning camera user interface 610 to a "quiet" or "ready-to-capture" appearance for photo capture. In particular, computer system 600 removes capture mode affordance 614A, camera flash affordance 614B, multi-frame photo affordance 614C, zoom affordances 614D-1, 614D-3, and 614D-4, camera selection affordance 614E, shutter affordance 614F, and captured media icon 614G from camera user interface 610. As illustrated in FIGS. 6F-6G, computer system 600 displays (e.g., animates) capture mode affordance 614A, camera flash affordance 614B, multi-frame photo affordance 614C, camera selection affordance 614E, shutter affordance 614F, and captured media icon 614G shifting off of display 606 and displays zoom affordances 614D-1, 614D-3, and 614D-4 fading out. Once removed from display 606, the removed touch controls can no longer be used to control their associated settings/functions (e.g., touch inputs detected at locations of display 606 where the removed touch controls were previously-displayed will not select or actuate the removed touch controls). Additionally, computer system 600 displays (e.g., adds) new touch controls in camera user interface 610, including f-stop affordance 614H (e.g., a software button that can be selected to toggle display of the synthetic depth-of-field effect and/or to change the simulated f-stop setting, as described in further detail below) and exposure affordance 614I (e.g., a software button that can be selected to change a capture exposure setting). In some embodiments, f-stop affordance 614H and exposure affordance 614I may appear, shift in, or fade in before, while, or after capture mode affordance 614A, camera flash affordance 614B, multi-frame photo affordance 614C, zoom affordances 614D-1, 614D-3, and 614D-4, camera selection affordance 614E, shutter affordance 614F, and captured media icon 614G fade out and/or shift away.

Figures 6H, 6I:
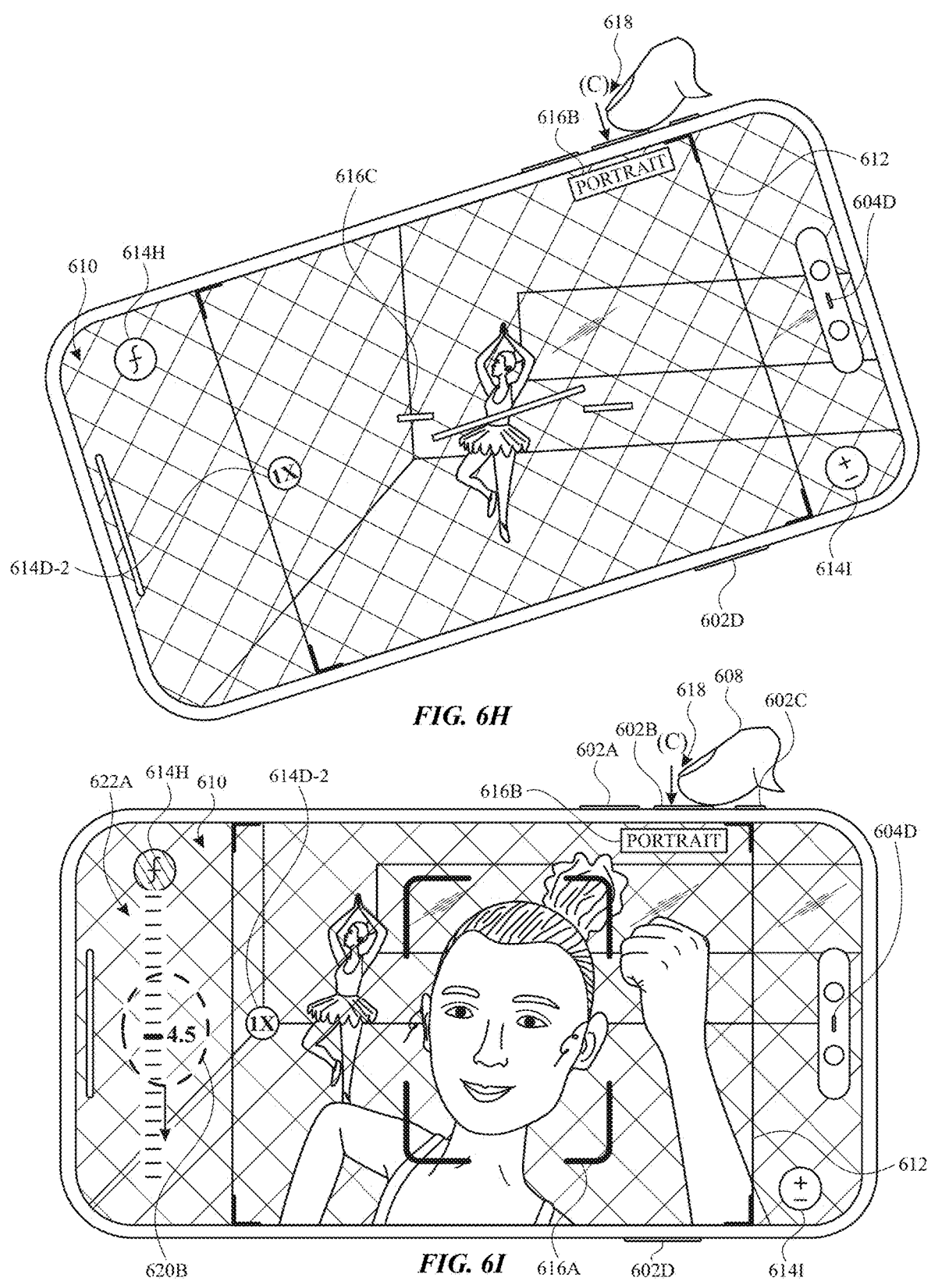

As illustrated in FIGS. 6F-6H, in addition to changing the displayed touch controls 614, in response to light/partial press 618 of second button 602B, computer system 600 displays indicator elements 616 including subject indicator 616A, mode indicator 616B, and/or level indicator 616C. As illustrated in FIGS. 6F-6G, subject indicator 616A indicates the person in the midground of camera preview 612 as a media capture subject. In some embodiments, computer system 600 displays subject indicator 616A in response to detecting the person in the midground of camera preview 612 as a media capture subject, for example, using sensor data and/or image processing techniques. In some embodiments, if computer system 600 does not detect a particular subject (e.g., a face, person, and/or pet of at least a particular size in camera preview 612), computer system 600 does not display subject indicator 616A. For example, as illustrated in FIG. 6H, where camera preview 612 only includes a person in the background. In some embodiments, the media capture subject indicated by subject indicator 616A is located within the simulated focal range of the synthetic depth-of-field effect, such that the media capture subject remains in focus in capture preview 612.

At FIGS. 6F-6G, computer system 600 displays (e.g., animates) mode indicator 616B, a text banner reading "Portrait" indicating that a preview of the portrait capture mode synthetic depth-of-field effect is being applied to camera preview 612. As illustrated in FIGS. 6F-6G, computer system 600 displays mode indicator 616B shifting into the display from the edge of display 606 where second button 602B is located, appearing as if light/partial press 618 of second button 602B physically "pushes" mode indicator 616B into display 606 from the edge directly below second button 602B. As illustrated in FIG. 6G, computer system 600 displays mode indicator 616B proximate to second button 602B, for example, displaying mode indicator 616B close to the edge of display 606 directly below second button 602B and closer to second button 602B than other elements of camera user interface 610.

As illustrated in FIG. 6H, level indicator 616C represents the current misalignment between the orientation of camera preview 612 and the target orientation. For example, as illustrated in FIG. 6H, level indicator 616C includes an inner portion that computer system 600 aligns with camera preview 612 (e.g., the capture orientation) and an outer portion that computer system 600 aligns with the horizon of the environment (e.g., the target orientation), such that the inner portion and outer portion align with each other when camera preview 612 is level with the horizon. In some embodiments, computer system 600 displays level indicator 616C in response to light/partial press 618 if computer system 600 detects (e.g., using one or more motion and/or orientation sensors) a change in orientation that tilts the camera preview more than a threshold amount (e.g., 0.5°, 1°, 2°, 5°, or 7°) with respect to a target orientation (e.g., the horizon of the environment). In some embodiments, if computer system 600 detects that the orientation is tilted less than a threshold amount (e.g., as illustrated in FIGS. 6F-6G), computer system 600 does not display (and/or ceases displaying) level indicator 616C in response to light/partial press 618. In some embodiments, if computer system detects a particular subject (e.g., a face, person, or pet of at least a particular size in camera preview 612), computer system 600 will suppress the display of level indicator 616C (e.g., even if camera preview 612 is misaligned with the horizon of the environment by more than the threshold amount).

At FIG. 6G, computer system 600 detects input 620A, for example, a long touch input directed to the location of f-stop affordance 614H on display 606. In response to detecting input 620A, at FIG. 6I, computer system 600 displays expanded f-stop affordance 622A, a slider for adjusting the simulated f-stop value of the synthetic depth-of-field effect. As illustrated in FIG. 6I, the current f-stop value is f/4.5. At FIG. 6I, computer system 600 detects input 620B, for example, a gesture input moving across expanded f-stop affordance 622A in the downward direction. In response to detecting input 620B, at FIG. 6J, computer system 600 adjusts the simulated f-stop value to f/2.8. Accordingly, the synthetic depth-of-field effect applied to camera preview 612 updates to simulate a shallower depth-of-field, blurring more of the foreground and background of camera preview 612 and/or blurring portions of the foreground and background more (e.g., with a greater blur radius) than for the previous simulated f-stop value of f/4.5, represented in FIG. 6J by the denser crosshatching of camera preview 612. In some embodiments, computer system 600 continues to display expanded f-stop affordance 622A until input 620B is released (e.g., lifted from display 606), allowing the user to continue adjusting the f-stop setting even if light/partial press 618 of second button 602B is ended/released. In some embodiments, similar to the display of expanded f-stop affordance 622A, in response to detecting an input (e.g., a touch, tap, gesture, air gesture, and/or gaze input) directed to the location of exposure affordance 616I, computer system displays expanded exposure affordance 622B, a slider for adjusting (e.g., as described with respect to expanded f-stop affordance 622A) a capture exposure value (e.g., adjusting media capture brightness, for example, by simulating different camera shutter speeds, aperture sizes, and/or ISO speeds), for example, as illustrated in the side panel of FIG. 6J.

Figures 6J, 6K:
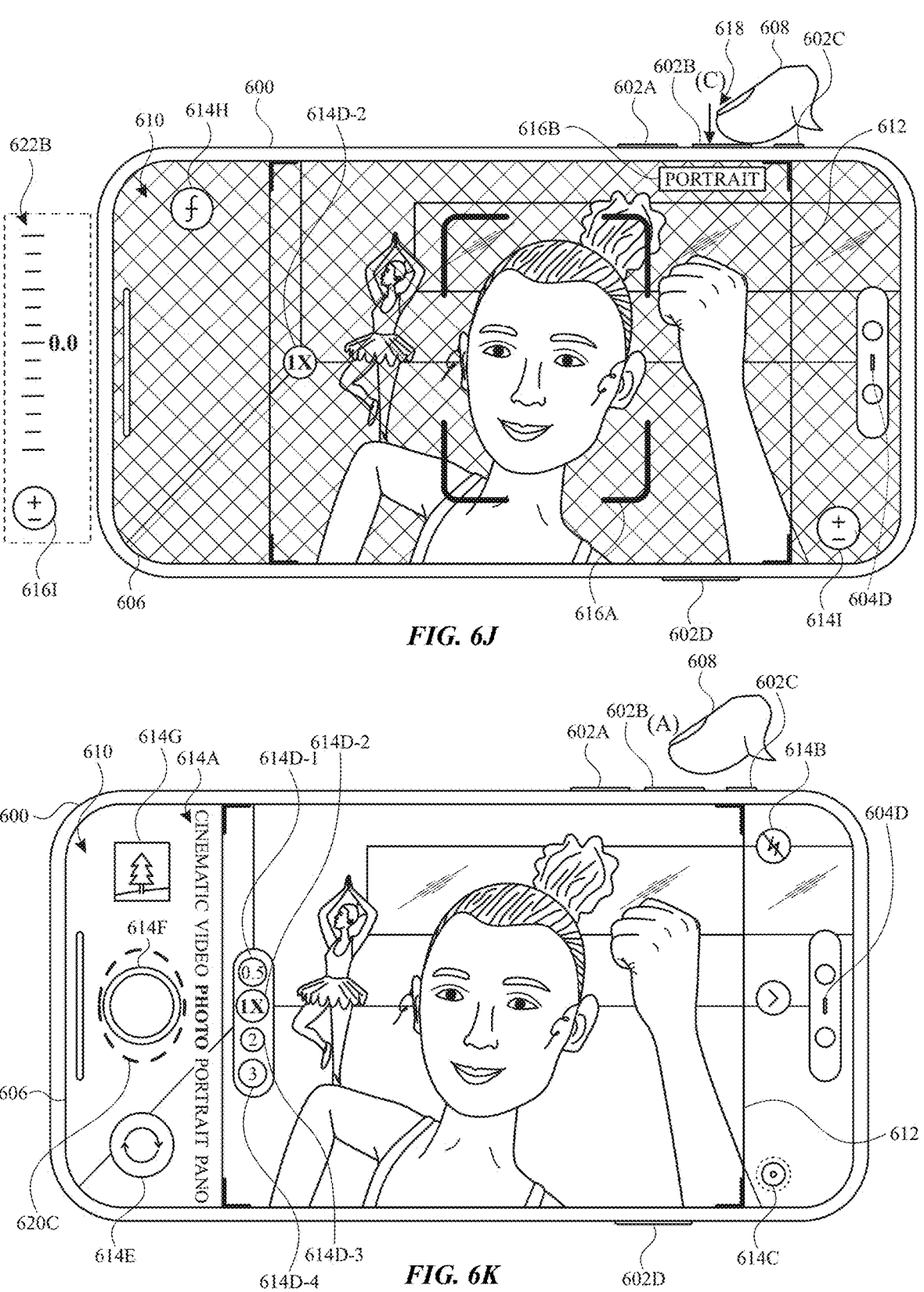

At FIG. 6K, computer system 600 detects that second button 602B is in hardware button state (A), for instance, due to the user lifting finger 608 off of second button 602B. Accordingly, at FIG. 6K, computer system 600 registers the end of light/partial press 618 (e.g., light/partial press 618 is no longer maintained/held). As illustrated in FIG. 6K, in response to detecting that second button 602B is in hardware button state (A), computer system 600 displays camera preview 612 without applying the synthetic depth-of-field effect, and additionally updates the display of camera user interface 610, reverting back to the default/standard appearance described with respect to FIG. 6C. In particular, computer system 600 removes (e.g., fades out, shifts off, and/or stops displaying, as described above with respect to FIGS. 6F-6G) f-stop affordance 614H and exposure affordance 616I and displays (e.g., fades and/or shifts in, as described above with respect to FIGS. 6F-6G) capture mode affordance 614A, camera flash affordance 614B, multi-frame photo affordance 614C, zoom affordances 614D-1, 614D-3, and 614D-4, camera selection affordance 614E, shutter affordance 614F, and captured media icon 614G. Once removed from display 606, f-stop affordance 614H and exposure affordance 614I (and likewise expanded f-stop affordance 622A and/or expanded exposure affordance 622B) are no longer available as touch controls (e.g., inputs directed to the locations where f-stop affordance 614H and exposure affordance 614I were displayed in FIGS. 6G-6K can no longer be used to adjust the corresponding settings). Additionally, computer system 600 stops displaying indicator elements 616 (e.g., subject indicator 616A, mode indicator 616B, and/or level indicator 616C).

At FIG. 6K, computer system 600 detects input 620C, for example, a tap input directed to the location of shutter affordance 614F on display 606. In response to detecting input 620C, computer system 600 performs a photo media capture. In some embodiments, the photo media capture includes capturing single-frame (e.g., still) photo media, and in some embodiments, the photo media capture includes capturing photo media of a limited duration (e.g., 1, 3, and/or 5 seconds). For example, the photo media of limited duration may include performing a multi-frame capture, which may include content (e.g., image data, audio data, and/or depth information) captured (e.g., buffered) before and/or after detecting input 620C, which can be displayed in sequence to create a "live" effect. Although input 620C is a tap input directed to the region of display 606 where expanded f-stop affordance 622A was previously displayed (e.g., in FIG. 6I), computer system 600 does not adjust the simulated f-stop value in response to input 620C, as light/partial press 618 was released and camera user interface 610 was returned to its default/standard appearance (e.g., without f-stop affordance 614H, exposure affordance 614I, expanded f-stop affordance 622A and/or expanded exposure affordance 622B).

Figures 6L, 6M:
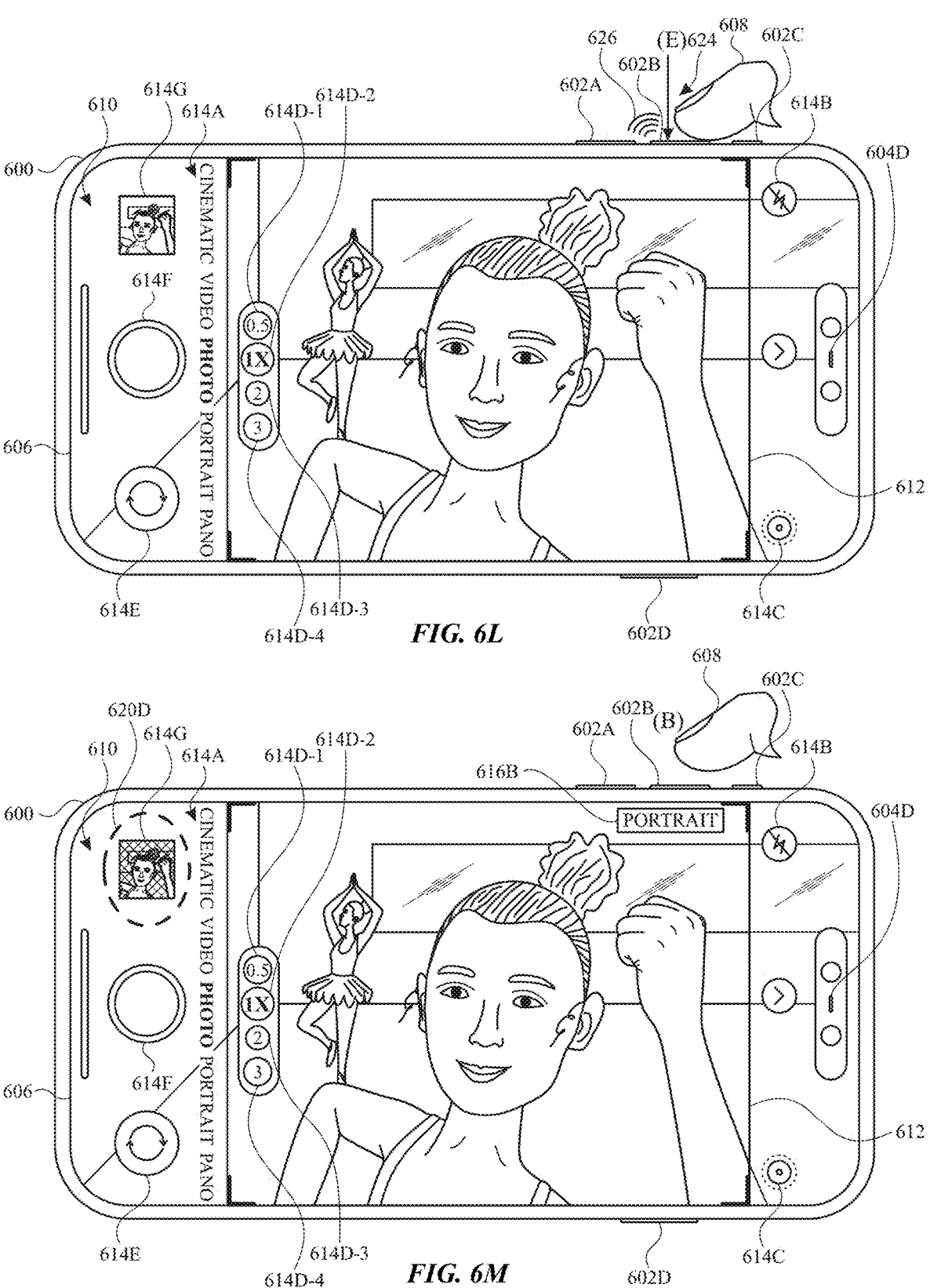

Upon performing the photo media capture, computer system updates captured media icon 614G as illustrated in FIG. 6L to show a thumbnail of the captured photo media. In some embodiments, in contrast to the response to light/partial press 618, computer system 600 does not display the synthetic depth-of-field effect applied to camera preview 612, change the displayed controls 614, and/or display indicator elements 616 in response to input 620C (e.g., when performing a photo media capture via a touch input at shutter affordance 614F). In some embodiments, computer system 600 does not designate the media captured in response to input 620C to be displayed with the synthetic depth-of-field effect when performing the photo media capture via touch input at shutter affordance 614F while camera user interface 610 is in the standard photo capture mode. As illustrated in FIG. 6L, computer system 600 updates captured media icon 614G to include the thumbnail of the photo media, which is displayed without a synthetic depth-of-field effect.

At FIG. 6L, computer system 600 detects that second button 602B is in hardware button state (E), and accordingly, computer system 600 registers hard/full press 624 of second button 602B and provides tactile output 626 indicating the detection of hard/full press 624 to the user. In some embodiments, tactile output 626 creates a different sensation than tactile output 619, for example, creating the sensation of fully depressing second button 602B (e.g., even if second button 602B is a solid-state button).

In response to detecting hard/full press 624 of second button 602B, computer system 600 performs a portrait media capture, capturing still and/or "live" photo media that is designated for display with a synthetic depth-of-field effect applied. In some embodiments, computer system 600 captures depth information in response to hard/full press 624 (e.g., for use in applying the synthetic depth-of-field effect). In particular, the portrait media captured in response to detecting hard/full press 624 of second button 602B is designated for display with the synthetic depth-of-field effect previewed and adjusted via light/partial press 618 in FIG. 6J (e.g., applying the synthetic depth-of-field effect to the captured media with a simulated f-stop value of f/2.8). Accordingly, second button 602B can be used to preview/adjust media capture settings (e.g., via a light/partial press) and to capture portrait photo media (e.g., via a hard/full press) even while camera user interface 610 is in the standard photo capture mode. In some embodiments, if computer system 600 detects second button 602B transitioning into hardware button state (E) from hardware button state (D) in under a threshold period of time, computer system 600 registers hard/full press 624 as a "quick" hard/full press. In response to a quick hard/full press of second button 602B, computer system 600 does not display the synthetic depth-of-field effect applied to camera preview 612, change the displayed controls 614, and/or display indicator elements 616 as it would in response to a light/partial press (e.g., as described with respect to FIG. 6F), despite second button 602B being momentarily placed into hardware button state (D). Additionally, computer system 600 does not provide a light press tactile output (e.g., such as tactile output 619) in response to a quick hard/full press (e.g., only providing tactile output 626). As illustrated in FIG. 6M, in response to hard/full press 624 and capturing the portrait media, computer system 600 updates captured media icon 614G to include a thumbnail of the captured portrait media, which is displayed with the synthetic depth-of-field effect applied, and displays mode indicator 616B, further indicating to the user that a portrait media capture was performed.

Figures 6N, 6O:
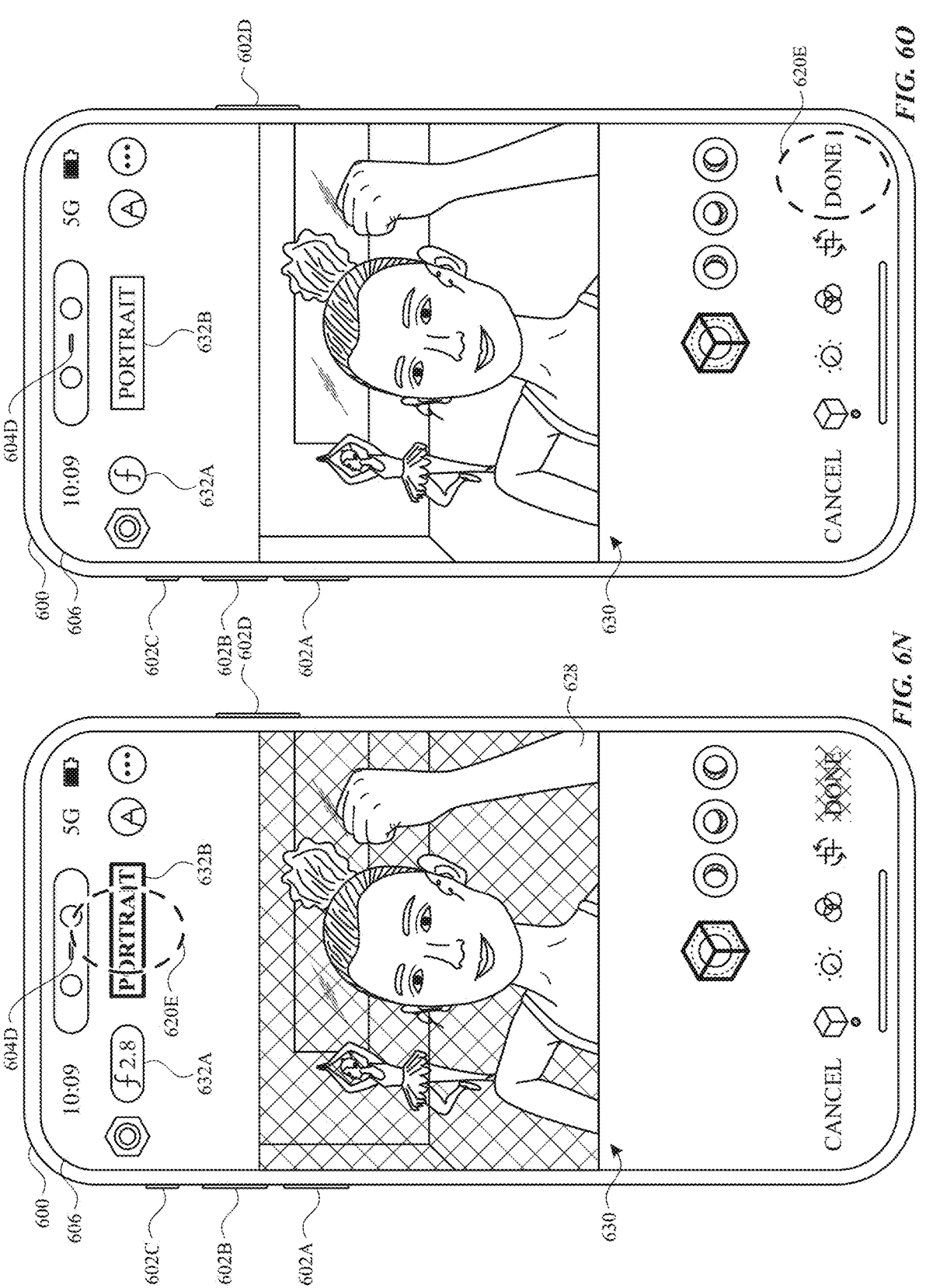

At FIG. 6M, computer system 600 detects input 620D, for example, a tap input directed to the location of captured media icon 614G on display 606. In response to detecting input 620D, at FIG. 6N, computer system 600 displays media item 628, the portrait media captured in response to hard/full press 624 of second button 602B, in media user interface 630 (e.g., a media library and/or media editing application). As discussed above, media captured using a hard/full press of second button 602B is designated for display with the synthetic depth-of-field effect, so at FIG. 6N, computer system 600 displays media item 628 with the synthetic depth-of-field effects applied. In particular, the synthetic depth-of-field effect applied to media item 628 has a simulated f-stop value of f/2.8, the f-stop value selected via expanded f-stop affordance 622A while previewing the synthetic depth-of-field effects via light/partial press 618. Media user interface 630 includes f-stop editing affordance 632A, which can be selected to adjust the simulated f-stop value for the synthetic depth-of-field effect (e.g., as described with respect to f-stop affordance 614H and expanded f-stop affordance 622A in FIG. 6I), and portrait mode affordance 632B, which can be selected to toggle whether media item 628 is designated for display with the synthetic depth-of-field effect (e.g., turning portrait mode off or on for media item 628). As illustrated in FIG. 6N, computer system 600 detects input 620E, for example, a tap input directed to portrait mode affordance 632B, and in response, at FIG. 6O, computer system 600 toggles off the portrait mode, displaying media item 628 without the synthetic depth-of-field effect applied. In response to input 620E (e.g., a tap input) requesting to finalize edits to media item 628 (e.g., selecting a "done" affordance in media user interface 630), computer system 600 designates media item 628 for display without the synthetic depth-of-field effect, as seen in the thumbnail of media item 628 included in cap- tured media icon 614G illustrated in FIG. 6P.

Figures 6P, 6Q:
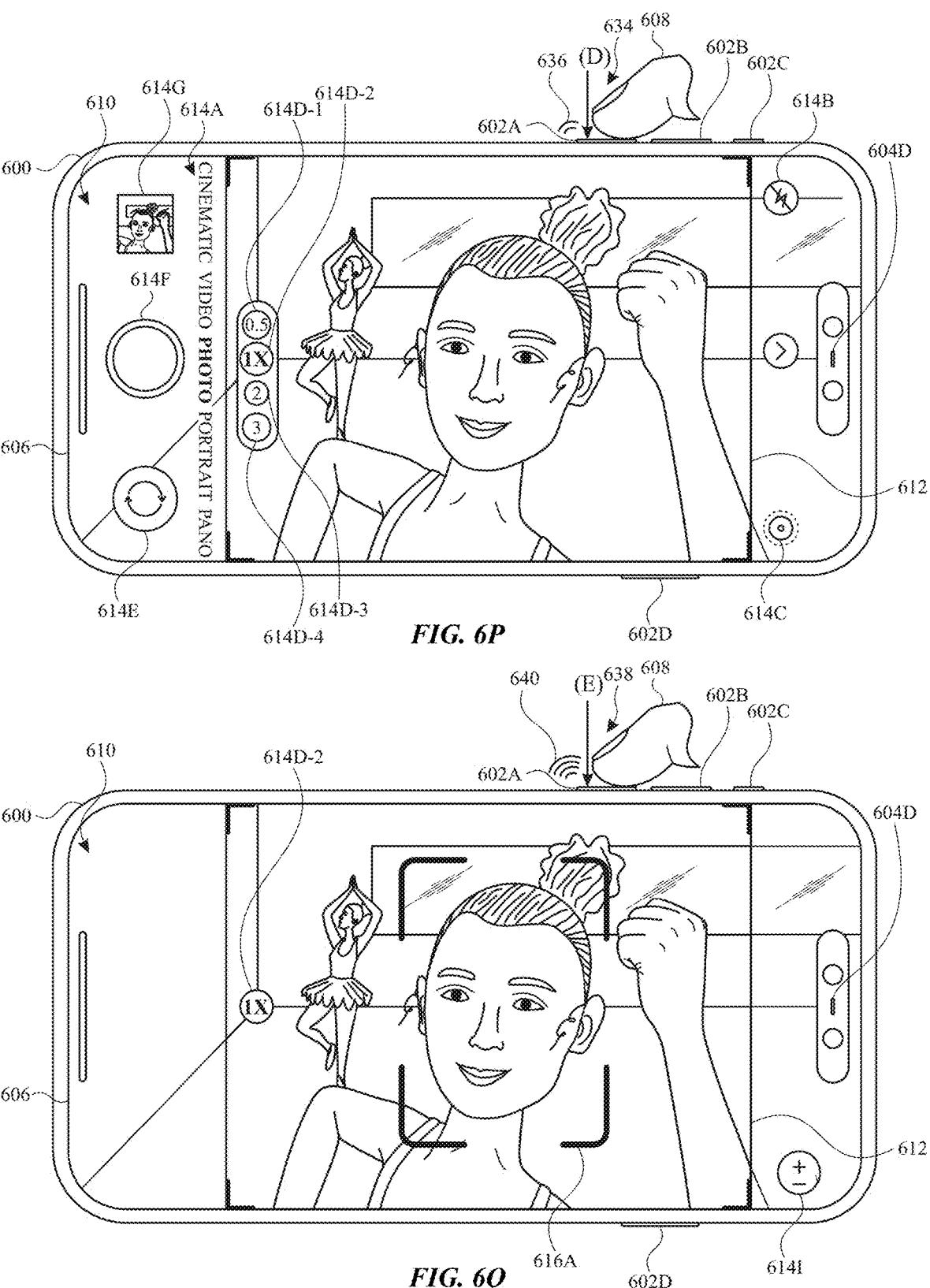

At FIG. 6P, while displaying camera user interface 610 in the standard photo capture mode as described with respect to FIG. 6C (e.g., with the default/standard appearance), com- puter system 600 detects that first button 602A is in hard- ware button state (D) (and, in some embodiments, that first button 602A remains in hardware button state (D) for at least the threshold period of time without transitioning to hard- ware button state (E)). Accordingly, computer system 600 registers light/partial press 634 of first button 602A, pro- vides tactile output 636 indicating the detection of light/ partial press 634 to the user (e.g., as described with respect to light/partial press 618 and tactile output 619). In response to detecting light/partial press 634 of first button 602A, computer system 600 updates the display of camera user interface 610 as illustrated in FIG. 6Q. In particular, com- puter system 600 removes capture mode affordance 614A, camera flash affordance 614B, multi-frame photo affordance 614C, zoom affordances 614D-1, 614D-3, and 614D-4, camera selection affordance 614E, shutter affordance 614F, and captured media icon 614G; adds exposure affordance 614I; and displays subject indicator 616A (and, in some embodiments, may display level indicator 616C as described with respect to FIG. 6H). In contrast to light/partial press 618 of second button 602B, computer system 600 does not apply the synthetic depth-of-field effects to camera preview 612, display f-stop affordance 614H (e.g., the affordance for adjusting/toggling the synthetic depth-of-field effect), or display mode indicator 616B (e.g., the portrait mode indi- cator) in response to light/partial press 624 of first button 602A. Accordingly, computer system 600 displays camera user interface 610 with a different quiet/ready-to-capture appearance in response to a light/partial press of first button 602A than the portrait capture mode preview displayed in response to a light/partial press of second button 602B (e.g., as described with respect to FIGS. 6F-6G).

Figures 6R, 6S:
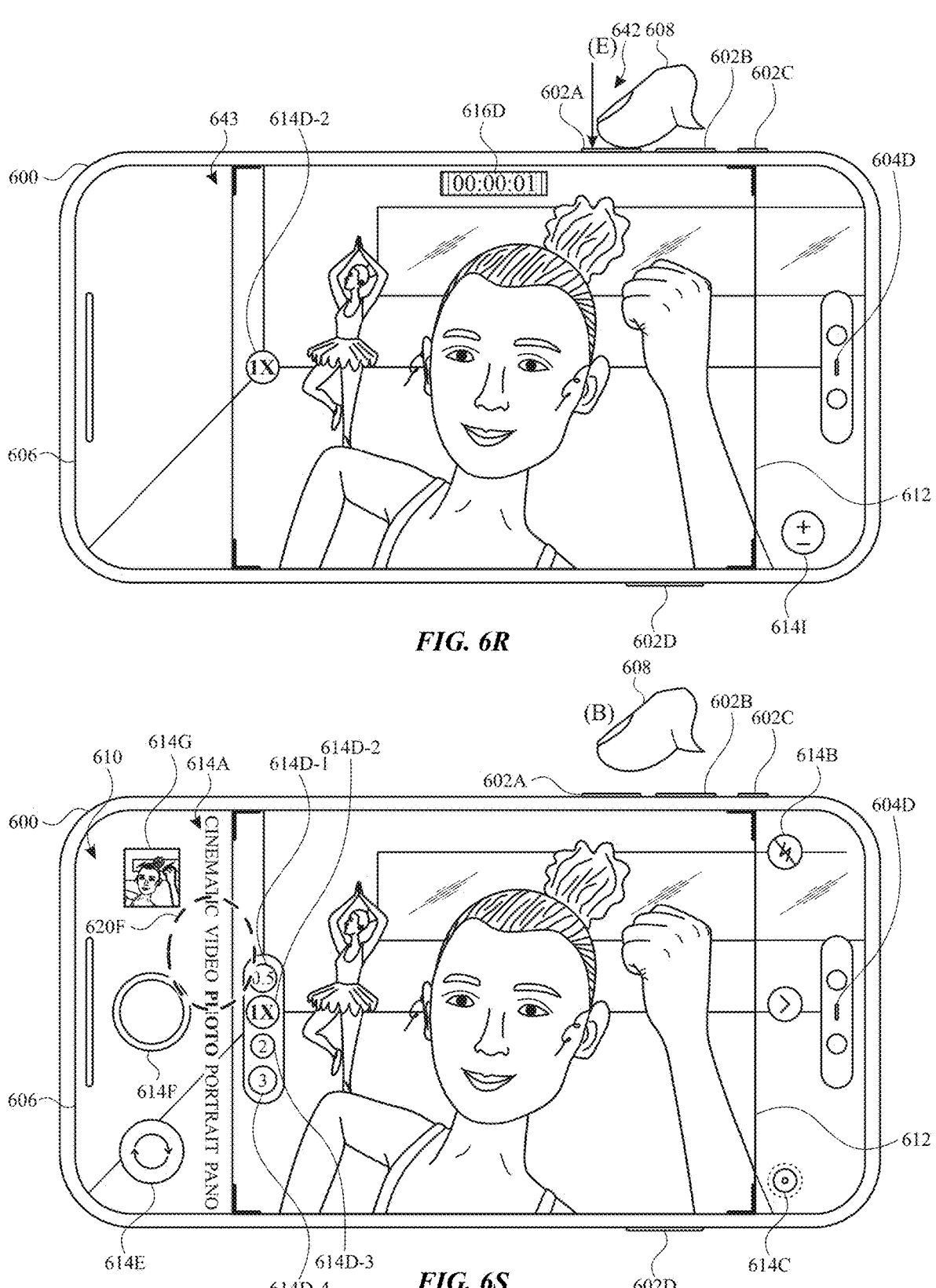

At FIG. 6Q, computer system 600 detects that first button 602A is in hardware button state (E), and accordingly, computer system 600 registers hard/full press 638 of first button 602A and provides tactile output 640 (e.g., the same type of haptic output as tactile output 626, indicating that a hard/full press has been registered). Additionally, computer system 600 detects that first button 602A remains in hard- ware button state (E) for at least a threshold duration of time (e.g., 0.5 s, 1 s, or 2 s), and accordingly registers hard/full press 638 as a held (e.g., long) hard/full press. In response to registering hard/full press 638 as a held press, computer system 600 initiates a video media capture and displays video status indicator 616D (e.g., a video capture timer) as illustrated in FIG. 6R. Accordingly, the user can initiate video capture by holding hard/full press 638 of first button 602A even while camera user interface 610 is in a photo capture mode (e.g., without switching camera user interface 610 into a video capture mode using capture mode affor- dance 614A). In some embodiments, the user can initiate video capture using a long hardware button press on either first button 602A or second button 602B, for example, initiating a standard video capture in response to a held hard/full press of first button 602A and/or initiating cin- ematic video capture (e.g., capturing video designated for display with the synthetic depth-of-field effect, as described below with respect to FIGS. 6W-6X) in response to a held hard/full press of second button 602B. In some embodi- ments, computer system 600 initially performs a photo media capture in response to registering hard/full press 638 of first button 602A (e.g., at FIG. 6Q, when hardware button state (E) is initially detected), and may optionally discard the captured photo media once hard/full press 638 registers as a held long/full press and the video media capture is initiated.

As illustrated in FIG. 6R, while performing the video media capture, computer system 600 detects that first button 602A is in hardware button state (E) and registers hard/full press 642 at first button 602A. As illustrated in FIG. 6S, computer system 600 detects that first button 602A is in hardware button state (A) (e.g., hard/full press 642 has been released), and computer system 600 ends the video capture. In some embodiments, computer system 600 continues the video capture in response to held hard/full press 638 as long as hard/full press 638 remains held (e.g., hard/full press 642 is a continuation of hard/full press 638), and ends the video capture in response to detecting first button 602A in a hardware state other than hardware button state (E). In some embodiments, computer system 600 continues the video capture held hard/full press 638 even if hard/full press 638 is released after the start of video capture, and ends the video capture in response to detecting a new hard/full press (e.g., hard/full press 642 returns hardware button 602A to hard- ware button state (E)). As illustrated in FIG. 6S, as first button 602A is in hardware button state (A), computer system 600 displays camera user interface 610 with the standard/default appearance.

Figures 6T, 6U:
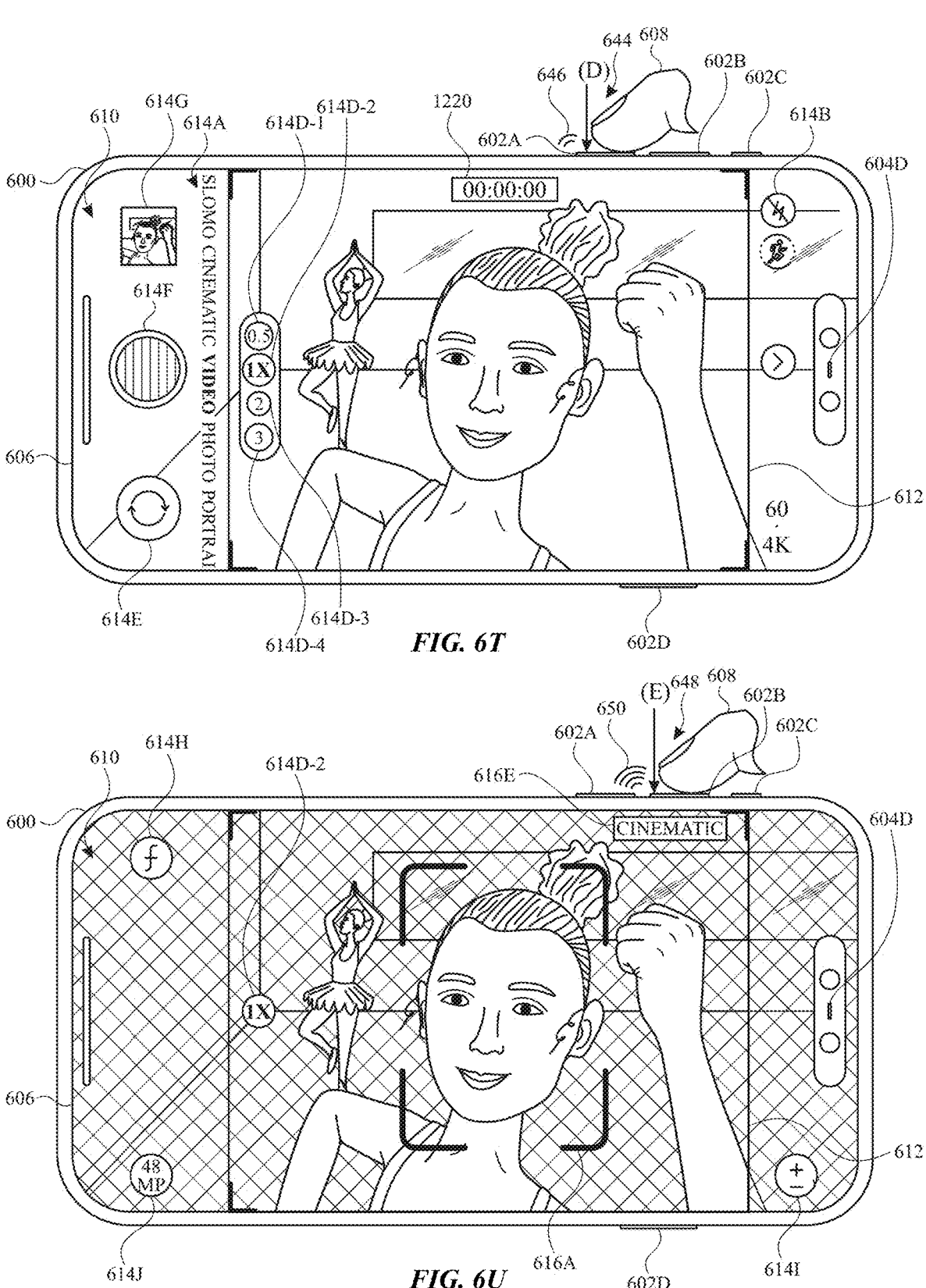

At FIG. 6S, computer system 600 detects input 620F, for example, a tap or swipe input selecting the standard video mode via capture mode affordance 614A. In response, computer system 600 places camera user interface 610 in a standard video capture mode, displaying camera user inter- face 610 with a "standard" or "default appearance for the standard video capture mode as illustrated in FIG. 6T. While camera user interface 610 is in the standard video capture mode, computer system 600 detects that second button 602B is in hardware button state (D) (and, in some embodiments, that second button 602B remains in hardware button state (D) for at least a threshold period of time without transi- tioning to hardware button state (E)). Accordingly, computer system 600 registers light/partial press 644 of second button 602B and provides tactile output 646 indicating the detec- tion of light/partial press 644 to the user (e.g., the same type of tactile output as tactile output 619, indicating that a hard/full press has been registered).

In response to detecting light/partial press 644 of second button 602B while in the standard video capture mode, at FIG. 6U, computer system 600 applies the synthetic (e.g., simulated) depth-of-field effect to camera preview 612. As described with respect to FIG. 6F, in some embodiments, the synthetic depth-of-field effect displayed in response to light/ partial press 644 of second button 602B is the effect that would be applied in a portrait photo capture mode or cinematic capture mode (e.g., in response to the user select- ing "Cinematic" from capture mode affordance 614A). Accordingly, the synthetic depth-of-field effect can be pre- viewed using a light/partial press of second button 602B even while camera user interface 610 is in the standard video capture mode (e.g., without switching camera user interface 610 into the cinematic video capture mode using capture mode affordance 614A). In some embodiments, the syn- thetic depth-of-field effect is simulated with the f-stop value (e.g., f/2.8) set while detecting light/partial press 618 of second button 602B, as described with respect to FIGS. 6I-6J.

As illustrated in FIG. 6U, in response to detecting light/ partial press 644 of second button 602B while in the standard video capture mode, computer system 600 also updates the display of camera user interface 610 to a quiet/ready-to-capture appearance for video capture, removing (e.g., shifting off/fading out) capture mode affordance 614A, camera flash affordance 614B, multi-frame photo affordance 614C, zoom affordances 614D-1, 614D-3, and 614D-4, camera selection affordance 614E, shutter affordance 614F, and captured media icon 614G; adding (e.g., shifting/fading in) exposure affordance 614I and f-stop affordance 614H; displaying subject indicator 616A (e.g., as described with respect to FIG. 6F in response to light/partial press 618); and additionally displaying quality affordance 614J, a touch control for changing the resolution and/or frame rate of video capture. In some embodiments, quality affordance 614J can be selected via display 606 to display expanded capture quality controls (e.g., expanded resolution and/or frame rate options), as described with respect to f-stop affordance 614H and expanded f-stop affordance 622A in FIG. 6I. Accordingly, while in a video capture mode, computer system 600 displays camera user interface 610 with a different quiet/ready-to-capture appearance in response to a light/partial press of second button 602A than the quiet/ready-to-capture appearance(s) displayed in response to a light/partial press of second button 602A detected while in a photo capture mode (e.g., as described with respect to FIGS. 6F-6G). Computer system 600 additionally displays mode indicator 616E, a text banner reading "Cinematic," in response to detecting light/partial press 644 of second button 602B while in the standard video capture mode, indicating that a preview of the cinematic video capture mode synthetic depth-of-field effect is being applied to camera preview 612.

Figures 6V, 6W:
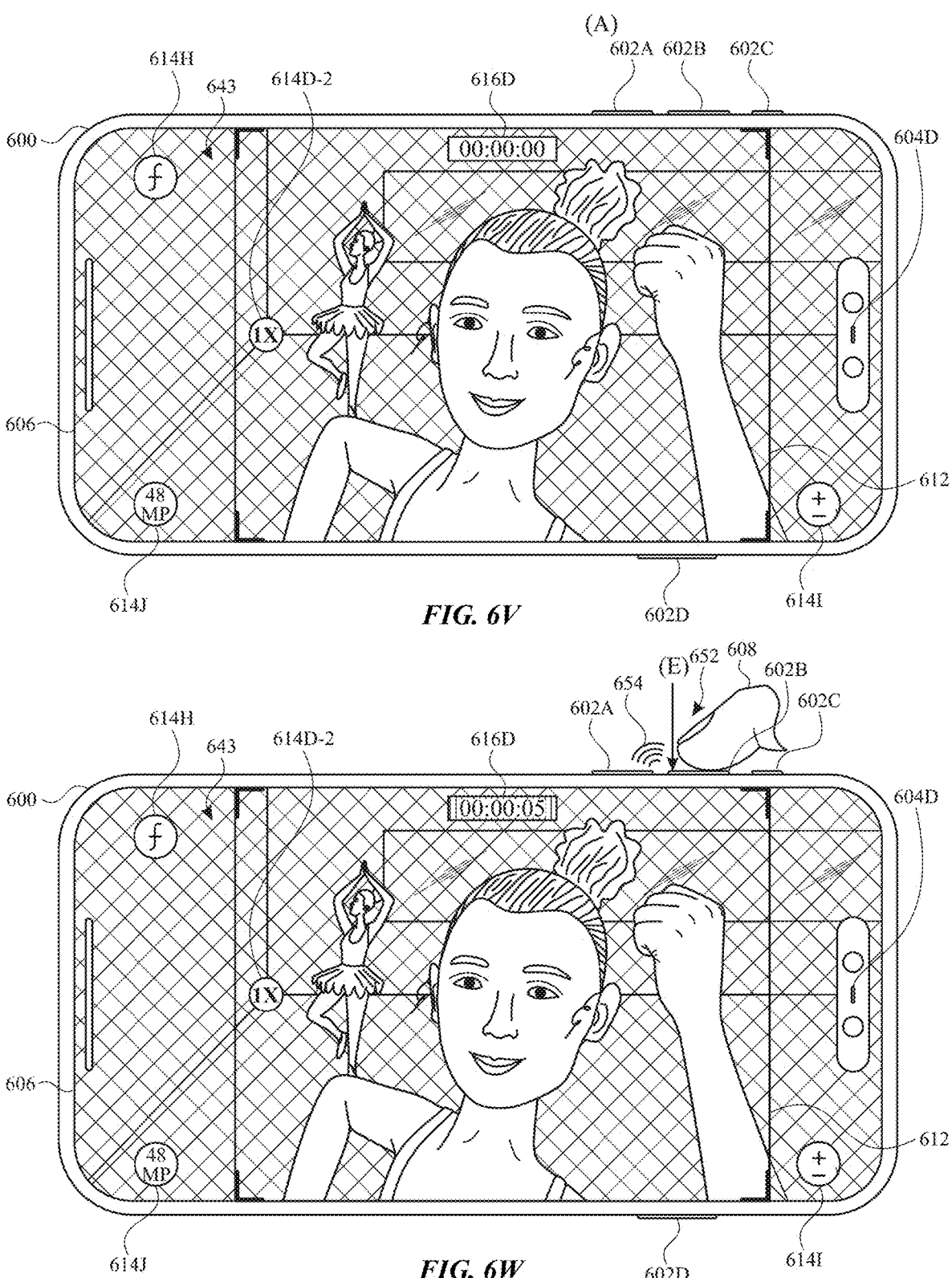
Figure 6X:
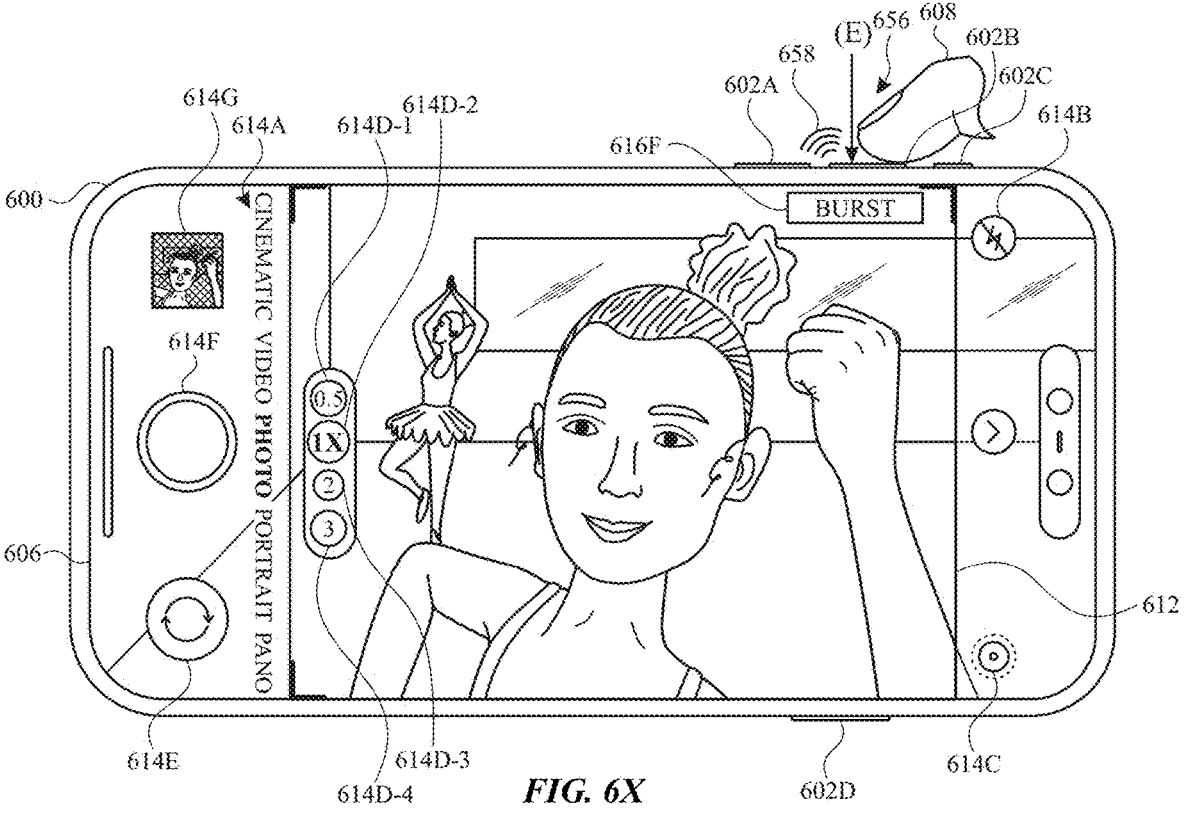

At FIG. 6U, computer system 600 detects that second button 602B is in hardware button state (E), and accordingly, computer system 600 registers hard/full press 648 of second button 602B and provides tactile output 650 indicating the detection of hard/full press 648 to the user. In response to detecting hard/full press 648 of second button 602B, at FIG. 6V, computer system 600 initiates a cinematic video media capture (e.g., capturing video designated for display with the synthetic depth-of-field effect) and displays video status indicator 616D (e.g., a video capture timer). In some embodiments, computer system 600 captures depth information in response to hard/full press 648 (e.g., for use in applying the synthetic depth-of-field effect). As illustrated in FIG. 6V, while capturing cinematic video, computer system 600 displays capture preview 612 with the synthetic depth-of-field effect applied, even when second button 602B is in hardware button state (A) (e.g., the user does not need to maintain a light/partial press of second button 602B). In alternative embodiments, computer system 600 may only display capture preview 612 with the synthetic depth-of-field effect applied while the user maintains a light/partial press of second button 602B (e.g., as described below with respect to FIGS. 12E-12G), even though the video media being captured may still be designated for display with the synthetic depth-of-field effect. Accordingly, the user can initiate cinematic video capture using a hard/full press of second button 602B even while camera user interface 610 is in the standard video capture mode (e.g., without switching camera user interface 610 into cinematic video capture mode using capture mode affordance 614A).

At FIG. 6W, while capturing video media, computer system 600 detects that second button 602B is in hardware button state (E), and accordingly, computer system 600 registers hard/full press 652 of second button 602B and provides tactile output 654 indicating the detection of hard/full press 648 to the user. In response to detecting hard/full press 652, at FIG. 6X, computer system 600 stops the cinematic video media capture and updates captured media icon 614G to show a thumbnail of the captured video media. As illustrated in FIG. 6X, as the media captured in response to detecting hard/full press 648 of second button 602B is designated for display with the synthetic depth-of-field effects applied, the thumbnail of the captured video media is displayed with the synthetic depth-of-field effects applied.

At FIG. 6X, computer system 600 detects that second button 602B is in hardware button state (E), and accordingly, computer system 600 registers hard/full press 656 of second button 602B and provides tactile output 658 indicating the detection of hard/full press 656 to the user. In some embodiments, in response to detecting that second button 602B has remained in hardware button state (E) for at least a threshold duration of time, computer system 600 performs a burst media capture, for example, performing several photo media captures (e.g., single- and/or multi-frame captures) in short succession, and displays mode indicator 616F, a text banner reading "Burst." In some embodiments, computer system 600 captures depth information in response to hard/full press 656 (e.g., for use in applying a synthetic depth-of-field effect to the burst capture). In some embodiments, computer system 600 may perform the burst media capture instead of performing a video media capture as described with respect to FIG. 6R. In some embodiments, computer system 600 may perform the burst media capture when a hard/full press is held for at least a longer or shorter duration than the duration required for video capture, for example, initiating a video capture at a hold duration of 0.5 s and initiating a burst video capture at a hold duration of is (and, in some embodiments, discarding the initiated video capture once the burst capture is initiated). In some embodiments, computer system 600 may perform the burst media capture in response to a held hard/full press of either first button 602A or second button 602B (e.g., capturing the burst media with standard capture mode effects in response to a press of first button 602A and capturing the burst media with portrait mode effects in response to a press of second button 602B). In some embodiments, computer system 600 may perform the burst media capture in response to a held hard/full press while camera user interface 610 is in different capture modes.

Although the techniques and systems for using different hardware buttons and/or different hardware button presses to control a camera application are described above with respect to particular hardware buttons (e.g., first button 602A and/or second button 602B), it is to be understood that the techniques and systems could be implemented using different configurations of hardware buttons than illustrated in FIGS. 6A-6X. For example, third button 602C and/or fourth button 602D could be used for previewing and/or capturing standard media (e.g., instead of or in addition to first button 602A) or for previewing and/or capturing media with synthetic depth-of-field effects (e.g., instead of or in addition to second button 602B).

FIG. 7 is a flow diagram illustrating a method for using different hardware buttons to control a camera application of a computer system in accordance with some embodiments. Method 700 is performed at a computer system (e.g., 100, 300, 500, and/or 600) that is in communication with a display generation component (e.g., 606) (e.g., a display controller; a touch-sensitive display system; a display (e.g., integrated and/or connected), a 3D display, a transparent display, a projector, and/or a heads-up display), one or more cameras (e.g., 604A, 604B, 604C, and/or 604D), and a set of one or more hardware buttons (e.g., 602A, 602B, 602C, and/or 602D). In some embodiments, the computer system includes one or multiple cameras, such as a rear (e.g., user-facing) camera and a forward (environment-facing) camera and/or a plurality of forward cameras (e.g., with different lenses, such as a standard camera, a telephoto camera, and/or a wide-angle camera). In some embodiments, the computer system includes one or more depth sensors. In some embodiments, the set of one or more hardware buttons includes one or more buttons that can be depressed to varying levels (e.g., partially and/or "fully" depressed). In some embodiments, the set of one or more hardware buttons includes one or more pressure-sensitive buttons. In some embodiments, the set of one or more hardware buttons includes one or more mechanical buttons (in some embodiments, with two or more states). In some embodiments, the set of one or more hardware buttons includes one or more solid-state buttons. In some embodiments, the set of one or more hardware buttons includes one or more pressure sensors. In some embodiments, the set of one or more hardware buttons at least a first hardware button (in some embodiments, a volume up button), and a second hardware button (in some embodiments, a volume down button) different from the first hardware button (e.g., the first and second hardware buttons are buttons that can be partially and/or fully depressed. In some embodiments, the first and second hardware button comprise multiple independently operable buttons in a compound form (e.g., multiple pressure sensors in a single button housing and/or a trackpad with multiple zones). In some embodiments, the set of one or more hardware buttons includes one or more mechanical buttons. Some operations in method 700 are, optionally, combined, the orders of some operations are, optionally, changed, and some operations are, optionally, omitted.

As described below, method 700 provides an intuitive user interface using different hardware buttons to control a camera application in accordance with some embodiments. The method reduces the cognitive burden on a user for operating the user interface, thereby creating a more efficient human-machine interface. For battery-operated computing devices, enabling a user to operate a user interface faster and more efficiently conserves power and increases the time between battery charges.

While displaying, via the display generation component, a camera user interface (e.g., 610) (e.g., a camera/capture UI;), the computer system (e.g., 600) detects (702) a first button press (e.g., 618, 624, 634, 638, 644, 648, and/or 656). In some embodiments, the first button press is or includes a hard and/or full press (e.g., where a hardware button is pressed with at least a threshold pressure and/or depressed at least a threshold amount). In some embodiments, the first button press is or includes a soft and/or partial press, where a hardware button is pressed with less than a threshold pressure and/or depressed less than a threshold amount. In some embodiments, the first button press is or includes a short/quick press. In some embodiments, the first button press is or includes a long/held press. In some embodiments, the camera user interface includes at least a portion of a field-of-view of the camera(s) (e.g., a live capture preview). In response to detecting the first button press (704) and in accordance with a determination that the first button press satisfies a first set of criteria (e.g., as described with respect to hard/full press 624, hard/full press 648, and/or hard/full press 656), the computer system captures (706) first media with the one or more cameras (e.g., as illustrated in FIGS. 6L, 6U, and 6X) (e.g., photo media and/or video media), wherein the first set of criteria includes a first criterion that is satisfied when the first button press is detected at the first hardware button (e.g., 602B) (in some embodiments, the volume up button) and the first media is designated to be displayed with a synthetic (e.g., simulated) depth-of-field effect (e.g., as illustrated in FIG. 6N) (e.g., blurring and/or other visual effects applied based on captured depth information and/or content (e.g., face/subject detection)). In some embodiments, photo media may include photo media with a limited duration (e.g., a short (e.g., 1, 3, and/or 5 second), e.g., a multi-frame capture that includes content from before and/or after a capture input is detected, creating a "live" effect. In some embodiments, photo media of a limited duration may include one or more images that are displayed in sequence (in some embodiments, a set of one or more of the images in the sequence were captured before the request to initiate capture was detected and one or more of the images in the sequence were captured after the request to initiate capture was detected), such as a media item that saved in the graphical interface file format. In some embodiments, the synthetic depth-of-field effects are applied to a live preview of the media capture, e.g., before and/or after the media capture. In some embodiments, the synthetic depth-of-field effects are applied only to the captured media (e.g., and are not applied to the live preview before and/or after the media capture).

In response to detecting the first button press (704) and in accordance with a determination that the first button press satisfies a second set of criteria different from the first set of criteria (e.g., as described with respect to hard/full press 638), the computer system captures (708) second media with the one or more cameras (e.g., photo media and/or video media), wherein the second set of criteria includes a second criterion that is satisfied when the first button press is detected at the second hardware button (e.g., 602A) (e.g., the volume down button) and the second media is not designated to be displayed with the synthetic depth-of-field effect (e.g., as illustrated in FIG. 6S) (e.g., the second media capture operation is a standard and/or default capture operation). In some embodiments, the synthetic depth-of-field effects can be applied to the second media after the media is captured. Automatically designating whether captured media is to be displayed with a synthetic depth-of-field effect based on whether the media was captured using a first hardware button or a second hardware button provides improved control of media capture without cluttering the media capture user interface with additional displayed controls. Doing so also assists the user with composing media capture events and reduces the risk that transient media capture opportunities are missed or captured with unintended synthetic depth-of-field settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, using the two hardware buttons, users can quickly switch between capturing media designated to be displayed with the synthetic depth-of-field effect and capturing media designated to be displayed without the synthetic depth-of-field effect without needing additional displayed controls and/or separate user inputs to manually enable or disable the synthetic depth-of-field effect or otherwise change the capture settings. Doing so also provides improved ergonomics of media capture devices, for example, by expanding the controls available using hardware buttons and reducing the need for users to move their hands back and forth between, e.g., the hardware buttons and a touch-sensitive display.

In some embodiments, the camera user interface (e.g., 610) includes a camera preview including a representation of at least a portion of a field-of-view of the one or more cameras (e.g., 612) (e.g., a live capture preview). In some embodiments, the representation of the portion of the field-of-view of the one or more cameras includes the portion of the environment that would currently be captured in a media capture and/or additional portions of the environment. In some embodiments, in response to detecting the first button press and in accordance with a determination that the first button press satisfies a third set of criteria different from the first set of criteria and different from the second set of criteria (e.g., as described with respect to light/partial press 618 and/or light/partial press 644), the computer system applies the synthetic depth-of-field effect (e.g., blurring and/or other visual effects applied based on captured depth information and/or content, such as face/subject detection) to the camera preview (e.g., as illustrated in FIGS. 6F-6J and/or 6U) (e.g., to the portion of the field-of-view of the camera included in the live capture preview), wherein the third set of criteria includes the first criterion that is satisfied when the first button press is detected at the first hardware button (e.g., 602B) (e.g., the first button press is a press of the first hardware button (in some embodiments, the volume up button)) and a first light press criterion that is satisfied when the first button press does not exceed a first light press threshold (e.g., hard-press pressure threshold $P_H$ and/or hard-press depression threshold $T_H$). For example, the first button press is a half, partial, and/or light press on the first button. In some embodiments, the first button press depresses the button less than a threshold amount (in some embodiments, without passing a light-press state of a multi-state mechanical button) and/or applies less than a threshold pressure. In some embodiments, the third set of criteria includes a set of light press criteria including the first light press criterion and one or more additional light press criteria, such as an additional light press criterion that is satisfied when the first button press depresses (e.g., initially) the button more than an activation threshold amount (e.g., distance; e.g., 30% depressed, 36% depressed, 40% depressed, or 50% depressed, and/or depressed to an activation state) and/or activation threshold pressure (e.g., 50 g/cm², 75 g/cm², 82 g/cm², or 100 g/cm²) and/or additional light press criteria that are satisfied when, for at least a respective duration after the light press criterion is met, the first button press depresses the button at least a maintenance threshold amount (e.g., 2% depressed, 5% depressed, 10% depressed, or 18% depressed, or depressed to a maintenance state) and/or a maintenance threshold pressure (e.g., 5 g/cm², 10 g/cm², 16 g/cm², or 20 g/cm²) and does not depress the button more than an upper (e.g., maximum, "full," and/or "hard") threshold amount (e.g., 60% depressed, 70% depressed, 72% depressed, or 80% depressed, and/or depressed to a final state) and/or an upper threshold pressure (e.g., 75 g/cm², 100 g/cm², 123 g/cm², or 150 g/cm²). In some embodiments, if the upper threshold amount and/or upper threshold pressure are exceeded within less than the respective duration after the light press criterion is met, the third set of criteria are not satisfied and the first set of criteria are satisfied and first media is captured (e.g., designating the media to be displayed with the synthetic depth-of-field effect applied, without first applying the synthetic depth-of-field effect to a camera preview in the camera user interface). Automatically displaying the synthetic depth-of-field effect in the camera user interface (e.g., applying the synthetic depth-of-field effect to a camera preview) in response to a light press of the first hardware button provides improved control of media capture without cluttering the media capture user interface with additional displayed controls, for example, allowing a user to preview a synthetic depth-of-field effect without needing additional displayed controls and/or separate user inputs to manually enable the synthetic depth-of-field effect or otherwise change the capture settings. Doing so also provides a user with real-time visual feedback about a state of the computer system, which assists the user with composing media capture events and reduces the risk that transient media capture opportunities are missed or captured with unintended synthetic depth-of-field settings. For example, a light press of the first hardware button intuitively indicates to a user that media captured with the first hardware button (e.g., if the light press transitions to a hard press) will be designated for display with the synthetic depth-of-field effect and allows the user to preview the appearance of the synthetic depth-of-field effect that would be applied to media captured using the first hardware button.

In some embodiments, the computer system, while displaying the camera user interface with the synthetic depth-of-field effect applied (e.g., as illustrated in FIGS. 6F-6J) (e.g., in response to detecting a light/partial press of the first button), detects a release of the first button press, and, in response to detecting the release of the first button press, the computer system displays the camera user interface without the synthetic depth-of-field effect applied (e.g., as illustrated in FIG. 6K) (e.g., ceasing applying the synthetic depth-of-field effect; e.g., removing the blurring and/or other visual effects from the live camera preview). In some embodiments, detecting a release includes detecting that the first button press is depressing the button less than a maintenance threshold amount (e.g., 2% depressed, 5% depressed, 10% depressed, or 18% depressed,) and/or a maintenance threshold pressure (e.g., 5 g/cm², 10 g/cm², 16 g/cm², or 20 g/cm²). In some embodiments, detecting a release includes detecting a lift-off event (e.g., the user lifting their finger from the pressed hardware button). Automatically removing the synthetic depth-of-field effect from the camera user interface in response to a press of first hardware button lifting off (e.g., releasing) provides improved control of media capture without cluttering the media capture user interface with additional displayed controls. For example, the user can briefly preview the synthetic depth-of-field effect by placing and lifting a finger on the first hardware button, without needing additional displayed controls and/or separate user inputs to manually toggle the synthetic depth-of-field effect or otherwise change the capture settings. Doing so also reduces power usage and improves battery life of the system, for example, by limiting how long the synthetic depth-of-field effect is applied to the live camera preview.

In some embodiments the set of hardware buttons includes one or more solid state buttons (e.g., as illustrated in panel (I) of FIG. 6B). For example, the one or more solid state buttons may include one or more a touch-sensitive surfaces that provides a tactile sensation when pressed (e.g., using a tactile (e.g., haptic) output generator), even when there is no movement of the touch-sensitive surface/a physical button when the user presses the button. In some embodiments, the generated tactile output is perceived by the user as corresponding to physical displacement of the button. In some embodiments, the first hardware button is a solid-state button, and in some embodiments, the second hardware button is a solid-state button. In some embodiments, the set of hardware buttons includes one or more mechanical buttons (e.g., as illustrated in panel (II) of FIG.

6B). For example, the one or more mechanical buttons may include physical buttons (e.g., push buttons, rocker buttons, switches, knobs, toggles, and/or other types of physically actuated buttons) that move between two or more states (e.g., from a rest (un-pressed) position/state to one or more depressed positions/states) when pressed (e.g., when pressure is applied). In some embodiments, the one or more physical buttons can be variably and/or continuously moved between a plurality of different states (e.g., positions; e.g., 0-100% depressed). In some embodiments, the first hardware button is a mechanical button, and in some embodiments, the second hardware button is a mechanical button.

In some embodiments, the computer system, in response to detecting the first button press and in accordance with a determination that the first button press satisfies a fourth set of criteria different from the first set of criteria and different from the second set of criteria (e.g., as described with respect to hard/full press 656) (in some embodiments, and different from the third set of criteria), captures third media (e.g., burst photo media, such as multiple, sequential photos), wherein the fourth set of criteria includes a duration criterion that is satisfied when a duration of the first button press exceeds a threshold duration (e.g., a minimum amount of time). For example, the first press satisfies the fourth set of criteria if the first press is a long press. In some embodiments, if the fourth set of criteria are satisfied after the first set of criteria are satisfied (e.g., the press becomes a long press), the computer system captures both the first media and the third media. For example, in some embodiments, the first media is included in the third media (e.g., as the first frame of a burst capture), and in some embodiments, the first media is discarded when capture of the third media is started). In some embodiments, the fourth set of criteria includes the first criterion (e.g., the first button press is a press of the first hardware button). In some embodiments, capturing the third media includes capturing a plurality of photo media (e.g., as described with respect to FIG. 6X) (e.g., a "burst" or multi-frame capture). In some embodiments, the plurality of photos includes a predetermined number of captures (e.g., 5, 10, and/or 20 frames). In some embodiments, the set of photos is captured one after another over a period of time that corresponds with the duration of the first button press (e.g., 5, 10, and/or 20 photos per second of detecting the first button press). In some embodiments, the computer system detects a release of the first button press, and in response to detecting the release of the first button press, ceases capture of the third media (e.g., stops capturing photos (e.g., ending the burst photo capture) and/or videos). In some embodiments, capturing the third media does not include applying the synthetic depth-of-field effect to the set of photos. In some embodiments, capturing the third media includes applying the synthetic depth-of-field effect to the set of photos. In some embodiments, the synthetic depth-of-field effects can be applied to the third media after the media is captured. In some embodiments, "burst" photo captures can be taken using different hardware buttons (e.g., the first button, the second button, and/or another hardware button), in some embodiments, by associating the burst capture with a particular button, e.g., in camera and/or button settings, in some embodiments, by using different types of button press (e.g., capturing "burst" photos in response to a sequence of multiple press inputs).

In some embodiments, in response to detecting the first button press and in accordance with a determination that the first button press satisfies a fifth set of criteria (e.g., as described with respect to light/partial press 618 and/or light/partial press 644), the computer system displays (in some embodiments, modifying) the camera user interface with a first appearance (e.g., as illustrated in FIGS. 6F-6J and/or 6U), wherein the fifth set of criteria includes the first criterion that is satisfied when the first button press is detected at the first hardware button (e.g., 602B) (in some embodiments, the volume up button) and a second set of light press criteria (in some embodiments, the second set of light press criteria is the same as the first set of light press criteria) including a second light press criterion that is satisfied when the first button press does not exceed a second first threshold (e.g., hard-press pressure threshold $P_H$ and/or hard-press depression threshold $T_H$) (e.g., the first button press is a half, partial, and/or light press on the first button). In some embodiments, the second light press criterion is the same as the first light press criterion. In some embodiments, the first button press is detected while displaying the camera user interface with a default appearance (e.g., without the synthetic depth of field effects applied, including a default set of user interface elements (e.g., flash control, photo well, mode selection menu, and/or settings affordance), and/or not including other user interface elements). In some embodiments, the fifth set of criteria is satisfied when the third set of criteria are satisfied. In some embodiments, the fifth set of criteria is the same as the third set of criteria. In some embodiments, the first appearance is different from the default appearance. In some embodiments, the first appearance is a first "quiet" or "ready-to-capture" UI appearance (e.g., as described with respect to FIGS. 9A-9Z). In some embodiments, displaying the camera interface with the first appearance includes applying the synthetic depth of field effects (e.g., as described above). In some embodiments, displaying the camera user interface with the first appearance includes removing (e.g., ceasing display of) one or more user interface elements displayed in the default appearance (e.g., flash control, photo well, mode selection menu, and/or settings affordance). In some embodiments, displaying the camera user interface with the first appearance includes adding one or more user interface elements not displayed in the default appearance (e.g., expanding a slider or menu for a particular setting, such as displaying an expanded f-stop slider). In some embodiments, in response to detecting the first button press in accordance with a determination that the first button press satisfies a sixth set of criteria (e.g., as described with respect to light/partial press 634), the computer system displays (in some embodiments, modifies) the camera user interface with a second appearance different from the first appearance (e.g., as illustrated in FIG. 6Q), wherein the sixth set of criteria includes the second criterion that is satisfied when the first button press is detected at the second hardware button (in some embodiments, the volume down button) and the second set of light press criteria including the second light press criterion that is satisfied when the first button press does not exceed the second first threshold (e.g., the first button press is a half, partial, and/or light press on the second button). In some embodiments, the second appearance is different from the default appearance. In some embodiments, the second appearance is a different "quiet" or "ready-to-capture" UI appearance than the first appearance (e.g., as described with respect to FIGS. 9A-9Z). In some embodiments, displaying the camera user interface with the second appearance includes removing (e.g., ceasing display of) one or more user interface elements displayed in the default appearance (e.g., flash control, photo well, mode selection menu, and/or settings affordance). In some embodiments, displaying the camera user interface with the second appearance includes adding one or more user interface elements not displayed in the default appearance (e.g., expanding a slider or menu for a particular setting, such as displaying an expanded exposure slider or expanded pro-res capture options). Automatically displaying different versions of the camera user interface in response to light hardware button presses on the different hardware buttons provides improved control of media capture and real-time visual feedback about a state of the computer system, which assists the user with composing media capture events and reduces the risk that transient media capture opportunities are missed or captured with unintended settings. For example, the different appearances of the camera user interface presented in response to a light touch can be customized for the different media capture operations mapped to the different buttons, providing relevant media capture controls and intuitively indicating to the user which media capture operation is mapped to each button.

In some embodiments, in response to detecting the first button press and in accordance with a determination that the first button press satisfies the first criterion that is satisfied when the first button press is detected at the first hardware button (e.g., 602B) (e.g., the volume up button), the computer system captures depth information (e.g., as described with respect to FIGS. 6F-6J, 6L-6M, 6U-6W, and 6X) (e.g., information related to the distance between the computer system and/or the one or more cameras and subjects in the environment (e.g., the physical, virtual, and/or XR environment) being captured using the one or more cameras and/or the distance between different subjects in the environment). In some embodiments, the depth information includes a depth map. In some embodiments, the depth information is captured using one or more sensors (e.g., structural light sensors and/or time-of-flight sensors (e.g., LIDAR and/or ultrasonic sensors) and/or using two or more cameras (e.g., as stereoscopic camera sensors). In some embodiments, after capturing media, the depth information can be used to modify the appearance of the captured media, e.g., applying the synthetic depth-of-field effect). In some embodiments, the depth information is captured along with capturing media (e.g., if the press satisfies the first set of criteria). In some embodiments, the depth information is captured in response to a partial press (e.g., along with displaying the synthetic depth-of-field effect preview). In some embodiments, in response to detecting the first button press and in accordance with a determination that the first button press does not satisfy the first criterion that is satisfied when the first button press is detected at the first hardware button (e.g., when the first button press is detected at the second hardware button or a different hardware button, not the first hardware button), the computer system forgoes capturing depth information. In some embodiments, the computer system forgoes capturing depth information when performing a media capture (e.g., the media capture operation is a standard and/or default capture operation). Conditionally capturing depth information based on whether the media was captured using a first hardware button or a second hardware button provides improved control of media capture without cluttering the media capture user interface with additional displayed controls, for example, by automatically capturing depth information in response to presses of the first hardware button (e.g., the button used for captures designated to be displayed with synthetic depth-of-field effects). Doing so also reduces power usage and improves battery life of the system, for example, by automatically forgoing capturing depth information in response to presses of the second hardware button (e.g., the button used for captures not designated to be displayed with synthetic depth-of-field effects).

In some embodiments, after capturing the first media (e.g., as described with respect to FIGS. 6L-6M and/or 6U-6W) (e.g., the media designated to be displayed with the synthetic depth-of-field effect), the computer system displays, via the display generation component, a representation of the first media (e.g., 628) and detects an input (e.g., 620E) (e.g., a set of inputs (e.g., one or more tap inputs)) requesting to modify the synthetic depth-of-field effect (e.g., as illustrated in FIG. 6N). In some embodiments, the computer system displays the representation of the first media in response to a selection of the photo well and/or in response to opening the first media from the media library. In some embodiments, the computer system displays the representation of the first media in a media viewing and/or media editing application. In some embodiments, the input requesting to modify the synthetic depth-of-field effect includes toggling the application of the synthetic depth-of-field effect on or off and/or editing one or more parameters or settings of the synthetic depth-of-field effect (e.g., changing the f-stop (aperture) value of the synthetic depth-of-field effect, increasing or decreasing the amount of blurring, and/or changing the regions where blurring is applied). In some embodiments, the computer system, in response to detecting the input, displays the first media with an updated synthetic depth-of-field effect (e.g., as illustrated in FIG. 6O) (e.g., modifying the synthetic depth-of-field effect, for example, based on the input). In some embodiments, the updated synthetic depth-of-field effect is simulated using a different f-stop value than the original synthetic depth-of-field effect. In some embodiments, a different portion (e.g., plane and/or subject) of the first media is in focus with the updated synthetic depth-of-field effect than with the original synthetic depth-of-field effect. Allowing a user the post-capture opportunity to modify the synthetic depth-of-field effect on media designated to be displayed with the synthetic depth-of-field effect provides improved control of media capture without cluttering the media capture user interface with additional displayed controls, assists the user with composing media capture events, and reduces the risk that transient media capture opportunities are missed or captured with unintended synthetic depth-of-field settings. For example, a user can quickly capture media using the first hardware button and later enable, disable, and/or change the initial settings of the synthetic depth-of-field effect for the captured media.

In some embodiments, capturing the first media includes, in accordance with a determination that the first button press satisfies a set of long press criteria, wherein the set of long press criteria include a long press criterion that is satisfied when a duration of the first button press exceeds a threshold duration (e.g., as described with respect to hard/full press 638) (e.g., the first button press is a long press (e.g., held for over 0.25 s, 0.5 s, or 1 s)), capturing first video media (e.g., as illustrated in FIGS. 6U-6W). In some embodiments, the set of long press criteria include a criterion that is satisfied when the press is maintained (e.g., with at least a threshold amount of depression and/or applied pressure, such as an upper (e.g., maximum, "full," and/or "hard" press) threshold amount (e.g., 60% depressed, 70% depressed, 72% depressed, or 80% depressed) and/or a maximum threshold pressure (e.g., 75 g/cm², 100 g/cm², 123 g/cm², or 150 g/cm²)) for at least the threshold duration (e.g., 0.25 s, 0.5 s, or 1 s). In some embodiments, a long press can be detected at either the first or second hardware buttons. In some embodiments, capturing the second media includes, in accordance with a determination that the first button press satisfies the set of long press criteria including the long press criterion that is satisfied when a duration of the first button press exceeds a threshold duration (e.g., as described with respect to hard/full press 638), capturing second video media (e.g., as illustrated in FIGS. 6Q-6R). For example, if the long button press is at the first hardware button, video media is captured and designated for display with the synthetic depth-of-field effect, and if the button press is at the second hardware button, video media is captured without being designated for display with the synthetic depth-of-field effect. In some embodiments, the duration of the video media capture is equivalent to the duration of the long press (e.g., in response to detecting the release of the first button press, ceasing capture of video media). Automatically capturing video media in response to a long hardware button press (e.g., on either of the hardware buttons) provides improved control of media capture without cluttering the media capture user interface with additional displayed controls. Doing so also assists the user with composing media capture events, reduces the risk that transient media capture opportunities are missed or captured with unintended synthetic depth-of-field settings, and improves the ergonomics of media capture devices. For example, a user can quickly initiate video capture (either with or without the synthetic depth-of-field effects) without needing additional displayed controls and/or separate user inputs to manually select a video capture mode.

In some embodiments, in response to detecting the first button press and in accordance with the determination that the first button press satisfies the first criterion that is satisfied when the first button press is detected at the first hardware button (e.g., 602B) (e.g., the volume up button;), the computer system displays, via the display generation component, a synthetic depth-of-field mode indicator (e.g., 616B and/or 616E) (e.g., a graphical element (e.g., an icon and/or text) indicating that media captured using the first hardware button will have the synthetic depth-of-field effect (e.g., "portrait mode" or depth-capture effect) applied) proximate to (e.g., appearing near, next to, below, and/or above the first hardware button) the first hardware button (e.g., as illustrated in FIGS. 6F-6G, 6M, and/or 6U). For a device including a display and a hardware button located outside of the display, the capture mode indicator is optionally displayed at a location in the edge region of the display close to the hardware button. In some embodiments, the capture mode indicator may be displayed when capturing the first media, capturing third media, applying the synthetic depth-of-field effect, capturing depth information, and/or displaying the camera UI with the first appearance. Displaying a visual indication of the capture mode near the first hardware button in response to presses of the first hardware button provides a user with real-time visual feedback about a state of the computer system, which assists the user with composing media capture events and reduces the risk that transient media capture opportunities are missed or captured with unintended synthetic depth-of-field settings. For example, displaying the capture mode indicator near the first hardware button indicates to the user that media captured with the first hardware button will be designated for display with the synthetic depth-of-field effects.

In some embodiments, displaying the synthetic depth-of-field mode indicator (e.g., 616B and/or 616E) includes animating (e.g., moving, sliding, appearing, fading in) the synthetic depth-of-field mode indicator moving from a first display location (e.g., at the edge of the display; from off the display onto the display) proximate to (e.g., next to, below, above, and/or near) the first hardware button (e.g., volume up button) to a second display location (e.g., inwards from the edge of the display), different from the first display location and proximate to the first hardware button (e.g., as illustrated in FIGS. 6F-6G), and, after animating the synthetic depth-of-field mode indicator moving from the first location to the second display location, displaying the synthetic depth-of-field mode indicator at the second display location (e.g., as illustrated in FIG. 6G). In some embodiments, the animation depicts a movement of the capture mode indicator from the location of the first hardware button outside of the display generation component (e.g., screen) into the display, e.g., showing the capture mode indicator moving inward (e.g., up, down, and/or laterally) from the hardware button, as if pushing the hardware button "pushes" the capture mode indicator onto the display. In some embodiments, the animation occurs while the depth-of-field effect is applied to the camera user interface. Displaying the capture mode indicator moving or pushing in from the first hardware button in response to presses of the first hardware button provides a user with real-time visual feedback about a state of the computer system, which assists the user with composing media capture events and reduces the risk that transient media capture opportunities are missed or captured with unintended synthetic depth-of-field settings. For example, animating the capture mode indicator "pushing" into the display from the first hardware button provides the user with visual feedback on the state of the button press.

Note that details of the processes described above with respect to method 700 (e.g., FIG. 7) are also applicable in an analogous manner to the methods described below. For example, methods 800, 1000, 1100, and 1300 optionally includes one or more of the characteristics of the various methods described above with reference to method 700. For example, in addition to performing different media capture operations in response to presses on different buttons as described with respect to method 700, computer systems may perform different operations in response to different types of presses of the different buttons, such as hard/full vs. light/partial presses as described with respect to methods 800 and 1300 and/or short vs. long presses as described with respect to method 1100. Additionally, computer systems may launch the camera application used for the different media capture operations of method 700 using hardware button presses as described with respect to method 1000. For brevity, these details are not repeated below.

FIG. 8 is a flow diagram illustrating a method for using different hardware buttons to control a camera application of a computer system in accordance with some embodiments. Method 800 is performed at a computer system (e.g., 100, 300, 500, and/or 600) that is in communication with a display generation component (e.g., 606) (e.g., a display controller; a touch-sensitive display system; a display (e.g., integrated and/or connected), a 3D display, a transparent display, a projector, and/or a heads-up display), one or more cameras (e.g., 604A, 604B, 604C, and/or 604D), a touch-sensitive surface (e.g., of display 606) (in some embodiments, a touch-sensitive surface of a display), and a hardware button (e.g., 602A, 602B, 602C, and/or 602D). In some embodiments, the hardware button includes a button that can be partially and/or fully depressed. In some embodiments, the hardware button includes a first hardware button of a plurality of hardware buttons. In some embodiments, the plurality of hardware buttons can comprise multiple independently operable buttons in a compound form (e.g., multiple pressure sensors in a single button housing and/or a trackpad with multiple zones). In some embodiments, the hardware button includes a mechanical button (in some embodiments, that moves between two or more states (e.g., from a rest (un-pressed) position to one or more depressed positions) when pressed (e.g., when pressure is applied). In some embodiments, the hardware button includes a solid-state button. In some embodiments, the hardware button includes a pressure sensor. In some embodiments, the computer system includes one or more cameras, such as a rear (user-facing) camera and a forward (environment-facing) camera and/or a plurality of forward cameras (e.g., with different lenses, such as a standard camera, a telephoto camera, and/or a wide-angle camera). In some embodiments, the computer system includes one or more depth sensors. Some operations in method 800 are, optionally, combined, the orders of some operations are, optionally, changed, and some operations are, optionally, omitted.

As described below, method 800 provides an intuitive user interface using different hardware button presses to control a camera application in accordance with some embodiments. The method reduces the cognitive burden on a user for operating the user interface, thereby creating a more efficient human-machine interface. For battery-operated computing devices, enabling a user to operate a user interface faster and more efficiently conserves power and increases the time between battery charges.

The computer system (e.g., 600) while displaying, via the display generation component (e.g., 606), a camera user interface (e.g., 610) (e.g., a camera/capture UI) with a first set of one or more user interface objects (e.g., 614A, 614B, 614C, 614D-1, 614D-2, 614D-3, 614D-4, 614E, 614F, and/or 614G, as illustrated in FIG. 6C and/or 6T) (e.g., affordances) that are selectable via the touch-sensitive surface (e.g., of 606) to control a first set of functions (e.g., as described with respect to FIG. 6C) (e.g., touch controls for a camera application) (e.g., while displaying the camera user interface in a first/initial/default state), detects (802) a first press (e.g., 618, 624, 634, 638, 644, 648, and/or 656) (e.g., a short/quick press or a long/held press) of the hardware button (e.g., 602A, 602B, 602C, and/or 602D). In some embodiments, the camera user interface includes at least a representation of a portion of a field-of-view of the camera(s) (e.g., a live capture preview).

The computer system, in response to detecting the first press of the hardware button (804) and in accordance with a determination that the first press satisfies a first set of criteria (e.g., as described with respect to light/partial press 618, light/partial press 634, and/or light/partial press 644), displays (806) the camera user interface with a second set of one or more user interface objects (e.g., 614D-2, 614H, 614I, and/or 614J as illustrated in FIGS. 6G, 6Q, and/or 6U), different from the first set of one or more user interface objects, that are selectable via the touch-sensitive surface to control a second set of functions different from the first set of functions (e.g., as described with respect to FIGS. 6G and 6U) (e.g., a ready-to-capture and/or "quiet" camera UI appearance). In some embodiments, the first set of criteria are or include light/partial press criteria. In some embodiments, the second set of user interface object includes at least one user interface object not included in the first set of user interface objects (e.g., the quick press adds new touch controls). In some embodiments, the second set of user interface objects does not include at least one user interface object included in the first set of user interface objects (e.g., the quick press removes controls). In some embodiments, the second set of functions includes at least one function not included in the first set of functions (e.g., the quick press expands control options). In some embodiments, the second set of functions does not include at least one function included in the first set of functions (e.g., the quick press removes control options). The first set of criteria includes a first criterion that is satisfied when the first press does not exceed a first press threshold (e.g., hard-press pressure threshold $P_H$ and/or hard-press depression threshold $T_H$; e.g., the button press is a light/partial press). In some embodiments, a light/partial press may be referred to as a light press or a partial press. In some embodiments, the first press threshold includes a threshold pressure (e.g., 50 g/cm², 100 g/cm², 123 g/cm², or 150 g/cm² pressure) (e.g., an amount of pressure applied to the button, as measured by a pressure sensor), a threshold depression (e.g., 30%, 50%, 67%, or 80% depression of the button (e.g., based on a range of motion available to the button)), and/or a threshold mechanical state (e.g., depressing a mechanical button to a first state but not to a second, further-depressed state). In some embodiments, the button does not physically move when pressed. In some embodiments, the first set of criteria includes a criteria that is satisfied when the first press exceeds an activation threshold (in some embodiments, an activation threshold pressure such as 25 g/cm², 50 g/cm², 82 g/cm², or 100 g/cm² pressure. In some embodiments, an activation threshold depression such as 15%, 30%, 43%, or 50% depression) that is lower that the first press threshold (e.g., the first press must at least initially exceed the activation threshold to be detected as a light/partial press). In some embodiments, in accordance with a determination that the first press does not satisfy the first set of criteria, the computer system foregoes displaying the camera user interface with the second appearance).

The computer system, in response to detecting the first press of the hardware button (804) and in accordance with a determination that the first press satisfies a second set of criteria (e.g., as described with respect to hard/full press 624, hard/full press 638, hard/full press 648, and/or hard/full press 656), performs (808) a media capture operation with the one or more cameras (e.g., as described with respect to FIGS. 6L-6M, 6Q-6R, and/or 6U-6W). In some embodiments, the media capture operation includes capturing photo media. In some embodiments, the photo media may include photo media with a limited duration, such as a short (e.g., 1, 3, and/or 5 second) multi-frame capture that includes content from before and/or after a capture input is detected, creating a "live" effect. In some embodiments, the photo media may include one or more images that are displayed in sequence (in some embodiments, a set of one or more of the images in the sequence were captured before the request to initiate capture was detected and one or more of the images in the sequence were captured after the request to initiate capture was detected), such as a media item saved in the graphical interface file format. In some embodiments, the media capture operation includes initiating and/or stopping video media capture. The second set of criteria includes a second criterion that is satisfied when the first press exceeds the first press threshold (e.g., the button press is a hard/full press). In some embodiments, a hard/full press may be referred to as a hard press or a full press. In some embodiments, in accordance with a determination that the first press does not satisfy the second set of criteria, the computer system forgoes performing the media capture operation. Conditionally displaying an alternative version of a camera user interface and/or capturing media based on whether or not a detected hardware button press has exceeded a threshold (e.g., whether the button press is a light/partial or hard/full press) provides improved control of media capture without cluttering the media capture user interface with additional displayed controls. For example, the alternative version of the camera user interface displayed in response to a light button press may be a "quiet" or "ready-to-capture" version of the camera user interface, providing a relevant set of touch controls and allowing a user to confirm capture settings (e.g., prior to capturing media using a hard button press). Doing so also assists the user with composing media capture events and reduces the risk that transient media capture opportunities are missed, captured with unintended settings, and/or mis-captured due to additional displayed controls obscuring the camera preview, which additionally reduces power usage, improves battery life of the system, and improves ergonomics by enabling the user to use the system more quickly and efficiently. For example, users can quickly access the alternative version of the camera user interface and capture media without needing to move their fingers from the hardware button. Enabling a single hardware button to both display the alternative version of the camera user interface and to capture media based on the input type also reduces the overall number of hardware components needed for control (e.g., compared to mapping different functions to different buttons), resulting in a more compact, lighter, and cost-effective device.

In some embodiments, the first set of criteria includes an activation criterion that is satisfied when the first press exceeds an activation threshold (e.g., activation pressure threshold $P_A$ and/or activation depression threshold $T_A$) that is less than the first press threshold (e.g., hard-press pressure threshold $P_H$ and/or hard-press depression threshold $T_H$). For example, the activation threshold may be a light/partial press activation threshold (e.g., an activation threshold pressure such as 25 g/cm², 50 g/cm², 82 g/cm², or 100 g/cm² pressure; or an activation threshold press amount such as 15% depressed, 30% depressed, 43% depressed, or 50% depressed, and/or depressed to an activation state). In some embodiments, while displaying the camera user interface with the second set of one or more user interface objects (e.g., 614D-2, 614H, 614I, and/or 614J, as illustrated in FIGS. 6G, 6Q, and/or 6U) (e.g., in response to determining that the first press is a light/partial press; e.g., while displaying the user interface with the ready-to-capture and/or quiet appearance), the computer system detects a change (e.g., in applied pressure and/or in hardware press state) to the first press of the hardware button. In some embodiments, in response to detecting the change to the first press of the hardware button and in accordance with a determination that the first press satisfies the first criterion that is satisfied when the first press does not exceed the first press threshold (e.g., hard-press pressure threshold $P_H$ and/or hard-press depression threshold $T_H$) (e.g., a light/partial press is maintained without transitioning into a hard/full press) and a set of maintenance criteria (e.g., as illustrated by the change from hardware button state (D) to hardware button state (C) in FIGS. 6F-6G), the computer system continues displaying (e.g., maintains display of) the camera user interface with the second set of one or more user interface objects (e.g., as illustrated in FIG. 6G), wherein the set of maintenance criteria include a maintenance criterion that is satisfied when the first press exceeds a maintenance threshold (e.g., maintenance pressure threshold $P_M$ and/or maintenance depression threshold $T_M$) that is less than the activation threshold (e.g., the full/hard press threshold). In some embodiments, the maintenance threshold amount is less than the activation threshold. For example, the first criterion and the set of maintenance criteria are satisfied if the first press is a light press that maintains a pressure within (e.g., between) the first press threshold and the maintenance threshold (e.g., an amount of pressure that exceeds the maintenance threshold and does not exceed the first press threshold)). For example, the maintenance threshold may be a light/partial press maintenance threshold amount (e.g., 2% depressed, 5% depressed, 10% depressed, or 18% depressed, and/or depressed to a maintenance state) and/or maintenance threshold pressure (e.g., 5 g/cm², 10 g/cm², 16 g/cm², or 20 g/cm²). In some embodiments, in response to detecting the change to the first press of the hardware button and in accordance with a determination that the first press does not satisfy the set of maintenance criteria including the maintenance criterion that is satisfied when the first press exceeds the maintenance threshold that is less than the activation threshold (e.g., as illustrated by the change from hardware button state (C) to hardware button state (A) in FIGS. 6J-6K), the computer system ceases displaying the camera user interface with the second set of one or more user interface objects (e.g., as illustrated in FIG. 6K). For example, the first criterion and the set of maintenance criteria are not satisfied if the first press falls below the maintenance threshold (e.g., the computer system detects a release of the first press) and/or the first press exceeds the first press threshold (e.g., the press transitions to a full press). In some embodiments, ceasing displaying the camera user interface with the second set of one or more user interface objects includes reverting to displaying the camera user interface with the first set of one or more user interface objects (in some embodiments, reverting to the initial state of camera user interface prior to detecting the first press). In some embodiments, in response to detecting the first press and in accordance with a determination that the first press does not satisfy the first criterion of the first set of criteria (e.g., the press has changed to exceed the first press threshold), the computer system also performs the media capture operation. Initially displaying the alternative version of the camera user interface when a detected press exceeds a higher activation threshold and maintaining displaying the alternative version of the camera user interface as long as the detected press exceeds a lower maintenance threshold reduces power usage, improves battery life of the system, and improves ergonomics of media capture devices. For example, the higher activation threshold prevents inadvertent toggling of the alternative version of the camera user interface (e.g., in response to accidental button contact), while the lower maintenance threshold allows users to comfortably maintain the alternative version of the camera user interface with a lighter press. Additionally, the two thresholds prevent flicker of the alternative version of the camera user interface (e.g., as the exact state of the button press fluctuates around the threshold levels).

In some embodiments, displaying the camera user interface with the second set of one or more user interface objects different from the first set of one or more user interface objects includes reducing a visual prominence (e.g., dimming, graying out, fading, reducing the opacity of, reducing the brightness of, reducing the contrast of, and/or gradually fading) of one or more user interface objects of the first set of one or more user interface objects (e.g., as illustrated in FIG. 6F by 614D-1, 614D-3, and 614D-4) (e.g., any affordances not included/displayed in the ready-to-capture/quiet camera UI appearance) and, after reducing the visual prominence of the one or more user interface objects, ceasing displaying the one or more user interface objects (e.g., as illustrated in FIG. 6J) (e.g., continuing to reduce the visual prominence of the one or more user interface objects until the one or more user interface objects cease to be displayed). Reducing the visual prominence of certain touch controls not included in the alternative version of the camera user interface in response to a light press provides improved control of media capture without cluttering the media capture user interface with additional displayed controls. For example, the alternative version of the camera user interface displayed in response to a "light" button press may be a "quiet" or "ready-to-capture" version of the camera user interface that fades out touch controls that are less relevant when the user is poised to capture media with the hardware button. Doing so also assists the user with composing media capture events and reduces the risk that transient media capture opportunities are missed, captured with unintended settings, and/or mis-captured due to additional displayed controls obscuring the camera preview, which additionally, reduces power usage and improves battery life of the system by enabling the user to use the system more quickly and efficiently.

In some embodiments, displaying the camera user interface with the second set of one or more user interface objects different from the first set of one or more user interface objects includes displaying (e.g., animating movement (e.g., moving, sliding, and/or shifting) in one or more directions) one or more user interface objects of the first set of one or more user interface objects (e.g., any affordances not included in the ready-to-capture/quiet UI appearance) moving from a first location (e.g., a location visible via the display generation component; e.g., a location on the display, arranged on the display, and/or displayed in an XR environment (e.g., in three-dimensional space) within the user's field-of-view) to a second location (e.g., a location off the display, off (e.g., beyond) the user interface, and/or outside of the user's field-of-view), different from the first location (e.g., as illustrated in FIG. 6F by 614A, 614B, 614C, 614E, 614F, and 614G) and, after displaying the one or more user interface objects moving from the first location to the second location, ceasing to display the one or more user interface objects (e.g., as illustrated in FIG. 6J) (e.g., the one or more user interface objects appear to move or shift off of the display and/or out of the user's field-of-view). Shifting certain touch controls not included in the alternative version of the camera user interface off of the display in response to a light press provides improved control of media capture without cluttering the media capture user interface with additional displayed controls. For example, the alternative version of the camera user interface displayed in response to a "light" button press may be a "quiet" or "ready-to-capture" version of the camera user interface that shifts away touch controls that are less relevant when the user is poised to capture media with the hardware button. Doing so also assists the user with composing media capture events and reduces the risk that transient media capture opportunities are missed, captured with unintended settings, and/or mis-captured due to additional displayed controls obscuring the camera preview, which additionally reduces power usage and improves battery life of the system by enabling the user to use the system more quickly and efficiently.

In some embodiments, in response to detecting the first press of the hardware button and in accordance with the determination that the first press satisfies the first set of criteria including the first criterion that is satisfied when the first press does not exceed the first press threshold (e.g., as described with respect to light/partial press 618 and/or light/partial press 644), the computer system displays the camera user interface with a synthetic depth-of-field effect (e.g., blurring and/or other visual effects applied based on captured depth information and/or content, for example, face and/or subject detection) applied (e.g., as illustrated in FIGS. 6F-6J and/or 6U-6W) (e.g., to a representation of a portion of the field-of-view of the cameras included in a live capture preview). In some embodiments, the first set of criteria are satisfied if the first press is a light/partial press. In some embodiments, the first set of criteria includes a criterion that is satisfied when the first press is directed to a particular hardware button. Displaying the camera user interface with a synthetic depth-of-field effect (e.g., blurring mimicking the focal conditions of a lens with a particular depth-of-field) applied in response to a "light" button press provides improved control of media capture without cluttering the media capture user interface with additional displayed controls. Doing so also provides a user with real-time visual feedback about a state of the computer system, which assists the user with composing media capture events and reduces the risk that transient media capture opportunities are missed or captured with unintended synthetic depth-of-field settings. For example, a light press allows a user to preview a synthetic depth-of-field effect without needing additional displayed controls and/or separate user inputs to manually enable the synthetic depth-of-field effect or otherwise change the capture settings.

In some embodiments, while displaying the camera user interface with the synthetic depth-of-field effect applied, the computer system detects a release of the first press and, in response to detecting the release of the first press of the hardware button, displays the camera user interface without the synthetic depth-of-field effect applied (e.g., as illustrated in FIG. 6K) (e.g., removing the blurring and/or other visual effects from the live camera preview). In some embodiments, detecting a release includes detecting that the first button press is depressing the button less than a maintenance threshold amount (e.g., 2% depressed, 5% depressed, 10%, or 18% depressed) and/or a maintenance threshold pressure (e.g., 5 g/cm$^2$, 10 g/cm$^2$, 16 g/cm$^2$, or 20 g/cm$^2$). Automatically removing the synthetic depth-of-field effect from the camera user interface in response to the light button press lifting off (e.g., releasing) provides improved control of media capture without cluttering the media capture user interface with additional displayed controls. For example, the user can briefly preview the synthetic depth-of-field effect by lightly pressing on and lifting a finger from the first hardware button, without needing additional displayed controls and/or separate user inputs to manually toggle the synthetic depth-of-field effect or otherwise change the capture settings. Doing so also reduces power usage and improves battery life of the system, for example, by limiting how long the synthetic depth-of-field effect is applied to the live camera preview.

In some embodiments, the first set of one or more user interface objects includes a first subset of one or more user interface objects (e.g., 614A, 614B, 614C, 614D-1, 614D-3, 614D-4, 614E, 614F, and/or 614G, as illustrated in FIG. 6E), and the second set of one or more user interface objects does not include the first subset of one or more user interface objects (e.g., as illustrated in FIGS. 6G-6J, 6Q, and/or 6U). For example, displaying the camera user interface with the second set of one or more user interface objects (e.g., the ready-to-capture/quiet UI appearance) includes removing (e.g., ceasing displaying, stopping display of, and/or no longer displaying) one or more user interface objects from the first set of one or more user interface objects. Removing certain touch controls not included in the alternative version of the camera user interface in response to a light press provides improved control of media capture without cluttering the media capture user interface with additional displayed controls. For example, the alternative version of the camera user interface displayed in response to a "light"

button press may be a "quiet" or "ready-to-capture" version of the camera user interface that removes touch controls that are less relevant when the user is poised to capture media with the hardware button. Doing so also assists the user with composing media capture events and reduces the risk that transient media capture opportunities are missed, captured with unintended settings, and/or mis-captured due to additional displayed controls obscuring the camera preview, which additionally, reduces power usage and improves battery life of the system by enabling the user to use the system more quickly and efficiently.

In some embodiments, the first subset of one or more user interface objects includes a media capture preview user interface object (e.g., 614G) (e.g., removing one or more user interface objects from the first set of one or more user interface objects includes removing the photo preview user interface object). In some embodiments, the media capture preview user interface object includes a thumbnail (e.g., "photo well") that, when selected, cause display of media (e.g., from a media library, album, and/or camera roll). Removing a media capture preview touch controls (e.g., thumbnails of captured media that can be selected to view a media library) from the camera user interface in response to a light press provides improved control of media capture without cluttering the media capture user interface with additional displayed controls. For example, the preview of previously-captured media is less likely to be relevant when the user is preparing for a new capture (e.g., using the hardware button), so its removal avoids unnecessarily obscuring the media capture and makes it easier to find relevant touch controls.

In some embodiments, the first subset of one or more user interface objects includes a media capture user interface object (e.g., 614F) (e.g., removing one or more user interface objects from the first set of one or more user interface objects includes removing the media capture user interface object). In some embodiments, the media capture user interface object includes a software capture button (e.g., displayed via the display generation component) that causes capture of media when selected (e.g., via the touch-sensitive surface). Removing a software capture button (e.g., a touch control for capturing media) from the camera user interface in response to a light press provides improved control of media capture without cluttering the media capture user interface with additional displayed controls. For example, the software capture button is less likely to be relevant when the user is poised for media capture using the hardware button, so its removal avoids unnecessarily obscuring the media capture and makes it easier to find relevant touch controls.

In some embodiments, the first subset of one or more user interface objects includes a capture mode user interface object (e.g., 614A) (e.g., removing one or more user interface objects from the first set of one or more user interface objects includes removing the capture mode user interface object). In some embodiments, the capture mode user interface object indicates camera capture modes, such as photo capture modes (e.g., standard, portrait, and/or timelapse) and/or video capture modes (e.g., standard, slow motion, and/or cinematic quality). In some embodiments, the capture mode user interface object changes camera capture mode when selected and/or interacted with using a gesture that includes movement (e.g., via a tap, tap and hold, drag, swipe, and/or pinch gesture). Removing capture mode touch controls from the camera user interface in response to a light press provides improved control of media capture without cluttering the media capture user interface with additional displayed controls. For example, the capture mode touch controls are less likely to be relevant when the user is already preparing for media capture using the hardware button (e.g., as the user has likely already selected the capture mode), so its removal avoids unnecessarily obscuring the media capture and makes it easier to find relevant touch controls.

In some embodiments, the first subset of one or more user interface objects includes a camera flash user interface object (e.g., 614B) (e.g., removing one or more user interface objects from the first set of one or more user interface objects includes removing the camera flash user interface object). In some embodiments, that the camera flash user interface object changes the flash settings (e.g., on, off, and/or low light mode) when selected. Removing a camera flash touch control from the camera user interface in response to a light press provides improved control of media capture without cluttering the media capture user interface with additional displayed controls. For example, the camera flash touch control is less likely to be relevant when the user is already preparing for media capture using the hardware button (e.g., as the user has likely already selected whether or not to use flash), so its removal avoids unnecessarily obscuring the media capture and makes it easier to find relevant touch controls.

In some embodiments, the first subset of one or more user interface objects includes a camera zoom user interface object (e.g., 614D-1, 614D-3, and/or 614D-4) (e.g., removing one or more user interface objects from the first set of one or more user interface objects includes removing the camera zoom user interface object). In some embodiments, the camera zoom user interface object can be selected and/or manipulated with a gesture to modify the level of zoom (e.g., 1×, 2×, 10×, and/or 0.5×). Removing a camera zoom touch control from the camera user interface in response to a light press provides improved control of media capture without cluttering the media capture user interface with additional displayed controls. For example, the camera zoom touch control is less likely to be relevant when the user is already preparing for media capture using the hardware button (e.g., as the user has likely already selected the desired zoom level), so its removal avoids unnecessarily obscuring the media capture and makes it easier to find relevant touch controls.

In some embodiments, the first subset of one or more user interface objects includes a camera selector user interface object (e.g., 614E) (e.g., removing one or more user interface objects from the first set of one or more user interface objects includes removing the camera selector user interface object). In some embodiments, the camera selector user interface object, when selected, changes which camera of the one or more cameras (e.g., one or more front (e.g., user-facing) cameras, one or more back (e.g., environment-facing) cameras, and/or one or more external cameras (e.g., connected wireless and/or in communication with the computer system). In some embodiments, the one or more cameras have one or more different lens types (e.g., a wide-angle lens, a macro lens, a telephoto lens, and/or a standard lens) is used for media capture. Removing a camera selection touch control from the camera user interface in response to a light press provides improved control of media capture without cluttering the media capture user interface with additional displayed controls. For example, the camera selection touch control is less likely to be relevant when the user is already preparing for media capture using the hardware button (e.g., as the user has likely already selected the desired lens/camera for capture), so its removal avoids unnecessarily obscuring the media capture and makes it easier to find relevant touch controls.

In some embodiments, the first subset of one or more user interface objects includes a multi-frame capture user interface object (e.g., 614C) (e.g., removing one or more user interface objects from the first set of one or more user interface objects includes removing the photo media control user interface object). In some embodiments, the multi-frame capture user interface object includes a touch control that, when selected, enables or disables capture of photo media with a limited duration (e.g., a short (e.g., 0.25, 0.5, 1, 3, and/or 5 second) multi-frame capture that includes content from before and/or after a capture input is detected, creating a "live" effect). Removing a multi-frame capture touch control from the camera user interface in response to a light press provides improved control of media capture without cluttering the media capture user interface with additional displayed controls. For example, the multi-frame capture touch control is less likely to be relevant when the user is already preparing for media capture using the hardware button (e.g., as the user has likely already selected whether to capture a multi-frame photo), so its removal avoids unnecessarily obscuring the media capture and makes it easier to find relevant touch controls.

In some embodiments, in response to detecting the first press of the hardware button and in accordance with a determination that the first press satisfies the first set of criteria including the first criterion that is satisfied when the first press does not exceed the first press threshold (e.g., as described with respect to light/partial press 618, light/partial press 634, and/or light/partial press 644), the computer system displays the camera user interface with one or more indicator elements (e.g., 616A, 616B, 616C, and/or 616E) that are not selectable via the touch-sensitive surface (e.g., as illustrated in FIGS. 6F-6J, 6Q, and/or 6U). For example, the one or more indicator elements may include informational user interface elements other than touch controls (e.g., affordances that cannot be selected to modify camera settings), such as a focus/subject indicator frame, capture mode banner, and/or level indicator. In some embodiments, in accordance with a determination that the first press does not satisfy the first set of criteria (e.g., the first press is not, or is no longer, a light/partial press), the computer system forgoes and/or ceases displaying the indicator elements. In some embodiments, the first press does not satisfy the first set of criteria if the first press is a hard/full press. In some embodiments, the first press does not satisfy the first set of criteria if the first press transitions from a light/partial press to a hard/full press, for example, by applying more pressure to the hardware button and/or depressing the hardware button further. In some embodiments, the first press does not satisfy the first set of criteria if the first press is released, for example, by reducing or removing the pressure applied to the hardware button and/or depressing the hardware button to a lesser extent or not at all. Displaying an alternative version of the camera user interface that includes non-touch control indicator elements in response to a light press provides improved control of media capture without cluttering the media capture user interface with additional displayed elements. Doing so also assists the user with composing media capture events and reduces the risk that transient media capture opportunities are missed and/or captured with unintended conditions, which additionally reduces power usage and improves battery life of the system by enabling the user to use the system more quickly and efficiently. For example, the non-touch control elements, which may include capture guidance elements (e.g., composition grids, level indicators, subject frames, and/or other status indicator elements), are displayed when the user is preparing to capture media using the hardware button (e.g., when relevant), but can be hidden when the user is not actively preparing for capture.

In some embodiments, in accordance with a determination that a set of level guidance criteria are met, the one or more indicator elements include an indicator (e.g., 616C) representing an orientation of a field-of-view of the one or more cameras with respect to a target orientation (e.g., as described with respect to FIG. 6H) (e.g., a level indicator, such as a broken line with an inner portion and outer portion(s)). In some embodiments, the target orientation is a horizon, level, and/or plumb line of the environment and/or a direction of gravitational pull of the environment. In some embodiments, the appearance of the level indicator updates as the orientation of the field-of-view of the camera changes with respect to the target orientation. In some embodiments, the set of level indicator criteria include a criterion that is satisfied when the field-of-view of the one or more cameras is tilted more than a lower threshold amount (e.g., 0.01°, 0.25°, 0.5°, 1°, 2.5°, or 5°) from a target orientation (e.g., a horizon line of the environment) and/or a criterion that is satisfied when the field-of-view of the one or more cameras is tilted less than a higher threshold amount from the target orientation (e.g., the level indicator stops being displayed when tilted over 5°, 10°, 15°, 25°, or 30° with respect to the target orientation). Conditionally displaying the alternative version of the camera user interface with a level indicator (e.g., capture guidance indicating the current orientation of the cameras relative to a target (e.g., level) orientation) provides improved control of media capture without cluttering the media capture user interface with additional displayed elements. Doing so also assists the user with composing media capture events and reduces the risk that transient media capture opportunities are missed and/or captured with unintended conditions, which additionally reduces power usage and improves battery life of the system by enabling the user to use the system more quickly and efficiently. For example, the level indicator may be displayed when the user is preparing to capture media using the hardware button if the current capture is tilted with respect to, e.g., a horizon of the environment, but can be hidden when the current capture is level and/or if the user is not actively preparing to capture media.

In some embodiments, the set of level guidance criteria includes a composition criterion that is satisfied when content of a respective content type is detected (e.g., using visual processing/image recognition techniques) in a representation of a portion of a field-of-view of the one or more cameras (e.g., 612) that is included in the camera user interface (e.g., as described with respect to FIGS. 6G-6H). In some embodiments, the respective content type may include a person, face, pet, animal, environment, landscape, and/or other particular subject. In some embodiments, the respective content type may include a person, face, pet, animal, and/or other particular subject that occupies less than a threshold portion (e.g., 10%, 15%, 25%, 29%, 40%, 50, or 60% area) of the camera user interface/live camera preview. For example, in some embodiments, if the subject occupies more than the threshold portion, display of the level indicator is suppressed. In some embodiments, the respective content type may include a landscape, environment, or other non-facial/person/pet content that occupies more than a threshold portion (e.g., 25%, 30%, 49%, 50%, 60%, 75%, or 90%) of the live camera preview. Conditionally displaying the alternative version of the camera user interface with a level indicator (e.g., capture guidance indicating the current orientation of the cameras relative to a target (e.g., level) orientation) based on the presence (or absence) of certain content in the frame of the capture provides improved control of media capture without cluttering the media capture user interface with additional displayed elements. Doing so also assists the user with composing media capture events and reduces the risk that transient media capture opportunities are missed and/or captured with unintended conditions, which additionally reduces power usage and improves battery life of the system by enabling the user to use the system more quickly and efficiently. For example, the level indicator may be displayed when the capture includes primarily landscape/environmental content (e.g., when a level capture is likely important to the composition) and may not be displayed when the capture includes primarily facial/portrait content (e.g., when a level capture is likely less important to the composition).

In some embodiments, the one or more indicator elements include a subject frame user interface object (e.g., 616A). In some embodiments, the subject frame user interface object includes a frame or border element indicating a person, animal, face, and/or other recognized object included the camera user interface (e.g., in a representation of a portion of a field-of-view of the one or more cameras included in a camera preview). In some embodiments, the subject frame user interface object indicates a focus location and/or subject of media capture. In some embodiments, in accordance with a determination that a representation of a portion of a field-of-view of the one or more cameras that is included in the camera user interface includes content of a particular type (e.g., a recognized face, person, pet, and/or other particular subject matter). Displaying an alternative version of the camera user interface that includes a subject indicator element (e.g., a framing element or other visual indication of a recognized subject (e.g., a face, person, pet, and/or other recognized subject) in the capture frame) in response to a light press provides improved control of media capture without cluttering the media capture user interface with additional displayed elements. Doing so also assists the user with composing media capture events and reduces the risk that transient media capture opportunities are missed and/or captured with unintended conditions, which additionally reduces power usage and improves battery life of the system by enabling the user to use the system more quickly and efficiently. For example, subjects recognized in the capture frame are automatically visually indicated when the user is preparing to capture media using the hardware button (e.g., when relevant), but are not automatically visually indicated when the user is not actively preparing for capture.

In some embodiments, the second set of one or more user interface objects includes one or more additional user interface objects that are selectable via the touch-sensitive surface (e.g., 614H, 614I, and/or 614J as illustrated in FIGS. 6G-6J, 6Q, and/or 6U) and the first set of one or more user interface objects does not include the one or more additional user interface objects (e.g., as illustrated in FIG. 6C) (e.g., additional/new touch controls are added to the camera user interface in response to a light/partial press). Including additional/new touch controls in the alternative version of the camera user interface provided in response to a light press provides improved control of media capture without unnecessarily cluttering the media capture user interface with additional displayed controls. Doing so also assists the user with composing media capture events and reduces the risk that transient media capture opportunities are missed or captured with unintended settings, which additionally, reduces power usage and improves battery life of the system by enabling the user to use the system more quickly and efficiently. For example, the alternative version of the camera user interface displayed in response to a "light" button press may be a "quiet" or "ready-to-capture" version of the camera user interface that surfaces additional controls that are particularly relevant as the user prepares to capture media with the hardware button, but may be less relevant when the user is not actively preparing for capture, such as exposure controls, focus/depth-of-field controls, and other controls for finalizing a media capture composition.

In some embodiments, displaying the camera user interface with the second set of one or more user interface objects that includes one or more additional user interface objects that are selectable via the touch-sensitive surface includes, in accordance with a determination that a first media capture mode is enabled (e.g., at the time the first press is detected), displaying a first additional user interface object as part of the one or more additional user interface objects (e.g., as illustrated by the addition of 614H in FIGS. 6G and/or 6U while in a mode for capturing media with synthetic depth-of-field effects). In some embodiments, the first media capture mode may include a photo media capture mode, a video media capture mode, a depth capture mode (e.g., capturing depth information for generating media with a synthetic depth-of-field effect and/or spatial media), a high-quality capture mode; and/or another media capture mode. In some embodiments, while in a photo media capture mode, the media capture operation includes capturing photo media, such as still photo media, photo media with a limited duration (e.g., a short (e.g., 1, 3, and/or 5 second) multi-frame capture that includes content from before and/or after a capture input is detected, creating a "live" effect), and/or panoramic photo media. In some embodiments, displaying the camera user interface with the second set of one or more user interface objects that includes one or more additional user interface objects that are selectable via the touch-sensitive surface includes, in accordance with a determination that the first media capture mode is not enabled, displaying the one or more additional user interface objects without displaying the first additional user interface object (e.g., as illustrated in FIG. 6Q (e.g., while in a mode for capturing media without synthetic depth-of-field effects)). For example, if the first press is detected while in a photo capture mode, the additional touch controls may include controls for toggling the "live" effect capture, adjusting focus, and/or adjusting exposure; if the first press is detected while in a video capture mode, the additional touch controls may include controls for selecting video resolution and/or adjusting frame rate; and/or if the first press is detected while in a depth capture mode, the additional touch controls may include controls for selecting a simulated f-stop value. In some embodiments, in accordance with a determination that a second media capture mode, different from the first media capture mode, is enabled, the one or more additional user interface objects includes a second additional user interface object different from the first additional user interface object. Conditionally including certain additional/new touch controls in the alternative version of the camera user interface in response to a light press based on the current capture mode provides improved control of media capture without unnecessarily cluttering the media capture user interface with additional displayed controls. Doing so also assists the user with composing media capture events and reduces the risk that transient media capture opportunities are missed or captured with unintended settings, which additionally, reduces power usage and improves battery life of the system by enabling the user to use the system more quickly and efficiently. For example, the alternative version of the camera user interface displayed in response to a "light" button press may be customized with different sets of additional controls that are particularly relevant to the current capture mode as the user prepares to capture media with the hardware button, but may be less relevant when the user is not actively preparing for capture or preparing to capture media in a different capture mode.

In some embodiments, displaying the camera user interface with the second set of one or more user interface objects that includes one or more additional user interface objects that are selectable via the touch-sensitive surface includes: in accordance with a determination that a first setting of the camera user interface is enabled (e.g., at the time the first press is detected), displaying a second additional user interface object as part of the one or more additional user interface objects (e.g., as illustrated by the addition of 614J while video capture is enabled in FIG. 6U). In some embodiments, the first setting is enabled and/or disabled by one or more user inputs (e.g., at the camera user interface, at a camera user interface settings menu, and/or at another settings configuration user interface) received prior to detecting the first press (e.g., the first setting is a user-configurable setting. In some embodiments, the first setting is a particular capture mode. In some embodiments, in some embodiments, the first setting is a particular ready-to-capture/quiet UI setting/configuration. In some embodiments, the second additional user interface object is a touch control associated with the particular capture mode. In some embodiments, the second additional user interface object is included in the particular ready-to-capture/quiet UI setting/configuration. In some embodiments, the second additional user interface object is the same as the first additional user interface object. In some embodiments, displaying the camera user interface with the second set of one or more user interface objects that includes one or more additional user interface objects that are selectable via the touch-sensitive surface includes: in accordance with a determination that a first setting of the camera user interface is not enabled, displaying the one or more additional user interface objects without displaying the second additional user interface object (e.g., as illustrated in FIG. 6G, while video capture is not enabled). In some embodiments, the first setting of the camera user interface is not enabled because the camera is not in the particular capture mode. In some embodiments, the first setting of the camera user interface is not enabled because the particular ready-to-capture/quiet UI setting/configuration is not enabled. Conditionally including certain additional/new touch controls in the alternative version of the camera user interface in response to a light press based on previous user inputs (e.g., settings selections made by the user) provides improved control of media capture without unnecessarily cluttering the media capture user interface with additional displayed controls. Doing so also assists the user with composing media capture events and reduces the risk that transient media capture opportunities are missed or captured with unintended settings, which additionally, reduces power usage and improves battery life of the system by enabling the user to use the system more quickly and efficiently. For example, the additional controls included in the alternative version of the camera user interface displayed in response to a "light" button press may be customized by a user (e.g., either directly and/or automatically in response to the user selecting certain settings) to automatically provide relevant controls as the user prepares to capture media with the hardware button.

In some embodiments, the one or more additional user interface objects includes a third additional user interface object (e.g., 614H, 614I, and/or 614J) (e.g., touch control). In some embodiments, the third additional user interface object is the same as the first additional user interface object and/or the second additional user interface object. In some embodiments, while displaying the camera user interface with the second set of one or more user interface objects, the computer system detects (e.g., via the touch-sensitive surface) a first input (e.g., 620A) (e.g., a tap input) selecting the third additional user interface object (e.g., as illustrated in FIG. 6G). In some embodiments, the computer system, in response to detecting the first input selecting the third additional user interface object, displays, via the display generation component, an alternative user interface object (e.g., 622A and/or 622B) that can be controlled via the touch-sensitive surface (e.g., via 620B) (e.g., via a selection and/or gesture input, such as a tap, tap and hold, drag, swipe, and/or pinch gesture) to control at least one function (e.g., as illustrated in FIGS. 6I-6J). In some embodiments, the at least one function is included in the second set of functions. For example, the third user interface object provides expanded controls and/or additional options for one of the functions controllable using the ready-to-capture/quiet UI (e.g., a slider, menu, and/or button set for selecting between, settings values such as f-stop values, exposure durations, and/or other settings values). In some embodiments, the at least one function is not included in the second set of functions (e.g., selecting the second user interface object exposes a previously-hidden function). Adding touch controls in the alternative version of the camera user interface in response to a light press based on the current capture mode provides improved control of media capture without unnecessarily cluttering the media capture user interface with additional displayed controls. Doing so also assists the user with composing media capture events and reduces the risk that transient media capture opportunities are missed or captured with unintended settings, which additionally, reduces power usage and improves battery life of the system by enabling the user to use the system more quickly and efficiently. For example, the alternative version of the camera user interface can initially include "minimized" touch controls that avoid unnecessarily obscuring the capture frame while still providing quick access to "expanded" touch controls that may be relevant as the user prepares to capture media with the hardware button.

In some embodiments, the one or more additional user interface objects includes an exposure user interface object (e.g., 614I) (in some embodiments, the exposure user interface object is the same as the first additional user interface object, the second additional user interface object, and/or the third additional user interface object) that can be controlled via the touch-sensitive surface to control a media capture exposure setting. For example, the exposure user interface object can be controlled via the touch-sensitive surface to adjust an exposure duration, simulated shutter speed, brightness, and or frame rate. In some embodiments, the exposure user interface object, when selected, causes display of a sliding user interface object for adjusting the exposure of media capture. In some embodiments, the exposure user interface object, when selected, controls a low-light/night mode capture setting (e.g., a setting for automatically adjusting the exposure based on luminance data). Adding a new exposure touch control to the camera user interface in response to a light press provides improved control of media capture without unnecessarily cluttering the media capture user interface with additional displayed controls. Doing so also assists the user with composing media capture events and reduces the risk that transient media capture opportunities are missed or captured with unintended settings, which additionally, reduces power usage and improves battery life of the system by enabling the user to use the system more quickly and efficiently. For example, surfacing new exposure controls to the user when the user is preparing for a new capture (e.g., using the hardware button) provides the exposure controls when relevant (e.g., to adjust the final composition of an upcoming media capture).

In some embodiments, the one or more additional user interface objects includes a synthetic depth-of-field user interface object (e.g., 614H) (in some embodiments, the synthetic depth-of-field user interface object is the same as the first additional user interface object, the second additional user interface object, and/or the third additional user interface object) that can be controlled via the touch-sensitive surface to control a synthetic depth-of-field media capture setting (e.g., as illustrated in FIGS. 6G-6J). In some embodiments, the synthetic depth-of-field media capture setting includes a setting to enable/disable the capture of depth information with the media capture. In some embodiments, the synthetic depth-of-field media capture setting includes a setting to enable, disable, and/or modify blurring and/or other visual effects applied (e.g., to a capture preview included in the camera user interface and/or to the captured media, e.g., either automatically or after the capture) based on captured depth information and/or content (e.g., face/subject detection). In some embodiments, modifying the synthetic depth-of-field media capture setting includes selecting a simulated aperture size (e.g., f-stop value, such as 1.8, 2.4, and/or 4.2). In some embodiments, the synthetic depth-of-field user interface object, when selected, causes display of a slider user interface object for adjusting the synthetic depth-of-field media capture setting (e.g., adjusting the f-stop value). Adding a new synthetic depth-of-field touch control to the camera user interface in response to a light press provides improved control of media capture without unnecessarily cluttering the media capture user interface with additional displayed controls. Doing so also assists the user with composing media capture events and reduces the risk that transient media capture opportunities are missed or captured with unintended settings, which additionally, reduces power usage and improves battery life of the system by enabling the user to use the system more quickly and efficiently. For example, surfacing new depth-of-field controls to the user when the user is preparing for a new capture (e.g., using the hardware button) provides the exposure controls when relevant (e.g., to adjust the final composition of an upcoming media capture).

In some embodiments, the one or more additional user interface objects includes a zoom user interface object (e.g., 614D-2) (in some embodiments, the zoom user interface object is the same as the first additional user interface object, the second additional user interface object, and/or the third additional user interface object) that can be controlled via the touch-sensitive surface to control a media capture zoom setting (e.g., that can be selected and/or interacted with using a gesture to modify the magnification level of a capture preview included in the camera user interface and/or captured media (e.g., 0.5×, 1×, 2×, or 10×)). Adding a new zoom touch control to the camera user interface in response to a light press provides improved control of media capture without unnecessarily cluttering the media capture user interface with additional displayed controls. Doing so also assists the user with composing media capture events and reduces the risk that transient media capture opportunities are missed or captured with unintended settings, which additionally, reduces power usage and improves battery life of the system by enabling the user to use the system more quickly and efficiently. For example, surfacing new zoom controls to the user when the user is preparing for a new capture (e.g., using the hardware button) provides the exposure controls when relevant (e.g., to adjust the final composition of an upcoming media capture).

In some embodiments, displaying the one or more additional user interface objects (e.g., in response to detecting a light/partial press) includes displaying a control user interface object (e.g., 614H, 614I, 614J, 622A, and/or 622B) at a first location (e.g., as illustrated in FIGS. 6G-6J, 6Q, and/or 6U). In some embodiments, the first location includes a location visible via the display generation component, for example, on the display, arranged on the display, and/or displayed in an XR environment (e.g., in three-dimensional space) within the user's field-of-view. In some embodiments, the control interface object is the same as the first additional user interface object, the second additional user interface object, and/or the third additional user interface object. In some embodiments, the computer system detects an input (e.g., a tap, touch, gesture, air gesture, and/or gaze input that is optionally detected via a touch-sensitive surface of the display generation component) directed to the first location and, in response to detecting the input at the first location and in accordance with a determination that the input at the first location is detected while the second set of one or more user interface objects (e.g., including the one or more additional user interface objects) are displayed, performs an operation corresponding to the control user interface object (e.g., as described with respect to FIGS. 6G and 6I-6J). For example, the second set of one or more user interface object remain displayed while detecting a light/partial press, e.g., while the first press satisfies the first set of criteria (e.g., while the first press is maintained without exceeding the first press threshold) and/or while the first press satisfies the maintenance criterion (e.g., while the first press is maintained with at least a maintenance threshold). In some embodiments, the computer system, in response to detecting the input at the first location and in accordance with a determination that the input at the first location is detected while the second set of one or more user interface objects are not displayed, forgoes performing the operation corresponding to the control user interface object (e.g., as described with respect to FIG. 6K). Providing certain additional controls via touch inputs only when the alternative version of the camera user interface is being displayed (e.g., in response to and/or while maintaining a light button press) button provides improved control of media capture, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, a user can use the additional controls to set up a media capture while maintaining a light press and then release the light press to "lock in" the settings when the additional controls are hidden.

In some embodiments, in response to detecting the first press of the hardware button and in accordance with a determination that the first press satisfies the second set of criteria including the second criterion that is satisfied when the first press exceeds the first press threshold (e.g., the button press is a hard/"full" press) and does not satisfy the first set of criteria including the first criterion that is satisfied when the first press does not exceed the first press threshold, wherein the first set of criteria includes a first duration criterion that is satisfied when the first press exceeds a press duration threshold (e.g., 0.1 seconds, 0.5 seconds, 0.9 seconds, or 1 second) without exceeding the first press threshold (e.g., a press is registered as a light/partial press if it is maintained at below the first press threshold for at least a threshold period of time), the computer system forgoes displaying the camera user interface with the second set of one or more user interface objects (e.g., as illustrated in FIGS. 6L-6M). For example, the media capture operation is performed without first changing the touch controls in response to a "quick" hard/full press (e.g., a press that exceeds the first press threshold in less than the threshold period of time). In some embodiments, the computer system continues displaying the camera user interface with the first set of one or more user interface objects in response to a quick hard/full press. In some embodiments, the computer system changes the appearance of the camera user interface in another manner in response to a quick hard/full press (e.g., displaying a capture animation). Displaying the alternative version of the camera user interface in response to a light press and forgoing displaying the alternative version of the camera user interface in response to a quick hard press (e.g., even though the quick hard press may initially be a "light" press) assists the user with composing media capture events and reduces the risk that transient media capture opportunities are missed and/or mis-captured due to unintended UI changes and/or latency. Doing so additionally reduces power usage and improves battery life of the system, for example, by refraining from changing to the alternative version of the camera user interface when the user intends only to capture media.

In some embodiments, while displaying the camera user interface (e.g., a camera/capture UI, which, in some embodiments, includes at least a portion of a field-of-view of the camera(s) (e.g., a live capture preview)) with the first set of one or more user interface objects (e.g., affordances) that are selectable via the touch-sensitive surface to control a first set of functions (e.g., touch controls for a camera application), the computer system detects a press (e.g., 620C) (in some embodiments, a touch input, a touch and release input, a tap input, or a light tap input) of a media capture user interface object (e.g., 614F) (e.g., as illustrated in FIG. 6K). In some embodiments, the media capture user interface object includes a software capture button displayed via the display generation component. In some embodiments, when selected, the media capture user interface object causes performance of the media capture operation (e.g., photo and/or video media). In some embodiments, the media capture user interface object is included in the first set of one or more user interface objects that are selectable via the touch-sensitive surface. In some embodiments, the media capture user interface object is included in the second set of one or more user interface objects. In some embodiments, in response to detecting the press (e.g., 620C) of the media capture user interface object (e.g., 614F), the computer system foregoes displaying the camera user interface with the second set of one or more user interface objects (e.g., as illustrated in FIG. 6L) (e.g., maintains display of the camera user interface with the first set of one or more user interface objects). In some embodiments, in response to detecting the first press of the software capture button, the computer system captures media (e.g., photo and/or video media).

Displaying the alternative version of the camera user interface in response to a light press of a hardware button but not in response to a selection of a software capture button (e.g., a displayed touch control for media capture) assists the user with composing media capture events and reduces the risk that transient media capture opportunities are missed and/or mis-captured due to unintended UI changes and/or latency. Doing so additionally reduces power usage and improves battery life of the system, for example, by refraining from changing to the alternative version of the camera user interface when the user intends only to capture media.

In some embodiments, the computer system, after displaying the camera user interface with the second set of one or more user interface objects (e.g., as illustrated in FIGS. 6G-6J, 6Q, and/or 6U) (e.g., in response to a light/partial press), detects a second press of the hardware button (e.g., 624, 638, 648, and/or 656). In some embodiments, the second press is a continuation of the first press of the hardware button. In some embodiments, the second press is a new press, separate from the first press. In some embodiments, in response to detecting the second press of the hardware button and in accordance with a determination that the second press satisfies the second set of criteria including the second criterion that is satisfied when the first press exceeds the first press threshold, the computer system performs a second media capture operation (e.g., as illustrated in FIGS. 6M, 6R, 6V-6W, and/or 6X). In some embodiments, the second set of criteria are satisfied when the press is a full/hard press. In some embodiments, where the second press is a continuation of the first press, the second set of criteria are satisfied when the press exceeds the first press threshold (e.g., transitioning from a light/partial press to a hard/full press). In some embodiments, the second media capture operation includes capturing photo media, initiating video media capture and/or stopping video media capture. In some embodiments, if the second press is a continuation of the first press, the second media capture operation is the same as the first media capture operation. Using a hardware button to both display an alternative version of a camera user interface and to capture media (e.g., based on whether button presses are light/partial or hard/full presses) provides improved control of media capture without cluttering the media capture user interface with additional displayed controls. For example, the alternative version of the camera user interface displayed in response to a "light" button press may be a "quiet" or "ready-to-capture" version of the camera user interface, providing a relevant set of touch controls and allowing a user to compose a media capture and confirm capture settings prior to capturing the media using a "hard" button press. Doing so also assists the user with composing media capture events and reduces the risk that transient media capture opportunities are missed, captured with unintended settings, and/or mis-captured due to additional displayed controls obscuring the camera preview, which additionally, reduces power usage, improves battery life of the system, and improves ergonomics by enabling the user to use the system more quickly and efficiently. For example, users can quickly switch between displaying the alternative version of the camera user interface and capturing media without needing to move their fingers from the hardware button.

In some embodiments, while displaying the camera user interface with the second set of one or more user interface objects (e.g., as illustrated in FIGS. 6G-6J, 6Q, and/or 6U) (e.g., in response to a light/partial press), the computer system detects a set of one or more inputs (e.g., 620A and/or 620B) (e.g., selection and/or gesture inputs, such as a tap, tap and hold, drag, swipe, and/or pinch gesture, via the touch-sensitive surface) directed to a fourth user interface object (e.g., 614H, 614I, 614J, 622A, and/or 622B). For example, the fourth user interface object may include one or more affordances corresponding to a media capture control or setting, such as buttons, menus, and/or sliders corresponding to controls for enabling, disabling, and/or adjusting a media capture mode, a synthetic depth-of-field effect, a depth capture mode, an exposure setting, a flash setting, a zoom (e.g., magnification) level, a resolution, a capture speed or frame rate, and/or another setting. In some embodiments, the fourth user interface object is the same as the second user interface object and/or the third user interface object. In some embodiments, the fourth interface object is included in the second set of one or more user interface objects. In some embodiments, in response to the set of one or more inputs, the computer system sets a first media capture setting corresponding to the fourth user interface object to a respective state (e.g., as illustrated in FIGS. 6I-6J), wherein the second media capture operation (e.g., capturing photo media, initiating video media capture, and/or stopping video media capture) is performed with the first media capture setting in the respective state (e.g., as illustrated in FIGS. 6M-6N). In some embodiments, setting the first media capture setting to the respective state includes enabling or disabling the media capture setting (e.g., turning flash, low-light capture mode, depth capture, or another feature on or off) and/or setting the media capture setting to a particular value (e.g., changing a simulated f-stop value, a zoom level, a maximum exposure duration, a brightness, or another adjustable setting). Capturing media with capture settings that were adjusted via the alternative version of the camera user interface in response to a subsequent hard button press provides improved control of media capture without cluttering the media capture user interface with additional displayed controls. For example, the alternative version of the camera user interface provides a relevant set of touch controls that allow a user to compose a media capture and confirm capture settings prior to capturing the media using a subsequent "hard" button press. Doing so also assists the user with composing media capture events and reduces the risk that transient media capture opportunities are missed, captured with unintended settings, and/or mis-captured due to additional displayed controls obscuring the camera preview, which additionally, reduces power usage, improves battery life of the system, and improves ergonomics by enabling the user to use the system more quickly and efficiently. For example, users can quickly switch between adjusting capture settings via the alternative version of the camera user interface and capturing media without needing to move their fingers from the hardware button.

In some embodiments, the computer system, in response to detecting the first press of the hardware button and in accordance with a determination that the first press satisfies the first set of criteria including the first criterion that is satisfied when the first press does not exceed the first press threshold (e.g., in response to a light/partial press), selects a plane of focus (e.g., as illustrated in FIGS. 6F-6J) for a third media capture operation (e.g., as illustrated in FIGS. 6M-6N). In some embodiments, the plane of focus includes a plane in the environment that is substantially parallel to the camera/perpendicular to the direction the camera is facing (e.g., the plane of focus lies in front of the camera). For example, the plane of focus includes a plane of the environment captured with the sharpest focus in the media capture operation. In some embodiments, the third media capture operation is the same as the first media capture operation and/or the second media capture operation. In some embodiments, the computer system displays a visual indication that the focus of the camera is locked on a particular subject. Selecting a plane of focus in response to a "light" button press provides improved control of media capture without cluttering the media capture user interface with additional displayed controls. Doing so also provides a user with real-time visual feedback about a state of the computer system, which assists the user with composing media capture events and reduces the risk that transient media capture opportunities are missed or mis-captured due to unintended focus. For example, a light press allows a user to preview the focus for a media capture without needing additional displayed controls and/or separate user inputs to manually lock focus while preparing for capture using the hardware button.

In some embodiments, in response to detecting the first press of the hardware button and in accordance with a determination that the first press satisfies the first set of criteria including the first criterion that is satisfied when the first press does not exceed the first press threshold (e.g., in response to a light/partial press), the computer system provides a first tactile (e.g., haptic) output (e.g., 619, 636, and/or 646) (e.g., as illustrated in FIGS. 6F, 6P, and/or 6T). In some embodiments, a tactile output is a tactile output (e.g., vibration and/or other tactile sensation) generated by a tactile (e.g., haptic) feedback module that is in communication with the computer system. In some embodiments, the tactile output at the hardware button may cause the user to perceive the pressed hardware button as a mechanical button, when the hardware button may be a solid state button (e.g. a touch-sensitive surface that provides a tactile sensation when pressed (e.g., using a tactile output generator), even when there is no movement of the touch-sensitive surface/a physical button when the user presses the button). In some embodiments, the generated tactile output is perceived by the user as corresponding to physical displacement of the button. Providing a tactile output in response to a light press of a hardware button provides a user with real-time feedback about a state of the computer system, for example, confirming for a user that a press on the hardware button has been detected as a light press, and accordingly, that the response to the button press will include displaying the alternative version of the camera user interface.

In some embodiments, in response to detecting the first press of the hardware button and in accordance with a determination that the first press satisfies the first set of criteria, wherein the first set of criteria includes a second duration criterion that is satisfied when the first press does not exceed the first press threshold (e.g., hard-press pressure threshold $P_H$ and/or hard-press depression threshold $T_H$) before a threshold amount of time (e.g., the button press is a light/partial press that is maintained below the first press threshold for at least a minimum amount of time (e.g., 0.1 seconds, 0.25 seconds, 0.5 seconds, 0.9 seconds, or 1 second)), the computer system provides a second tactile (e.g., haptic) output (e.g., 619, 636, and/or 646). In some embodiments, the second tactile output is the same as the first tactile output. In some embodiments, in response to detecting the first press of the hardware button and in accordance with a determination that the first press satisfies the second set of criteria and does not satisfy the first set of criteria (e.g., the button press moves through the first press threshold before meeting the threshold amount of time (e.g., 0.1 seconds, 0.25 seconds, 0.5 seconds, 0.9 seconds, or 1 second)), the computer system forgoes providing the second tactile output (e.g., as illustrated in FIG. 6L) or, optionally, forgoes providing any tactile output. Conditionally providing a tactile output in response to a light press of a hardware button based on whether the press quickly transitions to a hard press provides a user with real-time feedback about a state of the computer system. For example, the presence or absence of the tactile output helps the user gauge whether a press of the hardware button is being detected as a light press or a hard press, and accordingly, whether the response to the press will be displaying the alternative version of the camera user interface or capturing media.

In some embodiments, the computer system, in response to detecting the first press of the hardware button and in accordance with a determination that the first press satisfies the second set of criteria including the second criterion that is satisfied when the first press exceeds the first press threshold, provides a third tactile (e.g., haptic) output (e.g., 626, 640, 650, and/or 658) (e.g., as illustrated in FIGS. 6L, 6Q, 6U, and/or 6X). In some embodiments, a tactile output is a tactile output (e.g., vibration and/or other tactile sensation) generated by a tactile feedback generator that is in communication with the computer system. In some embodiments, the tactile output at the hardware button may cause the user to perceive the pressed hardware button as a mechanical button, when the hardware button may be a solid state button (e.g. a touch-sensitive surface that provides a tactile sensation when pressed (e.g., using a haptic output generator), even when there is no movement of the touch-sensitive surface/a physical button when the user presses the button). In some embodiments, the generated tactile output is perceived by the user as corresponding to physical displacement of the button. Providing a tactile output in response to a hard press of a hardware button provides a user with real-time feedback about a state of the computer system, for example, confirming for a user that a press on the hardware button has been detected as a hard press, and accordingly, that the response to the button press will include capturing media.

In some embodiments, the third tactile output (e.g., 626, 640, 650, and/or 658) is a haptic output of a first type (e.g., as illustrated in FIGS. 6L, 6Q, 6U, and/or 6X). In some embodiments, the computer system, in response to detecting the first press of the hardware button and in accordance with a determination that the first press satisfies the first set of criteria including the first criterion that is satisfied when the first press does not exceed the first press threshold, provides a fourth tactile (e.g., haptic) output (e.g., 619, 636, and/or 646), wherein the fourth tactile output is a tactile output of a second type different from the first type (e.g., as illustrated in FIGS. 6F, 6P, and/or 6T) (e.g., greater than, stronger than, less than, weaker than, and/or providing a different tactile sensation to the user). In some embodiments, the fourth tactile output is the same as the first tactile output and/or the second tactile output. Providing different tactile outputs depending on whether a button press is detected as a light press or a hard press of a hardware button provides a user with real-time feedback about a state of the computer system. For example, providing different tactile outputs helps the user gauge whether a press of the hardware button is being detected as a light press or a hard press, and accordingly, whether the response to the press will be displaying the alternative version of the camera user interface or capturing media.

Note that details of the processes described above with respect to method 800 (e.g., FIG. 8 are also applicable in an analogous manner to the methods described above and below. For example, methods 700, 1000, 1100, and 1300 optionally includes one or more of the characteristics of the various methods described above with reference to method 800. For example, in addition to changing camera user interface touch controls in response to light/partial presses as described with respect to method 800, computer systems may perform synthetic depth-of-field operations as described with respect to method 1300, and in addition to performing a media capture operation in response to hard/full presses as described with respect to method 800, computer systems may perform different media capture operations depending on the button pressed as described with respect to method 700. In addition to responding differently to light/partial vs. hard/full presses, computer systems may respond differently to other types of presses as described with respect to method 1100, and may launch the camera user interface described with respect to method 700 using hardware button presses as described with respect to method 1000. For brevity, these details are not repeated below.

FIGS. 9A-9Z illustrate exemplary user interfaces for providing customizable controls using a hardware button, in accordance with some embodiments. The user interfaces in these figures are used to illustrate the processes described below, including the processes in FIGS. 10 and 11.

At FIG. 9A, computer system 600 displays, via display 606, settings user interface 900. Settings user interface 900 includes settings affordance 902, which can be used to set an association between third button 602C (e.g., the "side button") and one or more settings, functions, user interfaces, and/or applications of computer system 600, as described in more detail below with respect to FIG. 9U. For example, via settings affordance 902 of settings user interface 900, a user can associate third button 602C with a camera application, a do-not-disturb setting for computer system 600 (e.g., for silencing and/or suppressing notifications), a notes application, a music application, a television user interface (e.g., a media viewing application and/or a virtual remote control for a connected television system), and/or a home screen of computer system 600.

At FIG. 9B, while displaying, via display 606, music application user interface 904 (including various touch controls, such as volume slider 904A, repeat affordance 904B, autoplay affordance 904C, and shuffle affordance 904D) detects press input 906 of third button 602C. In some embodiments, third button 602C may be a solid-state or mechanical button, and press input 906 may be a press that applies at least a threshold amount of pressure and/or physically depresses third button 602C at least a threshold amount. In some embodiments, press input 906 may place third button 602C into one of hardware button states (A)-(E), as illustrated in FIG. 6B and described with respect to first button 602A and second button 602B. In some embodiments, press input 906 may be a first type of hardware button press (e.g., a short button press, as described in further detail below) or a second type of hardware button press (e.g., a long button press, as described in further detail below). Depending on the current association with third button 602C (e.g., an option of the one or more settings, functions, user interfaces, and/or applications of computer system 600 selected via settings user interface 900), computer system 600 responds differently to press input 906 of third button 602C based on a current association with third button 602C. As illustrated in FIG. 9C, if third button 602C is associated with the do-not-disturb setting when press input 906 is detected, computer system 600 responds to press input 906 by enabling (or, if already enabled when press input 906 is detected, disabling) the do-not-disturb setting and displaying indicator 908 informing the user of the change to the setting. Accordingly, the user can control the do-not-disturb setting without needing navigate away from music application user interface 904 or to open a separate settings menu (e.g., controlling the do-not-disturb setting from "within" the current user interface). In some embodiments, while third button 602C is associated with the do-not-disturb setting, computer system 600 will change the do-not-disturb setting in response to presses of third button 602C while displaying various applications and/or user interfaces (e.g., camera user interface 620, home page user interface 940, a lock screen, and/or another application and/or user interface).

Figure 9D:
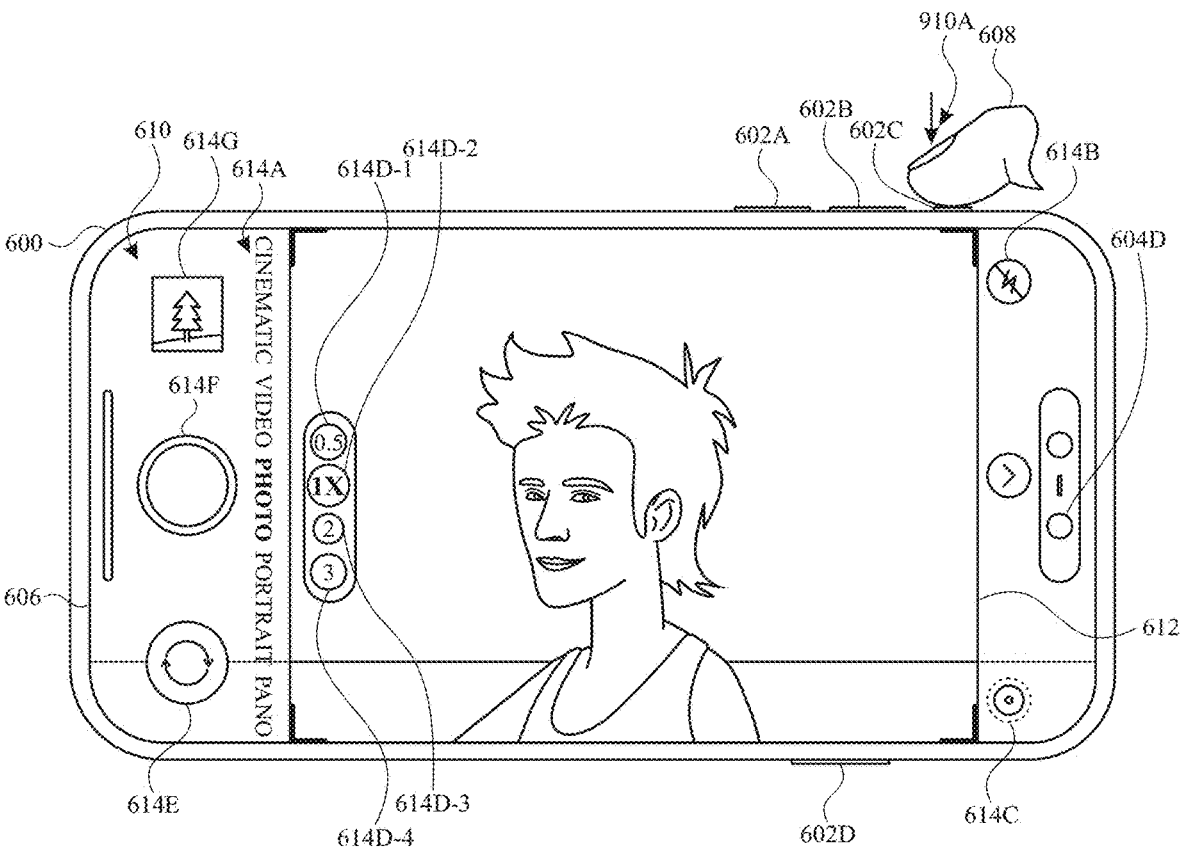

As illustrated in FIG. 9D, if third button 602C is associated with the camera application when press input 906 is detected, computer system 600 responds to press input 906 by ceasing display of (e.g., closing and/or hiding) music application user interface 904 and displaying (e.g., opening and/or surfacing) camera user interface 610 of the camera application (e.g., as described above with respect to FIG. 6C). Accordingly, the user can access the camera application directly from the music application, without needing to navigate to a home page or other application-switching user interface.

At FIG. 9D, while displaying camera user interface 610 (e.g., and while third button 602C remains associated with the camera application), computer system 600 detects press input 910A of third button 602C. Press input 910A is a first type of hardware button press. In some embodiments, the first type of hardware button press is a "short" button press, which is released in less than a threshold period of time (e.g., 0.25 s, 0.5 s, or 1 s) after the press is initially registered by computer system 600. For example, computer system 600 may register press input 910A as the first type of hardware button press if third button 602C is placed into an "activated" state, such as hardware button state (E) and/or (D), followed by a "released" state, such as hardware button states (A), (B), (C), and/or (D), within 0.5 seconds. In some embodiments, in addition to or alternatively to being a short button press, the first type of hardware button press may have other characteristics, such as being a light/partial press or a hard/full press (e.g., as described above with respect to first button 602A and second button 602B), or a being particular compound press, such as a double-press, triple-press or other multiple-press sequence or pattern.

Figure 9E:
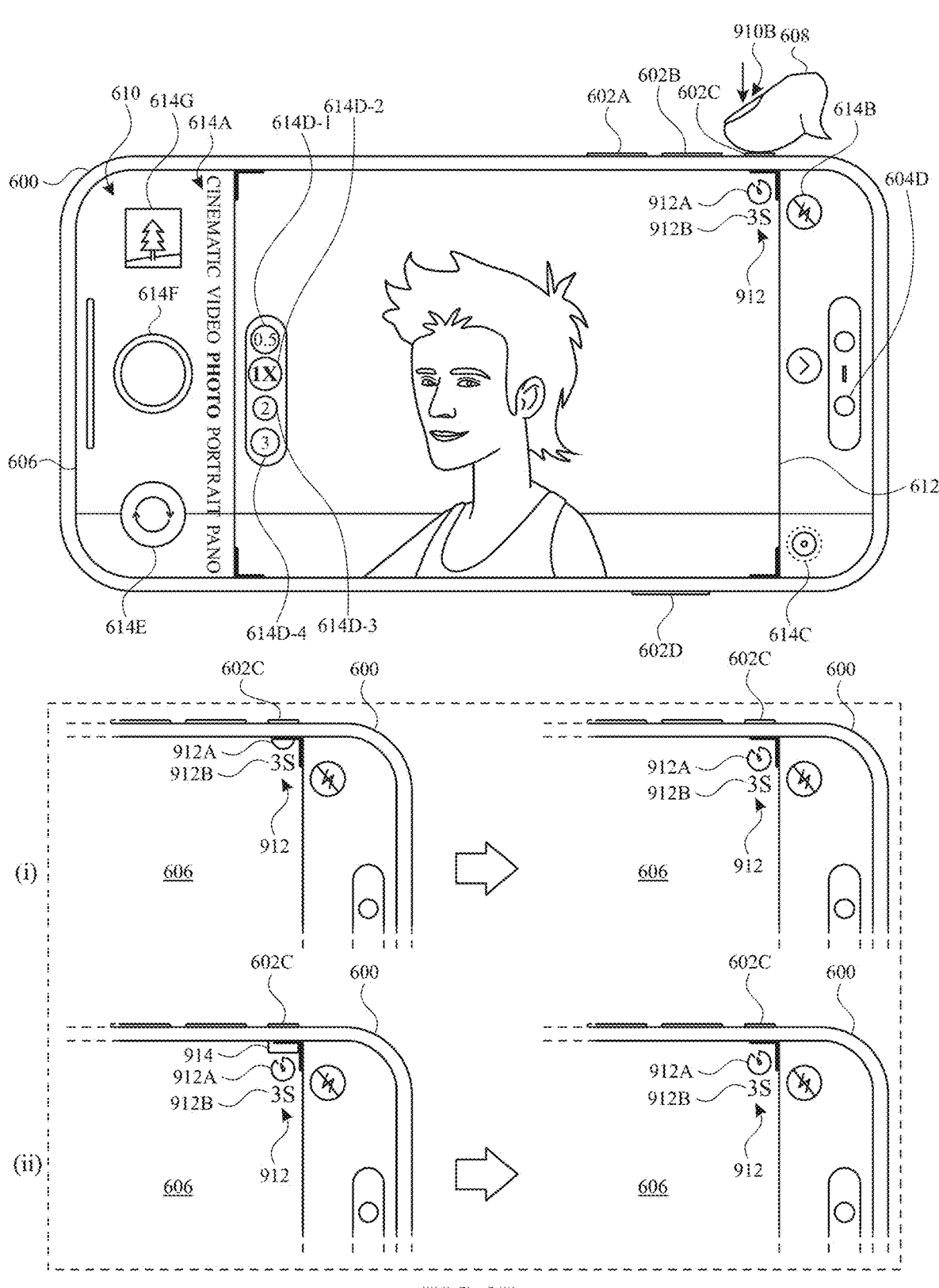

In response to press input 910A (e.g., a press of the first type) of third button 602C, at FIG. 9E, computer system 600 changes a setting of the camera application currently associated with third button 602C within the camera application. As illustrated in FIG. 9E, when press input 910A is detected, third button 602C is associated with a capture timer setting of the camera application (e.g., a setting controlling whether, and how long of, a delay is introduced between when a capture input is detected and when media starts to be captured), so computer system 600 changes the capture timer setting to a timer delay of three seconds. As illustrated in FIG. 9E, computer system 600 displays capture timer indicator 912 indicating the change. Capture timer indicator 912 includes glyph 912A, a stopwatch icon representing the capture timer setting, and text 912B, which indicates the current timer delay setting of three seconds. As illustrated in the lower inset of FIG. 9E, in some embodiments, computer system 600 animates capture timer indicator 912 moving into view from the edge of display 606 where third button 602C is located as if pressing third button 602C physically "pushes" capture timer indicator 912 into display 606. For example, as shown in the top panels of the inset, going from left to right, computer system 600 may animate capture timer indicator 912 shifting or sliding inwards from the edge of display 606 directly below third button 602C into a fully-displayed position below third button 602C. As another example, as shown in the bottom panels of the inset, going from left to right, computer system 600 may display element 914, a "notch" approximately the width of third button 602C, "bumping" capture timer indicator 912 further inwards into display 606 from the vicinity of third button 602C, then display element 914 retracting off of display 606 and capture timer indicator 912 retracting to the fully-displayed position below third button 602C. In some embodiments, computer system 600 animates capture timer indicator 912 based on one or more characteristics of press input 910A, such as the current hardware button state (e.g., described with respect to FIG. 6B) and/or the timing of press input 910A. For example, computer system 600 may display timer indicator 912 as shown in the top left panel of the inset when third button 602C is in hardware button state (D) (e.g., a light/partial press) and as shown in the right-hand panels of the inset or the bottom left panel of the inset when third button 602C is in hardware button state (E) (e.g., a hard/full press). As another example, computer system may display timer indicator 912 as shown in the bottom left panel of the inset while press input 910A is being held (e.g., while third button 602C remains pressed) and as shown in the right-hand panels of the inset when press input 910A is released.

Figures 9F, 9G:
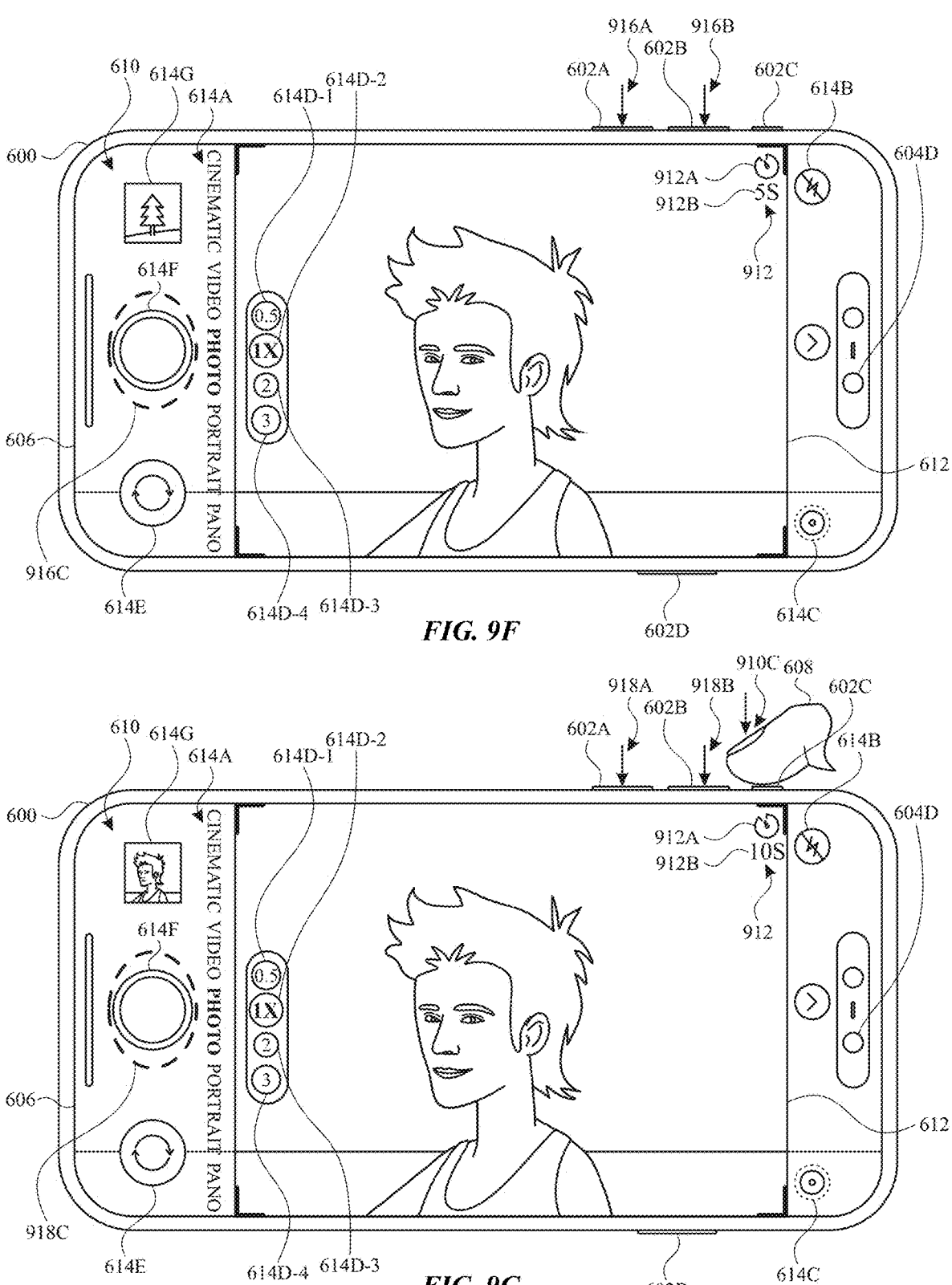

At FIG. 9E, computer system 600 detects press input 910B of third button 602C, which is another press of the first type (e.g., a short press). In response to press input 910B, at FIG. 9F, computer system 600 changes the capture timer setting again, this time setting the timer delay to five seconds. As illustrated in FIG. 9F, computer system 600 updates text 912B of capture timer indicator 912 to indicate the changed setting value. In some embodiments, computer system 600 may also animate capture timer indicator 912 moving in response to press input 910B as described with respect to FIG. 9E (e.g., displaying element 914 bumping capture timer indicator 912 out with each subsequent press). After changing the capture timer setting to five seconds, in response to detecting an input requesting to capture media, such as press input 916A of first button 602A (e.g., a hard/full press, as described with respect to FIGS. 6Q-6R), press input 916B of second button 602B (e.g., a hard/full press, as described with respect to FIGS. 6L-6M), or touch input 916C directed to shutter affordance 614F, computer system 600 initiates a media capture after a five-second countdown timer has elapsed and updates the appearance of captured media icon 614G as shown in FIG. 9G to show a thumbnail of the captured media once complete.

At FIG. 9G, computer system 600 detects press input 910C, another press of the first type, at third button 602C. In response to press input 910C, computer system 600 changes the capture timer setting to a ten-second delay and updates text 912B of capture timer indicator 912 as illustrated. After changing the capture timer setting to ten seconds, in response to detecting an input requesting to capture media, such as press input 918A of first button 602A, press input 918B of second button 602B, or touch input 916C directed to shutter affordance 614F, computer system 600 initiates a media capture after a ten-second countdown timer has elapsed. In some embodiments, in response to further press inputs of the first type (e.g., short presses) following press input 910C, computer system 600 would continue to change the capture timer setting, for instance, first changing the capture timer setting to a zero-second delay (e.g., toggling the delay timer off), and thereafter cycling back through the three-second delay, the five-second delay, the ten-second delay, and the zero-second delay. The user can thus cycle through a set of states for the capture timer setting using repeated press inputs of the first type (e.g., repeated short presses) while the capture timer setting is associated with third button 602C within the camera application.

Figures 9H, 9I:
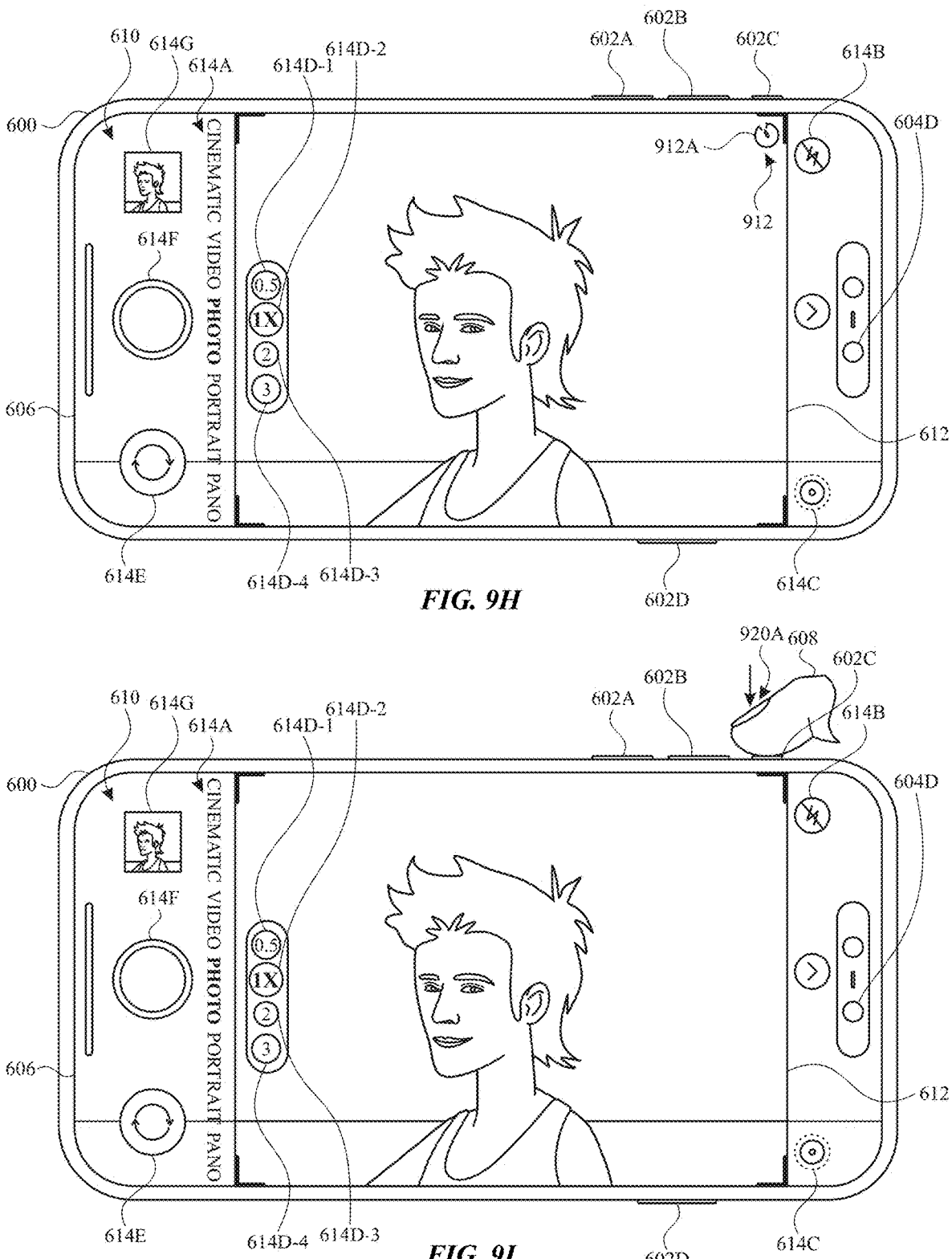

At FIG. 9H, after a period of time (e.g., 1 s, 1.5 s, and/or 2 s) without detecting further inputs at third button 602C, computer system 600 stops displaying capture timer indicator 912. As illustrated in FIGS. 9H-9I, computer system 600 stops displaying capture timer indicator 912 gradually, first removing text 912B as shown in FIG. 9H before removing glyph 912A in FIG. 9I. In some embodiments, computer system may fade glyph 912A and/or text 912B out and/or shift glyph 912A and/or text 912B off of display 606.

At FIG. 9I, while displaying camera user interface 610 and while third button 602C remains associated with the camera application, computer system 600 detects press input 920A of third button 602C. Press input 920A is a second type of hardware button press that is distinguishable from the first type of hardware button press (e.g., press inputs 910A, 910B, and 910C). In some embodiments, the second type of hardware button press is a "long" button press, which is released after at least the threshold period of time (e.g., 0.25 s, 0.5 s, and/or 1 s) after the press is initially registered by computer system 600. In some embodiments, in addition to or alternatively to being a long button press, the second type of hardware button press may have other characteristics that distinguish it from the first type of hardware button press, such as being light/partial press, a hard/full press, or a particular compound press, such as a double-press, triple-press or other multiple press sequence or pattern.

Figures 9J, 9K:
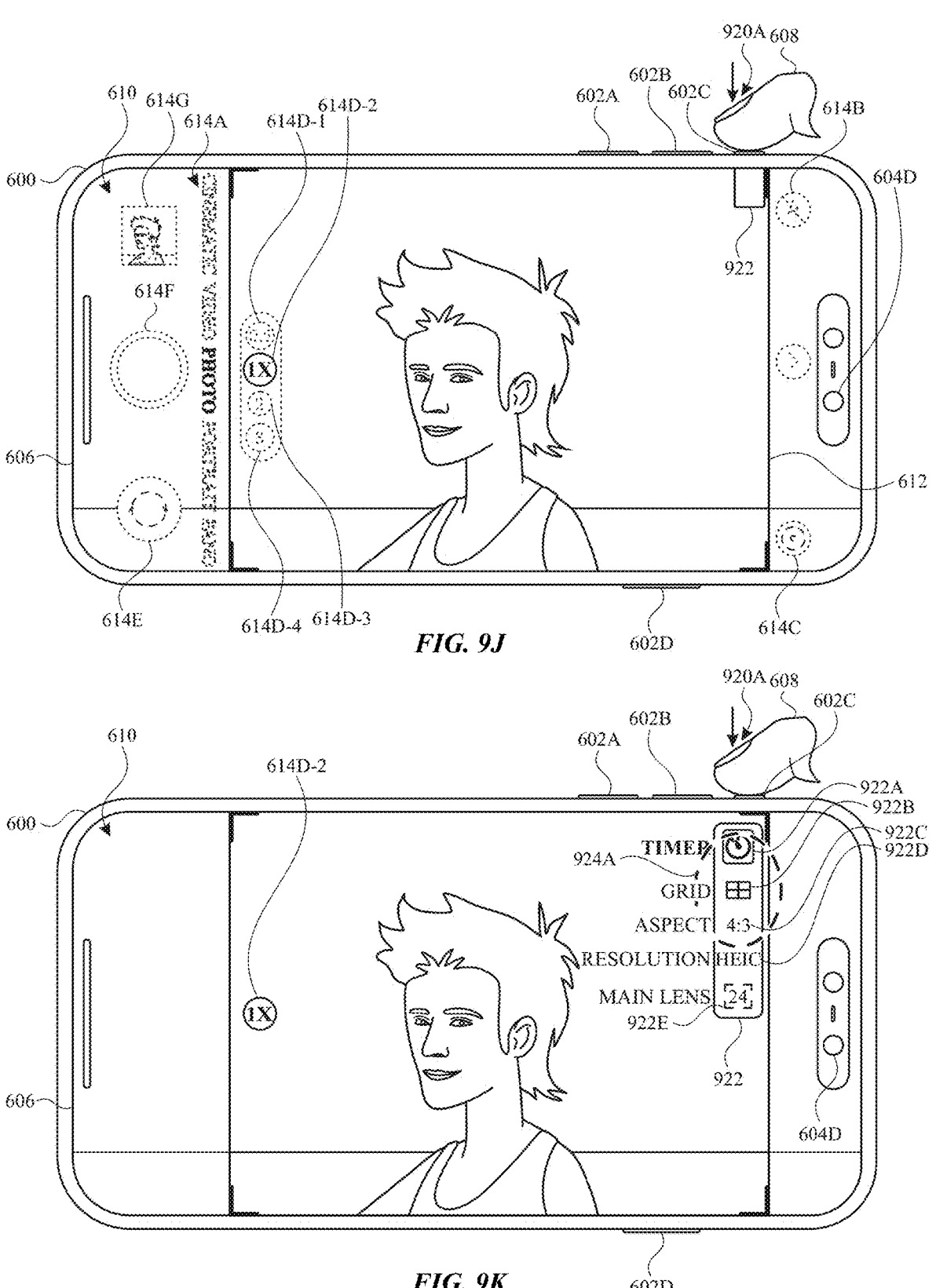

In response to press input 920A (e.g., a press of the second type) of third button 602C, computer system 600 displays settings menu 922 via display 606 as illustrated in FIGS. 9J-9K. In particular, as illustrated in FIG. 9J, computer system 600 animates a platter of settings menu 922 emerging (e.g., "pushing in") from third button 602C, transforming into settings menu 922 at illustrated in FIG. 9K, with menu items 922A-922E arranged on the platter. In some embodiments, as illustrated in FIGS. 9J-9K, computer system displays additional updates to camera user interface 610 while displaying settings menu 922, for example, removing capture mode affordance 614A, camera flash affordance 614B, multi-frame photo affordance 614C, zoom affordances 614D-1, 614D-3, and 614D-4, camera selection affordance 614E, shutter affordance 614F, and captured media icon 614G (e.g., displaying camera user interface 610 with a "quiet" or "ready-to-capture" appearance as described with respect to FIGS. 6A-6Y). In some embodiments, computer system 600 will cease displaying settings menu 922 if press input 920A of third button 602C is released.

Figures 9L, 9M:
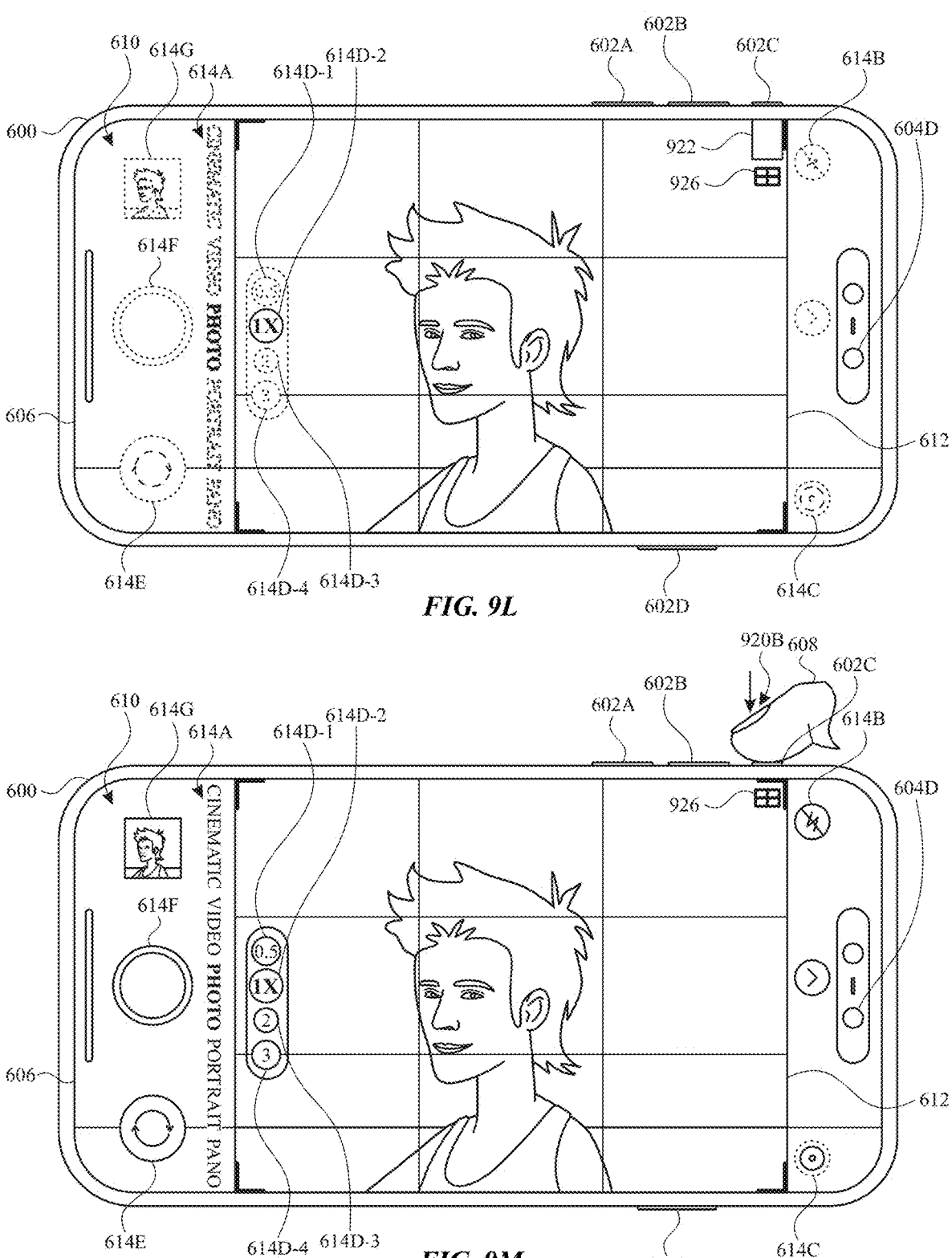

As illustrated in FIG. 9K, menu items 922A-922E of settings menu 922 include glyphs/icons and text labels indicating the settings that can be associated with third button 602C within the camera application. Menu item 922A, which is labeled "timer" and includes at least a portion of capture timer indicator 912 (e.g., the stopwatch icon, glyph 912A), corresponds to the capture timer setting. As the capture timer setting is associated with third button 602C (e.g., allowing the user to cycle through states of the capture timer setting via presses of the first type on third button 602C) in the camera application when press input 920A is detected, computer system 600 visually emphasizes menu item 922A in menu 922, which is represented in FIG. 9K by the frame around the stopwatch icon, but could also include highlighting, bolding, and/or changing the color of menu item 922A relative to the other menu items. Menu item 922B, labeled "grid" and including a grid icon (e.g., the grid icon of grid indicator 926, described in further detail below), corresponds to a capture guidance setting, for example, controlling the display of a camera grid (e.g., as illustrated in FIG. 9L), a level indicator (e.g., as described above with respect to level indicator 616C), and/or another form of capture guidance, such as a plumb indicator (e.g., similar to level indicator 616C, representing the current misalignment between the orientation of camera preview 612 and a direction of gravity's pull (e.g., straight up and down with respect to the environment)). Menu item 922C, labeled "aspect" and including the text "4:3" (e.g., the text of aspect ratio indicator 928, described in further detail below) corresponds to an aspect ratio setting, for example, controlling the aspect ratio of camera preview 612 and of captured media (e.g., cropping the field-of-view of the camera(s) to an aspect ratio of 4:3, 16:9, square (1:1), and/or another aspect ratio). Menu item 922D, labeled "resolution" and including the text "HEIC" (e.g., the text of display capture quality indicator 930, described in further detail below) corresponds to a capture quality setting, for example, controlling the capture resolution (e.g., 12, 24, or 48 megapixel) and/or the compression codec (e.g., high-efficiency image coding (HEIC), ProRes, or raw coding). Menu item 922E, labeled "main lens" and including a glyph with the text "24" inscribed in a crop icon (e.g., the text and icon of focal length indicator 932, described in further detail below) corresponds to a custom focal length setting, for example, setting a framing or crop size of camera preview 612/captured media that corresponds to a capture using a lens with a particular focal length (e.g., 22 mm, 24 mm, or 28 mm).

At FIG. 9K, computer system 600 detects input 924A (e.g., a touch, tap, gesture, air gesture, and/or other input) directed to menu item 922B. In response to detecting input 924A, computer system 600 changes the setting of the camera application currently associated with third button 602C in the camera application from the capture timer setting to the capture guidance setting. As illustrated in FIG. 9L, computer system 600 also changes the capture guidance setting in response to input 924A, enabling the display of a capture guidance grid marking camera preview 612 into thirds. In some embodiments, in addition or alternatively to displaying the capture guidance grid, computer system 600 may conditionally display a level indicator and/or a plumb indicator based on the current orientation of camera preview 612 (e.g., if a current orientation is misaligned from a target orientation by more than a threshold amount) and/or content detected in camera preview 612 (e.g., if a particular subject is not detected in camera preview 612), for example, as described above with respect to level indicator 616C in FIG. 6H. In some embodiments, input 924A may only change the setting of the camera application currently associated with third button 602C in response to inputs via settings menu 922, for instance, refraining from displaying capture guidance until further inputs are received (e.g., as described with respect to FIG. 9Q).

In response to detecting input 924A, computer system 600 additionally dismisses settings menu 922 as illustrated in FIGS. 9L-9M, animating the platter of settings menu 922 withdrawing towards the edge of display 606 below third button 602C before settings menu 922 disappears. Computer system 600 also displays capture guidance indicator 926 moving towards third button 602C (e.g., following behind the withdrawing platter of settings menu 922) to a final position near third button 602C, indicating that third button 602C is now associated with the capture guidance setting. In some embodiments, when settings menu 922 is dismissed, computer system 600 reverts camera user interface 610 to its previous (e.g., default or standard) appearance, once again displaying capture mode affordance 614A, camera flash affordance 614B, multi-frame photo affordance 614C, zoom affordances 614D-1, 614D-3, and 614D-4, camera selection affordance 614E, shutter affordance 614F, and captured media icon 614G as illustrated in FIG. 9M. In some embodiments, after a period of time (e.g., 0.5 s, 1 s, and/or 1.5 s) without detecting further inputs at third button 602C, computer system 600 stops displaying capture guidance indicator 926 for example, as described above with respect to capture timer indicator 912.

Figures 9N, 9O:
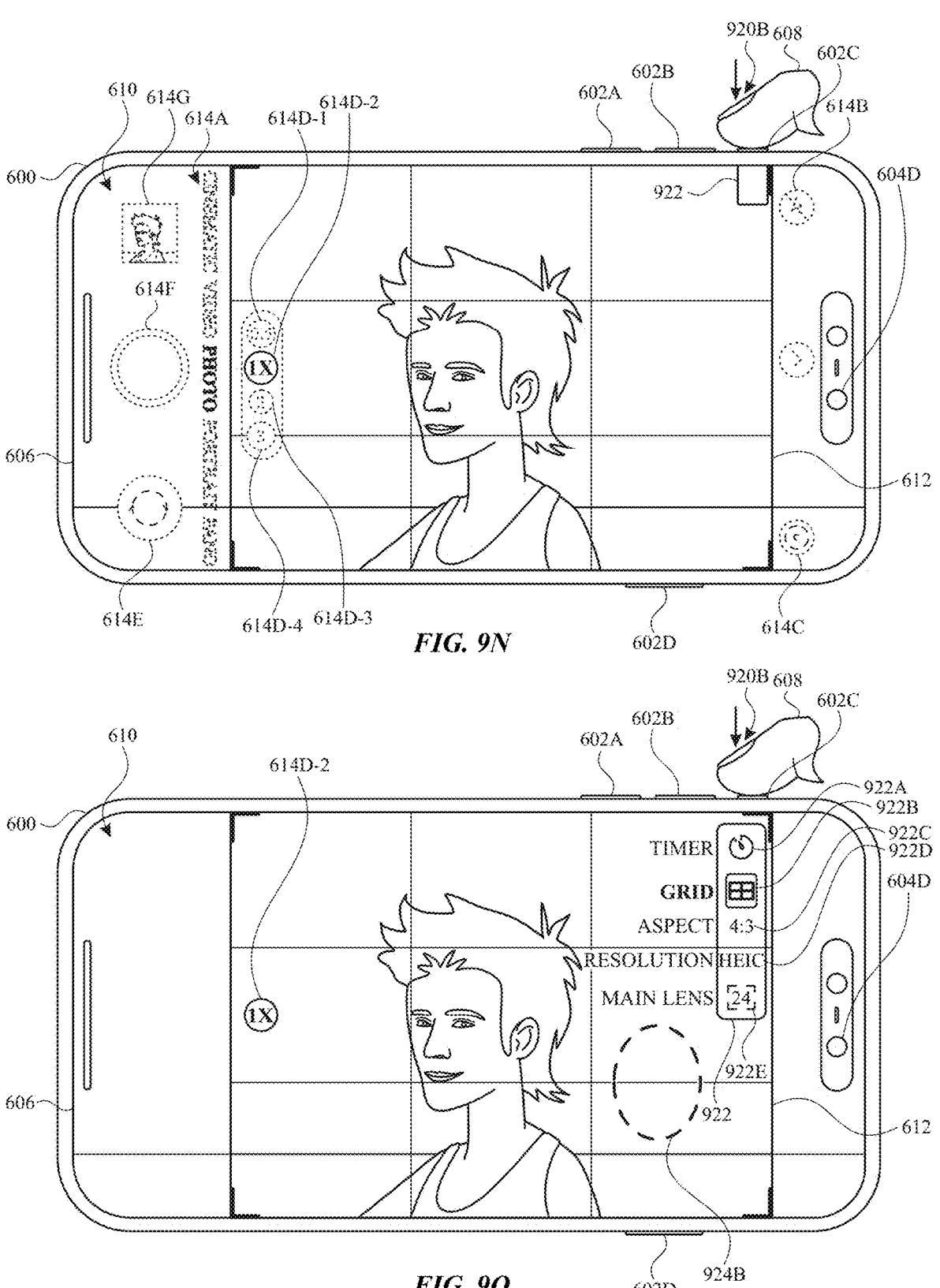

As illustrated in FIGS. 9N-9O, in response to detecting press input 920B, which, like press input 920A, is the second type of hardware button press (e.g., a long button press), computer system 600 presents settings menu 922 as previously described; however, as the capture guidance setting is currently associated with third button 602C (e.g., selected by the user via input 924A), at FIG. 9O, computer system 600 visually emphasizes menu item 922B. At FIG. 9O, computer system 600 detects input 924B (e.g., a touch, tap, gesture, air gesture, and/or other input), which is not directed to settings menu 922. At FIG. 9P, in response to input 924B, computer system 600 dismisses settings menu 922 as described with respect to FIG. 9L. In some embodiments, as input 924B did not select one of the items of settings menu 922, computer system 600 does not animate a settings indicator such as capture timer indicator 912 or capture guidance indicator 926 moving towards third button 602C, indicating that the setting associated with third button 602C did not change.

Figures 9P, 9Q:
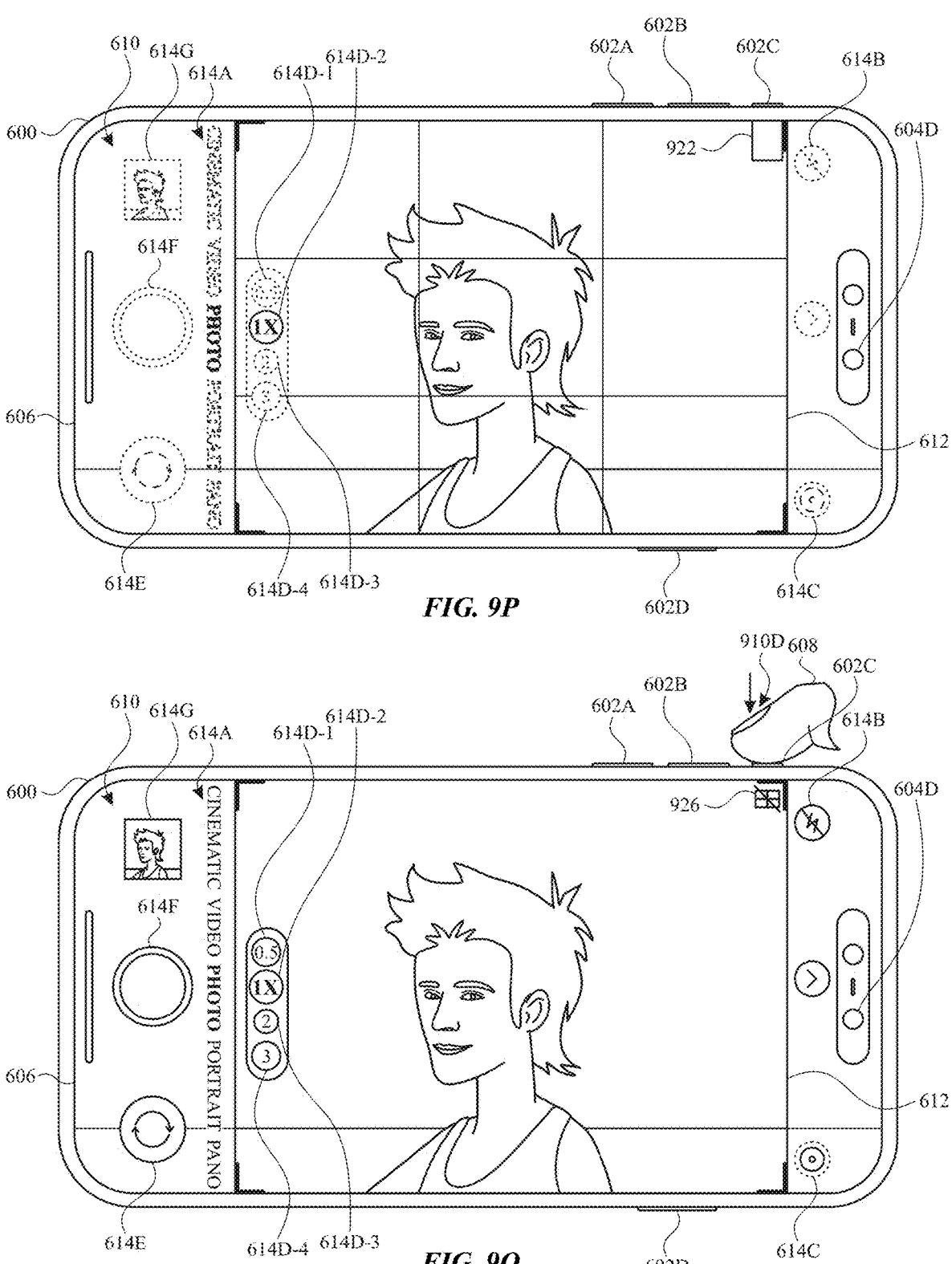
Figure 9R:
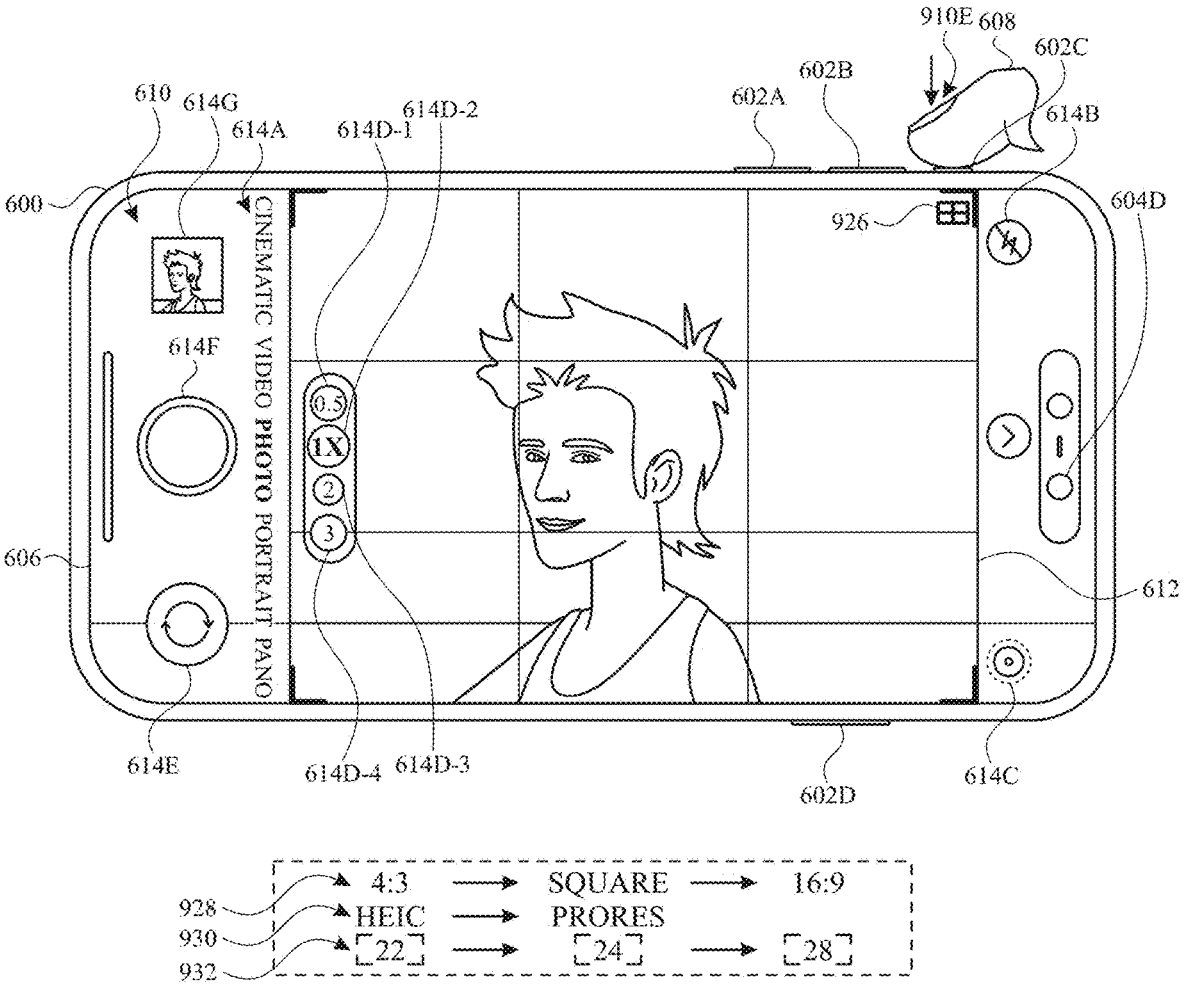

At FIG. 9Q, in response to detecting press input 910D, a press of the first type (e.g., a short button press), at third button 602C, computer system 600 changes the capture guidance setting to disable the display of capture guidance, hiding the capture guidance grid overlaying camera preview 612. As illustrated in FIG. 9Q, computer system 600 displays the grid icon of capture guidance indicator 926 with a strikethrough line, indicating the current (e.g., changed) value of the setting. At FIG. 9R, in response to detecting press input 910E, another press of the first type, at third button 602C, computer system 600 again changes the capture guidance setting, re-enabling the display of the capture guidance grid overlaying camera preview 612 and displaying capture guidance indicator 926 without the strikethrough line. In some embodiments, computer system 600 animates capture guidance indicator 926 in response to press inputs 910D and/or 910E as described with respect to capture timer indicator 912 in FIGS. 9E-9G. The user can thus cycle through states of the capture guidance setting using repeated press inputs of the first type at third button 602C while the capture guidance setting is associated with third button 602C.

As described with respect to the capture timer setting and the capture guidance setting, the user can cycle through sets of states for other settings using repeated press inputs of the first type at third button 602C by associating the other settings with third button 602C in the camera application (e.g., selecting menu item 922C corresponding to the aspect ratio setting, menu item 922D corresponding to the capture quality setting, and/or menu item 922E corresponding to the custom focal length setting via settings menu 922, as described with respect to selecting menu item 922B in FIGS. 9J-9M). For instance, while the aspect ratio setting is associated with third button 602C, computer system 600 will display aspect ratio indicator 928 and cycle through 4:3, square (e.g., 1:1), and 16:9 aspect ratio settings values for media capture (e.g., changing the aspect ratio at which media will be captured and, in some embodiments, updating display of camera preview 612 to the current aspect ratio) in response to repeated presses of the first type at third button 602C, updating aspect ratio indicator 928 as illustrated in the lower inset of FIG. 9R (e.g., cycling through display of the text "4:3," "square," and "16:9"). While the capture quality setting is associated with third button 602C, computer system 600 will display capture quality indicator 930 and switch between HEIC and ProRes encoding for media capture in response to repeated presses of the first type at third button 602C, updating capture quality indicator 930 as illustrated in the lower inset of FIG. 9R (e.g., cycling through display of the text "HEIC" and "ProRes"). In some embodiments, the capture quality setting may also be changed to select different capture resolutions (e.g., 12, 24, and/or 48 MP) and/or different media file size limits (e.g., 5 MB, 10 MB, and/or 20 MB). While the custom focal length setting is associated with third button 602C, computer system 600 will display focal length indicator 932 and cycle through 22 mm, 24 mm, and 28 mm focal length capture sizing (e.g., changing the cropping of media capture and, in some embodiments, updating display of camera preview 612 to the current crop setting), updating focal length indicator 932 as illustrated in the lower inset of FIG. 9R (e.g., cycling the text inscribed in a crop icon between "22," "24," and "28"). In some embodiments, different settings and/or different sets of settings values than those illustrated in the foregoing figures can be cycled using presses of the first type at third button 602C.

Figures 9S, 9T:
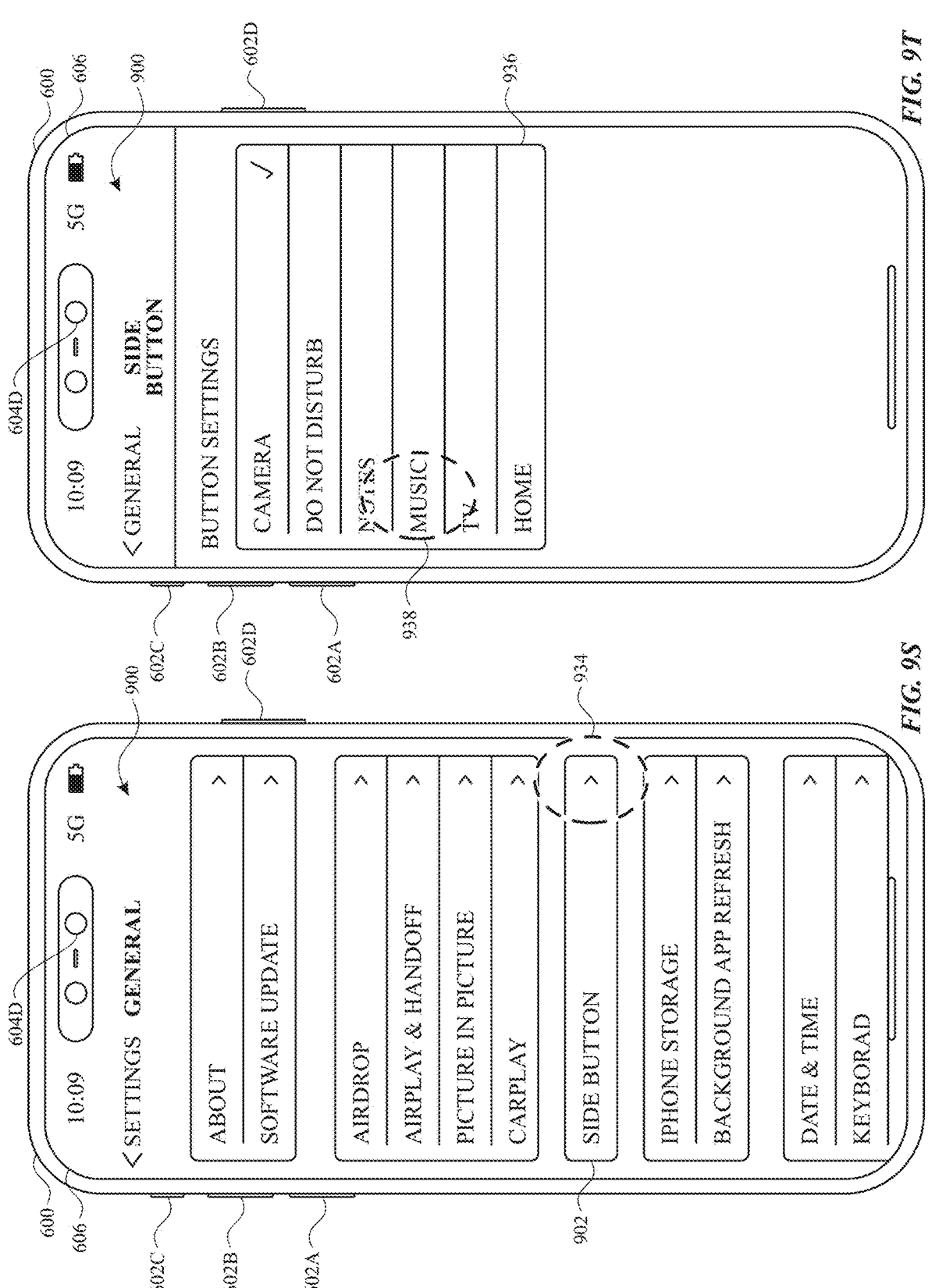

At FIG. 9S, while displaying settings user interface 900, computer system 600 detects input 934 (e.g., a touch, tap, gesture, air gesture, and/or other input) directed to settings affordance 902. As illustrated in FIG. 9T, in response to input 934, computer system 600 displays button menu 936, which includes menu items corresponding to the settings, functions, user interfaces, and/or applications that can be associated with third button 602C, including the camera application, do-not-disturb setting, notes application, music application, television controls, and/or home screen user interface. As the camera application is currently associated with third button 602C (e.g., allowing the user to open the camera application via press input 906, as described above with respect to FIG. 9D), computer system 600 displays the menu item for the camera application with a checkmark indicating the current association. At FIG. 9T, in response to detecting input 938 (e.g., a touch, tap, gesture, air gesture, and/or other input) directed to the "music" menu item of button menu 936, computer system 600 changes the association with third button 602C from the camera application to the music application, indicated by displaying the "music" menu item of button menu 936 with the checkmark as illustrated in FIG. 9U.

Figures 9U, 9V:
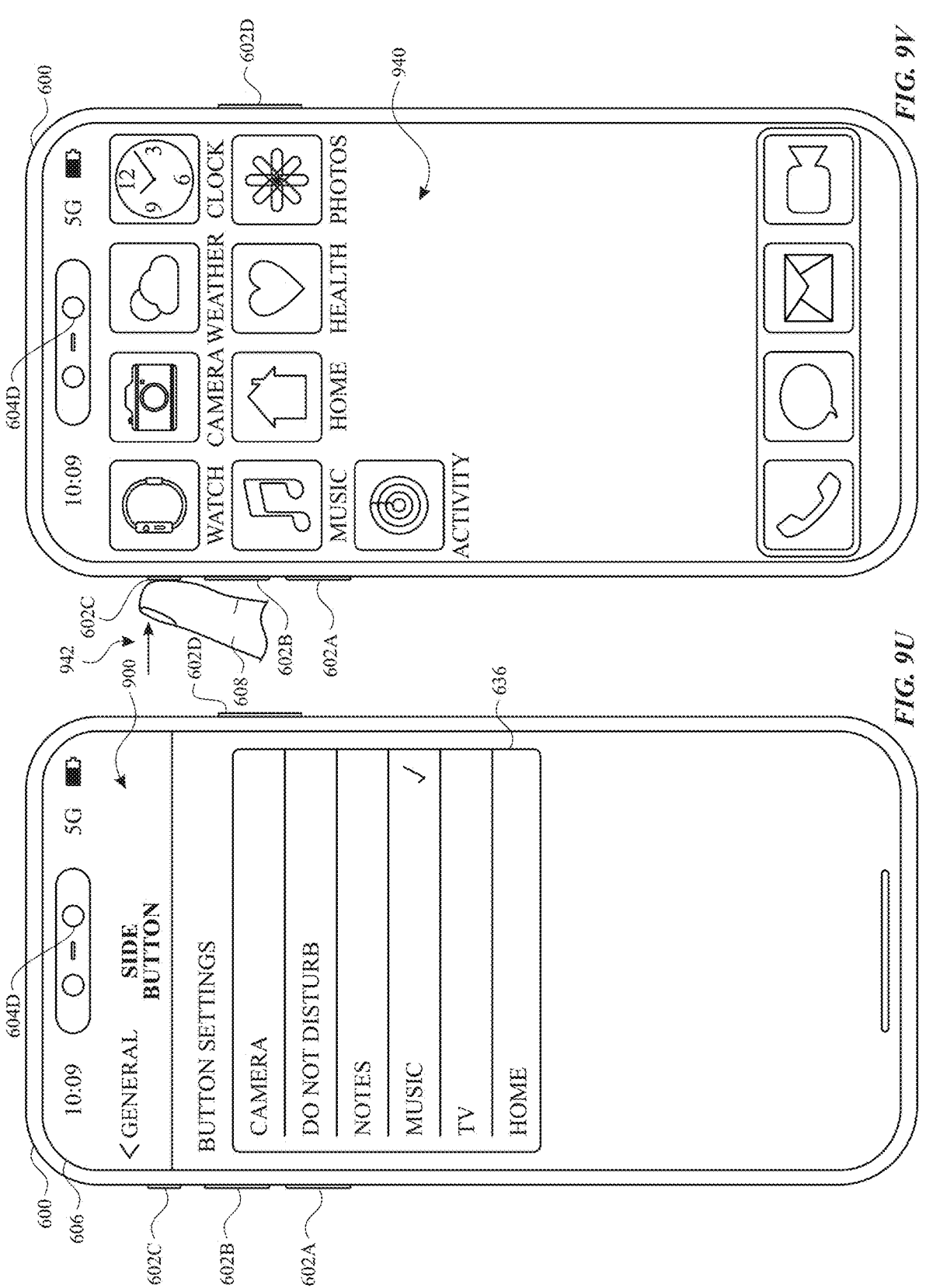

At FIG. 9V, while displaying home page user interface 940, computer system 600 detects press input 942 of third button 602C. As the music application is associated with third button 602C when press input 942 is detected, at FIG. 9W, computer system 600 stops displaying home page user interface 940 and displays music application user interface 904, launching and/or bringing the music application into focus. In some embodiments, while the music application is associated with third button 602C, if press input 642 were instead detected while displaying camera user interface 610 (e.g., as illustrated in FIGS. 9D-9R), computer system 600 would stop displaying camera user interface 610 and display music application user interface 904, for instance, without changing any of the settings of camera user interface 610 or displaying settings menu 922.

Figures 9W, 9X:
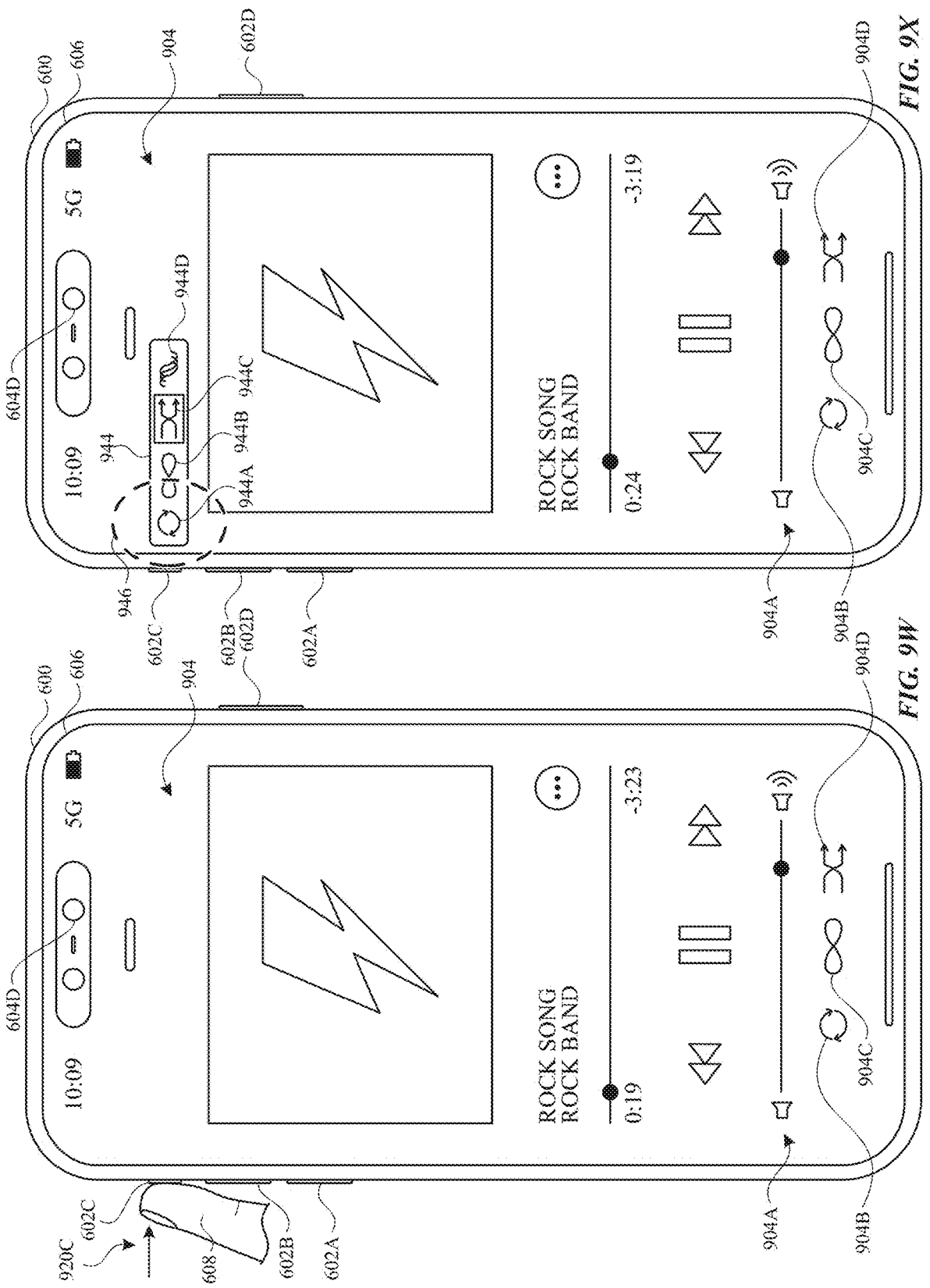

As illustrated in FIG. 9W, while displaying music application user interface 904, computer system 600 detects press input 920C, a press of the second type (e.g., a long press), of third button 602C. In response to detecting press input 920C, at FIG. 9X, computer system 600 displays settings menu 944, for example, animating settings menu 944 emerging from the location of third button 602C as described with respect to settings menu 922 in FIGS. 9J-9K. Settings menu 944 includes menu items 944A-944D, which correspond to settings that can be associated with third button 602C within the music application. Menu item 944A corresponds to a repeat setting for music playback, menu item 944B corresponds to an autoplay setting for music playback, menu item 944C corresponds to a shuffle setting for music playback, and menu item 944D corresponds to a playback quality setting. In response to detecting input 946 (e.g., a touch, tap, gesture, air gesture, and/or other input) directed to menu item 944A, computer system 600 changes the setting of the music application currently associated with third button 602C from the shuffle setting (indicated by the frame around menu item 944C at FIG. 9X) to the repeat setting and dismisses settings menu 944, for instance, as described above with respect to FIGS. 9L-9M.

At FIGS. 9Y-9Z, while the repeat setting is associated with third button 602C in the music application, in response to detecting press inputs of the first type (e.g., a short button press) at third button 602C, computer system 600 cycles through settings values for the repeat setting, for example, as described above with respect to FIGS. 9D-9H and 9Q-9R. As illustrated in FIG. 9Y, in response to detecting press input 910F of third button 602C, computer system 600 changes the repeat setting to repeat all (e.g., enabling looping of an entire track list). Additionally, computer system 600 displays repeat setting indicator 948 (e.g., as described above with respect to capture timer indicator 912 at FIG. 9E), including glyph 948A and text 948B reading "All," and, in some embodiments, updates the appearance of repeat affordance 904B (e.g., visually emphasizing repeat affordance 904B), indicating the change made to the repeat setting. As illustrated in FIG. 9Z, in response to detecting press input 910G of third button 602C, computer system 600 changes the repeat setting to repeat one (e.g., enabling looping of a single track), updates text 948B of repeat setting indicator 948 to read "One," and, in some embodiments, updates the appearance of repeat affordance 904B (e.g., displaying repeat affordance 904B with a "1" icon). Likewise, when other settings are associated with third button 602C within the music application (e.g., via settings menu 922), computer system 600 will cycle through states of the currently-associated setting in response to repeated press inputs of the first type, such as enabling and disabling autoplay (e.g., continuous playback of related or suggested tracks following the end of a track list), enabling and disabling shuffle (e.g., randomized and/or reordered playback of a track list), and/or switching between playback quality settings (e.g., standard, high, and/or lossless quality, and/or standard, surround-sound, and/or spatial audio format).

FIG. 10 is a flow diagram illustrating a method for providing customizable camera application controls using a hardware button of a computer system in accordance with some embodiments. Method 1000 is performed at a computer system (e.g., 100, 300, 500, and/or 600) that is in communication with a display generation component (e.g., 606) (e.g., a display controller; a touch-sensitive display system; a display (e.g., integrated and/or connected), a 3D display, a transparent display, a projector, and/or a heads-up display), one or more cameras (e.g., 604A, 604B, 604C, and/or 604D), and a hardware button (e.g., 602A, 602B, 602C, and/or 602D). In some embodiments, the one or more cameras may include one or more rear (user-facing) cameras and/or one or more forward (environment-facing) cameras. In some embodiments, the one or more cameras may include cameras with different lenses, such as a standard camera, a telephoto camera, and/or a wide-angle camera. In some embodiments, the computer system includes one or more depth sensors. In some embodiments, the hardware button is a first hardware button of a plurality of hardware buttons. In some embodiments, the plurality of hardware buttons can comprise multiple independently operable buttons in a compound form (e.g., multiple pressure sensors in a single button housing and/or a trackpad with multiple zones). In some embodiments, the hardware button includes a mechanical button. In some embodiments, the hardware button includes a solid-state button. In some embodiments, the hardware button includes a pressure sensor. Some operations in method 1000 are, optionally, combined, the orders of some operations are, optionally, changed, and some operations are, optionally, omitted.

As described below, method 1000 provides an intuitive way for providing customizable camera application controls using a hardware button in accordance with some embodiments. The method reduces the cognitive burden on a user for controlling a camera application using a computer system, thereby creating a more efficient human-machine interface. For battery-operated computing devices, enabling a user to control a camera application faster and more efficiently conserves power and increases the time between battery charges.

The computer system (e.g., 600) detects (1002) a first press (e.g., 906, 910A, 910B, 910C, 910D, 910E, 910F, 910G, 920A, 920B, 920C, and/or 942) (e.g., a short/quick press, or a long/held press) of the hardware button (e.g., 602A, 602B, 602C, and/or 602D). In response to detecting the first press of the hardware button (1004), the computer system, in accordance with a determination that the hardware button is associated with (e.g., as illustrated in FIG. 6T) launching a camera user interface (e.g., 610) (e.g., launching a camera (e.g., a camera application) of the computer system) and the first press is detected while displaying, via the display generation component, the camera user interface (e.g., as described with respect to press inputs 910A, 910B, 910C, 910D, 910E, 920A, and/or 920B) (e.g., while the camera application is open and/or in focus), performs (1006) a camera operation within the camera user interface (e.g., as illustrated in FIGS. 9D-9R). In some embodiments, the hardware button is a user-programmable button, where the association between the hardware button and launching the camera has been defined (e.g., programmed) by a user of the computer system. In some embodiments, the hardware button is not a user-programmable button, where the association between the hardware button and launching the camera is defined by the operating system and/or the back-end of the computer system. In some embodiments, the camera operation includes displaying a menu of one or more camera settings affordances (e.g., timer, grid, aspect ratio, resolution, and/or lens selection settings affordances), applying and/or changing one or more camera settings (e.g., a setting of a set of camera settings that can be associated with the hardware button while the hardware button is associated with launching the camera user interface). In some embodiments, settings can be selected to associate with the hardware button via a menu of the camera user interface. In response to detecting the first press of the hardware button (1004), the computer system, in accordance with a determination that the hardware button is associated with launching the camera user interface and the first press is detected while displaying, via the display generation component, a user interface other than the camera user interface (e.g., 900, 904, and/or 940) (e.g., another application UI, a home screen UI, and/or a lock screen UI), displays (1008), via the display generation component, the camera user interface (e.g., as illustrated in FIG. 9D in response to press input 906). In some embodiments, displaying the camera user interface includes initially launching, opening, and/or focusing the camera application. In some embodiments, displaying the camera user interface includes ceasing display of the other user interface. Using a variably-programmable hardware button associated with a camera application to both open the camera application when the camera application is not already open and to control the camera application when the camera application is already open provides improved control of media capture without cluttering the display with additional controls and improves ergonomics of the system. Doing so also assists the user with composing media capture events and reduces the risk that transient media capture opportunities are missed, which reduces the number of user inputs needed to access and use the camera application, thereby reducing power usage and improving battery life by enabling the user to use the system more quickly and efficiently. For example, a user can quickly open and operate the camera application without needing to search for displayed controls or to move their finger from the hardware button. Enabling a single hardware button to both open a camera application and to control the camera application reduces the overall number of hardware components needed for control (e.g., compared to mapping different functions to different buttons), resulting in a more compact, lighter, and cost-effective device.

In some embodiments, the hardware button is a mechanical button (e.g., as described with respect to FIG. 6B). For example, the hardware button may include a physical button (e.g., push button, rocker button, switch, knob, toggle, and/or other type of physically actuated button) that moves from a rest position to a depressed position when pressed (e.g., when pressure is applied). In some embodiments, the physical button can be variably and/or continuously moved between a plurality of different positions (e.g., 0-100% depressed). In some embodiments, the hardware button is a solid state button (e.g., as described with respect to FIG. 6B). For example, the hardware button may include. a touch-sensitive surface that provides a tactile sensation when pressed (e.g., using a tactile (e.g., haptic) output generator), even when there is no movement of the touch-sensitive surface/a physical button when the user presses the button. In some embodiments, the generated tactile output is perceived by the user as corresponding to physical displacement of the button.

In some embodiments, in response to detecting the first press of the hardware button and in accordance with a determination that the hardware button is associated with (e.g., programmed by the user of the computer system) launching a user interface different from the camera user interface (e.g., 900, 904, and/or 940) (e.g., another application and/or user interface of the computer system, such as an e-mail application, a messaging application, a media player application, a calendar application, a web browser, a home page UI, a settings UI, and/or another application or UI) and that the first press is detected while displaying the camera user interface (e.g., as illustrated in FIGS. 9D-9R) (e.g., while the camera application is open and/or in focus), the computer system displays the user interface different from the camera user interface and forgoes performing the camera operation within the camera user interface (e.g., as described with respect to FIG. 9V) (e.g., launching, opening, and/or focusing the other application/UI without performing the camera operation). For example, if the button is not currently associated with the camera user interface, the computer system does not perform the camera operation(s) that the computer system performs while associated with the camera user interface. In some embodiments, displaying the user interface different from the camera user interface includes initially launching, opening, and/or focusing the other application/UI. In some embodiments, displaying the user interface different from the camera user interface includes ceasing display of the camera user interface. Providing a variably-programmable hardware button, which can at different times be associated with the camera application or with another application or user interface, and using the hardware button to either open/operate the camera application or open the other application/UI (e.g., without opening/operating the camera application) depending on the current association provides improved control of a computer system without cluttering the media capture user interface with additional displayed controls and reduces the number of user inputs needed to access different applications/user interfaces, which reduces power usage, improves battery life, and improves ergonomics of the system by enabling the user to use the system more quickly and efficiently.

In some embodiments, performing the camera operation within the camera user interface includes displaying, via the display generation component, a menu (e.g., 922) including one or more option user interface objects (e.g., 922A, 922B, 922C, and/or 922D) (e.g., affordances and/or touch controls) corresponding to one or more (in some embodiments, a plurality of) media capture settings (e.g., as illustrated in FIGS. 9I-9P and described below with respect to FIG. 11). For example, the one or more option user interface objects may include controls for features and/or functions of the camera user interface. in some embodiments, the one or more media capture settings may include camera settings such as timer, grid, aspect ratio, resolution, and/or lens/zoom. In some embodiments, selecting one of the menu options associates the corresponding media capture setting with the hardware button, e.g., such that the button can be used to control the media capture setting from the camera application without needing to open the menu, as described below with respect to FIG. 11. In some embodiments, the menu options can be used (e.g., selected and/or manipulated) to change the corresponding media capture settings (e.g., changing settings values). Displaying a media capture settings menu in response to a press of a variably-programmable hardware button currently associated with a camera application when the camera application is open provides improved control of media capture without cluttering the display with additional controls and reduces the number of user inputs needed to use the camera application, which additionally reduces power usage, improves battery life, and improves ergonomics of the system. For example, the settings menu can be initially hidden from display while remaining quickly accessible to the user via button press without needing to search for displayed controls and/or move their finger away from the hardware button (e.g., if the hardware button was already used to open the camera application).

In some embodiments, at least one option user interface object of the one or more option user interface objects (e.g., 922A, 922B, 922C, and/or 922D) is selectable via a touch-sensitive surface (e.g., of display 606) that is in communication with the computer system (e.g., as described with respect to FIG. 9K). For example, the menu includes touch controls for the one or more media capture settings, such as touch affordances (e.g., buttons, links, sliders, selectors, and/or other interactive elements) corresponding to the one or more media capture settings. Providing additional touch controls in the settings menu accessed via the hardware button provides improved control of media capture without cluttering the display with additional controls, assisting the user with composing media capture events, reducing the risk that transient media capture opportunities are missed or mis-captured (e.g., due to unintended capture settings). Doing so enhances the operability of the system and makes the user-system interface more efficient by helping the user to provide proper inputs and reducing user mistakes when operating/interacting with the system which, additionally, reduces power usage and improves battery life of the system. For example, by providing the settings touch controls when requested by the user via the hardware button, the user can quickly access and adjust the capture settings, while reducing display clutter and preventing inadvertent inputs to the settings menu when the button is not pressed.

In some embodiments, while displaying the menu (e.g., 922) including the one or more option user interface objects (e.g., 922A, 922B, 922C, and/or 922D) corresponding to one or more media capture settings, the computer system detects a first input (e.g., 924A) directed to a first option user interface object of the one or more option user interface objects (e.g., as illustrated in FIG. 9K). For example, the first input may include an input selecting a control for one of the media capture items, such as a touch, tap, gesture, air gesture, and/or gaze input. In some embodiments, the computer system, in response to detecting the first input (e.g., 924A) directed to the first option user interface object, ceases displaying the menu including the one or more option user interface objects corresponding to one or more media capture settings (e.g., as illustrated in FIGS. 9L-9M) (e.g., selecting a menu option dismisses the menu). In some embodiments, ceasing displaying the menu includes first displaying an animation of the menu minimizing and/or collapsing (in some embodiments, collapsing "into" the location of the hardware button). In some embodiments, in response to detecting the first input, the computer system associates the corresponding media capture setting with the hardware button (e.g., such that the button can be used to control the media capture setting from the camera application without needing to open the menu, as described below with respect to FIG. 11). In some embodiments, in response to detecting the first input, the computer system controls (e.g., modifies and/or confirms a parameter of) the corresponding media capture setting (e.g., prior to, concurrently with, and/or after dismissing the menu). Dismissing the settings menu in response to a selection of one of the touch controls included in the menu provides improved control of media capture without cluttering the display with additional controls, reduces the number of user inputs needed to control the camera application, and reduces the risk that transient media opportunities are missed or mis-captured (e.g., due to touch controls obscuring the camera user interface), thereby reducing power usage and improving battery life by enabling the user to use the system more quickly and efficiently.

In some embodiments, while displaying the menu (e.g., 922) including the one or more option user interface objects (e.g., 922A, 922B, 922C, and/or 922D) corresponding to one or more media capture settings, the computer system detects a second input (e.g., 924A) (e.g., an input selecting a control for one of the media capture items, such as a touch, tap, gesture, air gesture, and/or gaze input) directed to a second option user interface object of the one or more option user interface objects. The second option user interface object optionally includes a display element (e.g., 912 (e.g., 912A and/or 912B), 926, 928, 930, and/or 932) displayed at a first location (e.g., a location visible via the display generation component, such as a location on the display, arranged on the display, and/or displayed in an XR environment (e.g., in three-dimensional space) within a user's field-of-view). In some embodiments, the second input is the same as the first input. In some embodiments, the second option user interface object is the same as the first option user interface object. For example, the display element may include an icon, text, and/or a glyph, for instance, representing the media capture setting corresponding to the second option user interface object (e.g., a clock icon representing a timer setting for media capture, a grid icon representing a capture guidance grid setting; text representing an aspect ratio of media capture; text representing a format, size, and/or resolution for media capture; and/or text representing a zoom level or lens used for media capture) and/or representing a value and/or state of the media capture setting (e.g., a clock icon with text indicating a 3, 5, and/or 10-second timer delay for media capture). In some embodiments, in response to detecting the second input directed to the second option user interface object, the computer system displays the display element (e.g., 912 (e.g., 912A and/or 912B), 926, 928, 930, and/or 932) moving (e.g., animating the display element moving) from the first location to a second location, wherein the second location is different from the first location and proximate to the hardware button (e.g., as illustrated in FIGS. 9L-9M). For example, the second location is a display location appearing near, next to, below, and/or above the hardware button. For example, for a device including a display and a hardware button located outside of the display, the display element is displayed (e.g., before, during, and/or after moving to the second location) in an edge region of the display close to the hardware button (e.g., near the edge of the display closest to the hardware button). In some embodiments, the display element is displayed (e.g., before, during, and/or after moving to the second location) less than a threshold distance (e.g., 0.1 mm, 1 mm, 10 mm, or 25 mm) from the edge of the display closest to the hardware button. In some embodiments, when displayed at the second location, the display element appears closer to the hardware button than the other display elements of the camera user interface appear to the hardware button. In some embodiments, the icon is moved prior to ceasing displaying the menu (e.g., the icon is moved within the menu). In some embodiments, the icon is moved while ceasing displaying the menu (e.g., while displaying the menu collapsing). In some embodiments, the icon is moved after ceasing displaying the menu (e.g., the icon persists after the menu is dismissed). In some embodiments, after moving the icon, ceasing displaying the icon). Displaying an icon or other visual element representing a selected media capture setting moving from its initial position in the menu to a position near the hardware button press provides a user with real-time visual feedback about a state of the computer system, for example, indicating to the user that the selection of the setting was detected, indicating/reinforcing that the hardware button is currently available for use controlling the selected setting in the camera application, and/or indicating changes made to the setting.

In some embodiments, performing the camera operation within the camera user interface includes changing a capture timer setting to a respective state (e.g., as illustrated in FIGS. 9D-9G) (e.g., a respective setting value). For example, the respective state may be an off/disabled state (e.g., a 0-second delay between when a capture input is detected and when media starts to be captured) or on/enabled state (in some embodiments, of a set of one or more enabled states, such as enabling a 3, 5, and/or 10 second delay between when a capture input is detected and when media starts to be captured). In some embodiments, in response to a request to capture media detected while the capture timer setting is set to the respective state, a media capture is initiated after a delay period defined by the respective state, for example, capturing media without delay (e.g., a delay period of 0 seconds) and/or with a timer delay (e.g., a delay period of 3, 5, and/or 10 seconds). In some embodiments, performing the camera operation includes changing the capture timer setting in accordance with a determination that the capture timer setting is currently associated with the hardware button. Using the variably-programmable hardware button associated with the camera application to change the state of a camera delay timer provides improved control of media capture without cluttering the display with additional controls, reduces the risk that transient media capture opportunities are missed and/or captured with unintended settings, and improves ergonomics of the system, for example, by allowing the user to quickly enable, disable, and/or change the camera timer delay without needing to search for displayed controls or to move their finger from the hardware button.

In some embodiments, performing the camera operation within the camera user interface includes changing a grid capture guidance setting to a respective state (e.g., as illustrated in FIGS. 9K-9L and 9Q-9R) (e.g., a respective setting value), wherein display of a capture guidance grid in the camera user interface (e.g., as illustrated in FIGS. 9L-9P and 9R) is provided based on the respective state. In some embodiments, the capture guidance grid is displayed. In some embodiments, the capture guidance grid is not displayed. In some embodiments, the capture guidance grid is displayed with a particular dimension and/or appearance. For example, the respective state may be an off/disabled state (e.g., disabling display of a capture guidance grid in the camera user interface) or an on/enabled state (e.g., enabling display of the capture guidance grid in the camera user interface). In some embodiments, the respective state may be a respective enabled state of a set of one or more enabled states, such as states enabling display of the capture guidance grid with different dimensions (e.g., a 3×3 grid, a 4×6 grid, and/or a 16×9 grid) and/or appearances (e.g., different line weights, patterns, and/or transparencies). In some embodiments, the capture guidance grid is displayed overlaying a representation of a portion of an environment included in a live capture preview. In some embodiments, performing the camera operation includes changing the grid setting in accordance with a determination that the grid setting is currently associated with the hardware button. Using the variably-programmable hardware button associated with the camera application to change the state of a capture guidance grid in the camera application provides improved control of media capture without cluttering the display with additional controls, reduces the risk that transient media capture opportunities are missed and/or captured with unintended settings, and improves ergonomics of the system, for example, by allowing the user to quickly enable, disable, and/or change the capture guidance grid without needing to search for displayed controls or to move their finger from the hardware button.

In some embodiments, performing the camera operation within the camera user interface includes changing an aspect ratio setting to a respective aspect ratio (e.g., as described with respect to FIG. 9R) (e.g., square, 4:6, 9:16, and/or another aspect ratio). For example, changing the aspect ratio setting to the respective aspect ration may include changing to the respective aspect ratio from a different aspect ratio setting (e.g., switching from 4:6 to square and/or 9:16). In some embodiments, in response to a request to capture media detected while the aspect ratio setting is set to the respective aspect ratio, media is captured with the respective aspect ratio. In some embodiments, changing the aspect ratio setting includes changing an appearance of the camera user interface according to the respective aspect ratio, e.g., displaying a live capture preview including a representation of a portion of an environment at the respective aspect ratio. In some embodiments, performing the camera operation includes changing the aspect ratio setting in accordance with a determination that the aspect ratio setting is currently associated with the hardware button. Using the variably-programmable hardware button associated with the camera application to change a media capture aspect ratio provides improved control of media capture without cluttering the display with additional controls, reduces the risk that transient media capture opportunities are missed and/or captured with unintended settings, and improves ergonomics of the system, for example, by allowing the user to quickly change the capture aspect ratio without needing to search for displayed controls or to move their finger from the hardware button.

In some embodiments, performing the camera operation within the camera user interface includes changing a resolution setting to a respective resolution (e.g., as described with respect to FIG. 9R). In some embodiments, changing the resolution setting to the respective resolution may include changing an overall resolution (e.g., 12, 24, and/or 48 MP resolution) a capture quality/compression setting (e.g., RAW, HEIC/HEVC, and/or MPEG) and/or a media file size limit (e.g., 5 MB, 10 MB, and/or 20 MB). In some embodiments, in response to a request to capture media while the resolution setting is set to the respective resolution, media is captured, compressed, and/or stored at the respective resolution. In some embodiments, performing the camera operation includes changing the resolution setting in accordance with a determination that the resolution setting is currently associated with the hardware button. Using the variably-programmable hardware button associated with the camera application to change a resolution setting for media capture provides improved control of media capture without cluttering the display with additional controls, reduces the risk that transient media capture opportunities are missed and/or captured with unintended settings, and improves ergonomics of the system, for example, by allowing the user to quickly change the capture resolution without needing to search for displayed controls or to move their finger from the hardware button.

In some embodiments, performing the camera operation within the camera user interface includes changing a lens selection setting to a respective lens selection (e.g., as described with respect to FIG. 9R). For example, changing the lens selection setting to a respective lens selection may include selecting a media capture crop size (e.g., framing) corresponding to a particular focal length (e.g., 22 mm, 24 mm, and/or 28 mm) for media capture at a particular zoom level (e.g., 0.5×, 1×, and/or 2×) (e.g., setting a custom zoom level). In some embodiments, changing the lens selection setting to a respective lens selection may include performing digital processing to simulate capture with the particular focal length (in some embodiments, using data captured by two or more cameras. In some embodiments, changing the lens selection setting to a respective lens selection may include switching between two or more of the cameras (e.g., changing which hardware lens is being used for media capture). In some embodiments, performing the camera operation includes changing the lens selection setting in accordance with a determination that the lens selection setting is currently associated with the hardware button. Using the variably-programmable hardware button associated with the camera application to adjust which cameras/lenses are used for media capture provides improved control of media capture without cluttering the display with additional controls, reduces the risk that transient media capture opportunities are missed and/or captured with unintended settings, and improves ergonomics of the system, for example, by allowing the user to quickly select the desired cameras/lenses without needing to search for displayed controls or to move their finger from the hardware button.

In some embodiments, performing the camera operation within the camera user interface includes, in accordance with a determination that a duration of the first press exceeds a threshold duration (e.g., as described with respect to 920A and/or 920B) (e.g., 0.5, 1, 1.2, or 2 seconds; e.g., the first press is a long/held press), displaying, via the display generation component, an options menu (e.g., 922) (e.g., as described with respect to FIG. 11, below) including one or more user interface objects (e.g., 922A, 922B, 922C, and/or 922D) that, when selected (e.g., using a touch input, hardware button input, and/or another input, such as a gesture, air gesture, and/or gaze), cause one or more additional operations to be performed (e.g., as described with respect to FIGS. 9K-9L). In some embodiments, the additional operations include selecting/changing a setting represented by one of the user interface objects. In some embodiments, the additional operations include associating the hardware button with (e.g., soft-programming the hardware button to correspond to) a setting represented by one of the user interface objects (e.g., the hardware button can be used to select/change an aspect ratio, lens selection, grid, resolution, and/or timer setting). In some embodiments, performing the camera operation within the camera user interface includes, in accordance with a determination that the duration of the first press does not exceed the threshold duration (e.g., as described with respect to 910A, 910B, 910C, 910D, and/or 910E) (e.g., the first press is released/lifted off prior to reaching the threshold duration; e.g., the first press is a short/quick press), performing a second camera operation within the camera user interface (e.g., as illustrated in FIGS. 9D-9G and/or 9Q-9R). In some embodiments, the second camera operation includes performing a quick action corresponding to the hardware button, such as selecting/changing the setting currently associated with the hardware button. In some embodiments, the second camera operation is included in the one or more additional operations. Using the variably-programmable hardware button associated with the camera application to both open a settings menu and to change the settings depending on whether a press of the hardware button is a short or long press provides improved control of media capture without cluttering the display with additional controls, reduces the risk that transient media capture opportunities are missed and/or captured with unintended settings, and improves ergonomics of the system, for example, by providing the user with different levels of control (e.g., either expanded control provided via the menu or limited control) without needing to search for displayed controls or to move their finger from the hardware button.

Note that details of the processes described above with respect to method 1000 (e.g., FIG. 10 are also applicable in an analogous manner to the methods described below/above. For example, method 1000 optionally includes one or more of the characteristics of the various methods described above with reference to methods 700 and 800 and below with reference to methods 1100 and 1300. For example, the camera user interface launched as described with respect to method 1000 can be controlled as described with respect to methods 700, 800, and 1300, and the camera operation described with respect to method 1000 may vary based on the type of button press received as described with respect to method 1100. For brevity, these details are not repeated below.

FIG. 11 is a flow diagram illustrating a method for providing customizable settings controls using a hardware button of a computer system in accordance with some embodiments. Method 1100 is performed at a computer system (e.g., 100, 300, 500, and/or 600) that is in communication with a display generation component (e.g., 606) (e.g., a display controller; a touch-sensitive display system; a display (e.g., integrated and/or connected), a 3D display, a transparent display, a projector, and/or a heads-up display), one or more cameras (e.g., 604A, 604B, 604C, and/or 604D), and a hardware button (e.g., 602A, 602B, 602C, and/or 602D). In some embodiments, the one or more cameras include one or more rear (user-facing) cameras and/or one or more forward (environment-facing) cameras. In some embodiments, the one or more cameras include cameras with different lenses, such as a standard camera, a telephoto camera, and/or a wide-angle camera. In some embodiments, the computer system includes one or more depth sensors. In some embodiments, the hardware button includes a button that can be partially and/or fully depressed. In some embodiments, the hardware button is a first hardware button of a plurality of hardware buttons. In some embodiments, the plurality of hardware buttons can comprise multiple independently operable buttons in a compound form (e.g., multiple pressure sensors in a single button housing and/or a trackpad with multiple zones). In some embodiments, the hardware button includes a mechanical button. In some embodiments, the hardware button includes a solid-state button. In some embodiments, the hardware button includes a pressure sensor. Some operations in method 1100 are, optionally, combined, the orders of some operations are, optionally, changed, and some operations are, optionally, omitted.

As described below, method 1100 provides an intuitive way for providing customizable settings controls using a hardware button in accordance with some embodiments. The method reduces the cognitive burden on a user for controlling a computer system with a hardware button, thereby creating a more efficient human-machine interface. For battery-operated computing devices, enabling a user to control a computer system faster and more efficiently conserves power and increases the time between battery charges.

The computer system (e.g., 600) detects (1102) a first press (e.g., 906, 910A, 910B, 910C, 910D, 910E, 910F, 910G, 920A, 920B, 920C, and/or 942) (e.g., a short/quick press, or a long/held press) of the hardware button. In accordance with a determination that the first press of the hardware button satisfies a first set of criteria, wherein the first set of criteria includes a first subset of criteria that is satisfied when the first press is a press of a first type (e.g., as described with respect to press input 920A, 920B, and/or 920C), the computer system displays (1104), via the display generation component (e.g., 606), a menu (e.g., 922 and/or 944) of one or more (in some embodiments, a plurality of) settings (e.g., 922A, 922B, 922C, 922D, 922E, 944A, 944B, 944C, and/or 944D) (e.g., features and/or functions). In some embodiments, the one or more settings include one or more camera settings such as timer, grid, aspect ratio, resolution, and/or lens/zoom) that can be associated with the hardware button (e.g., as illustrated in FIGS. 9K, 9O, and/or 9X). In some embodiments, a press of the first type includes a long press, where the press is held for at least a threshold duration. In some embodiments, a press of the first type includes a hard/full press, where the hardware button is pressed more than a threshold amount (e.g., physically and/or with more than a threshold amount of pressure applied). In some embodiments, a press of the first type includes a single press, double press, triple press, and/or other multiple press sequence. In some embodiments, the hardware button is a user-programmable button that a user of the computer system can program to control any one of the one or more settings. In some embodiments, in accordance with a determination that the first press of the hardware button is a press of the first type, the computer system foregoes changing the value of the first setting. In accordance with a determination that the first press of the hardware button satisfies a second set of criteria different from the first set of criteria, wherein the second set of criteria includes a second subset of criteria that is satisfied when the first press is a press of a second type different from the first type (e.g., as described with respect to press inputs 910A, 910B, 910C, 910D, 910E, 910F, and/or 910G), the computer system changes (1106) a value (e.g., a state and/or parameter) of a first setting (e.g., a setting currently associated with the button) of the one or more settings to a first value (e.g., as illustrated in FIGS. 9D-9G, 9Q-9R, and/or 9Y-9Z). In some embodiments, a press of the second type includes a short press, where the press is held for less than a threshold duration. In some embodiments, a press of the second type includes a light/partial press, where the hardware button is pressed less than the threshold amount. In some embodiments, a press of the second type includes a single press, double press, triple press, and/or other multiple press pattern. In some embodiments, a determination that a press satisfies the first set of criteria and a determination that the press satisfies the second set of criteria are mutually exclusive. In some embodiments, changing the value of the first setting to the first value includes toggling between an off state and an on state and/or toggling between different parameter values for an on state. In some embodiments, changing the value of the first setting to the first value includes changing the value of the first setting from a previous value to the first value. In some embodiments, in accordance with a determination that the first press of the hardware button is a press of the second type, the computer system foregoes displaying the menu of one or more settings. In some embodiments, the second set of criteria includes a criterion that is satisfied when the hardware button is associated with the first setting. Using a hardware button to either change a setting or feature (e.g., in an application or user interface) or to provide a menu of settings/features based on the type (e.g., characteristics) of the input on the hardware button (e.g., based on whether the press is a short or long press of the hardware button) provides improved controls without cluttering the display with additional controls and improves ergonomics of the system, which reduces the number of user inputs needed to access and use various functionality, thereby reducing power usage and improving battery life by enabling the user to use the system more quickly and efficiently. For example, the user can quickly access varying levels of functionality—for instance, either expanded control options provided via the menu or more limited control options-without needing to search for displayed controls or to move their finger from the hardware button. Enabling a single hardware button to both change a setting/feature and to provide a menu of settings/features based on the input type also reduces the overall number of hardware components needed for control (e.g., compared to mapping different functions to different buttons), resulting in a more compact, lighter, and cost-effective device.

In some embodiments, the first subset of criteria (e.g., the criteria met when the press is a press of the first type) includes a first criterion that is satisfied when the first press of the hardware button is maintained for longer than a threshold duration (e.g., as described with respect to press inputs 920A, 920B, and/or 920C) (e.g., 0.5, 1, 1.2, or 2 seconds; e.g., a long/held press). In some embodiments, the first press of the hardware button is maintained (e.g., in furtherance of satisfying the first criterion) while the press exceeds a maintenance threshold (e.g., applies at least a maintenance threshold pressure (e.g., 5 g/cm$^2$, 10 g/cm$^2$, 16 g/cm$^2$, or 20 g/cm$^2$) and/or depresses the hardware button at least a maintenance threshold amount (e.g., 2% depressed, 5% depressed, 10%, or 18% depressed)). For example, when the first press is lifted from the hardware button and/or ceases to exceed the maintenance threshold, the first press is no longer considered maintained in furtherance of satisfying the first criterion. In some embodiments, the second subset of criteria (e.g., the criteria met when the press is a press of the second type) includes a second criterion that is satisfied when the first press of the hardware button is maintained for less than the threshold duration (e.g., as described with respect to press inputs 910A, 910B, 910C, 910D, 910E, 910F, and/or 910G). In some embodiments, the first press of the hardware button is not maintained when the press fails to exceed the maintenance threshold (e.g., applies less than a maintenance threshold pressure (e.g., 5 g/cm$^2$, 10 g/cm$^2$, 16 g/cm$^2$, or 20 g/cm$^2$) and/or depresses the hardware button less than a maintenance threshold amount (e.g., 2% depressed, 5% depressed, 10%, or 18% depressed)). For example, when the first press is lifted from the hardware button and/or ceases to exceed the maintenance threshold prior to the threshold duration, the first criterion is not satisfied. For example, a short/quick press, which lifts from the hardware button and/or ceases to exceed the maintenance threshold in less than the threshold duration of time, does not satisfy the first criterion. Conditionally changing a setting or feature (e.g., in an application or user interface) or providing a menu of settings/features based on whether a press on the hardware button is a short press or a long press provides improved controls without cluttering the display with additional controls and improves ergonomics of the system, which reduces the number of user inputs needed to access and use various functionality, thereby reducing power usage and improving battery life by enabling the user to use the system more quickly and efficiently. For example, the user can simply provide button presses of different durations to access various functionality without needing to search for displayed controls or to move their finger from the hardware button.

In some embodiments, the first setting includes a media capture setting (e.g., as illustrated in FIGS. 9D-9G and/or 9Q-9R). For example, the media capture setting may be a setting of a camera application or user interface, such as a camera delay/timer setting, a capture guidance/grid setting, an aspect ratio setting, a resolution setting, a lens selection setting, and/or a zoom/magnification setting. Using a hardware button to both access a menu of camera features and to change camera features (e.g., within a camera application) provides improved media capture controls without cluttering the display with additional controls and improves ergonomics of media capture. Doing so also reduces the risk that transient media capture opportunities are missed and/or captured with unintended settings, thereby reducing power usage and improving battery life by enabling the user to use the system more quickly and efficiently. For example, a user can quickly view and control different levels of camera functionality without additional displayed controls obscuring the camera interface and/or without moving their finger from the hardware button.

In some embodiments, the first set of criteria and the second set of criteria include a respective criterion that is satisfied when the first press of the hardware button is detected while displaying, via the display generation component, a respective application (e.g., 610 and/or 904) (e.g., as described with respect to FIGS. 9D-9R, 9W-9Z, and/or 10). For example, the respective application may be a camera application, a media player application, a calendar application, a messaging application, and/or another application. In some embodiments, the respective criterion is satisfied while the application is open and/or in focus. For example, a button press will only open the menu or change the settings from within the respective application, in some embodiments, the one or more settings are settings of the application. Selectively enabling a hardware button to either change a setting/feature or to provide a menu of settings/features in a particular application provides improved controls for applications without cluttering the display with additional controls and helps the user to provide proper inputs and reducing user mistakes when operating/interacting with the system, which reduces power usage and improves battery life of the system by enabling the user to use the system more quickly and efficiently. Doing so also reduces the overall number of hardware components needed for control, resulting in a more compact, lighter, and cost-effective device. For example, the hardware button provides the user with quick access to an application's controls while using the application, and can be disabled (e.g., to prevent unintended or extraneous inputs) and/or mapped to different functionality while not using the application.

In some embodiments, in accordance with a determination that the first press of the hardware button satisfies a third set of criteria, wherein the third set of criteria includes a criterion that is satisfied when the first press of the hardware button is not detected while displaying the respective application, the computer system displays, via the display generation component, the respective application (e.g., 610 and/or 904) (e.g., as described with respect to FIGS. 9B, 9V, and/or 10). In some embodiments, displaying the respective application includes launching, opening, and/or bringing into focus the respective application. For example, pressing the hardware button outside of the respective application opens the application. In some embodiments, the third set of criteria includes a criterion that is satisfied when the hardware button is mapped to (e.g., associated with) the respective application (e.g., the hardware button is a user-programmable button). Enabling the hardware button used for controlling settings/features and opening a settings/feature menu within an application to open the application when the application is not already open provides improved controls for applications without cluttering the display with additional controls. Doing so also reduces the overall number of hardware components needed for control, resulting in a more compact, lighter, and cost-effective device. For example, the hardware button provides the user with quick access to an application in addition to quick access to the application's controls.

In some embodiments, displaying the menu (e.g., 922 and/or 944) of the one or more settings includes displaying one or more menu items corresponding to the one or more settings (e.g., 922A, 922B, 922C, 922D, 922E, 944A, 944B, 944C, and/or 944D). In some embodiments, the one or more menu items are affordances (e.g., touch controls) for selecting between the one or more settings. In some embodiments, displaying the menu of the one or more settings includes, while a respective setting of the one or more settings is associated with the hardware button, visually indicating a respective menu item of the one or more menu items corresponding to the respective setting (e.g., as illustrated in FIGS. 9K (e.g., 922A), 9O (e.g., 922B), and/or 9X (e.g., 922H)) (e.g., indicating the currently-selected setting). In some embodiments, visually indicating the respective menu item includes visually emphasizing the respective menu item. In some embodiments, visually indicating the respective menu item includes displaying the respective menu item differently from the other menu items (e.g., highlighting the menu item, framing the menu item, displaying the menu item in a different color, and/or displaying the menu item at a different size). In some embodiments, the respective setting is the setting currently mapped to the hardware button. In some embodiments, while the respective setting is associated with the hardware button, the respective setting can be changed/toggled via a press of the hardware button that satisfies the second set of criteria. Using the settings/feature menu to visually indicate the setting/feature that can currently be changed using the hardware button (e.g., the setting currently associated with the hardware button) provides improved control of media capture without cluttering the display with additional controls, provides a user with real-time visual feedback about a state of the computer system, and reduces the overall number of hardware components needed for control. For example, the hardware button can be used to quickly check, via the menu, which setting of the available settings is currently mapped to the hardware button, allowing the hardware button to be used for different functions without user confusion.

In some embodiments, while displaying the menu of the one or more settings, detects a first input (e.g., 924A, 924B, and/or 946) (e.g., a touch, tap, gesture, air gesture, hardware button, and/or gaze input) and, in response to detecting the first input and in accordance with a determination that the first input corresponds to a selection of a respective setting of the one or more settings (e.g., as described with respect to 924A and/or 946), the computer system ceases displaying the menu of one or more settings (e.g., as illustrated in FIGS. 9K-9M and/or 9X-9Y). In some embodiments, the first input corresponds to a selection of the respective setting if the first input is directed to a location of a menu item corresponding to the respective setting. In some embodiments, the first input corresponds to a selection of the respective setting if the first input is part of a sequence of inputs selecting the respective setting (e.g., the hardware button can be used to "click through" the menu settings). In some embodiments, the computer system also associates the respective setting with the hardware button. For example, selecting a setting to associate with the hardware button dismisses the settings menu. Dismissing the settings/feature menu in response to a selection of one of the settings/features included in the menu provides improved control of the system without cluttering the display with additional controls and reduces the number of user inputs needed, thereby reducing power usage and improving battery life by enabling the user to use the system more quickly and efficiently. In some embodiments, the first input (e.g., 924A, 924B, and/or 946) includes a touch input detected via a touch-sensitive surface (e.g., of display 606) in communication with the computer system (e.g., as illustrated in FIGS. 9K and/or 9X) (in some embodiments, a touch-sensitive surface of a display).

In some embodiments, the computer system, while displaying the menu of one or more settings (e.g., 922 and/or 944), detects (e.g., via a touch-sensitive display) a second input (e.g., 924A, 924B, and/or 946) (e.g., a tap input). In some embodiments, in response to detecting the second input and in accordance with a determination that the second input does not correspond to a selection of a respective setting of the one or more settings (e.g., as described with respect to 924B), the computer system ceases displaying the menu of one or more settings (e.g., as illustrated in FIGS. 9O-9Q). In some embodiments, the second input does not correspond to a selection of the respective setting if the input is directed to a location outside of the menu. In some embodiments, the computer system ceases displaying the menu without changing a value of the first setting and/or without changing an association between the hardware button and one of the settings (e.g., the current settings and settings values are confirmed/maintained when dismissing the menu). In some embodiments, in accordance with a determination that the second input corresponds to a selection of a respective setting of the one or more settings, the computer system ceases displaying the menu of one or more settings. In some embodiments, the computer system also associates the respective setting with the hardware button (e.g., selecting a setting to associate with the hardware button dismisses the settings menu). In some embodiments, in accordance with a determination that the second input corresponds to a selection of a respective setting of the one or more settings, the computer system continues displaying of the menu of one or more settings. In some embodiments, in accordance with a determination that the second input corresponds to a selection of a respective setting of the one or more settings, the computer system updates the displayed menu based on the selection. For example, the computer system may visually emphasize the selected setting, visually deemphasize other settings (e.g., a previously selected setting), and/or change a glyph and/or text representing the selected setting). Dismissing the settings/feature menu in response to a selection outside of the menu provides improved control of the system without cluttering the display with additional controls and reduces the number of user inputs needed, thereby reducing power usage and improving battery life by enabling the user to use the system more quickly and efficiently.

In some embodiments, changing the value of the first setting of the one or more settings to the first value (e.g., in response to a press of the second type) includes displaying, via the display generation component, an indication of the first value (e.g., 912 (e.g., 912A and/or 912B), 926, 928, 930, 932, and/or 948 (e.g., 948A and/or 948B)) (e.g., as illustrated in FIGS. 9D-9G, 9Q-9R, and/or 9Y-9Z). For example, the indication of the first value may include a text and/or graphic indication, such as an icon or glyph representing the first setting with text indicating the changed value. In some embodiments, the indication of the first value is displayed in the same region that the menu would be displayed in (e.g., near the hardware button). Displaying an indication of the change to the value of the first setting made in response to an input of the second type on the hardware button provides improved control of media capture without cluttering the display with additional controls, provides a user with real-time visual feedback about a state of the computer system, and reduces the overall number of hardware components needed for control. For example, the indication can inform the user of both the setting currently being changed via the hardware button and the current value of the setting, allowing the hardware button to be used for different functions without user confusion.

In some embodiments, while displaying the indication of the first value (e.g., 912 (e.g., 912A and/or 912B), 926, 928, 930, 932, and/or 948 (e.g., 948A and/or 948B)) (e.g., in response to the input of the second type; in some embodiments, if no further inputs are received), the computer system reduces a visual prominence of the indication of the first value (e.g., as illustrated in FIG. 9H) and, after reducing the visual prominence of the indication of the first value, ceases displaying the indication of the first value (e.g., as illustrated in FIG. 9I) (e.g., the indication fades out entirely). In some embodiments, the fading begins a predetermined period of time after initially displaying the indication and, in some embodiments, the fading continues for a predetermined period of time (e.g., fading gradually). In some embodiments, different portions of the indication fade/disappear at different rates/times (e.g., the indication may include a glyph/icon representing the first setting and a glyph/icon representing the first value, and the glyph/icon representing the first value may fade out before the glyph/icon representing the first setting fades out). Fading out the indication of the change to the value of the first setting provides improved control of media capture without cluttering the display with additional controls and provides a user with real-time visual feedback about a state of the computer system, for example, confirming the setting change to the user before clearing off the display.

In some embodiments, after changing the value of the first setting of the one or more settings to the first value (e.g., as described with respect to FIGS. 9D-9E (e.g., in response to press input 910A), 9Q (e.g., in response to press input 910D), and/or 9Y (e.g., in response to press input 910F)), detects a second press of the hardware button and, in accordance with a determination that the second press of the hardware button satisfies the second set of criteria (e.g., as described with respect to 910B, 910C, 910E, and/or 910G), the computer system changes the value of the first setting to a second value different from the first value (e.g., as illustrated in FIG. 9Z). In some embodiments, the second set of criteria includes criteria that are satisfied when the second press is the second type of press (e.g., a short press, a light/partial press, or a particular multiple press pattern). In some embodiments, the second set of criteria includes criteria that are satisfied when the second press is received while the hardware button is associated with the first setting. In some embodiments, the second set of criteria includes criteria that are satisfied when the second press is received while the application is open/displayed/in focus. In some embodiments, repeated presses of the second type cycle through values for the setting. For example, in some embodiments, in response to a subsequent third input of the second type, the computer system changes the first setting to a third, different value and/or back to the first value. In some embodiments, the first value and the second value are included in a predetermined set of values for the first setting. Cycling through changes to the first setting in response to repeated inputs of the second type via the hardware button provides improved controls without cluttering the display with additional controls and improves ergonomics of the system, which reduces the number of user inputs needed to access and use various functionality, thereby reducing power usage and improving battery life by enabling the user to use the system more quickly and efficiently. For example, a user can quickly switch between different values for the first setting without needing to search for settings touch controls, open a settings menu, and/or move their finger from the button.

In some embodiments, the second set of criteria includes a first criterion that is satisfied when the first setting is associated with the hardware button (e.g., as described with respect to the capture timer setting in FIGS. 9E-9G and/or the repeat setting in FIGS. 9Y-9Z). In some embodiments, the first setting is associated with the hardware button by selecting the first setting from the menu. In some embodiments, in accordance with a determination that the second press of the hardware button satisfies a third set of criteria different from the first set of criteria and different from the second set of criteria, the computer system changes a value of a second setting, different from the first setting, of the one or more settings to a third value (e.g., as illustrated in FIGS. 9Q-9R), wherein third set of criteria includes a second criterion that is satisfied when the second setting is associated with the hardware button (e.g., as described with respect to the capture guidance setting, the aspect ratio setting, the capture quality setting, and/or the custom focal length setting in FIGS. 9Q-9R). In some embodiments, changing the value of the second setting to the third value includes toggling, changing, and/or cycling through values of the second setting. In some embodiments, changing the value of the second setting to the third value includes changing the value of the second setting from a previous value to the third value. In some embodiments, the second setting is associated with the hardware button by selecting the second setting from the menu. In some embodiments, the third set of criteria includes one or more criteria that are also included in the second set of criteria (e.g., the criteria other than the first criterion). In some embodiments, -, the third set of criteria includes the second subset of criteria that is satisfied when a press of the second type is detected (in some embodiments, a short press; in some embodiments, a light/ partial press; in some embodiments, a particular multiple press pattern). In some embodiments, the third set of criteria includes a criterion that is satisfied when the respective application is open/displayed/in focus. Cycling through changes to different settings in response to repeated inputs of the second type via the hardware button based on which setting is currently selected (e.g., associated with the hardware button) provides improved controls without cluttering the display with additional controls and improves ergonomics of the system, which reduces the number of user inputs needed to access and use various functionality, thereby reducing power usage and improving battery life by enabling the user to use the system more quickly and efficiently. For example, a user can quickly switch between different values for the first setting without needing to search for settings touch controls, open a settings menu, and/or move their finger from the button. Enabling a single hardware button to cycle through changes to different settings also reduces the overall number of hardware components needed for control (e.g., compared to mapping different settings to different buttons), resulting in a more compact, lighter, and cost-effective device.

In some embodiments, the computer system detects a third press (e.g., 906, 910A, 910B, 910C, 910D, 910E, 910F, 910G, 920A, 920B, 920C, and/or 942) of the hardware button and, in accordance with a determination that the third press of the hardware button satisfies a fourth set of criteria different from the first set of criteria, changes a value of a respective setting of the one or more settings to a respective value (e.g., as illustrated in FIGS. 9D-9G, 9Q-9R, and/or 9Y-9Z) and displays, via the display generation component, an indication (e.g., 912 (e.g., 912A and/or 912B), 926, 928, 930, 932, and/or 948 (e.g., 948A and/or 948B)) of the respective value (e.g., providing visual feedback indicating changes to the settings made using the hardware button). In some embodiments, the fourth set of criteria include the second subset of criteria (e.g., satisfied when the third press is a press of the second type). In some embodiments, the fourth set of criteria includes a criterion that is satisfied when the respective application is open/displayed/in focus. In some embodiments, the fourth set of criteria is satisfied when the second set of criteria is satisfied. In some embodiments, the fourth set of criteria is satisfied when the third set of criteria is satisfied. Displaying an indication of the change to the value of the first setting made in response to an input on the second type on the hardware button provides improved control of media capture without cluttering the display with additional controls, provides a user with real-time visual feedback about a state of the computer system, and reduces the overall number of hardware components needed for control. For example, the indication informs the user of both the setting currently being changed via the hardware button and the current value of the setting, allowing the hardware button to be used for different functions without user confusion.

In some embodiments, the indication (e.g., 912 (e.g., 912A and/or 912B), 926, 928, 930, 932, and/or 948 (e.g., 948A and/or 948B)) of the respective value is displayed at a location proximate to the hardware button (e.g., as illustrated in FIGS. 9D-9G, 9Q-9R, and/or 9Y-9Z). For example, the location proximate to the hardware button may include a display location appearing near, next to, below, and/or above the hardware button. For example, for a device including a display and a hardware button located outside of the display, the indication is displayed in an edge region of the display close to the hardware button (e.g., near the edge of the display closest to the hardware button). In some embodiments, the indication is displayed less than a threshold distance (e.g., 0.1 mm, 1 mm, 10 mm, or 25 mm) from the edge of the display closest to the hardware button. In some embodiments, the indication appears closer to the hardware button than the other display elements of the current user interface appear to the hardware button. Displaying the indication of the change to the value of the first setting made in response to the input on the second type on the hardware button at a location near the hardware button provides a user with real-time visual feedback about a state of the computer system. For example, displaying the indication near the hardware button informs the user of both the change made via the hardware button and of the hardware button's association with the change.

In some embodiments, in response to detecting the first press of the hardware button (in some embodiments, and in accordance with a determination that the first press is detected while a respective application is open/displayed/in focus), the computer system displays, via the display generation component, an animation of (e.g., moving, sliding, appearing, growing, and/or fading in) a graphical element (e.g., 912 (e.g., 912A and/or 912B), 914, 922, 926, 928, 930, 932, 944, and/or 948 (e.g., 948A and/or 948B)), wherein the animation of the graphical element visually represents the first press (e.g., as illustrated in FIGS. 9E-9G, 9J-9P, and/or 9X-9Z). In some embodiments, the graphical element includes a representation of the hardware button (e.g., a shape or silhouette approximately the dimensions of the hardware button). In some embodiments, the graphical element includes a representation of the setting currently associated with the hardware button, such as text, an icon, and/or a glyph. In some embodiments, the graphical element includes at least a portion of the menu. In some embodiments, the animation depicts a movement of the graphical element from the location of the hardware button outside of the display generation component (e.g., screen) into the display, e.g., showing the capture mode indicator moving inward (e.g., up, down, or laterally) from the hardware button, as if pushing the hardware button "pushes" the graphical onto the display. Animating a graphical element representing presses of the hardware button provides a user with real-time visual feedback about a state of the computer system. For example, the animation provides a user with feedback on a state of the hardware button press (e.g., indicating detection of the press and/or representing the press).

In some embodiments, displaying the animation of the graphical element includes: in accordance with a determination that the first press has a first value for a respective input characteristic of the first press (e.g., speed, intensity (e.g., amount of applied pressure and/or amount of depression of the hardware button), and/or duration), displaying the animation of the graphical element with a first animation characteristic (e.g., animated speed, visual intensity/prominence, and/or animation duration); and in accordance with a determination that the first press has a second value different from the first value for the respective input characteristic of the first press (e.g., speed, intensity (e.g., amount of applied pressure and/or amount of depression of the hardware button), and/or duration), displaying the animation of the graphical element with a second animation characteristic different from the first animation characteristic (e.g., as described with respect to FIGS. 9E and/or 9J-9P). For example, characteristics of the animation are based on detected characteristics of the first press. In some embodiments, the graphical element appears to move with the same or similar speed, intensity, and/or duration as the first press. Animating a graphical element representing presses of the hardware button based on characteristics (e.g., speed, intensity, and/or duration) of the presses provides a user with real-time visual feedback about a state of the computer system. For example, the animation provides a user with feedback on a state of the hardware button press, allowing the user to better understand and adjust the press characteristics to achieve the desired type of button press (e.g., soft or hard presses, short or long presses, and/or presses of other characteristics/types).

In some embodiments, displaying the animation of the graphical element includes, in accordance with a determination that the first press of the hardware button satisfies the first set of criteria including the first subset of criteria that is satisfied when the first press is a press of the first type (e.g., if the press is a press of the first type), animating the graphical element transforming into the menu of the one or more settings that can be associated with the hardware button (e.g., as illustrated in FIGS. 9J-9P). For example, the animation includes graphical element changing size, shape, and/or appearance to become the menu. In some embodiments, the graphical element begins as a small tab or "notch"

displayed near the hardware button then extends (e.g., lengthens) outward from the hardware button further into the display to become the "platter" for menu items for the one or more settings (e.g., as though the menu is being pushed/pulled onto the display from the hardware button) (e.g., as illustrated in FIGS. 9J-9P). In some embodiments, the menu items for the one or more settings are gradually revealed as the graphical element transforms into the menu (in some embodiments, sequentially; in some embodiments, fading in; in some embodiments, as though the menu items were being pushed/pulled onto the screen with the menu). In some embodiments, the transformation includes gradually blending and/or overlaying the appearance of the graphical element into the appearance of the menu of the one or more settings. In some embodiments, in accordance with a determination that the first press of the hardware button satisfies the second set of criteria, the graphical element does not transform into the menu (e.g., as the menu is not displayed in response to a press of the second type). Animating the graphical element morphing into the settings menu provides a user with real-time visual feedback about a state of the computer system. For example, the graphical element morphing into the menu provides a user with feedback on the hardware button press transitioning between different press types (e.g., short or long presses, soft or hard presses, and/or other types of presses).

In some embodiments, displaying the animation of the graphical element includes, in accordance with a determination that the first press is detected while displaying, via the display generation component, a camera user interface (e.g., 610) that includes a camera preview (e.g., 612) representing at least a portion of a field-of-view of the one or more cameras (e.g., a live preview including at least a portion of an environment being captured by the one or more cameras), displaying the graphical element overlaying at least a portion of the camera preview (e.g., as illustrated in FIGS. 9E-9G and/or 9J-9P) (e.g., the graphical element replaces a portion of the live camera preview). Animating the graphical element overlaying a camera preview provides a user with real-time visual feedback about a state of the computer system and reduces the risk that transient media capture opportunities are missed and/or captured with unintended settings. For example, by displaying the graphical element replacing a portion of the camera preview provides a user with feedback on the result of the button press without the user needing to look fully away from the camera preview.

In some embodiments, while detecting the first press of the hardware button, the computer system displays, via the display generation component, a user interface (e.g., 610 and/or 904) that includes one or more selectable user interface objects (e.g., an interactive elements/affordances). In some embodiments, when the user interface is a camera interface, the one or more selectable user interface objects may include a captured media preview (e.g., photo well) that can be selected to view captured media, a capture affordance/shutter button that can be selected to initiate media capture, and/or other affordances for controlling camera settings. In some embodiments, in accordance with the determination that the first press of the hardware button satisfies the first set of criteria including the first subset of criteria that is satisfied when the first press is a press of the first type (e.g., as described with respect to press inputs 920A, 920B, and/or 920C), the computer system ceases displaying at least one selectable user interface object of the one or more user interface objects (e.g., as illustrated in FIGS. 9J-9K and/or 9N-9O) (e.g., other interactive user interface elements are hidden while the menu is being displayed). In some embodiments, ceasing to display the at least one selectable user interface object includes fading out the at least one selectable user interface object. In some embodiments, ceasing to display the at least one selectable user interface object includes animating the at least one selectable user interface object moving off of the display. In some embodiments, after displaying the menu, the computer system ceases displaying the menu (e.g., in response to a release of the button, a selection of a menu item, and/or a touch outside of the menu area) and re-displays the selectable user interface object. Hiding elements of a user interface while displaying the settings/feature menu provides improved controls without cluttering the display with additional controls and improves ergonomics of the system, which reduces the number of user inputs needed to access and use various functionality, thereby reducing power usage and improving battery life by enabling the user to use the system more quickly and efficiently.

Note that details of the processes described above with respect to method 1100 (e.g., FIG. 11) are also applicable in an analogous manner to the methods described below/above. For example, method 1100 optionally includes one or more of the characteristics of the various methods described above with reference to methods 700, 800, and/or 1000 and below with reference to method 1300. For example, in addition to either providing a settings menu or changing a setting based on the type of button press detected as described with respect to method 1100, computer systems may perform different functions based on different button press types (e.g., light/partial vs. hard/full presses) as described with respect to methods 800 and 1300 and/or based on which button is pressed as described with respect to methods 700. Button presses may be used to access settings menu and settings changes described with respect to method 1100 when a particular application is open, and otherwise used to launch the application as described with respect to method 1000. For brevity, these details are not repeated below.

FIGS. 12A-12K illustrate exemplary user interfaces for using different hardware button presses to control different functions of a camera application, in accordance with some embodiments. The user interfaces in these figures are used to illustrate the processes described below, including the processes in FIGS. 13 and 14.

Figures 12A, 12B:
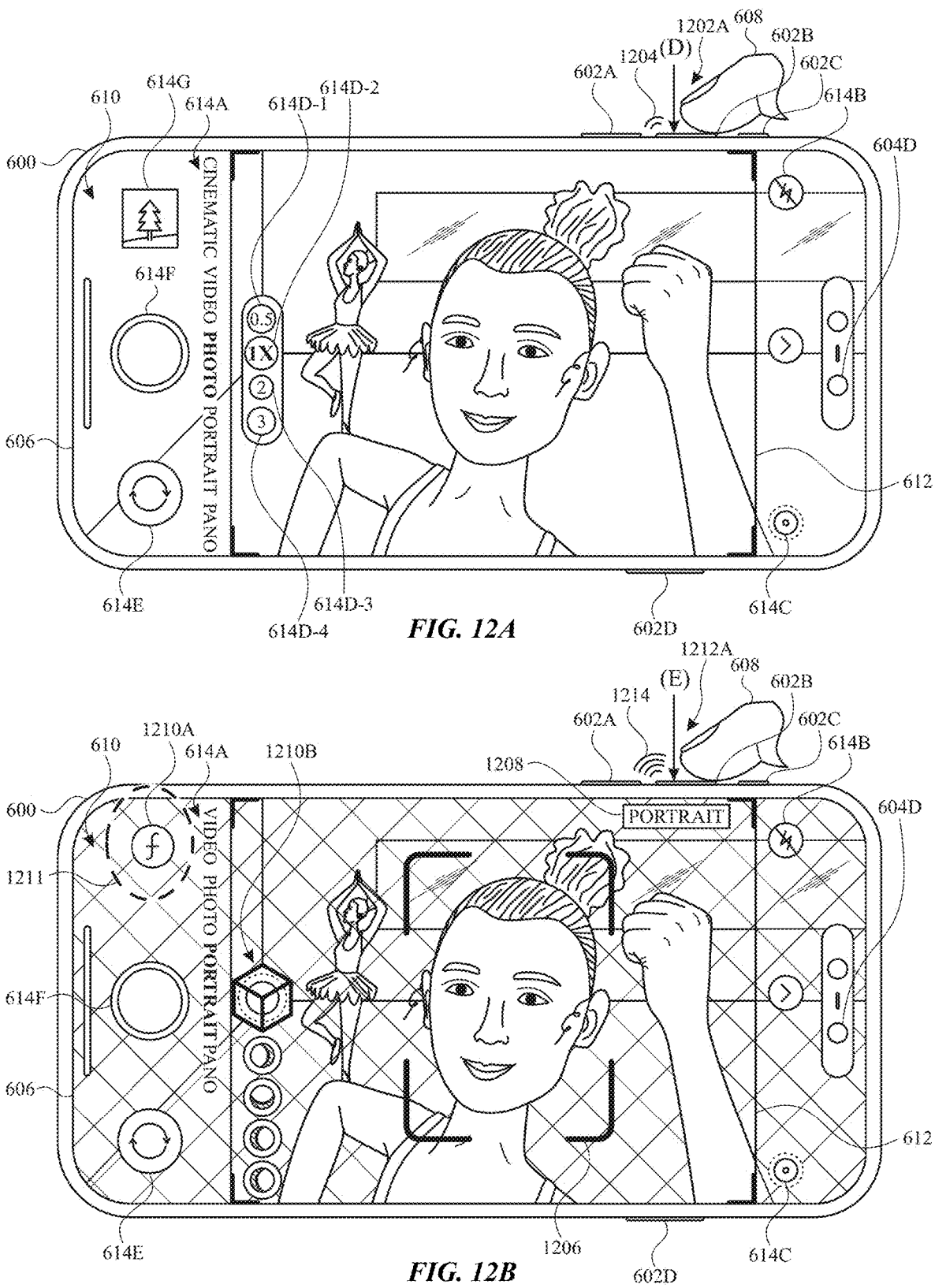
FIGS. 12A-12K illustrate example techniques and systems for using different hardware button presses to control different functions of a camera application in accordance with some embodiments.

At FIG. 12A, computer system 600 displays, via display 606, camera user interface 610 in the standard photo capture mode, as described above with respect to FIG. 6C (e.g., indicated by capture mode affordance 614A, in which the "photo" menu item is visually emphasized and centered). At FIG. 12A, computer system 600 detects press input 1202A of second button 602B, placing second button 602B into hardware button state (D) as described above with respect to FIG. 6B (e.g., applying less than hard-press pressure threshold $P_H$ to second button 602B and/or not depressing second button 602B to hard-press depression threshold $T_H$). Accordingly, computer system 600 registers press input 1202A as a light/partial-type press and provides tactile output 1204 (e.g., a light/partial press tactile output, such as described with respect tactile output 619 at FIG. 6F).

In response to detecting press input 1202A, a light/partial-type press of second button 602B, computer system 600 performs actions related to capturing media with a synthetic depth-of-field effect, for instance, placing camera user interface 610 into a portrait capture mode (e.g., a mode for capturing still or multi-frame photo media that are designated for display with synthetic depth-of-field effects, lighting effects, and/or other post-processing effects). As illustrated in FIG. 12B, computer system 600 applies a synthetic (e.g., simulated) depth-of-field effect to camera preview 612 (e.g., as described above with respect to FIG. 6F), variably blurring portions of the foreground and background in camera preview 612 to simulate in-focus and out-of-focus regions (e.g., the focal plane) of media capture with a particular f-stop value (e.g., f/1.4, f/2.8, or f/8). Computer system 600 additionally selects the person in the foreground of camera preview 612 as a media capture subject and displays subject indicator 1206 (e.g., as described with respect to subject indicator 616A in FIGS. 6F-6H). In some embodiments, computer system 600 applies the synthetic depth-of-field effect to camera preview 612 based on the detection of the media capture subject, for example, adjusting the simulated f-stop value and/or the simulated focal plane such that the person in the foreground remains mostly in-focus (e.g., un-blurred). In some embodiments, computer system 600 captures depth information in response to detecting press input 1202A of second button 602B.

Furthermore, computer system 600 updates the display of camera user interface 610 for the portrait capture mode, including updating capture mode affordance 614A to center and visually emphasize the "portrait" menu item, and displaying mode indicator 1208, a text banner reading "Portrait" (e.g., as described with respect to mode indicator 616B in FIGS. 6F-6H). Additionally, computer system 600 displays portrait mode controls including f-stop affordance 1210A and lighting effect affordance 1210B. In some embodiments, in response to an input directed to f-stop affordance 1210A, computer system 600 displays expanded f-stop controls (e.g., as described with respect to a long touch input on f-stop affordance 614H and expanded f-stop affordance 622A in FIGS. 6G and 6I) and/or toggles the application of the synthetic depth-of-field effect to camera preview 612 (e.g., in response to a short touch input). Lighting effect affordance 1210B includes controls for different synthetic (e.g., simulated) lighting and post-processing effects (e.g., simulated studio lighting effects, simulated stage lighting effects, simulated monochromatic capture, and/or other effects) that can be selected for application to portrait media captures. In some embodiments, in response to detecting press input 1202A being released (e.g., placed into hardware button state (A) and/or (B)), computer system 600 will revert the changes to the display illustrated in FIG. 12B (e.g., press input 1202A places camera user interface 610 into a temporary portrait capture mode).

At FIG. 12B, computer system 600 detects press input 1212A of second button 602B, placing second button 602B into hardware button state (E) as described above with respect to FIG. 6B (e.g., applying at least the hard-press pressure threshold $P_H$ to second button 602B and/or depressing second button 602B to hard-press depression threshold $T_He$). Accordingly, computer system 600 registers press input 1212A as a hard/full-type press and provides tactile output 1214 (e.g., a hard/full press tactile output, such as described with respect tactile output 626 at FIG. 6L). In response to detecting press input 1212A, a hard/full-type press of second button 602B, computer system 600 performs a portrait media capture, capturing photo media (e.g., still and/or multi-frame) designated for display with portrait mode effects, in particular, the effects previewed (and, in some embodiments, adjusted using f-stop affordance 1210A and/or lighting effect affordance 1210B) using press input 1202A, including the synthetic depth-of-field effect and/or other lighting/post-processing effects. In some embodiments, computer system 600 captures depth information in response to detecting press input 1212A of second button 602B. In some embodiments, computer system 600 will perform the portrait media capture as described even if press input 1202A (e.g., the light/partial-type press previewing the synthetic depth-of-field effects and placing camera user interface 610 into a portrait capture mode) is released prior to detecting press input 1202A. In some embodiments, computer system 600 will instead perform a standard media capture (e.g., capturing media without designating it for display with the portrait mode effects) if press input 1202A is released prior to detecting press input 1202A. As illustrated in FIG. 12B, computer system 600 displays mode indicator 1208 at the edge of display 606 below second button 602B, and, referring momentarily to FIG. 12D, updates captured media icon 614G to include a thumbnail of the portrait photo media capture.

Figures 12C, 12D:
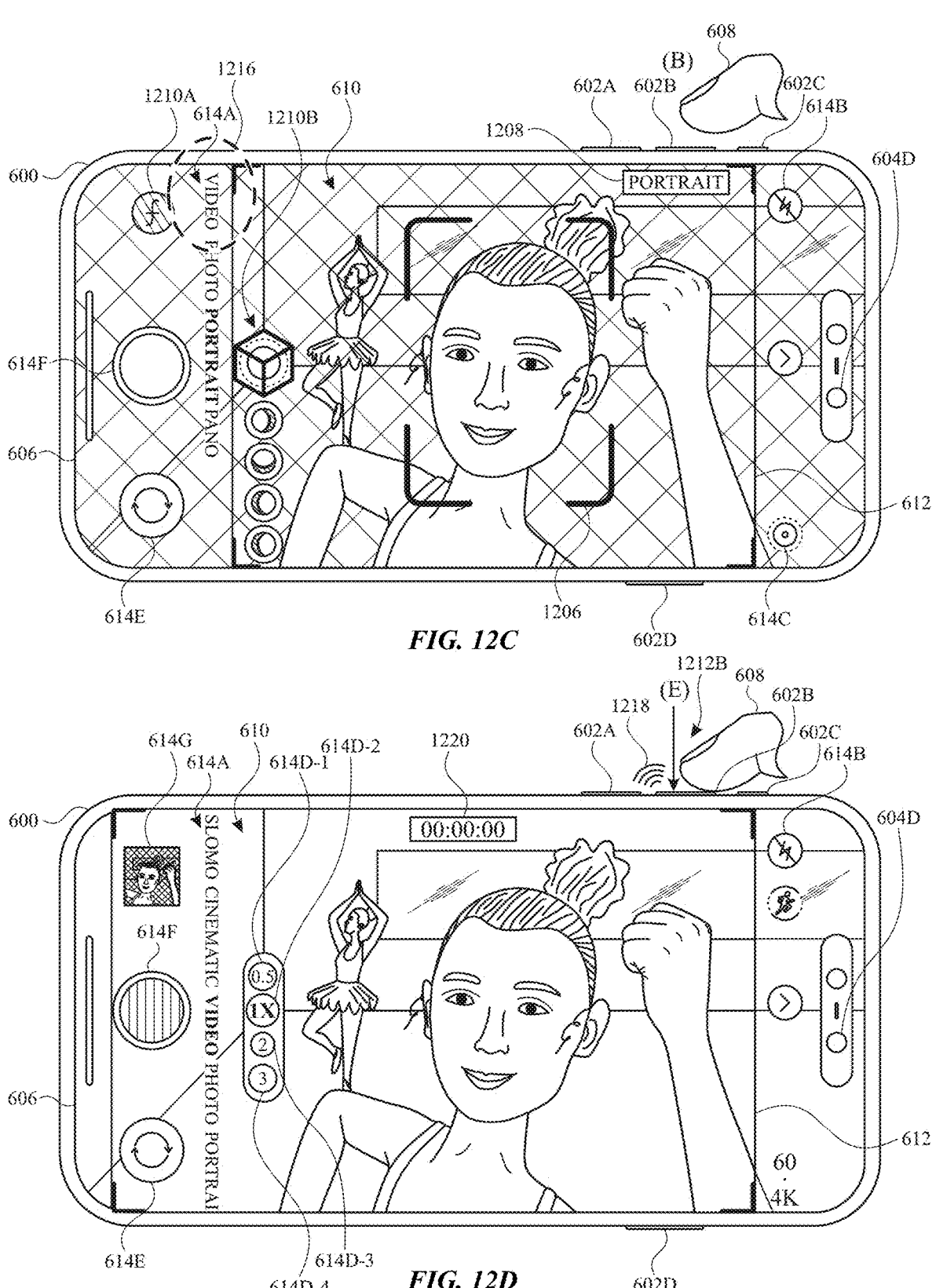

At FIG. 12B, computer system 600 detects touch input 1211 selecting f-stop affordance 1210A. In response to detecting touch input 1211, computer system 600 places camera user interface 610 in a persistent portrait capture mode, continuing to display camera user interface 610 with the portrait mode controls (e.g., f-stop affordance 1210A and lighting effect affordance 1210B), indicators (e.g., subject indicator 1206 and mode indicator 1208), and synthetic depth-of-field even when press input 1212A is released (e.g., placed into hardware button state (B)) as illustrated in FIG. 12C. In some embodiments, press input 1202A and/or press input 1212A of second button 602B may place camera user interface 610 into a persistent portrait capture mode persistently (e.g., camera user interface 610 remains in the portrait capture mode when second hardware button 602B is released, so computer system 600 will continue to display camera user interface 610 with the portrait mode controls and perform portrait media captures in response to capture inputs (e.g., hard/full presses of second button 602B and/or touch inputs of shutter affordance 614F) until another input changing the capture mode (e.g., via capture mode affordance 614A and/or f-stop affordance 1210A) is detected.

At FIG. 12C, computer system 600 detects input 1216 (e.g., a touch, tap, gesture, air gesture, and/or other input) selecting the "video" menu item in capture mode affordance 614A. In response to detecting input 1216, computer system 600 updates camera user interface 610 as illustrated in FIG. 10D, switching to a standard video capture mode. In particular, computer system 600 stops applying the synthetic depth-of-field and/or other portrait mode capture effects to camera preview 612; stops displaying f-stop affordance 1210A, lighting effect affordance 1210B, and mode indicator 1208; and updates capture mode affordance 614A to indicate the switch to the standard video capture mode.

At FIG. 10D, while displaying camera user interface 610 in the standard video capture mode, computer system 600 detects press input 1212B of second button 602B, placing second button 602B into hardware button state (E). Accordingly, computer system 600 registers press input 1212B as a hard/full-type press and provides tactile output 1218 (e.g., as described above with respect to FIG. 12B). In response to detecting press input 1212B, a hard/full-type press of second button 602B, computer system 600 initiates a cinematic video media capture (e.g., capturing video media designated for display with synthetic depth-of-field effects, lighting effects, and/or other post-processing effects) and displays video status indicator 1220 (e.g., a video capture timer). In some embodiments, press input 1212B places second button 602B into hardware button state (E) less than a threshold amount of time after placing second button 602B into hardware button state (D), and accordingly, computer system 600 does not register a light/partial-type press (e.g., press input 1212B is a "quick" hard/full press, as described above with respect to FIG. 6M), and accordingly does not update the display of camera user interface 610 as described with respect to the response to press input 1202A (e.g., previewing the portrait mode effects, displaying mode indicator 1208, displaying f-stop affordance 1210A, and/or displaying lighting effect affordance 1210B). However, in some embodiments, some actions related to capturing media with a synthetic depth-of-field effect, such as selecting a media capture subject and/or capturing depth information, may still be performed in response to a quick hard/full press of second button 602B (e.g., as part of performing the cinematic video capture).

Figures 12E, 12F:
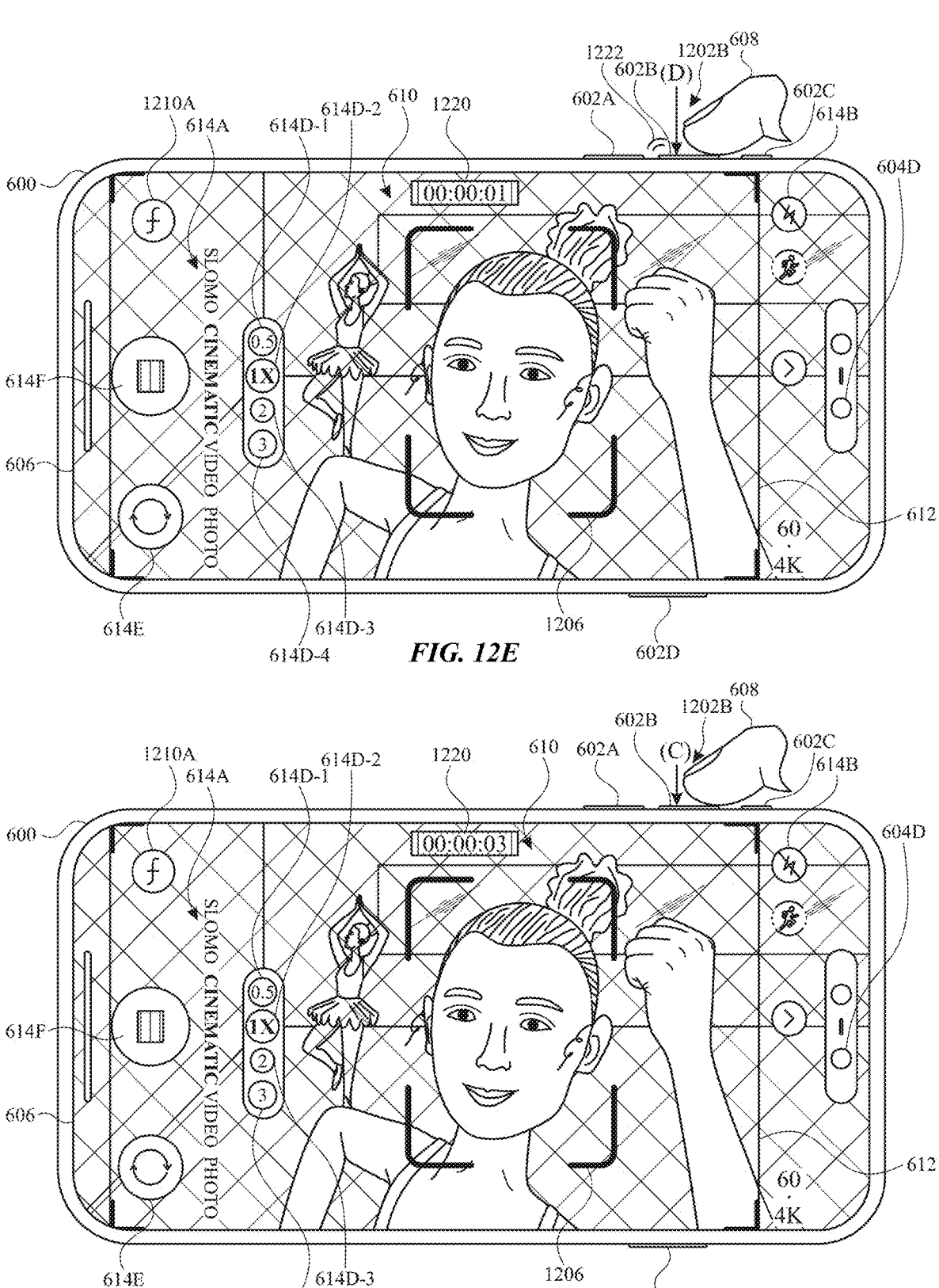

At FIG. 12E, while performing the video media capture, computer system 600 detects press input 1202B of second button 602B, which computer system 600 registers as a light/partial-type press. In response to detecting press input 1202B, computer system 600 performs the actions related to capturing video media with a synthetic depth-of-field effect while the video media capture is ongoing, for instance, placing camera user interface 610 into a cinematic capture mode (e.g., a mode for capturing video media that are designated for display with synthetic depth-of-field effects, lighting effects, and/or other post-processing effects). As illustrated in FIG. 12E, computer system 600 applies the synthetic depth-of-field effect to camera preview 612 and displays subject indicator 1206 to indicate a selected subject (in some embodiments, selecting the person in the foreground of camera preview 612 as a media capture subject (e.g., as described above with respect to FIG. 12B) in response to press input 1202B). In some embodiments, computer system 600 captures depth information in response to detecting press input 1202B of second button 602B. Additionally, computer system 600 updates the display of camera user interface 610 for the cinematic capture mode, updating capture mode affordance 614A to center and visually emphasize the "cinematic" menu item, displaying cinematic video controls including f-stop affordance 1210A. After detecting second button 602B in hardware button state (D), computer system 600 continues to register press input 1202B as a light/partial-type press when second button 602B is in hardware button state (C) (e.g., as described above with respect to FIGS. 6B and 6F-6J), and accordingly, at FIG. 12F, computer system 600 continues the actions related to capturing video media with the synthetic depth-of-field effect, including applying the synthetic depth-of-field effect to camera preview 612.

Figures 12G, 12H:
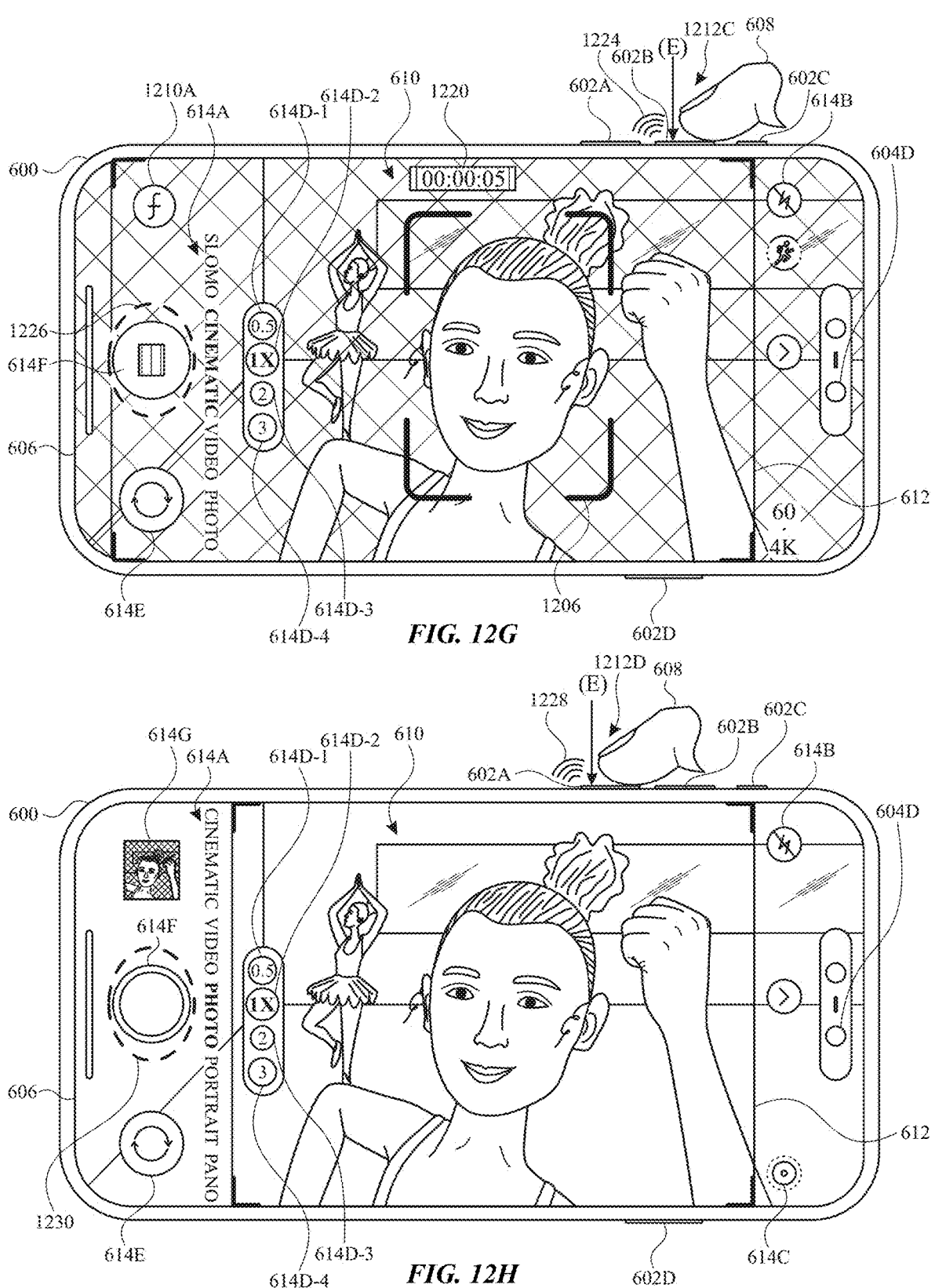

At FIG. 12G, computer system 600 detects press input 1212C, a hard/full-type press of second button 602B (e.g., placing second button 602B into hardware button state (E)). In response to press input 1212C, computer system 600 provides tactile output 1224 and ends the ongoing video capture. As illustrated in FIG. 12H, computer system 600 updates captured media icon 614G with a thumbnail of the captured video, which is displayed with the synthetic depth-of-field effect applied via press input 1202B during the video capture.

At FIG. 12H, computer system 600 detects press input 1212D, a hard/full-type press of first button 602A. In response to press input 1212D of first button 602A, computer system 600 performs a different media capture operation than the portrait photo media capture or the cinematic video media capture performed in response to press input 1212A and press input 1212B, the hard/full-type presses of second button 602B. In particular, as illustrated by the updated captured media icon 614G at FIG. 12I, the media capture operation performed in response to press input 1212D of first button 602A does not include designating the captured media for display with the synthetic depth-of-field effect. In some embodiments, the media capture operation performed in response to press input 1212D of first button 602A may include performing a standard photo capture (e.g., a mode for capturing photo media that are not designated for display with synthetic depth-of-field effects), a standard video capture (e.g., a mode for capturing video media that are not designated for display with synthetic depth-of-field effects), a high frame rate video capture (e.g., a "slo-mo" capture, for capturing video at a high frame rate for playback at a lower frame rate, resulting in a high-quality slow motion effect), a burst photo capture (e.g., a sequence of several still or multi-frame photo captures taken in short succession, as described with respect to FIG. 6X), and/or a panoramic photo capture (e.g., a mode for capturing photos from different positions and/or angles that are stitched together to create a single, larger form-factor image). In some embodiments, the media capture performed in response to press input 1212D of first button 602A may be the same type of media capture that computer system 600 would perform in response to input 1230 (e.g., a touch, tap, gesture, air gesture, and/or other input) selecting shutter affordance 614F or a different type of media capture than computer system 600 would perform in response to input 1230.

Figure 12I:
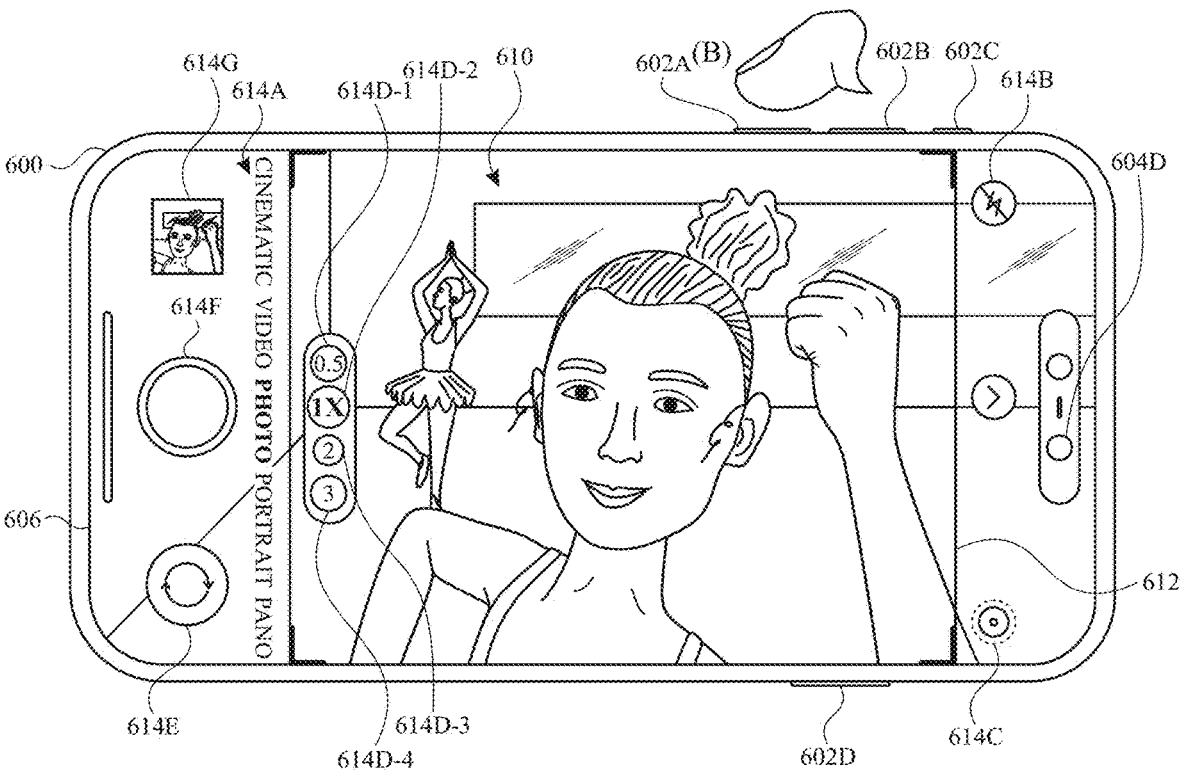
Figures 12J, 12K:
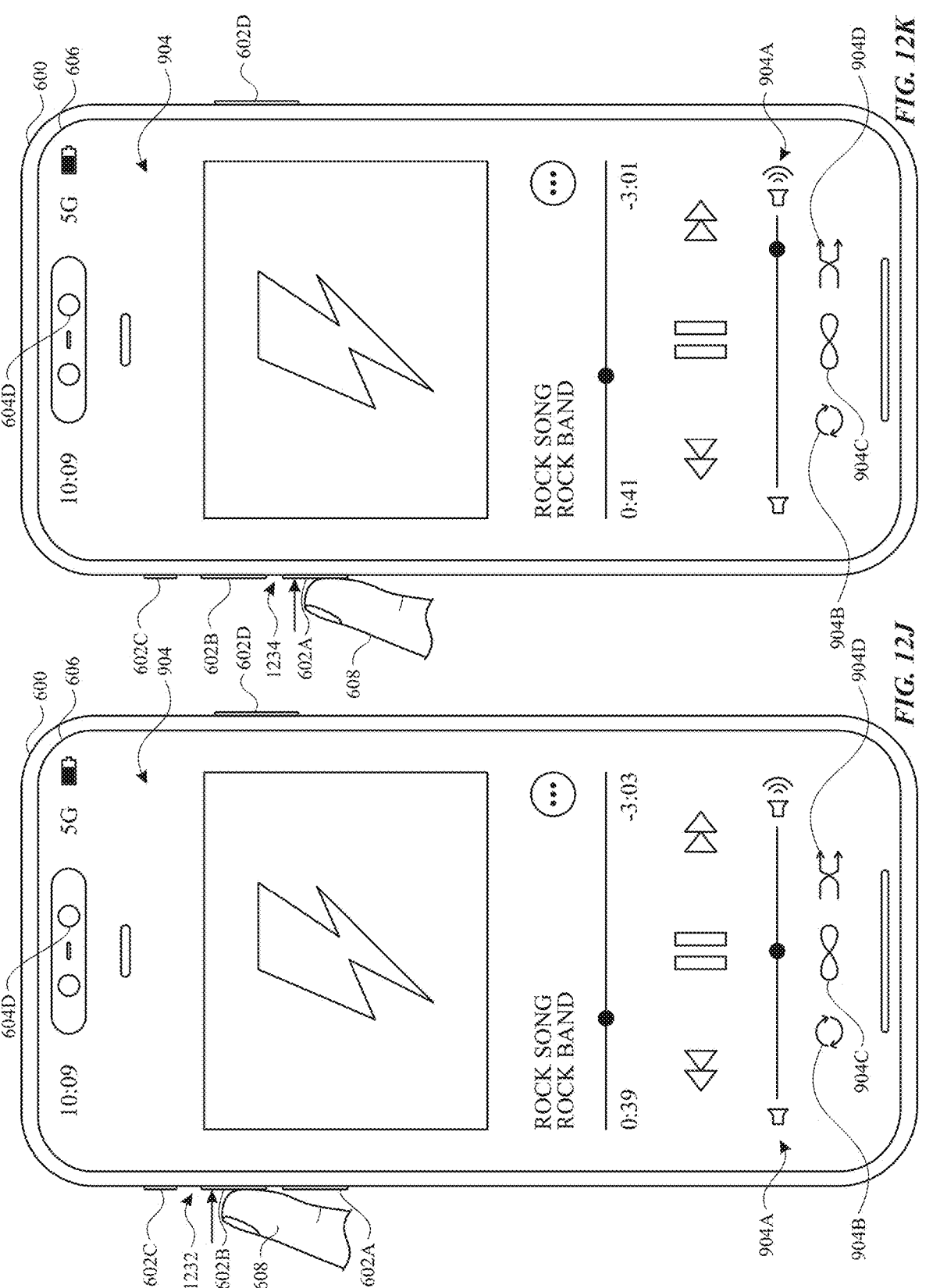

As illustrated in FIG. 12J, while displaying music application user interface 904, computer system 600 detects press input 1232 of second button 602B. In response to press input 1232, computer system 600 adjusts a playback volume setting for the music application upwards (e.g., louder), updating the display of volume slider 904A as illustrated in FIG. 12K to indicate the adjustment. At FIG. 12K, while displaying music application user interface 904, computer system 600 detects press input 1234 of first button 602A and, in response to press input 1234, adjusts the playback volume setting for the music application downwards (e.g., quieter). In some embodiments, pressing first button 602A and second button 602B may (respectively) adjust volume settings downwards and upwards in other contexts outside of camera user interface 610, for example, while displaying a home screen user interface, a lock screen user interface, or another application user interface (e.g., adjusting the system volume setting and/or an applications-specific volume setting).

FIG. 13 is a flow diagram illustrating a method for using different hardware button presses to control different functions of a camera application using a computer system in accordance with some embodiments. Method 1300 is performed at a computer system (e.g., 100, 300, 500, and/or 600) that is in communication with a display generation component (e.g., 606) (e.g., a display controller; a touch-sensitive display system; a display (e.g., integrated and/or connected), a 3D display, a transparent display, a projector, and/or a heads-up display), one or more cameras (e.g., 604A, 604B, 604C, and/or 604D), and a set of hardware buttons (e.g., 602A, 602B, 602C, and/or 602D) including at least a first hardware button (in some embodiments, a volume up button). In some embodiments, the one or more cameras include one or more rear (user-facing) cameras and/or one or more forward (environment-facing) cameras. In some embodiments, the one or more cameras include cameras with different lenses, such as a standard camera, a telephoto camera, and/or a wide-angle camera. In some embodiments, the computer system includes one or more depth sensors. In some embodiments, the set of hardware buttons includes a plurality of hardware buttons. In some embodiments, the plurality of hardware buttons can comprise multiple independently operable buttons in a compound form, such as, multiple pressure sensors and/or mechanical buttons in a single button housing and/or a solid-state button and/or trackpad with multiple sensing zones. In some embodiments, the set of hardware buttons includes buttons that can be depressed to varying levels (e.g., partially and/or "fully" depressed). In some embodiments, the set of hardware buttons includes pressure-sensitive buttons. In some embodiments, the set of hardware buttons includes mechanical buttons, which, in some embodiments, move between two or more states (e.g., from a rest (un-pressed) position to one or more depressed positions) when pressed (e.g., when pressure is applied). In some embodiments, the set of hardware buttons includes solid-state buttons. In some embodiments, the set of hardware buttons includes one or more pressure sensors. Some operations in method 1300 are, optionally, combined, the orders of some operations are, optionally, changed, and some operations are, optionally, omitted.

As described below, method 1300 provides an intuitive way for using different hardware button presses to control different functions of a camera application in accordance with some embodiments. The method reduces the cognitive burden on a user for controlling a camera application with a hardware button of a computer system, thereby creating a more efficient human-machine interface. For battery-operated computing devices, enabling a user to control a camera application faster and more efficiently conserves power and increases the time between battery charges.

The computer system (e.g., 600), while displaying, via the display generation component (e.g., 606), a camera application (e.g., 610), detects (1302) a press input (e.g., 1202A, 1202B, 1212A, 1212B, and/or 1212C) at a location corresponding to the first hardware button (e.g., 602B) (e.g., a button corresponding/mapped to Portrait mode). In some embodiments, displaying the camera application includes displaying a live preview of at least a portion of a field-of-view of the camera(s). In some embodiments, the press input is detected while displaying a camera preview in which depth information (e.g., information about the distance between the camera(s) and one or more subjects or features in the field-of-view of the camera(s)) is not currently being captured. In some embodiments, the press input is detected while displaying, a camera preview in which depth-based functionality (e.g., synthetic depth-of-field effects) is not currently being used. In response to detecting the press input (1304) and in accordance with a determination that the press input at the location corresponding to the first hardware button is a press input of a first type (e.g., as described with respect to press inputs 1202A and/or 1202B), the computer system performs (1306) a synthetic (e.g., simulated) depth-of-field operation in the camera application (e.g., as illustrated in FIGS. 12B and/or 12E-12G). For example, the synthetic depth-of-field operation may include surfacing synthetic depth-of-field effects (e.g., Portrait mode) options to the user, capturing depth information, determining a subject, and/or applying synthetic depth-of-field effects to the live camera preview. In some embodiments, a press input of the first type includes a soft and/or partial press. In some embodiments, a press input of the first type depresses the button less than a threshold amount (e.g., depressed less than 30%, 50%, or 80%, and/or not all the way to a hard press state). In some embodiments, a press input of the first type applies less than a threshold amount of pressure (e.g., less than 25 g/cm$^2$, 50 g/cm$^2$, 68 g/cm$^2$, or 75 g/cm$^2$ pressure). In some embodiments, the synthetic depth-of-field operation is performed without performing a media capture operation.

In response to detecting the press input (1304) and in accordance with a determination that the press input at the location corresponding to the first hardware button is a press input of a second type different from the first type (e.g., as described with respect to press inputs 1212A, 1212B, and/or 1212C), the computer system performs (1308) a first media capture operation in the camera application (e.g., as described with respect to FIGS. 12B, 12D, and/or 12G), wherein the press input at the location corresponding to the first hardware button of the second type applies more pressure to the location corresponding to the first hardware button than an amount of pressure that is applied to the location corresponding to the first hardware button by the press input of the first type (in some embodiments, a press of the second type depresses the first hardware button to a lower/further-depressed state than a press of the first type). For example, the media capture operation may include initiating capture of media. In some embodiments, the media capture operation includes performing a photo media capture and/or initiating and/or stopping video media capture. In some embodiments, performing a photo media capture includes capturing still photo media and/or photo media with a limited duration, such as a short (e.g., 1, 3, and/or 5 second) multi-frame capture that includes content from before and/or after a capture input is detected, creating a "live" effect. In some embodiments, photo media with a limited duration one or more images that are displayed in sequence (in some embodiments, a set of one or more of the images in the sequence were captured before the request to initiate capture was detected and one or more of the images in the sequence were captured after the request to initiate capture was detected), such as a media item that saved in the graphical interface file format. In some embodiments, the media capture operation is performed without performing the synthetic depth-of-field operation (e.g., media is captured without capturing depth/subject information or applying depth-of-field effects). In some embodiments, a synthetic depth-of-field operation is also performed (e.g., depth/subject information is captured so that the user can retroactively apply the synthetic depth-of-field effects to the captured media. In some embodiments, a press input of the second type includes a hard and/or full press. In some embodiments, a press input of the second type depresses the button at least a threshold amount (e.g., further than 30%, 50%, or 80% depression, and/or to the hard press state). In some embodiments, a press input of the second type applies at least a threshold amount of pressure (e.g., more than 25 g/cm², 50 g/cm², 68 g/cm², and/or 75 g/cm² pressure). Conditionally performing a synthetic depth-of-field operation and/or performing a media capture operation in response to a hardware button press based on whether the press is a "light" or "hard" press provides improved control of media capture without cluttering the media capture user interface with additional displayed controls. Doing so also assists the user with composing media capture events and reduces the risk that transient media capture opportunities are missed, captured with unintended depth-of-field settings, and/or mis-captured due to additional displayed controls obscuring the camera preview, which additionally, reduces power usage, improves battery life of the system, and improves ergonomics by enabling the user to use the system more quickly and efficiently. For example, a synthetic depth-of-field effect operation is performed in response to a "light" button press, allowing a user to control, apply, and/or preview the effect before, during, or after capturing media using a "hard" button press without needing to move their finger from the button or search for displayed touch controls. Enabling a single hardware button to both apply the synthetic depth-of-field effect and to capture media based on the input type also reduces the overall number of hardware components needed for control (e.g., compared to mapping different functions to different buttons), resulting in a more compact, lighter, and cost-effective device. Additionally, performing the synthetic depth-of-field operation in response to a light button press provides more efficient operation by reducing processing and power resources expended on depth-of-field operations (e.g., compared to leaving the synthetic depth-of-field effect "on").

In some embodiments, performing the synthetic depth-of-field operation includes selecting a subject (e.g., as indicated by 1206 in FIGS. 12B-12C and/or 12E-12G) (e.g., a face, person, pet, animal, and/or other object) included in a field-of-view of the one or more cameras (e.g., 612) (e.g., a portion of an environment (e.g., a physical and/or XR environment) being captured by the one or more cameras, for example, the field-of-view represented in a live camera preview of the camera application) and simulating a depth-of-field for media capture, wherein the subject is included in the depth-of-field for media capture (e.g., as illustrated in FIGS. 12B-12C and/or 12E-12G) (e.g., such that the subject appears in focus in the media capture, while content outside of the depth-of-field (e.g., in front of or behind) appears out of focus). For example, simulating the depth-of-field for media capture may include simulating conditions of capture using a lens with a particular depth-of-field, for instance, synthetically altering the focus (e.g., selectively blurring) of different regions/planes of the field-of-view of the one or more cameras. In some embodiments, selecting the subject includes detecting a particular subject (e.g., using image processing techniques and/or depth sensing). Selecting a subject of focus for applying the synthetic depth-of-field effects in response to a light button press assists the user with composing media capture events and improves ergonomics of media capture devices. Doing so also reduces the risk that transient media capture opportunities are missed, captured with unintended depth-of-field settings, and/or mis-captured due to additional displayed controls obscuring the camera preview, which additionally reduces power usage and improves battery life of the system. For example, a user can quickly compose and capture media with the subject in focus and/or with synthetic depth-of-field effects applied without needing to move their finger from the hardware button or search for displayed controls.

In some embodiments, the camera application (e.g., 610) includes a representation of a portion of a field-of-view of the one or more cameras (e.g., 612) (e.g., a live camera preview including at least a portion of an environment being captured by the one or more cameras) and performing the synthetic depth-of-field operation includes blurring one or more regions of the representation of the field-of-view of the one or more cameras to create an appearance of a synthetic depth-of-field of the one or more cameras (e.g., as illustrated in FIGS. 12B and/or 12E-12G). For example, blurring one or more regions of the representation of the field-of-view simulates conditions of capture using a lens with a particular depth-of-field, for example, by synthetically altering the focus (e.g., selectively blurring) of different regions of the live camera preview (e.g., the foreground and/or the background relative to a selected subject and/or focal plane). In some embodiments, blurring one or more regions of the representation of the field-of-view includes blurring portions of the foreground and/or background of the capture based on their respective distances from the subject and/or focal plane. For example, the computer system blurs portions of the foreground and background that are closer to (e.g., along the depth/focal axis of the capture) the subject/focal plane less (in some embodiments, with a smaller blur radius) than portions of the foreground and background that are farther away from the subject/focal plane. In some embodiments, the computer system does not blur the subject and/or portions of the capture that fall within the focal plane. Blurring portions of a camera preview to create the synthetic depth-of-field effects in response to a light button press assists the user with composing media capture events and improves ergonomics of media capture devices. Doing so also reduces the risk that transient media capture opportunities are missed, captured with unintended depth-of-field settings, and/or mis-captured due to additional displayed controls obscuring the camera preview, which additionally reduces power usage and improves battery life of the system. For example, a user can quickly compose and capture media with the desired blur appearance without needing to move their finger from the hardware button or search for displayed controls.

In some embodiments, performing the synthetic depth-of-field operation includes displaying, via the display generation component, a selectable user interface object (e.g., 1210A) (e.g., an interactive element/affordance, such as an f-stop button and/or a "Portrait" mode button) that, when selected (e.g., as illustrated in FIG. 12B) (e.g., via a touch, tap, gesture, air gesture, and/or gaze input), enables capture of media designated to be displayed with a synthetic depth-of-field effect. In some embodiments, the synthetic depth-of-field effect includes blurring and/or other visual effects applied based on captured depth information and/or content (e.g., face/subject detection), for example, simulating conditions of capture using a lens with a particular depth-of-field. In some embodiments, when enabled, the synthetic depth-of-field effects are applied to a live preview of the media capture, e.g., before and/or after the media capture. In some embodiments, when enabled, the synthetic depth-of-field effects are applied only to the captured media (e.g., and are not applied to the live preview before and/or after the media capture). Providing a user interface object that can be selected to enable capturing media with the synthetic depth-of-field effect in response to a light button press provides improved control of media capture without cluttering the media capture user interface with additional displayed controls. Doing so also assists the user with composing media capture events and reduces the risk that transient media capture opportunities are missed, captured with unintended depth-of-field settings, and/or mis-captured due to additional displayed controls obscuring the camera preview. For example, a button press can be used to quickly surface the synthetic depth-of-field effect option, which may enable certain synthetic depth-of-field options/operations without needing to press or hold the button.

In some embodiments, performing the synthetic depth-of-field operation (e.g., surfacing synthetic depth-of-field effects (e.g., Portrait mode) options to the user, capturing depth information, determining a subject/focal plane, and/or applying/enabling synthetic depth-of-field effects in the live camera preview) occurs while performing a video media capture operation (e.g., as illustrated in FIGS. 12E-12G). In some embodiments, in response to detecting a press input of the first type while capturing video, the synthetic depth-of-field operation is performed while the video capture is ongoing. In some embodiments, the video media capture operation is performed in response to detecting a press input of the second type. Performing the synthetic depth-of-field operation in response to a light button press while capturing video provides improved control of media capture without cluttering the media capture user interface with additional displayed controls, assisting the user with composing the video capture even after starting the capture and reducing the risk that transient media capture opportunities are captured with unintended depth-of-field settings and/or mis-captured due to additional displayed controls obscuring the camera preview. Doing so also improves ergonomics of media capture devices. For example, a user can quickly control, apply, and/or preview a synthetic depth-of-field effect for the ongoing video capture without needing to move their finger from the hardware button or needing extraneous touch inputs, which may distract the user and/or jostle the camera(s) during the capture.

In some embodiments, the computer system, after performing the synthetic depth-of-field operation (e.g., surfacing synthetic depth-of-field effects (e.g., Portrait mode) options to the user, capturing depth information, determining a subject, and/or applying/enabling synthetic depth-of-field effects in the live camera preview), performs a respective media capture operation (e.g., as illustrated in FIG. 12C) (e.g., capturing photo and/or video media). In some embodiments, the computer system performs the respective media capture operation in response to detecting a press input of the second type. In some embodiments, the computer system performs the respective media capture operation in response to detecting another media capture input (e.g., a selection of a displayed capture affordance). In some embodiments, the respective media capture operation includes capturing media designated to be displayed with a synthetic depth-of-field effect. Performing the synthetic depth-of-field operation in response to a light button press prior to capturing media provides improved control of media capture without cluttering the media capture user interface with additional displayed controls. Doing so also assists the user with composing media capture events and reduces the risk that transient media capture opportunities are missed, captured with unintended depth-of-field settings, and/or mis-captured due to additional displayed controls obscuring the camera preview, and improves ergonomics of media capture devices. For example, a user can quickly control, apply, and/or preview a synthetic depth-of-field effect and then initiate media capture without needing to move their finger from the hardware button or needing extraneous touch inputs, which may distract the user and/or delay capture.

In some embodiments, performing the first media capture operation includes capturing photo media (e.g., as described with respect to FIGS. 12B-12C). In some embodiments, capturing photo media includes capturing still photo media. In some embodiments, capturing photo media includes capturing photo media with a limited duration, such as a short (e.g., 1, 3, and/or 5 second), multi-frame capture that includes content from before and/or after a capture input is detected, creating a "live" effect. In some embodiments performing the first media capture operation includes capturing video media (e.g., as illustrated in FIGS. 12D-12G) (e.g., initiating video capture). In some embodiments, capturing video media continues while the press input is held (in some embodiments, with at least a threshold amount of pressure and/or depressing the first hardware button at least a threshold amount) and stops when the press input is released.

In some embodiments, the set of hardware buttons includes a second hardware button (e.g., 602A). In some embodiments, the computer system detects a second press input (e.g., 1212D) at a location corresponding to the second hardware button and, in response to detecting the second press input and in accordance with a determination that the second press input satisfies media capture criteria (in some embodiments, the media capture criteria include a criterion that is satisfied when the second press input is a press input of the second type; in some embodiments, the media capture criteria include a criterion that is satisfied when the second press input is detected while displaying the camera application), performs a second media capture operation in the camera application (e.g., as described with respect to FIGS. 12H-12I). For example, multiple different buttons can be used to initiate media capture. In some embodiments, the second media capture operation includes a photo media capture (e.g., of a still and/or live photo). In some embodiments, the second media capture operation includes initiating and/or stopping video media capture. In some embodiments, the second media capture operation is the same operation as the media capture operation performed using the first hardware button. In some embodiments, the second media capture operation is a different operation than the media capture operation performed using the first hardware button (e.g., a capture in a different mode and/or with different capture settings). In some embodiments, the set of hardware buttons may include additional hardware buttons that, when pressed, may cause additional media capture operations to be performed. Performing media capture operations in response to button presses detected at different hardware buttons provides improved control of media capture without cluttering the media capture user interface with additional displayed controls. Doing so also assists the user with composing media capture events and reduces the risk that transient media capture opportunities are missed and/or mis-captured due to additional displayed controls obscuring the camera preview.

In some embodiments, the second media capture operation is different from the first media capture operation (e.g., as described with respect to FIGS. 12H-12I; e.g., as described with respect to FIGS. 6A-6X, and 7). For example, media captured with the second hardware button is captured in a different mode and/or with different capture settings than media captured with the first hardware button. In some embodiments, the set of hardware buttons may include additional hardware buttons (e.g., first button 604A, second button 604B, third button 604C, and/or fourth button 604D) that, when pressed, may cause additional media capture operations, different than the first media capture operation and/or the second media capture operation, to be performed. For example, various buttons may be pressed to perform various capture operations, such as initiating a standard photo capture (e.g., a photo capture not designated for display with synthetic depth-of-field effects), a standard video capture (e.g., a video capture not designated for display with synthetic depth-of-field effects), a multi-frame (e.g., "live") photo capture, a burst photo capture (e.g., a sequence of multiple still and/or multi-frame photo captures), a portrait photo capture (e.g., a photo capture designated for display with synthetic depth-of-field effects), a cinematic video capture (e.g., a video capture designated for display with synthetic depth-of-field effects), a panoramic photo capture (e.g., capturing multiple photos from different positions/angles that can be merged to create a continuous image) and/or another type or format of media capture. Performing different media capture operations in response to button presses detected at different hardware buttons provides improved control of media capture without cluttering the media capture user interface with additional displayed controls. Doing so also assists the user with composing media capture events and reduces the risk that transient media capture opportunities are missed and/or mis-captured due to additional displayed controls obscuring the camera preview. For example, a user can quickly switch between different media capture operations by switching buttons, without needing to set up or select the desired operations via touch inputs.

In some embodiments, performing the first media capture operation includes capturing media in a first capture mode (e.g., as described with respect to FIGS. 12B-12G; e.g., as described with respect to FIGS. 6K-6L, 6U-6W, and/or 6X), and performing the second media capture operation includes capturing media in a second capture mode different from the first capture mode (e.g., as described with respect to FIGS. 12H-12I; e.g., as described with respect to FIGS. 6Q-6R). For example, the first capture mode and the second capture mode may include a photo capture mode (e.g., still photo media and/or multi-frame/"live" effect photo capture), a video capture mode, a capture mode for capturing media designated for display with a synthetic depth-of-field effect (e.g., a portrait photo and/or cinematic video mode), a capture mode for capturing multiple media items in quick succession (e.g., a burst photo mode), a high-resolution/professional capture mode, a high frame-rate video capture mode, and/or another capture mode. Performing media capture operations in different capture modes in response to button presses detected at different hardware buttons provides improved control of media capture without cluttering the media capture user interface with additional displayed controls. Doing so also assists the user with composing media capture events and reduces the risk that transient media capture opportunities are missed, captured in an unintended capture mode, and/or mis-captured due to additional displayed controls obscuring the camera preview. For example, a user can quickly switch between different capture modes by switching buttons, without needing to set up or select the desired mode via touch inputs.

In some embodiments, the computer system, while displaying, via the display generation component, a user interface (e.g., 900, 904, and/or 940) other than the camera application (e.g., 610) (e.g., another application UI, a home screen UI, and/or a lock screen UI), detects a third press input (e.g., 1232 and/or 1234) at a respective location (e.g., as illustrated in FIGS. 12J-12K). In some embodiments, the computer system, in response to detecting the third press input and in accordance with a determination that the respective location corresponds to the first hardware button (e.g., 602B), performs a first operation different from the first media capture operation (e.g., as described with respect to FIG. 12J) (in some embodiments, and different from the second media capture operation). For example, the first operation may include a non-media capture operation. In some embodiments, the first operation may include changing volume for audio output (e.g., volume up, volume down, and/or mute), for instance, for media playback, audio communication sessions (e.g., audio calls, video calls, and/or asynchronous audio communications (e.g., voice messages)), and/or other audio outputs such as alarms. In some embodiments, the first operation may include opening the camera application. In some embodiments, the computer system, in response to detecting the third press input and in accordance with a determination that the respective location corresponds to the second hardware button, performs a second operation different from the first operation and different from the second media capture operation (e.g., as described with respect to FIG. 12K) (in some embodiments, and different from the first media capture operation). For example, the second operation may include a non-media capture operation. In some embodiments, the second operation includes changing volume for audio output (e.g., volume up, volume down, and/or mute)). Performing a synthetic depth-of-field operation and/or performing a media capture operation in response to hardware button presses detected while the camera application is open and performing different operations in response to hardware button presses detected while the camera application is not open provides improved control of devices without cluttering the media capture user interface with additional displayed controls. Enabling a single hardware button to conditionally perform different operations based on the current application context also reduces the overall number of hardware components needed for control (e.g., compared to mapping different functions to different buttons), resulting in a more compact, lighter, and cost-effective device.

In some embodiments, while displaying, via the display generation component, a user interface (e.g., 900, 904, and/or 940) other than the camera application (e.g., 610) (e.g., another application UI, a home screen UI, and/or a lock screen UI), the computer system detects a fourth press input (e.g., 1232 and/or 1234) (in some embodiments, the fourth press input is the same as the third press input) at a location corresponding to the first hardware button and, in response to detecting the fourth press input, changes a volume setting for audio outputs (e.g., as illustrated in FIGS. 12J-12K). For example, changing the volume setting may include turning the volume setting up, turning the volume setting down, and/or muting. In some embodiments, the volume setting is a volume setting for media playback, audio communication sessions (e.g., audio calls, video calls, and/ or asynchronous audio communications (e.g., voice messages)), and/or other audio outputs such as alarms. Performing a synthetic depth-of-field operation and/or performing a media capture operation in response to hardware button presses detected while the camera application is open and performing a volume change operation in response to hardware button presses detected while the camera application is not open provides improved control of devices without cluttering the media capture user interface with additional displayed controls. Enabling a single hardware button to conditionally perform both camera operations or volume change operations based on the current application context also reduces the overall number of hardware components needed for control (e.g., compared to mapping different functions to different buttons), resulting in a more compact, lighter, and cost-effective device.

In some embodiments, the first hardware button comprises a pressure-sensitive button (e.g., as described with respect to FIG. 6B). In some embodiments, the pressure sensitive button includes at least one pressure sensor. In some embodiments, the pressure sensitive button includes a mechanical button that physically depresses when pressure is applied. In some embodiments, the pressure sensitive button includes a solid-state button that does not physically depress when pressure is applied. In some embodiments, the solid-state button includes one or more tactile (e.g., haptic) output generators that create the sensation of physically depressing a button.

Note that details of the processes described above with respect to method 1100 (e.g., FIG. 11) are also applicable in an analogous manner to the methods described below/above. For example, method 1100 optionally includes one or more of the characteristics of the various methods described above with reference to methods 700, 800, and/or 1000 and below with reference to method 1300. For example, in addition to performing a synthetic depth-of-field operation in response to light/partial presses as described with respect to method 1300, computer systems may change camera touch controls as described with respect to method 800, and in addition to performing a media capture operation in response to hard/ full presses as described with respect to method 1300, computer systems may perform different media capture operations depending on the button pressed as described with respect to method 700. In addition to responding differently to light/partial vs. hard/full presses, computer systems may respond differently to other types of presses as described with respect to method 1100, and may launch the camera user interface described with respect to method 1300 using hardware button presses as described with respect to method 1000. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the provision and customization of user interfaces. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to customize user interfaces. Accordingly, use of such personal information data helps provide user interfaces suited to users' needs. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of customizing user interfaces, the present technology can be configured to allow users to select to "opt in" or "opt out" of participation in the collection of personal information data during registration for services or anytime thereafter. In another example, users can select not to provide mood-associated data for providing and customizing user interfaces. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user interfaces can be provided and customized based on non-personal information data or a bare minimum amount of personal information, such as the content being requested by the device associated with a user, other non-personal information available to the computer systems, or publicly available information.

What is claimed is:

1. A computer system configured to communicate with a display generation component, one or more cameras, and a hardware button, comprising:
one or more processors; and
memory storing one or more programs configured to be executed by the one or more processors, the one or more programs including instructions for:
detecting, via the hardware button, a respective input that includes a first press of the hardware button;
in accordance with a determination that the first press of the hardware button satisfies a first set of criteria, wherein the first set of criteria includes a first subset of criteria that is satisfied when the respective input includes a press of a first type, displaying, via the display generation component, a menu of one or more settings that can be associated with the hardware button; and
in accordance with a determination that the first press of the hardware button satisfies a second set of criteria different from the first set of criteria, wherein the second set of criteria includes a second subset of criteria that is satisfied when the respective input includes a press of a second type different from the first type, changing a value of a first setting of the one or more settings to a first value based on the respective input.

2. The computer system of claim 1, wherein:
the first subset of criteria includes a first criterion that is satisfied when the first press of the hardware button includes a multiple-press sequence.

3. The computer system of claim 1, wherein the first setting includes a media capture setting.

4. The computer system of claim 1, wherein the first set of criteria and the second set of criteria include a respective criterion that is satisfied when the first press of the hardware button is detected while displaying, via the display generation component, a respective application.

5. The computer system of claim 4, the one or more programs further including instructions for:
in accordance with a determination that the first press of the hardware button satisfies a third set of criteria, wherein the third set of criteria includes a criterion that is satisfied when the first press of the hardware button is not detected while displaying the respective application, displaying, via the display generation component, the respective application.

6. The computer system of claim 1, wherein displaying the menu of the one or more settings includes:
displaying one or more menu items corresponding to the one or more settings; and
while a respective setting of the one or more settings is associated with the hardware button, visually indicating a respective menu item of the one or more menu items corresponding to the respective setting.

7. The computer system of claim 1, the one or more programs further including instructions for:
while displaying the menu of the one or more settings, detecting a first input; and in response to detecting the first input:

in accordance with a determination that the first input corresponds to a selection of a respective setting of the one or more settings, ceasing displaying the menu of the one or more settings.

8. The computer system of claim 7, wherein the first input includes a touch input detected via a touch-sensitive surface in communication with the computer system.

9. The computer system of claim 1, the one or more programs further including instructions for:

while displaying the menu of one or more settings, detecting a second input;

in response to detecting the second input:

in accordance with a determination that the second input does not correspond to a selection of a respective setting of the one or more settings, ceasing displaying the menu of one or more settings.

10. The computer system of claim 1, wherein changing the value of the first setting of the one or more settings to the first value includes displaying, via the display generation component, an indication of the first value.

11. The computer system of claim 10, the one or more programs further including instructions for:

while displaying the indication of the first value, reducing a visual prominence of the indication of the first value; and after reducing the visual prominence of the indication of the first value, ceasing displaying the indication of the first value.

12. The computer system of claim 1, the one or more programs further including instructions for:

after changing the value of the first setting of the one or more settings to the first value, detecting, via the hardware button, a second respective input that includes a second press of the hardware button; and in accordance with a determination that the second press of the hardware button satisfies the second set of criteria, changing the value of the first setting to a second value different from the first value.

13. The computer system of claim 12, wherein the second set of criteria includes a first criterion that is satisfied when the first setting is associated with the hardware button, and the one or more programs further including instructions for:

in accordance with a determination that the second press of the hardware button satisfies a third set of criteria different from the first set of criteria and different from the second set of criteria, changing a value of a second setting, different from the first setting, of the one or more settings to a third value, wherein third set of criteria includes a second criterion that is satisfied when the second setting is associated with the hardware button.

14. The computer system of claim 12, the one or more programs further including instructions for:

detecting, via the hardware button, a third respective input that includes a third press of the hardware button; and in accordance with a determination that the third press of the hardware button satisfies a fourth set of criteria different from the first set of criteria:

changing a value of a respective setting of the one or more settings to a respective value; and displaying, via the display generation component, an indication of the respective value.

15. The computer system of claim 14, wherein the indication of the respective value is displayed at a location proximate to the hardware button.

16. The computer system of claim 1, the one or more programs further including instructions for:

in response to detecting the first press of the hardware button, displaying, via the display generation component, an animation of a graphical element, wherein the animation of the graphical element visually represents the first press.

17. The computer system of claim 16, wherein displaying the animation of the graphical element includes:

in accordance with a determination that the first press has a first value for a respective input characteristic of the first press, displaying the animation of the graphical element with a first animation characteristic; and in accordance with a determination that the first press has a second value different from the first value for the respective input characteristic of the first press, displaying the animation of the graphical element with a second animation characteristic different from the first animation characteristic.

18. The computer system of claim 16, wherein displaying the animation of the graphical element includes:

in accordance with a determination that the first press of the hardware button satisfies the first set of criteria including the first subset of criteria that is satisfied when the first press is a press of the first type, animating the graphical element transforming into the menu of the one or more settings that can be associated with the hardware button.

19. The computer system of claim 16, wherein displaying the animation of the graphical element includes:

in accordance with a determination that the first press is detected while displaying, via the display generation component, a camera user interface that includes a camera preview representing at least a portion of a field-of-view of the one or more cameras, displaying the graphical element overlaying at least a portion of the camera preview.

20. The computer system of claim 1, the one or more programs further including instructions for:

while detecting the first press of the hardware button, displaying, via the display generation component, a user interface that includes one or more selectable user interface objects; and in accordance with the determination that the first press of the hardware button satisfies the first set of criteria including the first subset of criteria that is satisfied when the first press is a press of the first type, ceasing displaying at least one selectable user interface object of the one or more selectable user interface objects.

21. A non-transitory computer-readable storage medium storing one or more programs configured to be executed by one or more processors of a computer system that is in communication with a display generation component, one or more cameras, and a hardware button, the one or more programs including instructions for:

detecting, via the hardware button, a respective input that includes a first press of the hardware button;

in accordance with a determination that the first press of the hardware button satisfies a first set of criteria, wherein the first set of criteria includes a first subset of criteria that is satisfied when the respective input includes a press of a first type, displaying, via the display generation component, a menu of one or more settings that can be associated with the hardware button; and in accordance with a determination that the first press of the hardware button satisfies a second set of criteria different from the first set of criteria, wherein the second set of criteria includes a second subset of criteria that is satisfied when the respective input includes a press of a second type different from the first type, changing a value of a first setting of the one or more settings to a first value based on the respective input.

22. A method, comprising:

at a computer system that is in communication with a display generation component, one or more cameras, and a hardware button:

detecting, via the hardware button, a respective input that includes a first press of the hardware button;

in accordance with a determination that the first press of the hardware button satisfies a first set of criteria, wherein the first set of criteria includes a first subset of criteria that is satisfied when the respective input includes a press of a first type, displaying, via the display generation component, a menu of one or more settings that can be associated with the hardware button; and in accordance with a determination that the first press of the hardware button satisfies a second set of criteria different from the first set of criteria, wherein the second set of criteria includes a second subset of criteria that is satisfied when the respective input includes a press of a second type different from the first type, changing a value of a first setting of the one or more settings to a first value based on the respective input.

23. The non-transitory computer-readable storage medium of claim 21, wherein:

the first subset of criteria includes a first criterion that is satisfied when the first press of the hardware button includes a multiple-press sequence.

24. The non-transitory computer-readable storage medium of claim 21, wherein the first setting includes a media capture setting.

25. The non-transitory computer-readable storage medium of claim 21, wherein the first set of criteria and the second set of criteria include a respective criterion that is satisfied when the first press of the hardware button is detected while displaying, via the display generation component, a respective application.

26. The non-transitory computer-readable storage medium of claim 21, wherein displaying the menu of the one or more settings includes:

displaying one or more menu items corresponding to the one or more settings; and while a respective setting of the one or more settings is associated with the hardware button, visually indicating a respective menu item of the one or more menu items corresponding to the respective setting.

27. The non-transitory computer-readable storage medium of claim 21, the one or more programs further including instructions for:

while displaying the menu of the one or more settings, detecting a first input; and in response to detecting the first input:

in accordance with a determination that the first input corresponds to a selection of a respective setting of the one or more settings, ceasing displaying the menu of the one or more settings.

28. The non-transitory computer-readable storage medium of claim 21, the one or more programs further including instructions for:

while displaying the menu of one or more settings, detecting a second input;

in response to detecting the second input:

in accordance with a determination that the second input does not correspond to a selection of a respective setting of the one or more settings, ceasing displaying the menu of one or more settings.

29. The non-transitory computer-readable storage medium of claim 21, wherein changing the value of the first setting of the one or more settings to the first value includes displaying, via the display generation component, an indication of the first value.

30. The non-transitory computer-readable storage medium of claim 21, the one or more programs further including instructions for:

after changing the value of the first setting of the one or more settings to the first value, detecting, via the hardware button, a second respective input that includes a second press of the hardware button; and in accordance with a determination that the second press of the hardware button satisfies the second set of criteria, changing the value of the first setting to a second value different from the first value.

31. The non-transitory computer-readable storage medium of claim 21, the one or more programs further including instructions for:

in response to detecting the first press of the hardware button, displaying, via the display generation component, an animation of a graphical element, wherein the animation of the graphical element visually represents the first press.

32. The non-transitory computer-readable storage medium of claim 21, the one or more programs further including instructions for:

while detecting the first press of the hardware button, displaying, via the display generation component, a user interface that includes one or more selectable user interface objects; and in accordance with the determination that the first press of the hardware button satisfies the first set of criteria including the first subset of criteria that is satisfied when the first press is a press of the first type, ceasing displaying at least one selectable user interface object of the one or more selectable user interface objects.

33. The method of claim 22, wherein:

the first subset of criteria includes a first criterion that is satisfied when the first press of the hardware button includes a multiple-press sequence.

34. The method of claim 22, wherein the first setting includes a media capture setting.

35. The method of claim 22, wherein the first set of criteria and the second set of criteria include a respective criterion that is satisfied when the first press of the hardware button is detected while displaying, via the display generation component, a respective application.

36. The method of claim 22, wherein displaying the menu of the one or more settings includes:

displaying one or more menu items corresponding to the one or more settings; and while a respective setting of the one or more settings is associated with the hardware button, visually indicating a respective menu item of the one or more menu items corresponding to the respective setting.

37. The method of claim 22, further comprising:

while displaying the menu of the one or more settings, detecting a first input; and in response to detecting the first input:

in accordance with a determination that the first input corresponds to a selection of a respective setting of the one or more settings, ceasing displaying the menu of the one or more settings.

38. The method of claim 22, further comprising:

while displaying the menu of one or more settings, detecting a second input;

in response to detecting the second input:

in accordance with a determination that the second input does not correspond to a selection of a respective setting of the one or more settings, ceasing displaying the menu of one or more settings.

39. The method of claim 22, wherein changing the value of the first setting of the one or more settings to the first value includes displaying, via the display generation component, an indication of the first value.

40. The method of claim 22, further comprising:

after changing the value of the first setting of the one or more settings to the first value, detecting, via the hardware button, a second respective input that includes a second press of the hardware button; and in accordance with a determination that the second press of the hardware button satisfies the second set of criteria, changing the value of the first setting to a second value different from the first value.

41. The method of claim 22, further comprising:

in response to detecting the first press of the hardware button, displaying, via the display generation component, an animation of a graphical element, wherein the animation of the graphical element visually represents the first press.

42. The method of claim 22, further comprising:

while detecting the first press of the hardware button, displaying, via the display generation component, a user interface that includes one or more selectable user interface objects; and in accordance with the determination that the first press of the hardware button satisfies the first set of criteria including the first subset of criteria that is satisfied when the first press is a press of the first type, ceasing displaying at least one selectable user interface object of the one or more selectable user interface objects.

* * * * *